US012300977B2

(12) United States Patent
Kulkarni et al.

(10) Patent No.: US 12,300,977 B2
(45) Date of Patent: May 13, 2025

(54) MODULAR PLUG-IN POWER DISTRIBUTION PANEL ASSEMBLY FOR CRITICAL LOADS

(71) Applicant: IEM NEW SUB 2 LLC, Fremont, CA (US)

(72) Inventors: Ashok Kulkarni, Fremont, CA (US); Frank Cavezza, San Jose, CA (US); Jorge Alfaro, Pico Rivera, CA (US); Robert Walter, Jr., Fremont, CA (US)

(73) Assignee: IEM NEW SUB 2 LLC, Fremont, CA (US)

( * ) Notice: Subject to any disclaimer, the term of this patent is extended or adjusted under 35 U.S.C. 154(b) by 259 days.

(21) Appl. No.: 18/178,092

(22) Filed: Mar. 3, 2023

(65) Prior Publication Data
US 2023/0283052 A1    Sep. 7, 2023

Related U.S. Application Data

(60) Provisional application No. 63/315,989, filed on Mar. 3, 2022.

(51) Int. Cl.
*H02B 1/20* (2006.01)
*H02B 1/30* (2006.01)
(Continued)

(52) U.S. Cl.
CPC .............. *H02B 1/30* (2013.01); *H02B 1/20* (2013.01); *H02B 1/565* (2013.01); *H02B 13/0358* (2013.01)

(58) Field of Classification Search
None
See application file for complete search history.

(56) References Cited

U.S. PATENT DOCUMENTS

| 4,209,818 A | 6/1980 | Zylstra et al. |
| 5,351,165 A | 9/1994 | Hancock |

(Continued)

OTHER PUBLICATIONS

International Application No. PCT/US2023/063739 , "International Search Report and Written Opinion", Sep. 27, 2023, 12 pages.

*Primary Examiner* — Courtney L Smith
(74) *Attorney, Agent, or Firm* — Kilpatrick Townsend & Stockton LLP

(57) ABSTRACT

A 100%-rated, touch-safe, 800-ampere (A)/1000 A/1200 A, wall-mounted or floor-mounted, modular plug-in power distribution panel assembly (MPIPDPA) is provided for addition of critical loads. The MPIPDPA includes a bus bar assembly with bus bars operably coupled to a panel accommodated in an electrical enclosure, and bus straps selectively configured for providing electrical insulation and ensuring operability of the MPIPDPA. Multiple plug-in bases are operably coupled to the bus bar assembly. Configurable 100%-rated, 150 A/250 A/400 A/600 A plug-in breakers are detachably coupled to the plug-in bases without having to power down a main power or the critical loads. One or more barriers are provided for the plug-in breakers to securely direct gases produced within the electrical enclosure, out of the electrical enclosure to an external environment. Multiple heat sinks are operably coupled to terminals of the plug-in breakers for cooling the terminals of the plug-in breakers to ensure safety and standards compliance.

20 Claims, 85 Drawing Sheets

(51) Int. Cl.
    *H02B 1/56*     (2006.01)
    *H02B 13/00*     (2006.01)
    *H02B 13/035*     (2006.01)

(56) References Cited

U.S. PATENT DOCUMENTS

| | | |
|---|---|---|
| 6,003,012 A | 12/1999 | Nick |
| 6,063,996 A | 5/2000 | Takada et al. |
| 6,205,019 B1 * | 3/2001 | Krom ........................ H02B 1/56 361/639 |
| 9,263,860 B2 * | 2/2016 | Crooks ..................... H02B 1/04 |
| 9,312,668 B2 * | 4/2016 | Faber ....................... H02B 1/14 |
| 9,338,866 B1 * | 5/2016 | Faber ..................... H01H 71/082 |
| 9,413,142 B2 * | 8/2016 | Duda ........................ H02B 1/20 |
| 11,158,998 B1 * | 10/2021 | Fonseca ................... H02B 1/56 |
| 2005/0012578 A1 * | 1/2005 | Afshari .................... H02B 1/06 335/202 |
| 2009/0273425 A1 | 11/2009 | Tremaine |
| 2010/0304590 A1 * | 12/2010 | Frassineti .............. H02B 11/04 439/196 |
| 2013/0107448 A1 | 5/2013 | Hamburgen et al. |
| 2014/0160639 A1 * | 6/2014 | Duda ........................ H02B 1/56 361/652 |
| 2014/0301092 A1 | 10/2014 | Wronski et al. |
| 2015/0282381 A1 | 10/2015 | Yampolsky |
| 2015/0282838 A1 | 10/2015 | Langdale et al. |
| 2015/0371790 A1 * | 12/2015 | Sippel .................. H01H 71/082 29/874 |
| 2016/0181748 A1 | 6/2016 | Rathjen et al. |
| 2017/0040135 A1 | 2/2017 | Hughes |
| 2019/0372282 A1 * | 12/2019 | Baillargeon ............. H02B 1/48 |
| 2019/0372283 A1 * | 12/2019 | Irons .................... H01R 25/165 |

\* cited by examiner

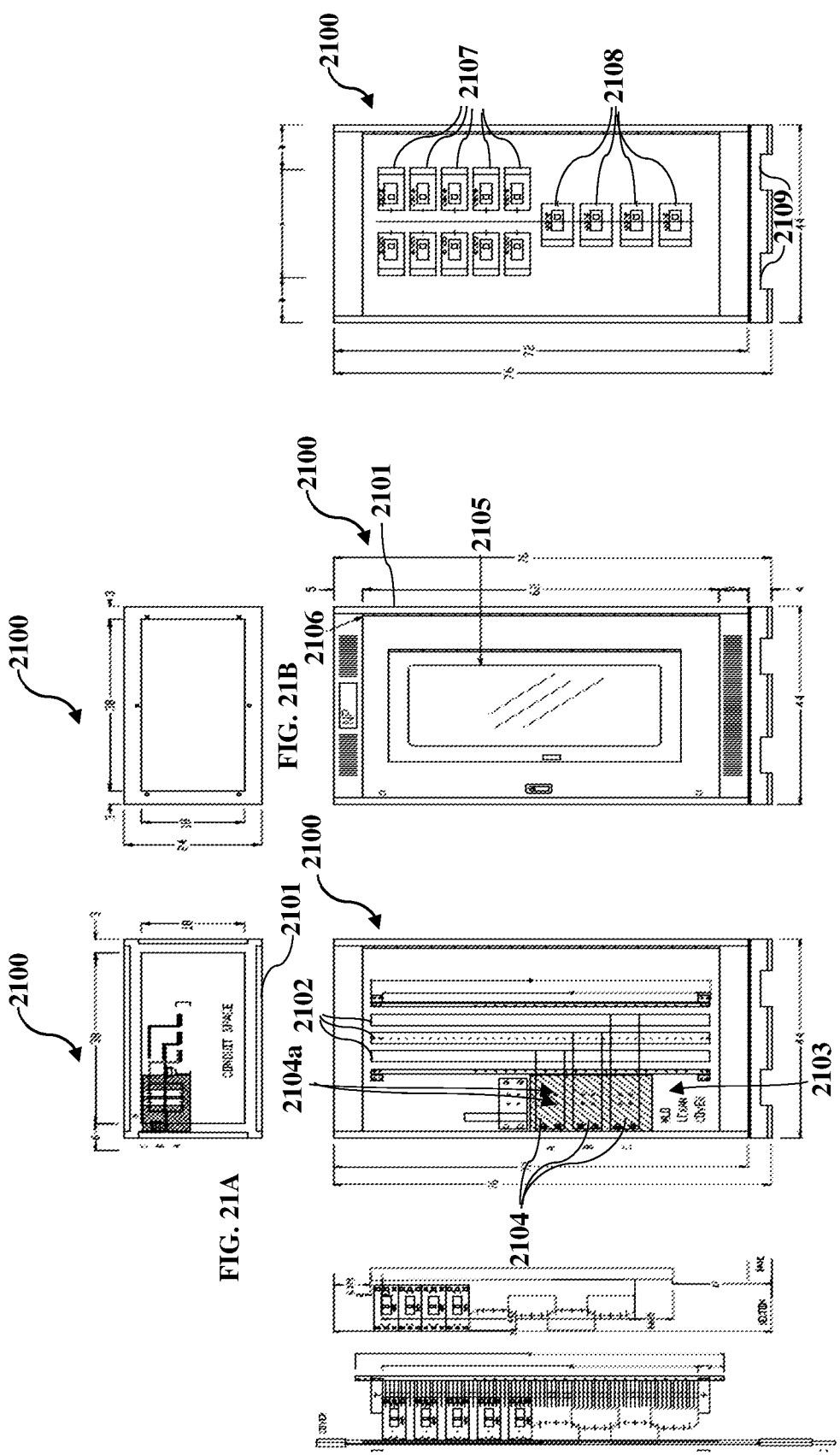

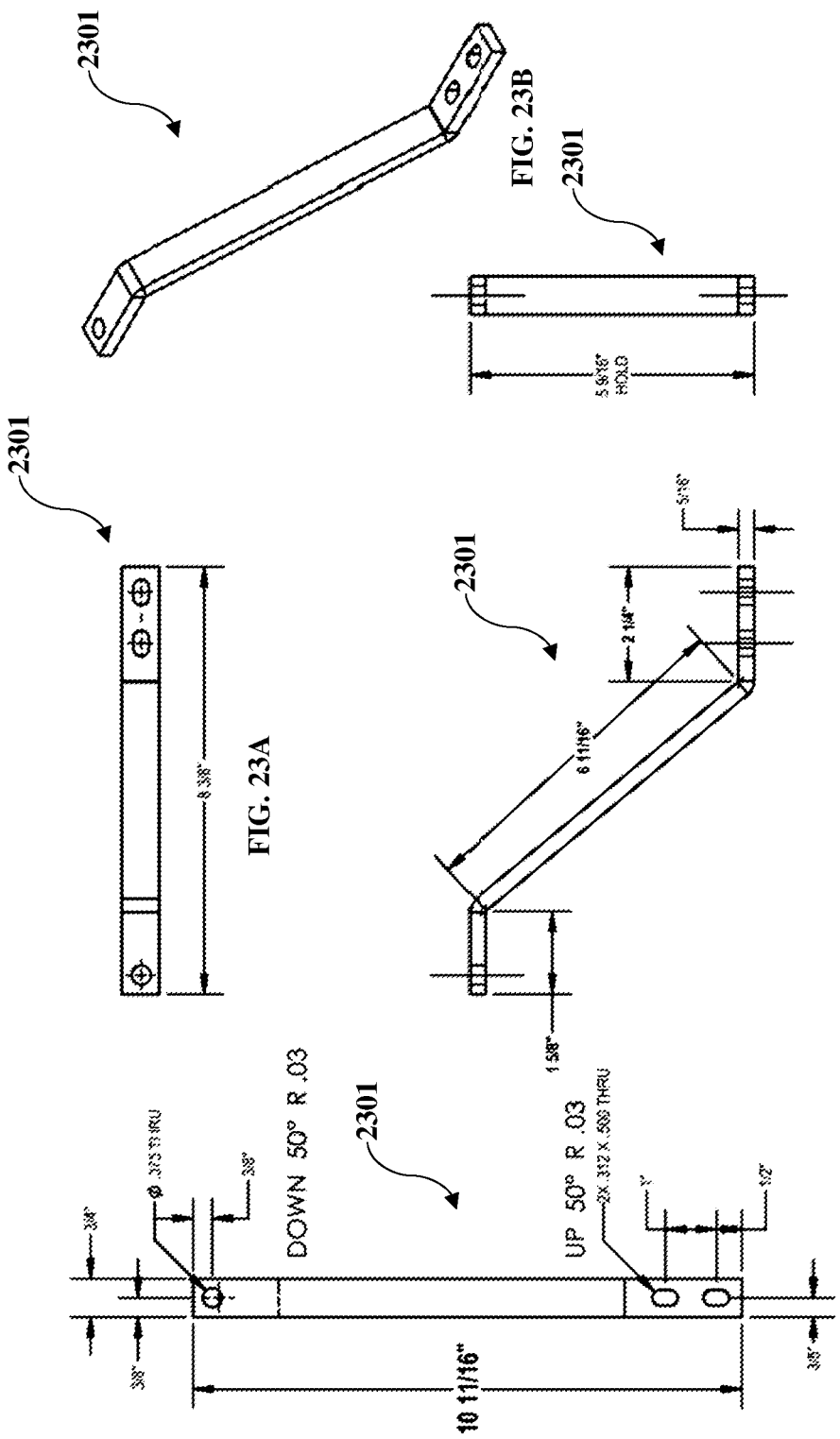

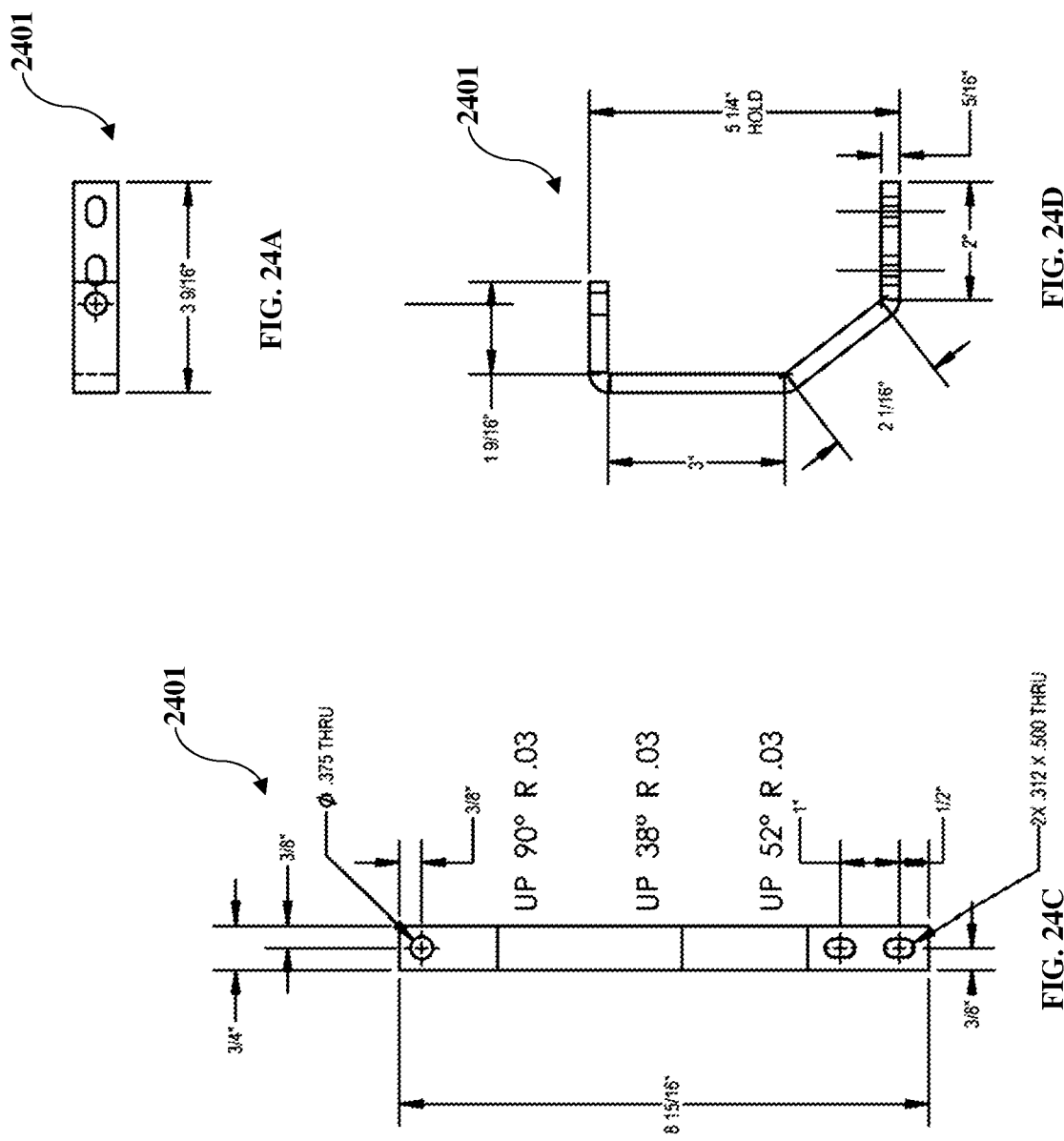

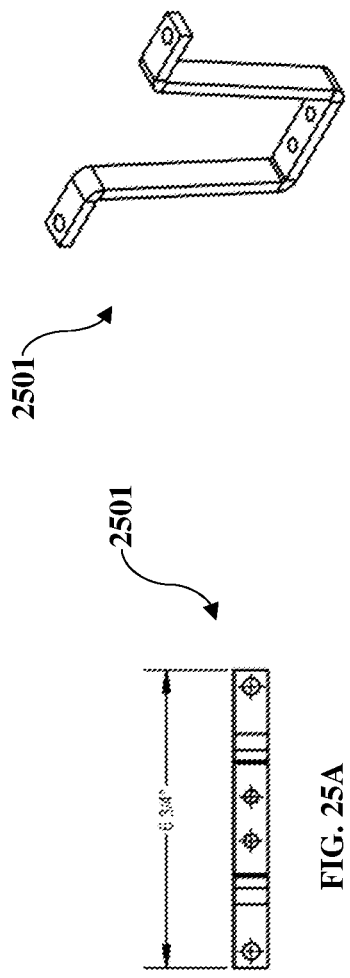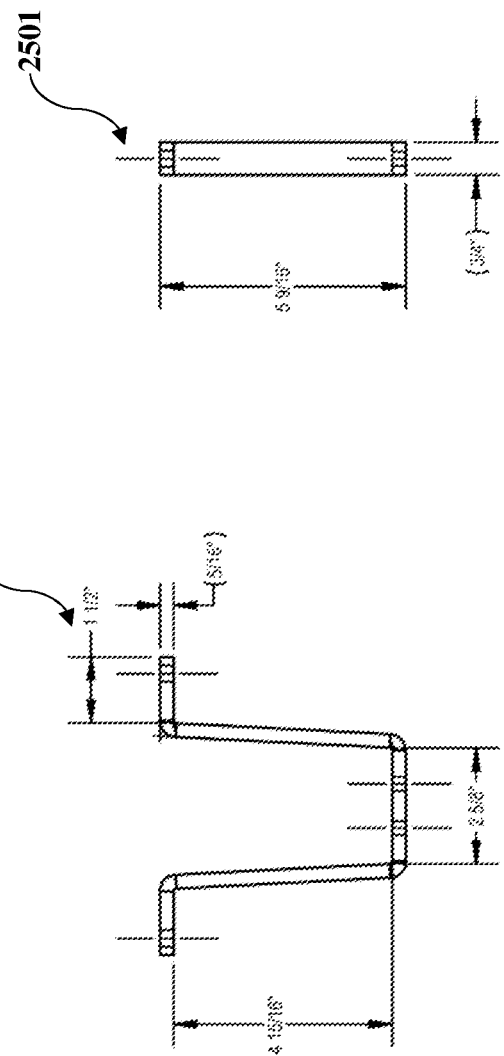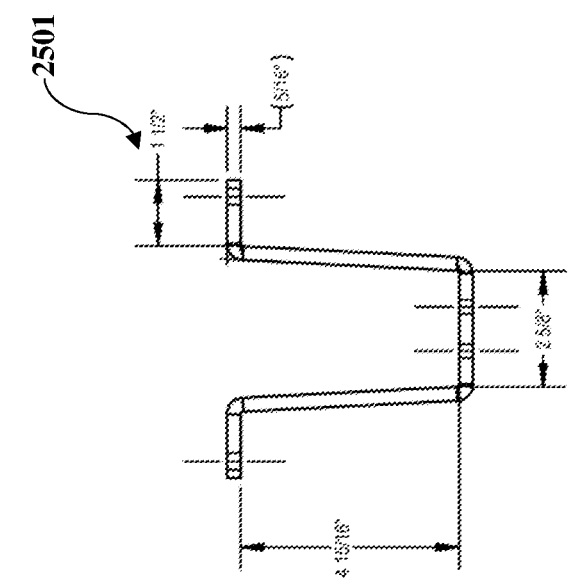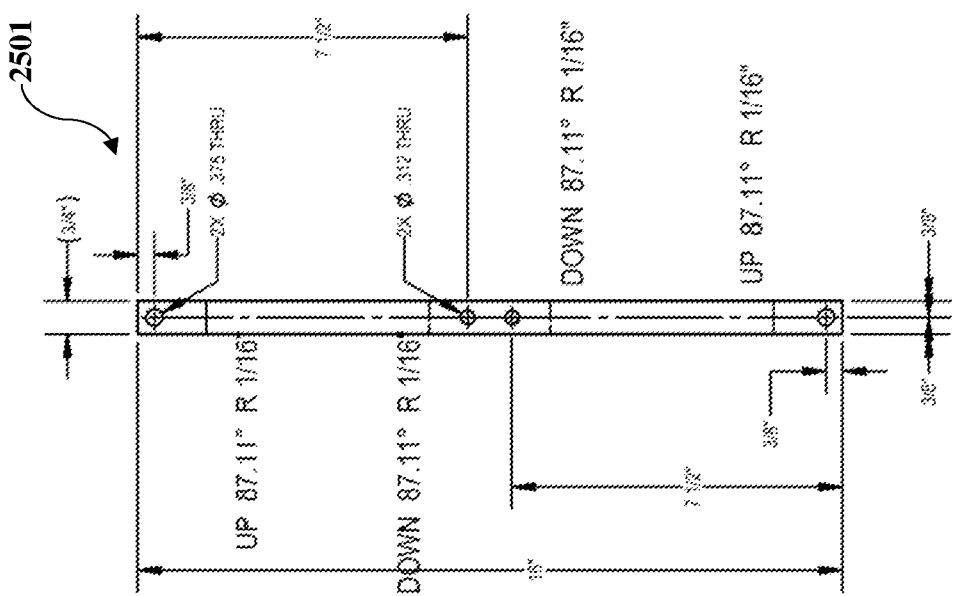
FIG. 25A  FIG. 25B  FIG. 25C  FIG. 25D  FIG. 25E

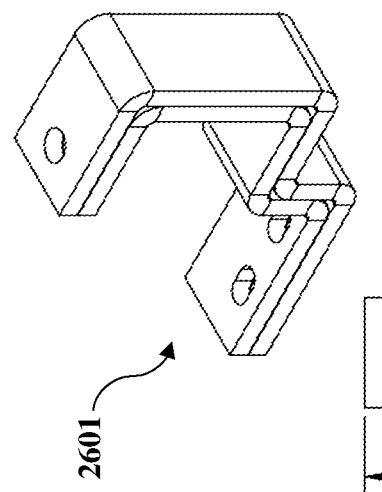
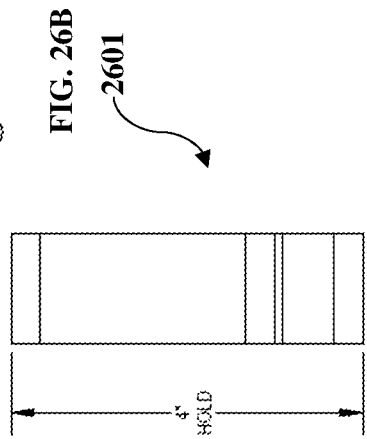
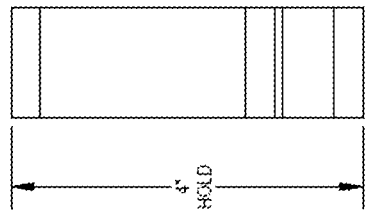
FIG. 26B
FIG. 26E
FIG. 26A
FIG. 26D
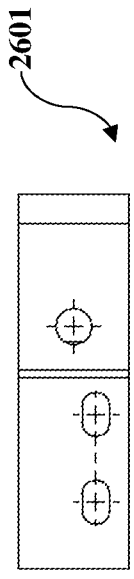
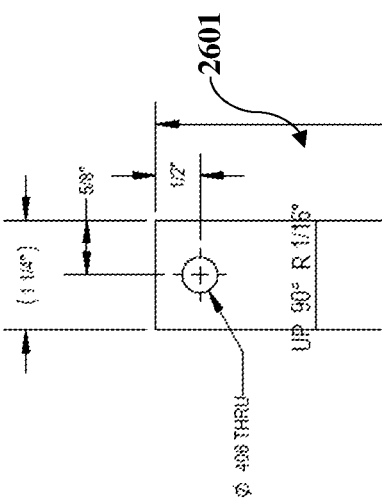
FIG. 26C

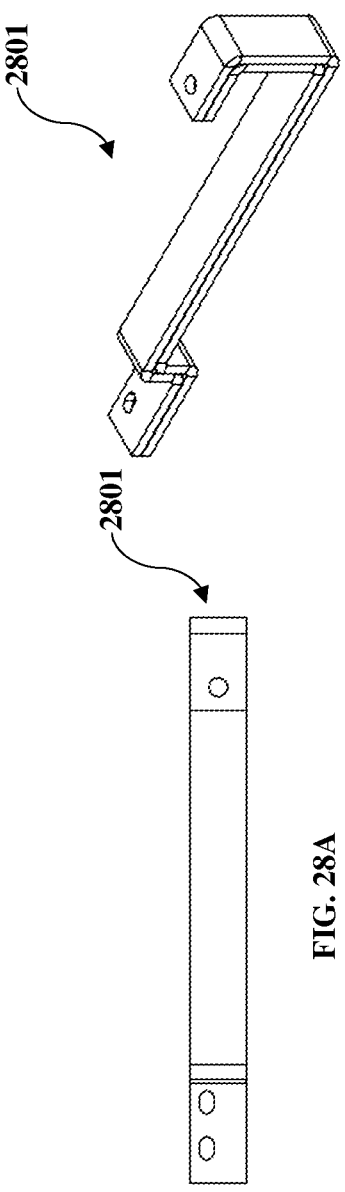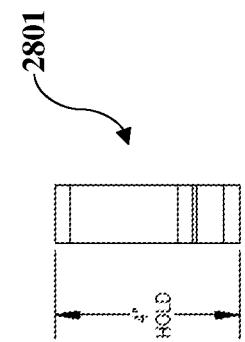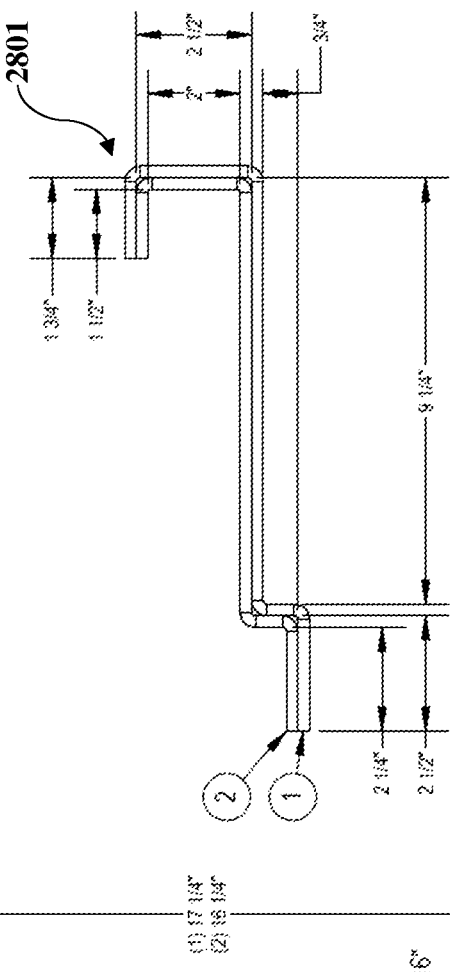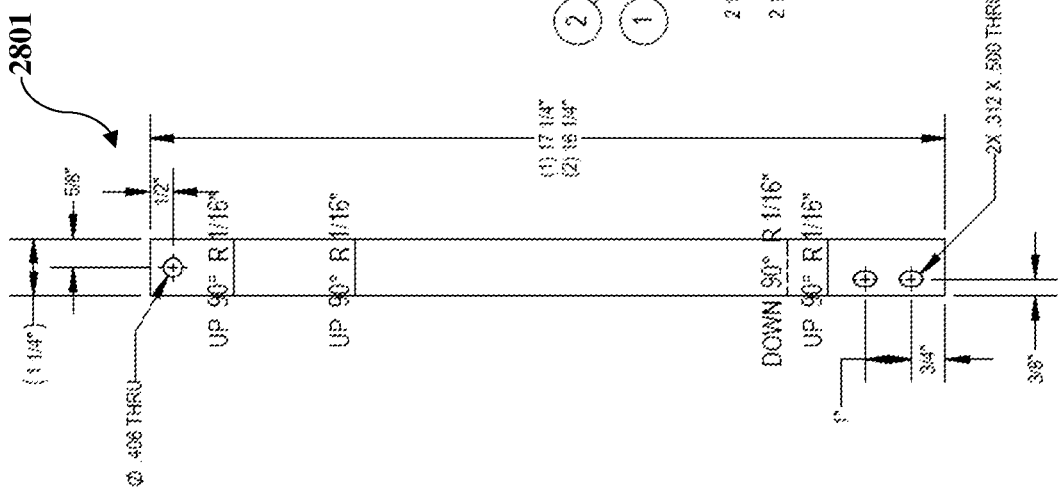
FIG. 28A  FIG. 28B  FIG. 28C  FIG. 28D  FIG. 28E

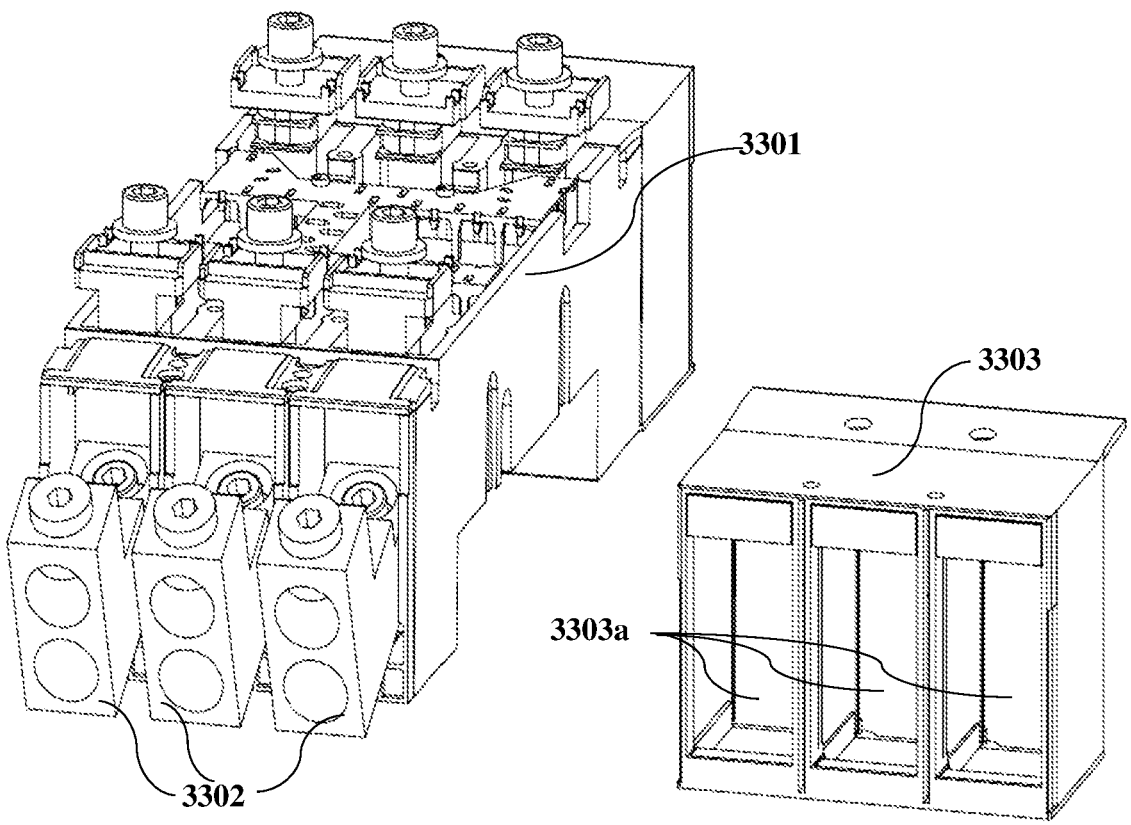
FIG. 33A
FIG. 33B
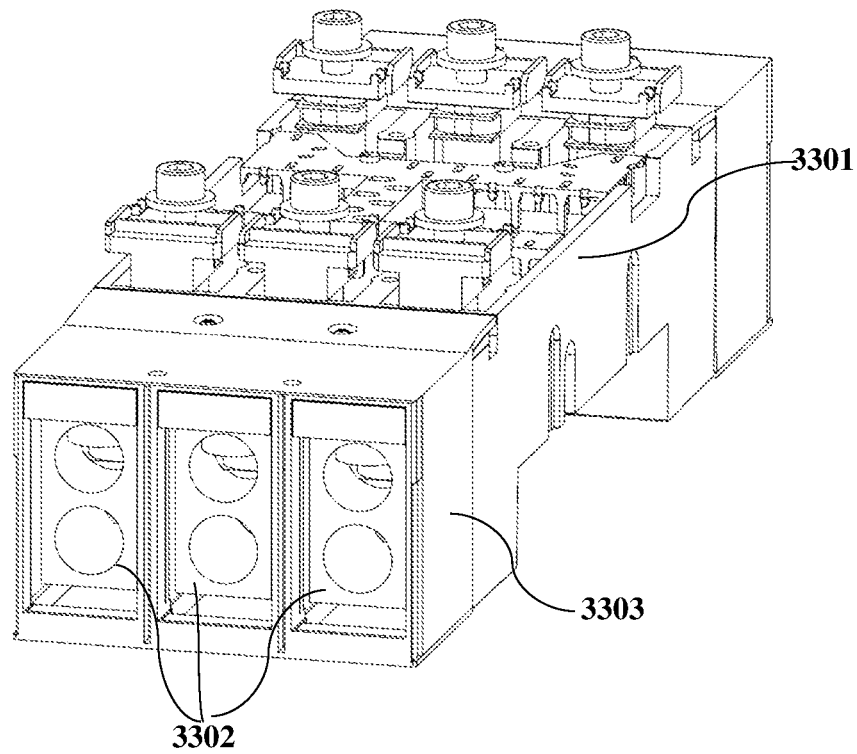
FIG. 33C

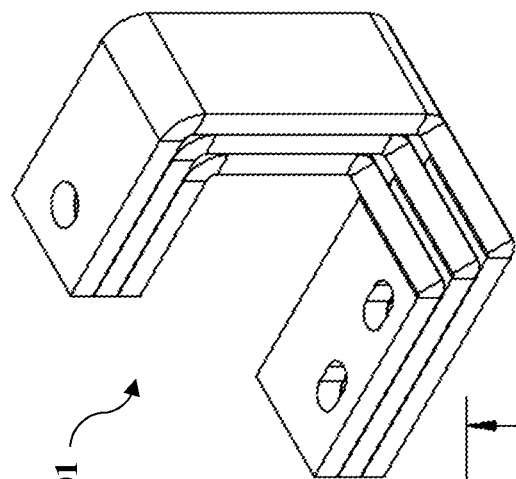
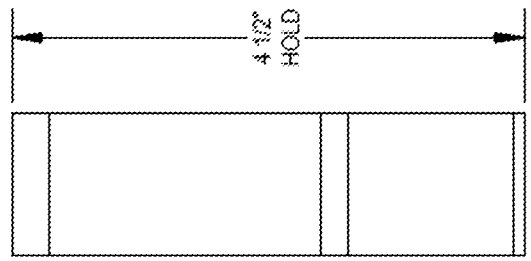
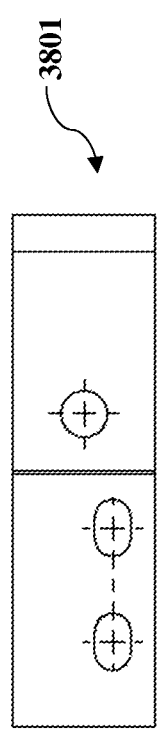
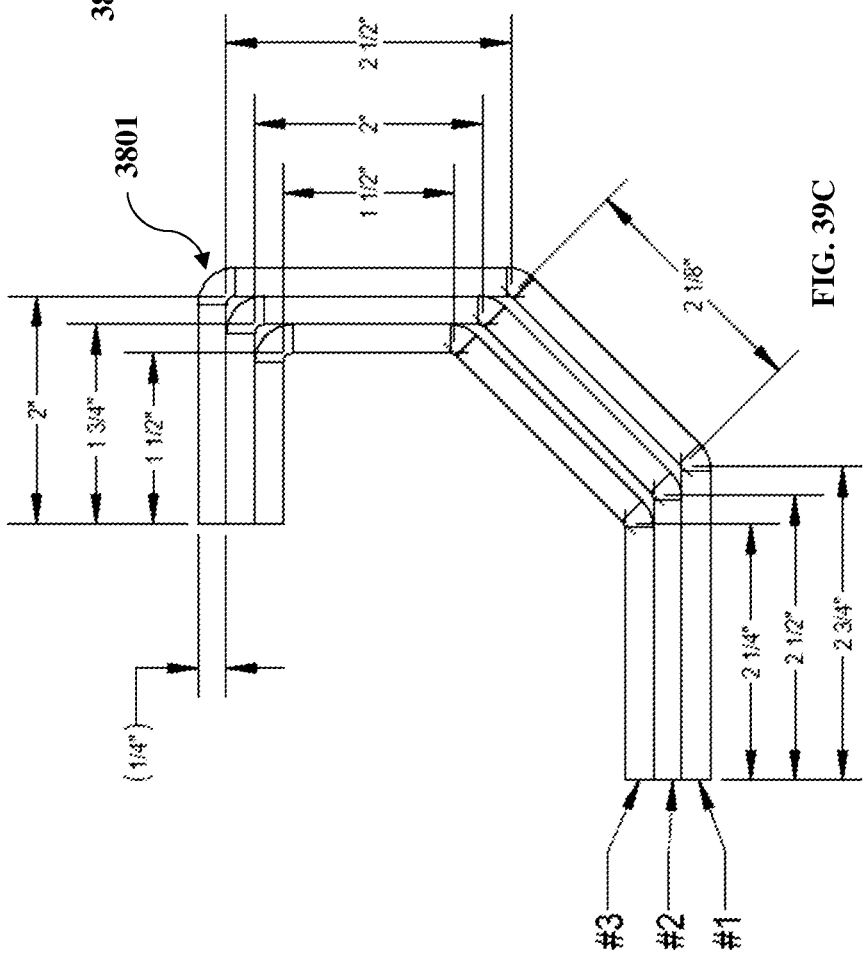
FIG. 39A
FIG. 39B
FIG. 39C
FIG. 39D

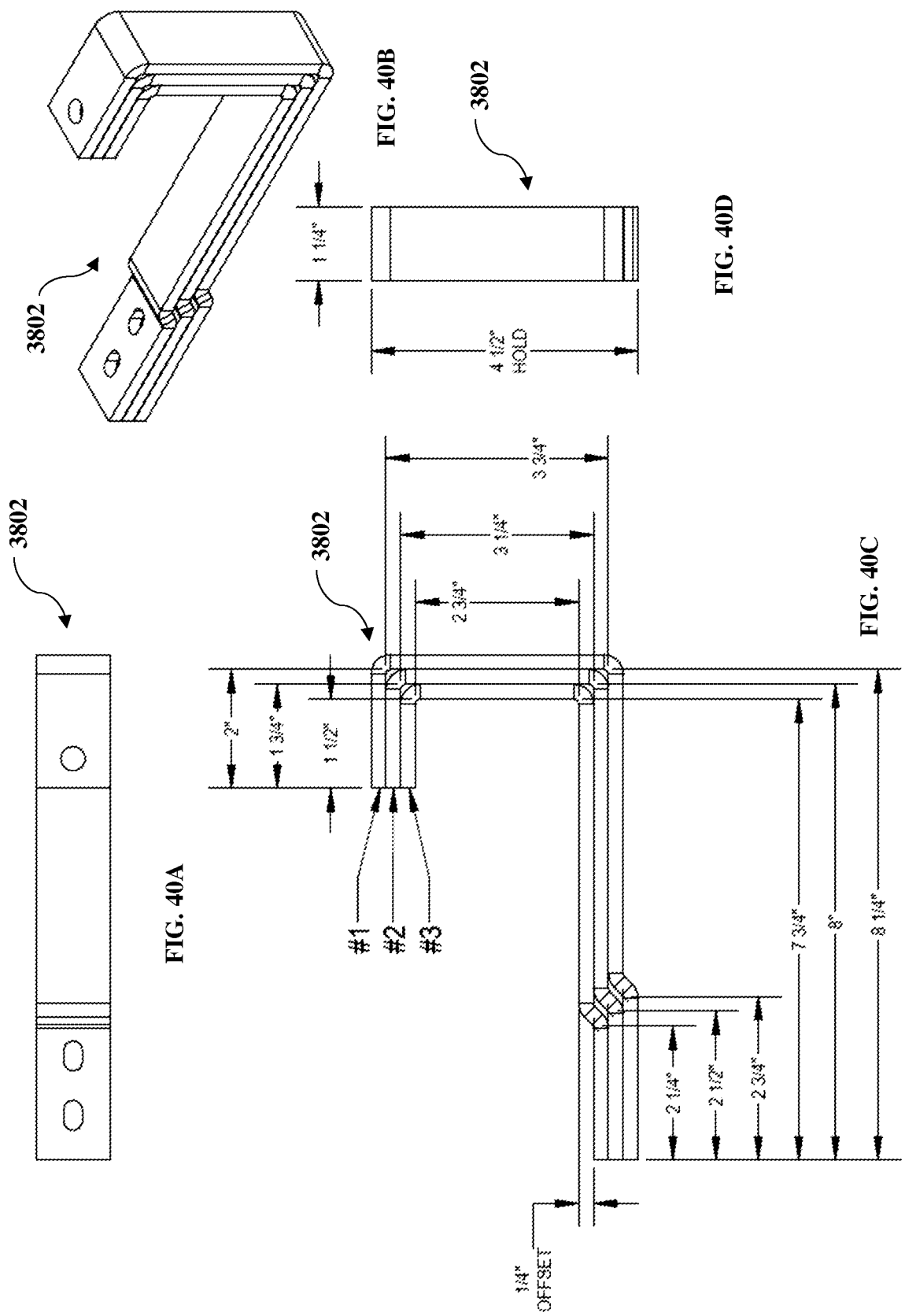

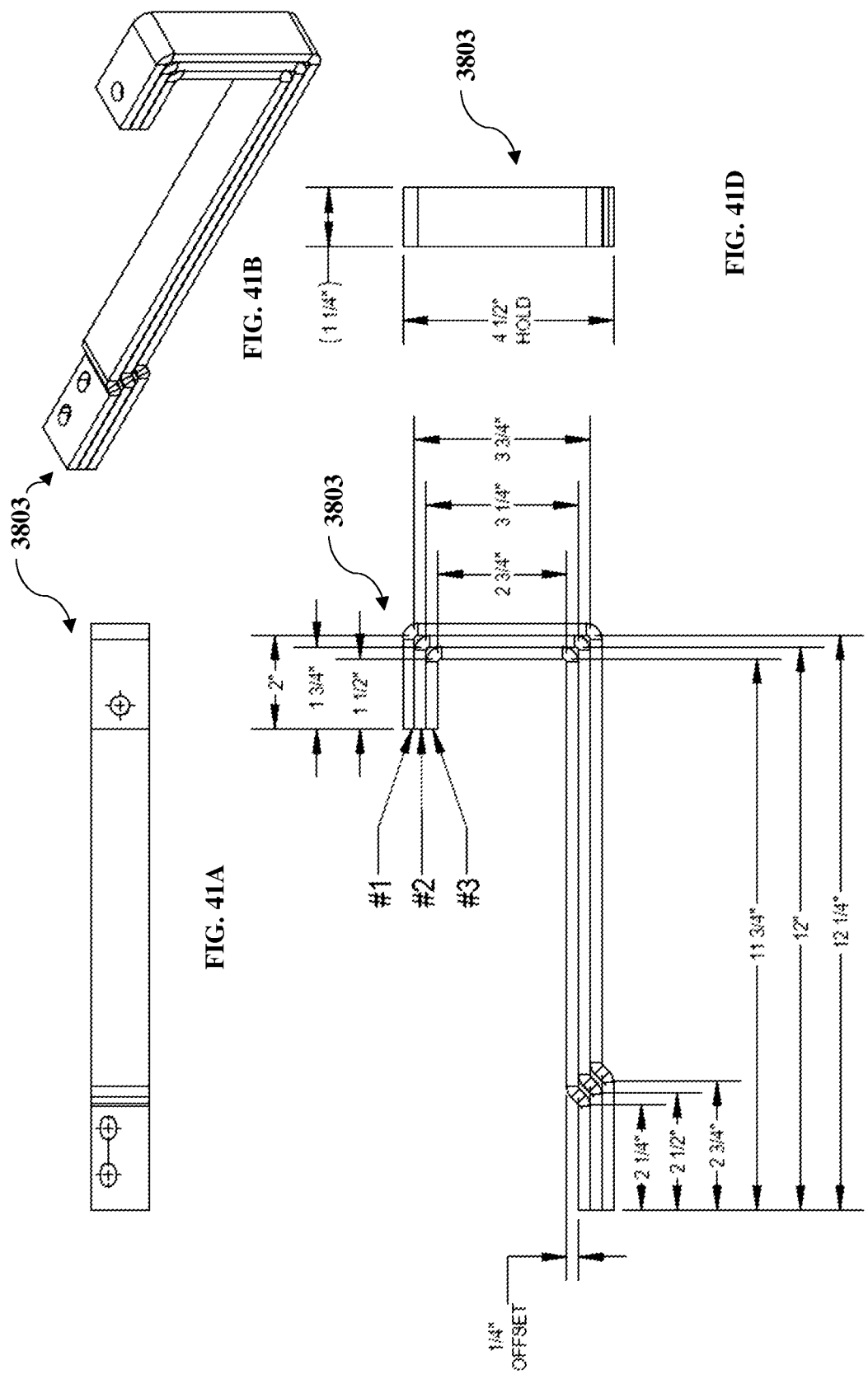

| 600A Plug-in Breaker Line Terminals | Temperature rise, deg. C | Maximum Limit, deg. C (°C) |
|---|---|---|
| Phase A | 51 | 65 |
| Phase B | 53 | 65 |
| Phase C | 51 | 65 |

FIG. 47A

| 600A Plug-in Breaker Load Connections at the Lug | Temperature rise, deg. C | Maximum Limit, deg. C (°C) For 75 °C cables |
|---|---|---|
| Phase A | 41 | 50 |
| Phase B | 43 | 50 |
| Phase C | 41 | 50 |

FIG. 47B

| 600A Plug-in Breaker Load Terminals | Temperature rise, deg. C | Maximum Limit, °C |
|---|---|---|
| Phase A | 55 | 65 |
| Phase B | 57 | 65 |
| Phase C | 55 | 65 |

FIG. 47C

MODULAR PLUG-IN POWER DISTRIBUTION PANEL ASSEMBLY FOR CRITICAL LOADS

CROSS-REFERENCE TO RELATED APPLICATIONS

This application claims priority to and the benefit of the provisional patent application titled "Modular Plug-in Power Distribution Panel Assembly for Critical Loads", application No. 63/315,989, filed in the United States Patent and Trademark Office on Mar. 3, 2022. The specification of the above-referenced patent application is incorporated herein by reference in its entirety.

BACKGROUND

The system disclosed herein, in general, relates to an electrical power distribution panel. More particularly, the system disclosed herein relates to a modular plug-in power distribution panel assembly for allowing optimal addition of critical loads as capacity requirements grow over time.

For electrical power distribution applications in facilities such as hospitals, data centers, semiconductor fabrication facilities, etc., there is a need for optimal connection and management of overcurrent protection devices (OCPDs), for example, circuit breakers, that optimally address load requirements of the facilities. In some conventional power distribution panelboards, output cables are connected to a circuit breaker in a manner that requires the power to be shut down to add loads. In these power distribution panelboards, a main circuit breaker is either 80%-rated or 100%-rated, while feeder breakers are 80%-rated only. Furthermore, in conventional modular panels, in order to add a breaker as capacity requirements grow, power must be shut down to allow a customer to connect output cables to the breaker. The cables have to be installed when adding new breakers to modular panels of this type.

Some applications require a circuit breaker to be installed, exchanged, or replaced in a panel assembly quickly without having to remove any wiring. There is a need for enhanced touch-safe solutions that do not allow access to any live parts in a panel assembly and that allow convenient functional expansion. Furthermore, plug-in breakers with plug-in bases, for example, 3 VA molded case circuit breakers, are typically 80%-rated only. The standard 80%-rated breaker can only be applied continuously for about three hours or more at 80% of its continuous current rating. While 150-ampere (150 A) and 250-ampere (250 A), 3 VA breakers are available as 100%-rated in a non-plug-in configuration, the breakers for plug-in configurations are typically rated at 80% only due to a higher number of contacts, resulting in more losses and heating at terminals of the breakers. In an example, an 80%-rated, 150 A breaker can only be loaded to 120 amperes (A). Therefore, loads between 120 A and 150 A require a bigger 250 A frame breaker. A 250 A frame breaker is more expensive than a 150 A frame breaker. Similarly, a 250 A breaker can only be loaded up to 200 A. Loads between 200 A and 250 A require a 400-ampere (400 A) frame breaker, which occupies more space and costs more. For example, a 250 A load requires a 400 A breaker that can be used up to 320 A, if the breaker is only 80%-rated. Higher ampacity breakers, for example, 400 A breakers, are more expensive than lower ampacity, 100%-rated breakers, for example, a 100%-rated, 250 A breaker. Similarly, a 600-ampere (600 A) load requires an 800 A frame breaker that is 80%-rated. An 80%-rated, 600 A breaker can be loaded up to 480 A. However, a 100%-rated, 600 A breaker can be loaded to 600 A. An 800 A plug-in breaker is currently not available. Therefore, if any load is between 480 A and 600 A, a plug-in breaker option is not possible at present with 80%-rated breakers, which limits the number of applications where the load requires a higher current. Furthermore, there is a need for implementing a 100%-rated panel that provides a solution for loads that require a large number of higher current ratings for a given panel size. Therefore, there is a need for incorporating 100%-rated breakers that offer cost savings into a power distribution panel assembly.

Moreover, there are several challenges associated with temperature rise at 80% current rating versus a 100% current rating. Since copper losses are proportional to the square of the current, the amount of copper losses at 100% rating is, for example, about 1.5625 times the losses at 80% rating. Therefore, the temperature rise at the terminals of the breakers is, for example, higher than 56% at 100% rating, due to the fact that the resistance of copper also increases with temperature, causing additional losses. Furthermore, a non-plug-in breaker typically has only two terminals per phase, that is, an input terminal and an output terminal. In a plug-in breaker, there are typically four contact points per phase, that is, two at the input and two at the output. Two tulip contacts, one input and one output, make the breaker a plug-in breaker. The losses in a plug-in breaker assembly due to contact resistance is therefore twice as much as a non-plug-in breaker assembly since there are four contacts instead of two. Furthermore, in a typical panelboard, the breaker input terminals are connected to the main bus by pieces of copper bus suitably shaped as bus straps for a bolt-in connection. The main bus and the bus straps are typically made of silver-plated copper or tin-plated copper. The maximum temperature rise permitted at the breaker input terminals is, for example, about 65° C. over ambient temperature. The breaker load connections at the output of the breaker are typically cable connected at the mechanical lugs. The maximum temperature rise allowed at the output lug connections is 50° C. over ambient temperature for 75° C.-rated cables. 75° C.-rated cables are standard cables used for 80%-rated breaker connections and typical electrical installation. While higher temperature-rated cables allow a higher temperature rise, for example, 90° C.-rated cables allow a 60° C. temperature rise, there is need for having the 100% rated breakers utilize or implement the use of standard 75° C.-rated cables for providing an overall solution that optimizes installation cost.

Furthermore, for the main bus and breaker bus straps, the cross section of the bus used is typically equal to or slightly higher than 1000-ampere (A) per square inch for a panelboard with 80%-rated feeder breakers. For the 80%-rated feeder breakers, the breaker output mechanical lugs are typically made of aluminum and the cables are rated 75° C. For 100%-rated plug-in breakers, the main bus size is larger, for example, at about 750 A to about 800 A per square inch, and the breaker output mechanical lugs are typically made of copper which has better thermal conductivity than aluminum. Aluminum has a thermal conductivity that is 60% of the thermal conductivity of copper. 100%-rated, 150 A/250 A breakers operate well with copper lugs. However, for 600 A breakers, for better cooling, the bus strap size, that is, cross-section, needed is almost twice as large, for example, at about 600 A per square inch. Moreover, copper lugs at higher ratings are prohibitively expensive. Furthermore, copper lugs can only accommodate copper cables while aluminum lugs can accommodate both copper and aluminum cables. When aluminum cables are connected to copper lugs, loosening of the aluminum cables occurs due to different thermal expansions of copper and aluminum, which causes more contact resistance and thus more heating. Tin-plated copper lugs may be used to minimize the effect to the contact resistance and the heating. However, commercially available copper lugs are typically not plated. Therefore, there is a need for using aluminum lugs that cost significantly less than copper lugs, are made of high strength aluminum alloy, are tin-plated, and can accommodate both copper and aluminum cables for 100%-rated breakers.

Moreover, there is a need for incorporating supplementary components in power distribution panels, which provide optimal electrical insulation; securely direct gases produced within an electrical enclosure, out of the electrical enclosure to an external environment, in an event of a short circuit; cool breaker terminals; accommodate a configurable number of cables of different sizes; allow flexible and secure neutral connections for feeder breakers; enhance flexibility, reliability, and operability of the power distribution panels, and meet stringent seismic requirements. Furthermore, there is a need for one or more plug-in panelboards that are each series rated with a plug-in breaker of a predetermined ampacity for increasing a short circuit rating of the power distribution panels.

Hence, there is a long-felt need for a touch-safe, cost-effective, 100%-rated, modular plug-in power distribution panel assembly that allows convenient functional expansion and optimal addition of critical loads for electrical power distribution applications in facilities such as hospitals, data centers, semiconductor fabrication facilities, etc., as capacity requirements grow over time, while addressing the above-mentioned needs and problems associated with the related art.

SUMMARY OF THE INVENTION

This summary is provided to introduce a selection of concepts in a simplified form that are further disclosed in the detailed description of the invention. This summary is not intended to determine the scope of the claimed subject matter.

The system disclosed herein addresses the above-recited need for a touch-safe, cost-effective, 100%-rated, modular plug-in power distribution panel assembly (MPIPDPA) that allows convenient functional expansion and optimal addition of critical loads for electrical power distribution applications in facilities such as hospitals, data centers, semiconductor fabrication facilities, etc., as capacity requirements grow over time. The MPIPDPA allows optimal addition of critical loads without having to shut down power. Moreover, the MPIPDPA implements plug-in or draw-out systems that allow installation of overcurrent protection devices (OCPDs), for example, circuit breakers, feeder breakers, etc., quickly without having to remove any wiring. Furthermore, the system disclosed herein addresses the above-recited need for incorporating supplementary components in the MPIPDPA, which provide optimal electrical insulation; securely direct gases produced within an electrical enclosure of the MPIPDPA, out of the electrical enclosure to an external environment, in an event of a short circuit; cool breaker terminals; accommodate a configurable number of cables of different sizes; allow flexible and secure neutral connections for feeder breakers; enhance flexibility, reliability, and operability of the MPIPDPA, and meet stringent seismic requirements.

The modular plug-in power distribution panel assembly (MPIPDPA) is configured as a touch-safe, 100%-rated power distribution panel. In an embodiment, the MPIPDPA is configured as an 800-ampere (A) power distribution panel. In another embodiment, the MPIPDPA is configured as a 1000 A power distribution panel. In another embodiment, the MPIPDPA is configured as a 1200 A power distribution panel. In an embodiment, the MPIPDPA is configured as a wall-mounted power distribution panel, for example, an 800 A or a 1000 A wall-mounted power distribution panel. In another embodiment, the MPIPDPA is configured as a floor-mounted power distribution panel, for example, a 1200 A power distribution panel. In an embodiment, the 800 A power distribution panel, the 1000 A power distribution panel, and the 1200 A power distribution panel are each configured with a main breaker assembly comprising a non-plug-in main breaker. In another embodiment, the 800 A power distribution panel, the 1000 A power distribution panel, and the 1200 A power distribution panel are each configured with a main lug only (MLO) assembly comprising plug-in breakers and main lugs. In another embodiment, the MPIPDPA is configured as a power distribution unit comprising a transformer section and a power distribution panel section. The transformer section comprising a main breaker is bus connected to the power distribution panel section comprising multiple plug-in breakers and allows accommodation of additional plug-in breakers in the power distribution panel section. In another embodiment, a smaller MPIPDPA further comprises one or more small plug-in panelboards, for example, two small plug-in panelboards, that are each series rated with a plug-in feeder breaker of a predetermined ampacity, for example, a 250 A breaker, from a larger plug-in panelboard assembly, for increasing a short circuit rating of the smaller MPIPDPA. This plug-in feeder breaker acts as a plug-in main breaker that is cable connected to a smaller MLO plug-in panel.

The 100%-rated, modular plug-in power distribution panel assembly (MPIPDPA) disclosed herein accounts for losses due to contact resistance. Moreover, the MPIPDPA increases the allowable limit for temperature rise by using cables rated at a higher temperature, for example, 75 degrees Celsius (° C.)-rated cables. The MPIPDPA disclosed herein does not need 90 degrees Celsius (° C.)-rated cables. Furthermore, aluminum lugs are used for 100%-rated plug-in breakers in the MPIPDPA to optimize cost. In order to cool breaker line terminals, the bus strap size needed is close to twice as large, for example, at close to about 600 A per square inch. In the MPIPDPA disclosed herein, heat sinks are used for cooling the breaker line terminals and the aluminum lugs of the 100%-rated, 400 A and 600 A breakers.

The modular plug-in power distribution panel assembly (MPIPDPA) disclosed herein comprises an electrical enclosure, a bus bar assembly, multiple plug-in bases, multiple plug-in breakers, one or more barriers configured for the plug-in breakers, and multiple heat sinks. The electrical enclosure is configured to accommodate a panel therewithin. The bus bar assembly comprises multiple bus bars operably coupled to the panel. The bus bar assembly further comprises bus straps selectively configured and connected to a main bus to provide electrical insulation and enhance flexibility and operability of the MPIPDPA. In an embodiment, the bus straps comprise B-phase bus straps coated with a substantially thin epoxy coating having a UL-certified reduced thickness configured to provide electrical insulation and ensure operability of the MPIPDPA. In another embodiment, the bus bar assembly further comprises a neutral bus operably coupled to each of the opposing sides of the electrical enclosure for allowing flexible and secure neutral connections for the feeder breakers. In another embodiment, the bus bar assembly further comprises a line side bus assembly and a load side bus assembly operably coupled to terminals configured at opposing ends of each of the plug-in bases for supply and distribution of electric power within the MPIPDPA. In another embodiment, the bus bar assembly implements multiple bus configurations and designs for the plug-in breakers for flexibly accommodating 80%-rated plug-in breakers and 100%-rated plug-in breakers comprising, for example, 150 A plug-in breakers, 250 A plug-in breakers, 400 A plug-in breakers, and 600 A plug-in breakers. In an embodiment, the bus bar assembly is configured to allow bus connections of an increased number of plug-in breakers to a main bus. This configuration of the bus bar assembly provides an alternative layout to the MPIPDPA for increasing the number of plug-in breakers by using bus connections to the main bus instead of using cable connections. In this embodiment, the MPIPDPA comprises a supplementary section for incoming cables. In another embodiment, a part of a plug-in panel section is configured for the incoming cables.

The plug-in bases are operably coupled to the panel via the bus bar assembly in the MPIPDPA. The plug-in bases are configured to connect multiple cables during initial installation for adding a configurable number of plug-in breakers to the panel without shutting power down. As the capacity grows, the MPIPDPA allows addition of plug-in breakers without shutting the power down, following guidelines for electrical safety as defined by local and national electrical codes, the National Fire Protection Association (NFPA) guidelines, and the Occupational Safety and Health Administration (OSHA) guidelines. The plug-in breakers are detachably coupled to the plug-in bases. The plug-in breakers are configured to be coupled to the plug-in bases without powering down a main power or the critical loads. In an embodiment, the plug-in breakers are 100%-rated plug-in breakers comprising, for example, one or more of 150 A plug-in breakers, 250 A plug-in breakers, 400 A plug-in breakers, and 600 A plug-in breakers. In an embodiment, the modular plug-in power distribution panel assembly (MPIPDPA) disclosed herein is applicable to 800 A breakers. For implementing larger 800 A breakers, the MPIPDPA utilizes larger heat sinks and lug covers. In an embodiment, the plug-in breakers are twin mounted to the plug-in bases on the panel in the MPIPDPA. In an embodiment, the 100%-rated plug-in breakers, for example, 100%-rated 3 VA plug-in breakers, comprise electronic trip units for added flexibility and reliability. The barrier(s) in the MPIPDPA is configured to securely direct gases produced within the electrical enclosure in the interior of the MPIPDPA out of the electrical enclosure to an external environment, in the event of an electrical short circuit. In an embodiment, the MPIPDPA further comprises one or more supplementary barriers for incoming cables. The supplementary barrier(s) is configured to accommodate a configurable number of cables of different sizes per phase and maintain touch-safety of the MPIPDPA. The supplementary barrier(s) is made of a polycarbonate resin thermoplastic material, for example, the Lexan® material.

The heat sinks are operably coupled to terminals of the plug-in breakers comprising, for example, at 400 A breakers and 600 A breakers. The heat sinks are configured to cool the terminals of the plug-in breakers for ensuring safety and standards compliance. The heat sinks enhance cooling of the terminals of the plug-in breakers, for example, by natural conduction, convection, and radiation. The heat sinks are made, for example, of a black anodized aluminum material. In an embodiment, the MPIPDPA further comprises lugs made of aluminum for implementing 100%-rated plug-in breakers comprising one or more of 150 A plug-in breakers, 250 A plug-in breakers, 400 A plug-in breakers, and 600 A plug-in breakers. In an embodiment, 75° C.-rated cables are used for load connections to the 100%-rated plug-in breakers. In an embodiment, the MPIPDPA further comprises flexible covers configured for the main lugs. The flexible covers are made of a polycarbonate resin thermoplastic material, for example, the Lexan® material. The flexible covers are configured to accommodate a configurable number of cables of different sizes.

The embodiments herein disclose a touch-safe, modular plug-in power distribution panel assembly (MPIPDPA) rated 800 A or 1000 A with twin mounted 150 A and 250 A breakers. The breakers in the 800 A or 1000 A touch-safe MPIPDPA are rated 100% using aluminum lugs and extensive testing. Modified barriers for the twin mounted plug-in breakers are used in the touch-safe MPIPDPA for directing gases outside the electrical enclosure of the MPIPDPA safely. The embodiments herein disclose main lug and main breaker options for the 800 A and 1000 A touch-safe MPIPDPA. Other embodiments disclose a 1200 A-rated, touch-safe, MPIPDPA with touch-safe protection for input cables that vary in size and number per phase. The embodiments herein also disclose main lug and main breaker options for the 1200 A touch-safe MPIPDPA. Other embodiments herein disclose a 1200 A touch-safe panel with 100%-rated, 400 A and 600 A feeder breakers using aluminum, black anodized heat sinks and aluminum lugs. The embodiments herein also disclose bus or cable connection for the main feed in the 1200 A MPIPDPA for added flexibility.

In an embodiment, the modular plug-in power distribution panel assembly (MPIPDPA) further comprises notches configured at a base of the electrical enclosure for attaching to lifting equipment, for example, lifting dollies, hydraulic machinery roller dollies, etc., on one or more sides of the electrical enclosure to facilitate ease of moving and handling the MPIPDPA. In another embodiment, the MPIPDPA further comprises an anchoring element configured to anchor the electrical enclosure to a ground surface using anchor bolts. The structure of the MPIPDPA and the base of the electrical enclosure with the anchoring element are configured to meet stringent seismic requirements. In another embodiment, the MPIPDPA is configured to flexibly mount a support for a metal framing system on a top end of the electrical enclosure for allowing flexible movement of the metal framing system. The metal framing system, for example, a Unistrut® metal framing system, is configured to provide support for multiple electrical conduits. In an embodiment, the MPIPDPA with a main breaker is configured to be series rated for cost optimization. In another embodiment, the MPIPDPA is series rated with a main breaker for a higher short circuit rating, which is characterized by the following: bus connections to the main breaker being epoxy insulated to prevent any arcing during a short circuit interruption; increased size of the electrical enclosure to provide a large volume for the gases released from the breaker, during a short circuit, to expand; optimized size of the electrical enclosure to provide an adequate volume for the gases released from the breaker, during a short circuit, to expand, and to provide sufficient cable bend radius for connecting load cables; extensive testing performed for validating design of the modular plug-in power distribution panel assembly; and witness testing performed for verifying safety compliance and for maintaining high series ratings.

In one or more embodiments, related systems comprise circuitry for executing the methods disclosed herein. The circuitry is configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein.

FIGS. 21A-21F illustrate different views of another embodiment of the modular plug-in power distribution panel assembly.

FIGS. 23A-23E illustrate different views of an embodiment of a bus implemented in the bus bar assembly of the modular plug-in power distribution panel assembly.

FIGS. 24A-24D illustrate different views of another embodiment of a bus implemented in the bus bar assembly of the modular plug-in power distribution panel assembly.

FIGS. 25A-25E illustrate different views of another embodiment of a bus implemented in the bus bar assembly of the modular plug-in power distribution panel assembly.

FIGS. 26A-26E illustrate different views of another embodiment of a bus implemented in the bus bar assembly of the modular plug-in power distribution panel assembly.

FIGS. 28A-28E illustrate different views of another embodiment of a bus implemented in the bus bar assembly of the modular plug-in power distribution panel assembly.

FIG. 33A illustrates a perspective view of a plug-in base, showing output lugs connected to terminals of the plug-in base.

FIG. 33B illustrates a perspective view of an embodiment of a lug cover configured to cover the output lugs shown in FIG. 33A.

FIG. 33C illustrates a perspective view showing the lug cover covering the output lugs connected to the terminals of the plug-in base shown in FIG. 33A.

FIGS. 39A-39E illustrate different views of an embodiment of a line bus implemented for bus connections in a modular plug-in power distribution panel assembly.

FIGS. 40A-40E illustrate different views of another embodiment of a line bus implemented for bus connections in a modular plug-in power distribution panel assembly.

FIGS. 41A-41E illustrate different views of another embodiment of a line bus implemented for bus connections in a modular plug-in power distribution panel assembly.

FIGS. 47A-47C illustrate tabular representations showing results of the bench tests conducted with the 100%-rated, 600 A plug-in breaker.

DETAILED DESCRIPTION OF THE INVENTION

Figure 1A:
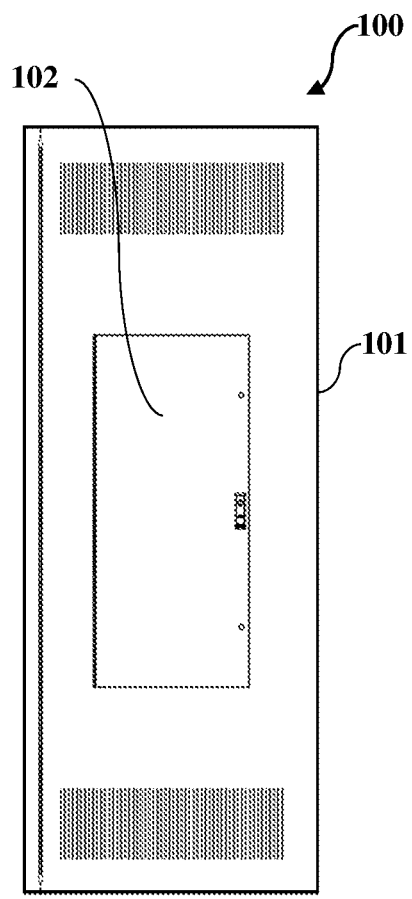
FIGS. 1A-1C illustrate an exterior view, an interior view, and a top plan view, respectively, of an embodiment of a modular plug-in power distribution panel assembly comprising one 800-ampere (A) main breaker and ten 250 A feeder breakers.

Disclosed herein is a touch-safe, cost-effective, 100%-rated, modular plug-in power distribution panel assembly (MPIPDPA) that allows convenient functional expansion and optimal addition of critical loads for electrical power distribution applications in facilities such as hospitals, data centers, semiconductor fabrication facilities, etc., as capacity requirements grow over time. By being touch-safe, the MPIPDPA is completely covered and does not allow access to any live parts, thereby protecting personnel from electrical hazards, for example, burns, shocks, electrocutions, etc. In an embodiment, the MPIPDPA is configured to be finger-safe having an ingress protection marking of 20 (IP20), thereby disallowing insertion of a finger to access a live part. In this embodiment, a 12-millimeter (mm) rod is used to check the finger-safe MPIPDPA during Underwriter Laboratories (UL) safety tests. The touch-safe MPIPDPA provides enhanced safety over the finger-safe MPIPDPA. The MPIPDPA allows optimal addition of critical loads without having to shut down power. Furthermore, the MPIPDPA implements plug-in or draw-out systems, that allow installation of overcurrent protection devices (OCPDs), for example, circuit breakers, feeder breakers, etc., quickly without having to remove any wiring. The MPIPDPA is configured as a touch-safe, 100%-rated power distribution panel. In an embodiment, the MPIPDPA is configured as an 800-ampere (A) power distribution panel as illustrated in FIGS. 1A-1C, FIGS. 2A-2D, FIGS. 5A-5C, and FIG. 6. In another embodiment, the MPIPDPA is configured as a 1000 A power distribution panel that is similar to the 800 A power distribution panel, but with a main bus of a larger size than the main bus of the 800 A power distribution panel. For example, the main bus of the 800 A power distribution panel is sized as 2×1.75 inches (")×0.25" copper, that is, two pieces of a 1.75" wide×0.25" thick copper bus. The main bus of the 1000 A power distribution panel is sized, for example, as 3×1.75"×0.25" copper, that is, three pieces of a 1.75" wide×0.25" thick copper bus.

In another embodiment, the modular plug-in power distribution panel assembly (MPIPDPA) is configured as a 1200 A power distribution panel as illustrated in FIGS. 8A-8D, FIGS. 9A-9C, FIGS. 11A-11B, and FIGS. 16A-16E. In an embodiment, the MPIPDPA is configured as a wall-mounted power distribution panel, for example, an 800 A or a 1000 A wall-mounted power distribution panel as illustrated in FIGS. 1A-1C, FIGS. 2A-2D, FIGS. 5A-5C, and FIG. 6. In another embodiment, the MPIPDPA is configured as a floor-mounted power distribution panel, for example, a 1200 A power distribution panel as illustrated in FIGS. 8A-8D, FIGS. 9A-9C, FIGS. 11A-11B, and FIGS. 16A-16E. In an embodiment, the 800 A power distribution panel, the 1000 A power distribution panel, and the 1200 A power distribution panel are each configured with a main breaker assembly comprising, for example, a non-plug-in, fixed main breaker. For example, the 800 A power distribution panel assemblies illustrated in FIGS. 1A-1C and FIGS. 2B-2D are each configured with a main breaker assembly comprising a non-plug-in, fixed main circuit breaker 103. In an embodiment, the main breaker is an 800 A circuit breaker. In another embodiment, the main breaker is a 1000 A circuit breaker. In another embodiment, the main breaker is a fixed mount, 1200 A circuit breaker.

In another embodiment, the 800 A power distribution panel, the 1000 A power distribution panel, and the 1200 A power distribution panel are each configured with a main lug only (MLO) assembly comprising plug-in breakers and main lugs. For example, the 1200 A power distribution panel assemblies illustrated in FIGS. 8A-8D, FIGS. 9A-9C, and FIGS. 11A-11B are each configured with a main lug only assembly comprising main lugs, for example, 504 and 808. MPIPDPAs with main breakers are rated for service entrance and MPIPDPAs with main lugs are not rated for service entrance. In another embodiment, the MPIPDPA is configured as a power distribution unit comprising a transformer section 1601 and a power distribution panel section 1602 as illustrated in FIGS. 16A-16E. In this embodiment of the MPIPDPA 1600 illustrated in FIGS. 16A-16E, the transformer section 1601 and the power distribution panel section 1602 are bus connected and do not need main lugs. This embodiment of the MPIPDPA 1600 provides an alternative arrangement comprising additional space for accommodating additional plug-in breakers, for example, feeder breakers, in the power distribution panel section 1602.

Figure 1B:
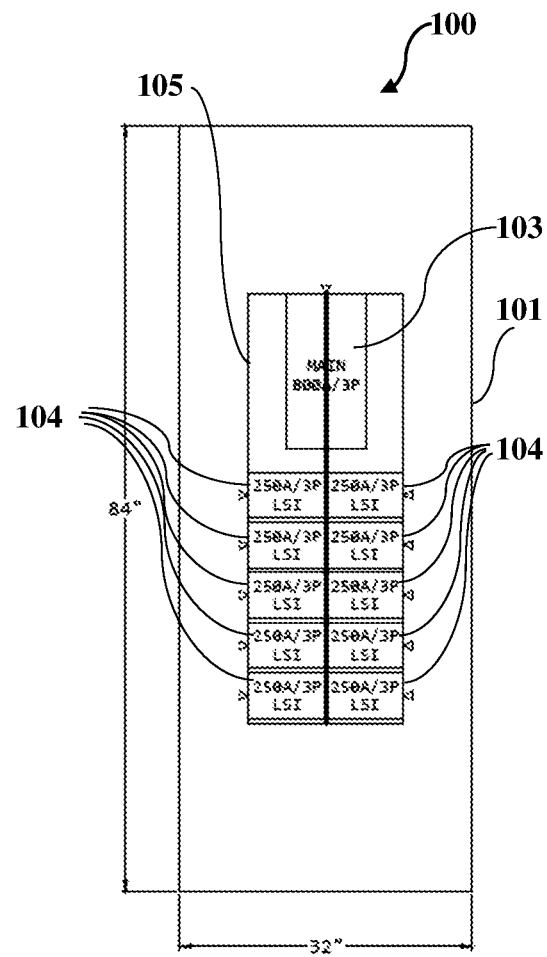
Figure 1C:
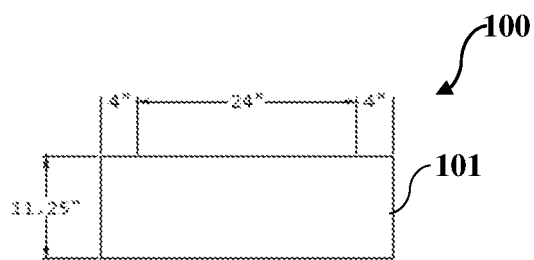

FIGS. 1A-1C illustrate an exterior view, an interior view, and a top plan view, respectively, of an embodiment of a modular plug-in power distribution panel assembly (MPIPDPA) 100 comprising one 800-ampere (A) main breaker 103 and ten 250 A feeder breakers 104. The MPIPDPA 100 comprises an electrical enclosure 101 configured to accommodate a panel 105 therewithin as illustrated in FIG. 1B. The electrical enclosure 101 is made, for example, of gauge sheet steel. In an example, the height and the length of the electrical enclosure 101 are about 84 inches and about 32 inches respectively. In an embodiment, the MPIPDPA 100 is configured for front access only via a panel door 102, also referred to as a "trim door". FIG. 1A illustrates the MPIPDPA 100 with the panel door 102 in a closed position. On opening the panel door 102, the breakers 103 and 104 are exposed for allowing opening and closing of the breakers 103 and 104. The breakers in the MPIPDPA 100 comprise plug-in breakers, for example, 104, detachably coupled to plug-in bases 110 that are connected to a main bus of a bus bar assembly 201 as illustrated in FIG. 2D. The plug-in breakers, for example, 104, are configured to be coupled or plugged into the plug-in bases 110 manually without powering down a main power or the critical loads.

In an embodiment, the plug-in breakers are 100%-rated plug-in breakers comprising, for example, one or more of 150 A plug-in breakers, 250 A plug-in breakers, 400 A plug-in breakers, and 600 A plug-in breakers. In an embodiment, the 150 A breakers and the 250 A breakers are configured to be coupled to the same plug-in bases 110. In an embodiment, the plug-in bases 110 for the 150 A breakers or the 250 A breakers are different from the plug-in bases 3301 and 2203 for the 400 A or 600 A breakers as illustrated in FIG. 33A, FIGS. 33C-33D, and FIG. 22. The number of 150 A/250 A and 400 A/600 A is variable depending on customer requirements. In an embodiment, one or more sets of the plug-in breakers 104 are twin mounted to the plug-in bases 110 on the panel 105. For example, the 150 A and 250 A feeder breakers are twin mounted while the 400 A and 600 A feeder breakers are single mounted. The output lugs or load connections for the 400 A and 600 A breakers alternate left and right to optimize cable management since all feeder cables are routed on both sides of the MPIPDPA 100.

The modular plug-in power distribution panel assembly (MPIPDPA) 100 illustrated in FIGS. 1A-1C, is an 800 A, wall-mounted, power distribution panel configured with a main breaker assembly comprising a non-plug-in main breaker 103. In the main breaker assembly, the MPIPDPA 100 incorporates the main breaker 103. The main breaker 103 is a circuit breaker configured to protect an electrical circuit from damage caused by an overcurrent or a short circuit. The main breaker 103 is operably coupled to the panel 105 as illustrated in FIG. 1B. Input cable connections are made at the main breaker 103. That is, incoming supply cables of the main breaker assembly are connected to the main breaker 103 which in turn feeds power to the main breaker assembly and its branch circuits. The main breaker 103 disconnects power from the main breaker assembly and provides overcurrent protection. In an embodiment, the main breaker 103 is a 100%-rated, 800 A breaker. The 800 A breaker is a non-plug-in, main breaker. The MPIPDPA 100 illustrated in FIG. 1B further comprises ten feeder breakers 104 configured to be coupled to the plug-in bases 110 without powering down a main power or the critical loads. In an embodiment, the feeder breakers 104 are 100%-rated, 250 A plug-in breakers. In another embodiment (not shown), the feeder breakers 104 are 100%-rated, 150 A plug-in breakers. As illustrated in FIG. 1B, the feeder breakers 104 are twin-mounted on the panel 105. That is, two feeder breakers 104 are mounted to the panel 105 per row. A top plan view of the MPIPDPA 100 is illustrated in FIG. 1C. The MPIPDPA 100 is configured for addition of critical loads.

Figure 2A:
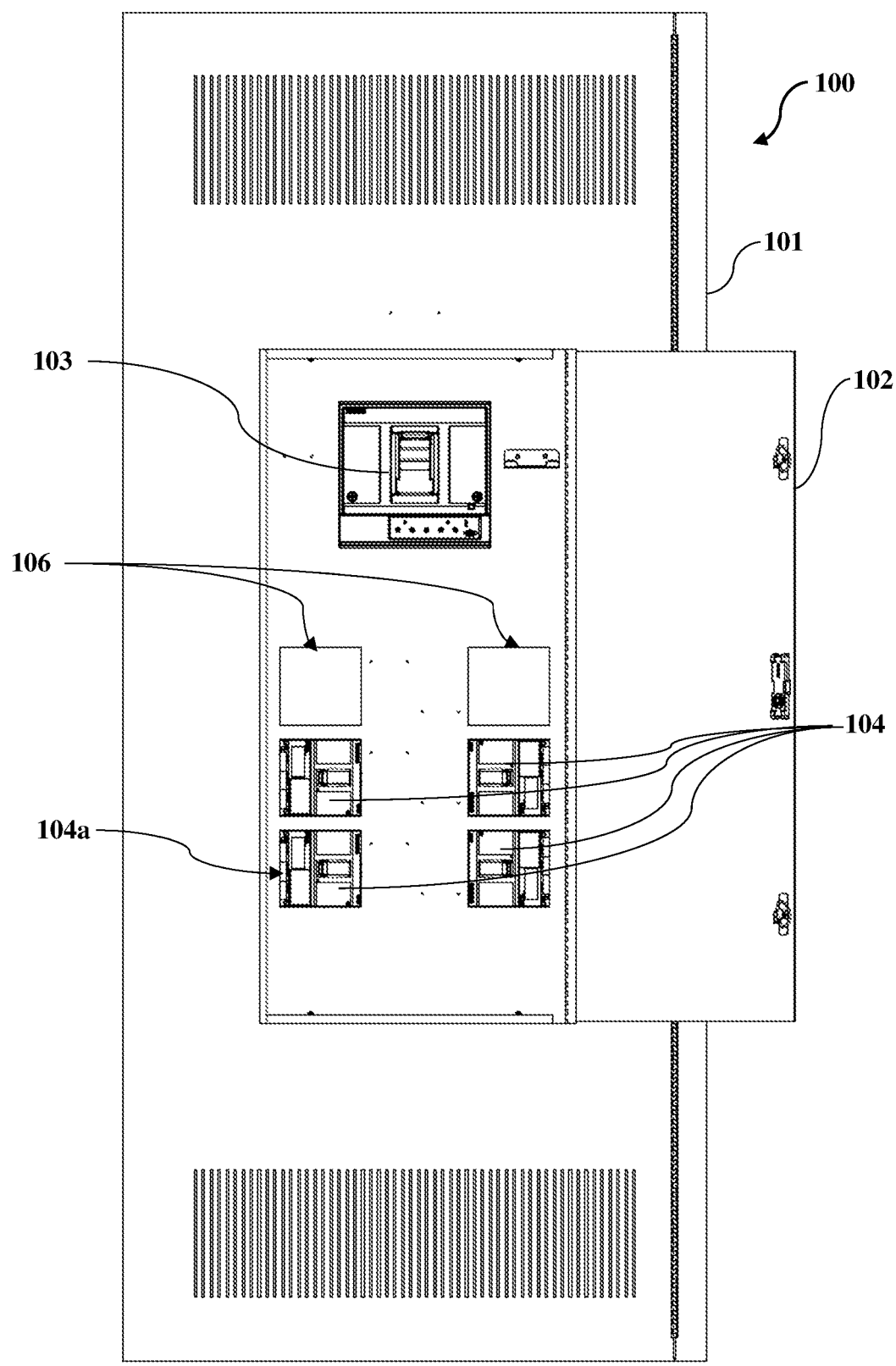
FIG. 2A illustrates a front elevation view of an embodiment of a wall-mounted, modular plug-in power distribution panel assembly with an outer panel door in an open position.

FIG. 2A illustrates a front elevation view of an embodiment of a wall-mounted, modular plug-in power distribution panel assembly (MPIPDPA) 100 with a panel door 102 in an open position. The wall-mounted MPIPDPA 100 is a touch-safe, power distribution panel. The panel door 102 conceals the breakers, for example, the main breaker 103, the feeder breakers 104, etc., illustrated in FIGS. 2A-2B, accommodated in the panel 105 of the MPIPDPA 100. By opening the panel door 102, the breakers, for example, the main breaker 103, the feeder breakers 104, etc., illustrated in FIG. 2B, accommodated in the panel 105 of the MPIPDPA 100 are exposed for allowing operation, for example, opening and closing of the breakers 103 and 104. Blanking plates 108 illustrated in FIG. 2B, for four feeder breakers 104 are not installed to show open slots 106 in FIG. 2A. In an embodiment, the 100%-rated plug-in breakers, for example, 104, comprise electronic trip units 104a, for example, molded case circuit breakers, motor circuit protectors, etc., for added flexibility and reliability. In an example, the electronic trip units 104a are ETU350 LSI, where LSI refers to a combination of adjustable trip functions comprising long-time ampere rating, long-time delay, short-time pickup, short-time delay, and instantaneous pickup.

Figure 2B:
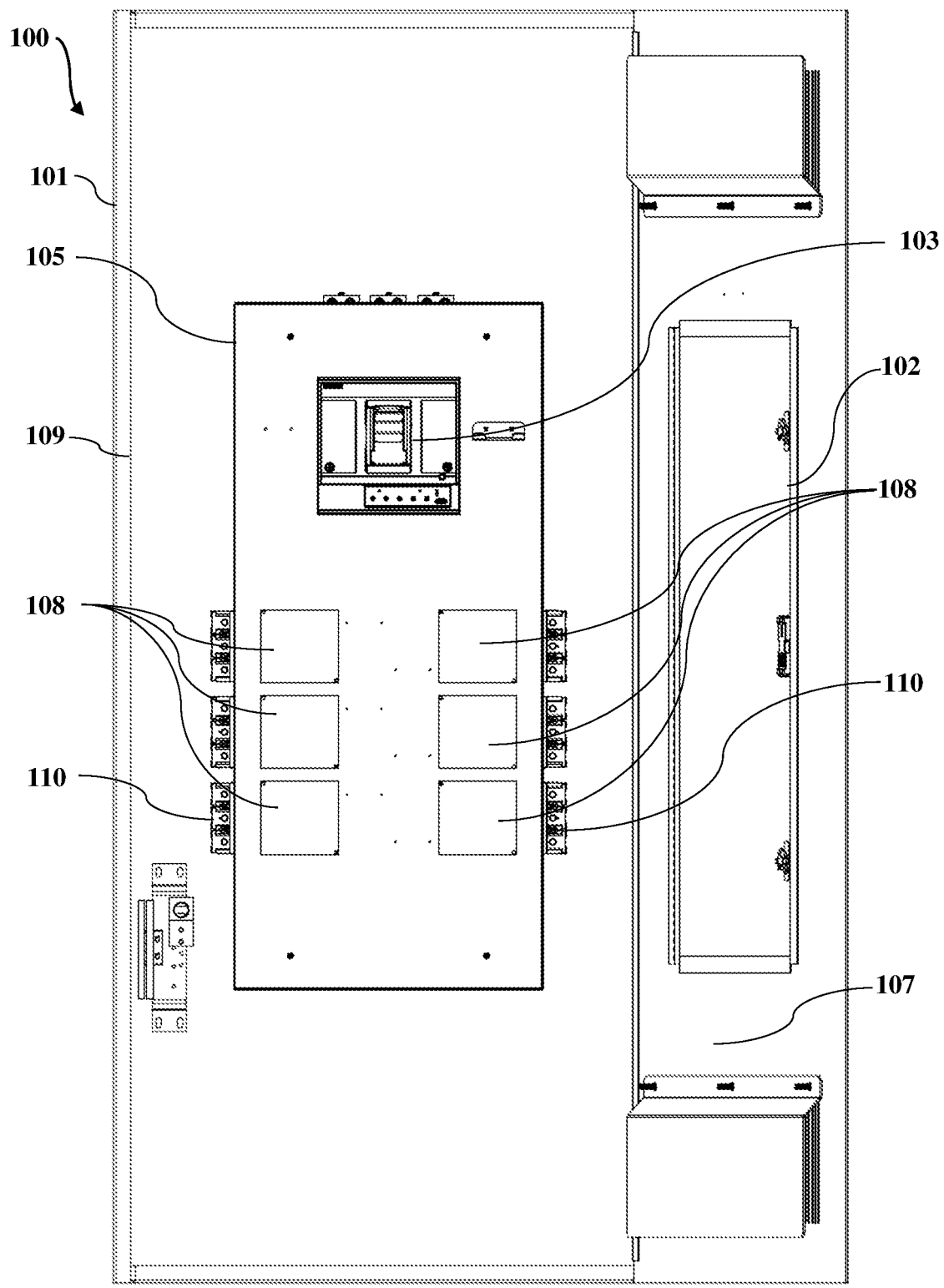
FIG. 2B illustrates a front elevation view of the embodiment of the wall-mounted, modular plug-in power distribution panel assembly shown in FIG. 2A, showing a dead front positioned on an operating side of the wall-mounted, modular plug-in power distribution panel assembly.

FIG. 2B illustrates a front elevation view of the embodiment of the wall-mounted, modular plug-in power distribution panel assembly (MPIPDPA) 100 shown in FIG. 2A, showing a dead front 107 positioned on an operating side of the wall-mounted MPIPDPA 100. The interior 113 of the MPIPDPA 100 is covered by a pan structure, herein referred to as a "cookie pan" 109. The dead front 107 defines an outer panel door of the MPIPDPA 100. The dead front 107 is a metal plate that conceals live parts, for example, wiring, bus bars, etc., from personnel on the operating side of the MPIPDPA 100. The dead front 107 is not electrically active. The dead front 107 comprises an opening for exposing the main breaker 103 and blanking plates 108 for concealing the plug-in bases 110 illustrated in FIGS. 2B-2C. The dead front 107 protects any person touching the dead front 107 from shock as the metal of the dead front 107 is isolated from the live parts of the MPIPDPA 100 and is grounded such that, if the dead front 107 briefly becomes live, the current flow to ground immediately trips a breaker to shut off the electricity. The blanking plates 108 cover and protect the plug-in bases 110 from external elements, for example, dust, moisture, etc. The blanking plates 108 are made, for example, from sheet metal. The cookie pan 109 with the dead front 107 and the blanking plates 108 is typically used in a scenario where an operator installs some or all feeder breakers 104 in the field.

Figure 2C:
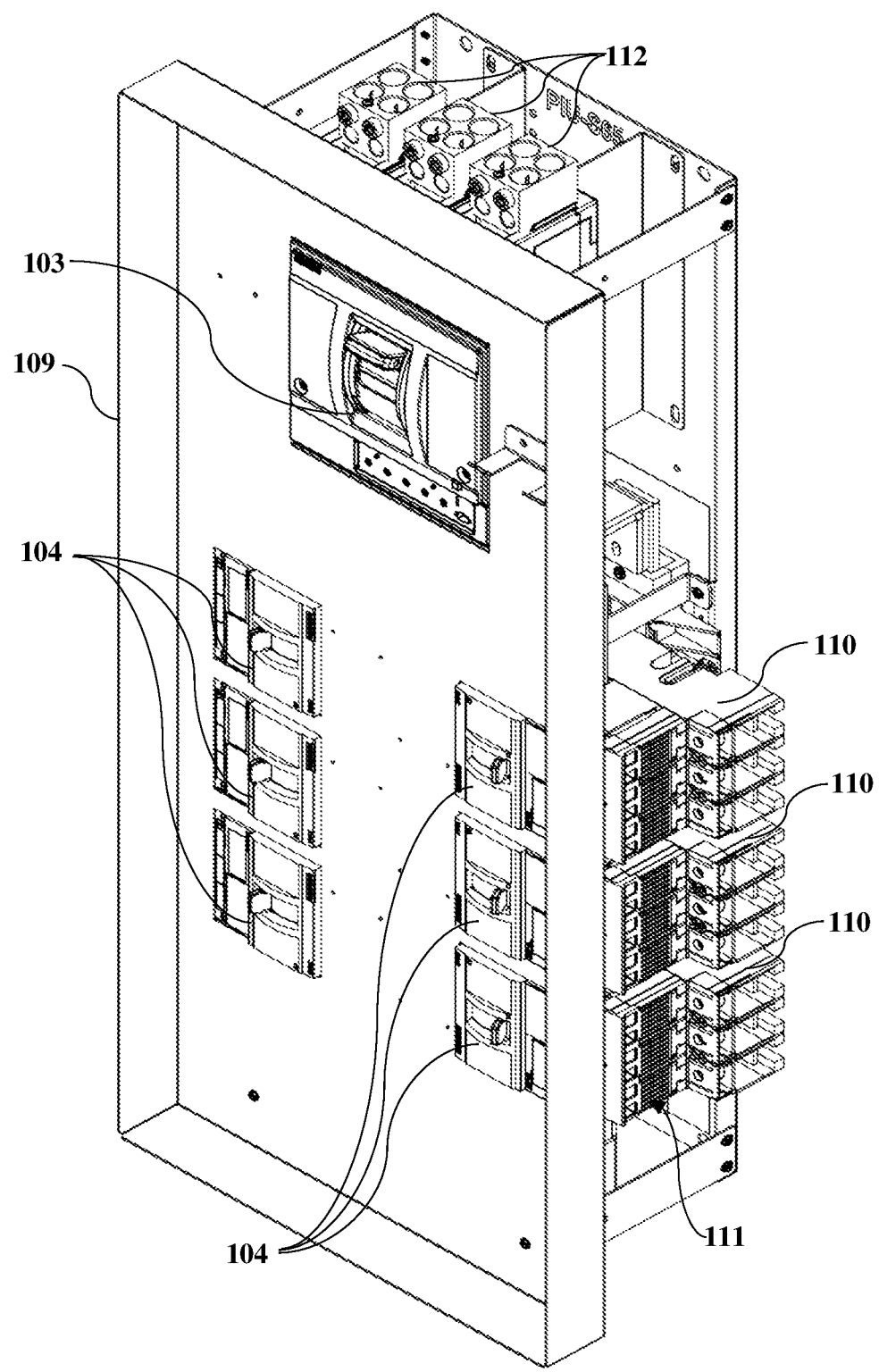
FIG. 2C illustrates a perspective view of the embodiment of the wall-mounted, modular plug-in power distribution panel assembly shown in FIG. 2A, showing one 800 A main breaker and six 250 A feeder breakers.
Figure 2D:
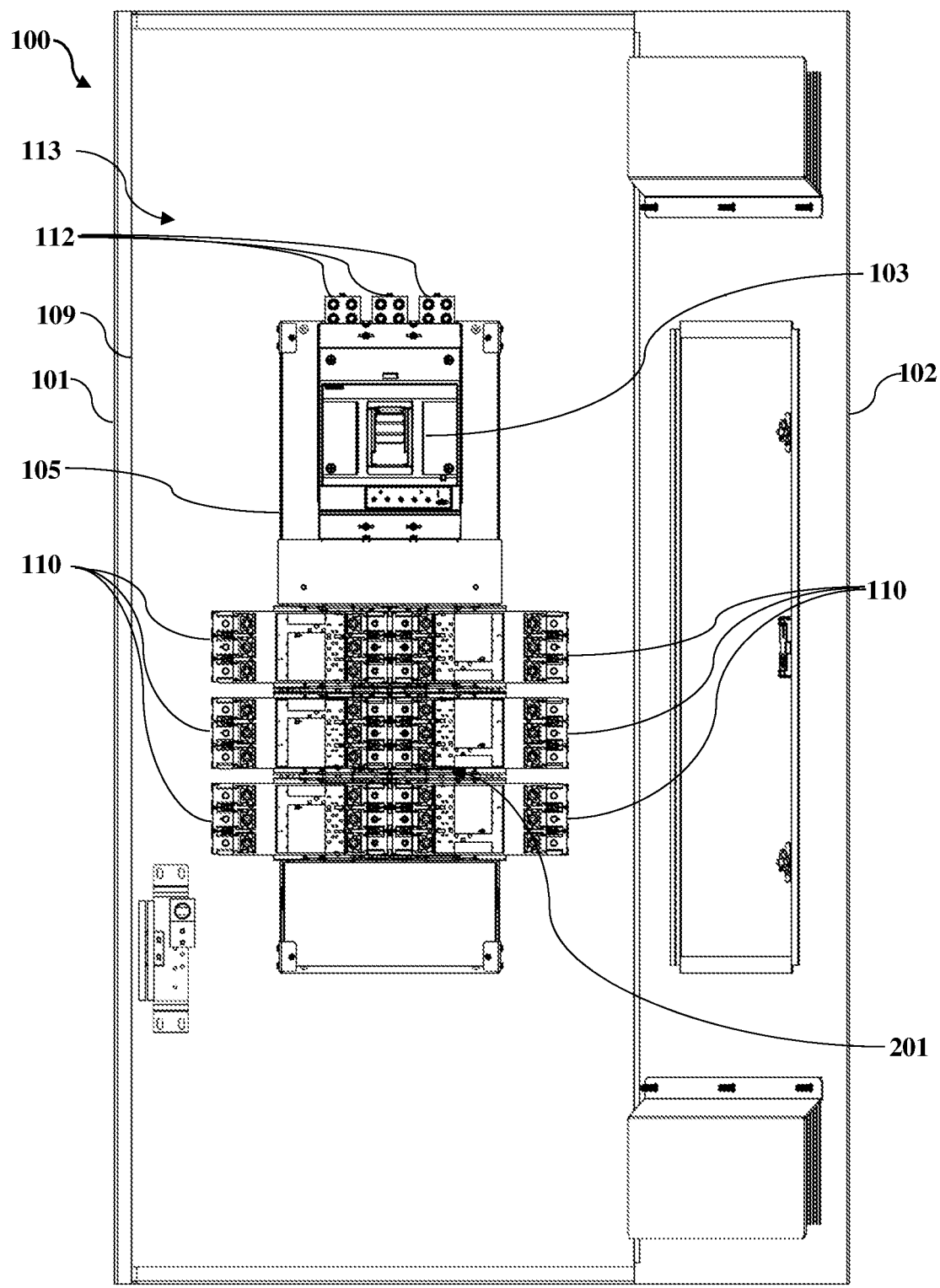
FIG. 2D illustrates a front elevation view of the embodiment of the wall-mounted, modular plug-in power distribution panel assembly shown in FIG. 2A, showing plug-in bases operably coupled to a main bus of a bus bar assembly on a panel of an electrical enclosure.

FIG. 2C illustrates a perspective view of the embodiment of the wall-mounted, modular plug-in power distribution panel assembly (MPIPDPA) 100 shown in FIG. 2A, showing one 800 A main breaker 103 and six 250 A feeder breakers 104. The 250 A feeder breakers 104 are detachably coupled to the plug-in bases 110 illustrated in FIGS. 2A-2C. To add feeder breakers 104 to the MPIPDPA 100, the entire front trim and the cookie pan 109 illustrated in FIGS. 2B-2C, are removed. The feeder breakers 104 are operably coupled to the plug-in bases 110. Also illustrated in FIG. 2C are lugs 112 that are a part of the main breaker assembly positioned on top of the MPIPDPA 100. The lugs 112 allow cable connections to the main breaker 103.

FIG. 2D illustrates a front elevation view of the embodiment of the wall-mounted, modular plug-in power distribution panel assembly (MPIPDPA) 100 shown in FIG. 2A, showing the plug-in bases 110 operably coupled to a main bus of a bus bar assembly 201 on the panel 105 of the electrical enclosure 101. When the entire front trim and the cookie pan 109 illustrated in FIGS. 2B-2C are removed, an interior 113 of the MPIPDPA 100 is exposed as illustrated in FIGS. 2D, thereby allowing addition of feeder breakers 104. The bus bar assembly 201 comprises multiple bus bars operably coupled to the panel 105 in the interior 113 of the MPIPDPA 100. The plug-in bases 110 are operably coupled to the panel 105 via the main bus constituted, for example, by three bus bars, of the bus bar assembly 201 as illustrated in FIG. 2D. The plug-in bases 110 are positioned face-to-face on the panel 105. A phase separation partition is configured as part of the plug-in bases 110 to ensure there is no loss of functionality or compromise in safety. The plug-in bases 110 are configured for connecting multiple cables during initial installation for adding a configurable number of plug-in breakers, for example, the feeder breakers 104 illustrated in FIG. 1B, FIG. 2A, and FIG. 2C, to the panel 105 without shutting power down. As the capacity grows, the MPIPDPA 100 allows addition of the plug-in breakers, for example, 104, without shutting the power down, following guidelines for electrical safety as defined by local and national electrical codes, the National Fire Protection Association (NFPA) guidelines, and the Occupational Safety and Health Administration (OSHA) guidelines.

Figure 3A:
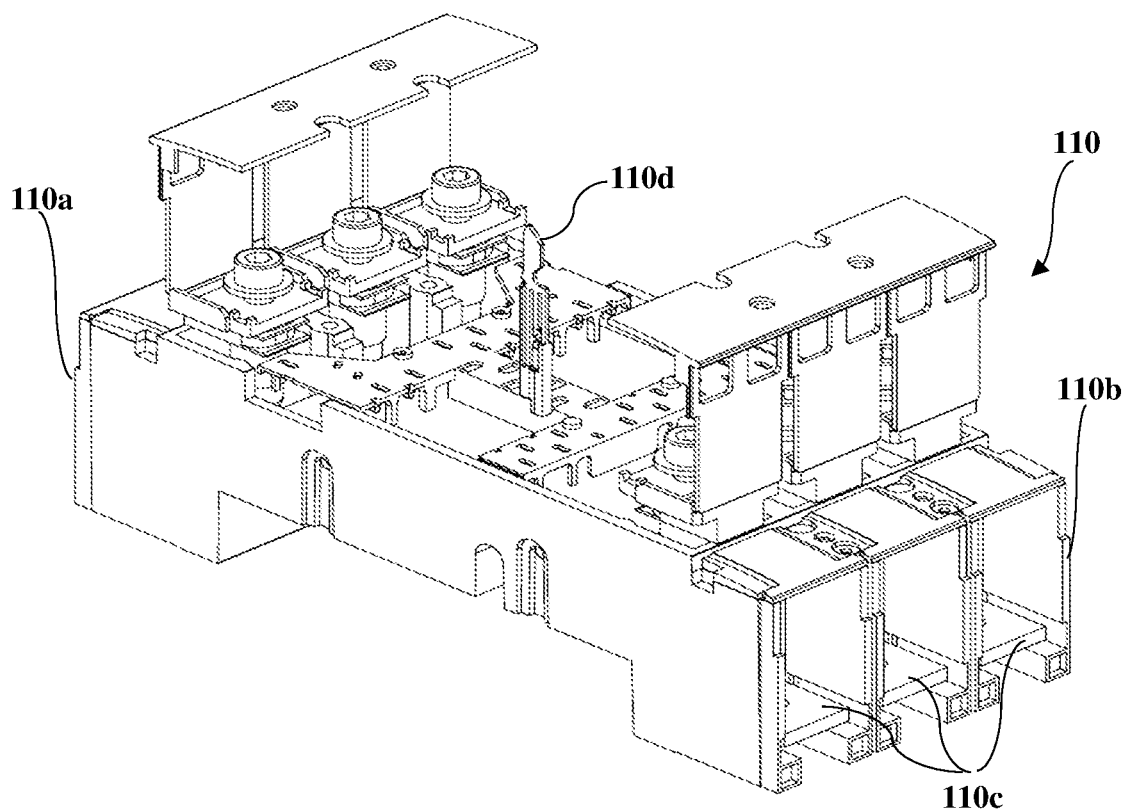
FIGS. 3A-3B illustrate a perspective view and a side elevation view of a plug-in base, respectively.
Figure 3B:
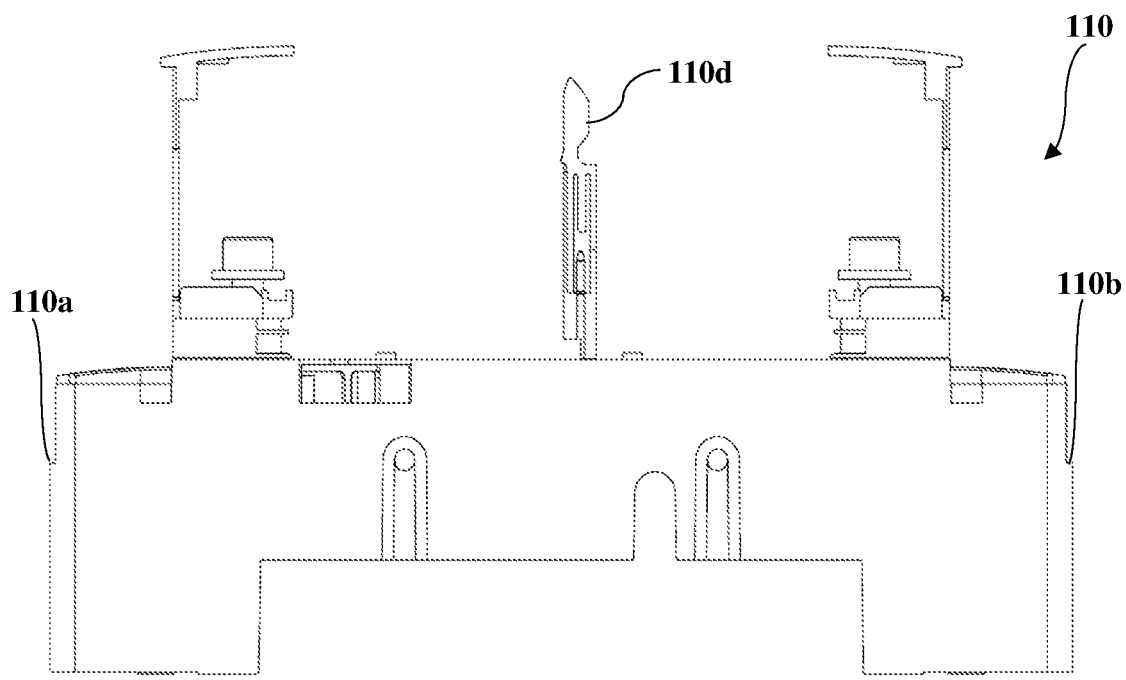

FIGS. 3A-3B illustrate a perspective view and a side elevation view of a plug-in base 110, respectively. Each plug-in base 110 in the modular plug-in power distribution panel assembly (MPIPDPA) 100 shown in FIGS. 2B-2D is configured to connect multiple cables (not shown) during initial installation for adding a configurable number of plug-in breakers to the panel 105 without shutting power down. The cables are connected to plug-in base terminals 110c disposed at opposing ends 110a and 110b of the plug-in base 110. In an embodiment, a line side bus assembly 3800a and a load side bus assembly 3800b illustrated in FIGS. 38A-38E and FIG. 38G, are operably coupled to the plug-in base terminals configured at the opposing ends 2203a and 2203b of each plug-in base 2203 for supply and distribution of electric power within the MPIPDPA 100. In an embodiment, the plug-in breakers incorporate a safety feature whereby a circuit breaker, for example, 103, that is switched on cannot be plugged into the panel 105 shown in FIGS. 2B-2D. If an operator of the MPIPDPA 100 attempts to plug-in a circuit breaker that is switched on, the circuit breaker is configured to automatically trip ensuring no loads are connected during a plug-in of the circuit breaker while the MPIPDPA 100 is energized. Furthermore, if an operator attempts to remove a plug-in breaker that is in an "on" position by loosening screws that secure the plug-in breaker, the plug-in breaker automatically trips. In an embodiment, the plug-in base 110 comprises a safety trip lever 110d, also referred to as a trip flag, extending outwardly as illustrated in FIGS. 3A-3B. The safety trip lever 110d of the plug-in base 110 is configured to insert into the plug-in breaker from the bottom and execute the safety function disclosed above. The safety trip lever 110d is installed inside the bottom of the plug-in breaker and operates in conjunction with each plug-in base 110 to perform the safety function.

Figure 4:
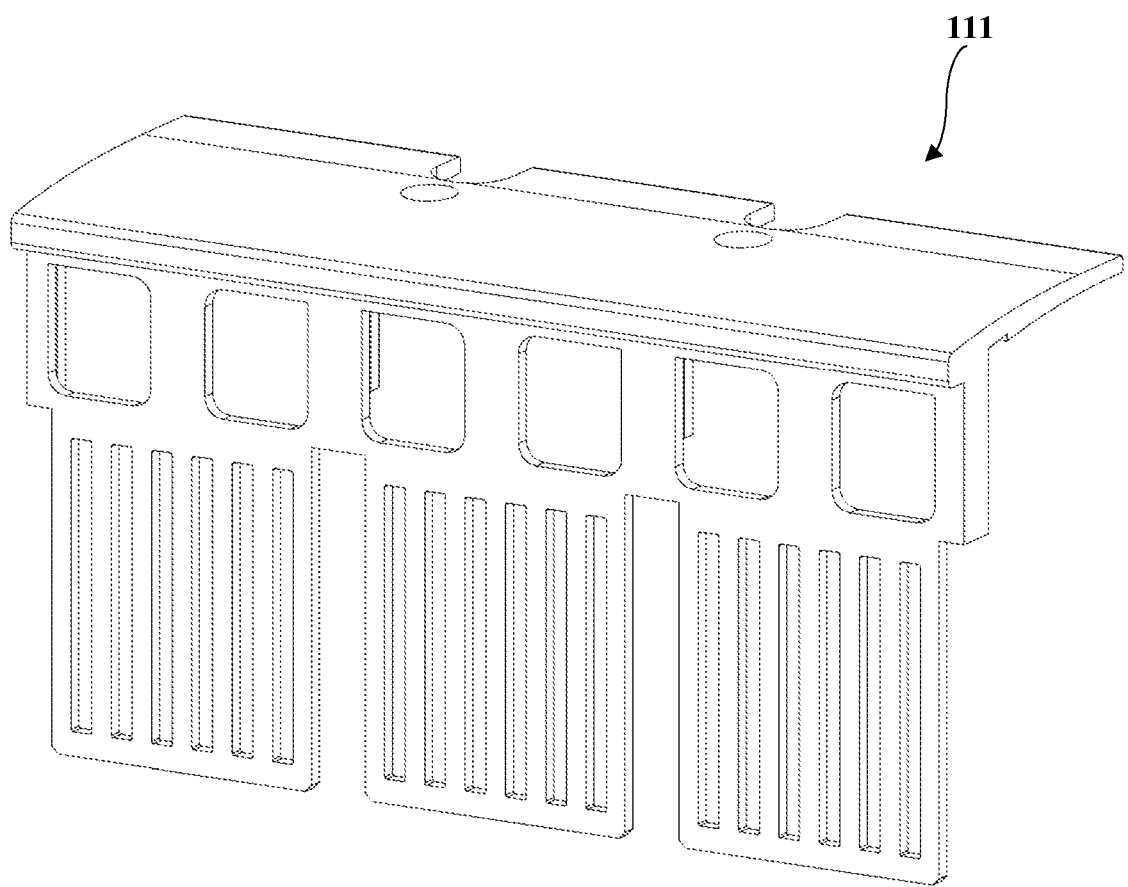
FIG. 4 illustrates a perspective view of an embodiment of a lug cover configured to protect lugs of the modular plug-in power distribution panel assembly shown in FIGS. 2A-2D.

FIG. 4 illustrates a perspective view of an embodiment of a lug cover 111 configured to protect lugs of the modular plug-in power distribution panel assembly (MPIPDPA) 100 shown in FIGS. 2A-2D. The lug cover 111 is made, for example, from a glass-filled thermoplastic material such as a glass-filled polycarbonate. The thermoplastic material is flexible, has enhanced electrical insulating properties, and is safety rated by the Underwriters Laboratories (UL) 94V-0. The thermoplastic material is also flame tested and is UL recognized under 94V-0. The lugs are operably connected to the feeder breakers, for example, the 250 A feeder breakers 104, housed on the panel 105 illustrated in FIG. 2B. The feeder breakers 104 are operably coupled to their respective plug-in bases 110 on the panel 105. In an embodiment, holes are punched in each lug cover 111 for connecting cables to the lugs.

All the modular plug-in power distribution panel assemblies (MPIPDPAs) 100 illustrated in FIGS. 1A-1C and FIGS. 2B-2D configured as main breaker plug-in panels are configured to be series rated to optimize cost. For example, a 3 VA 800 A or 1000 A, 65 kA, 480V fixed main breaker and a 150 A/250 A, 25 kA, 480V plug-in feeder breaker rates the MPIPDPA 100 65 kA at 480V. In another example, an 800 A or 1000 A, 100 kA, 480V main breaker and a 150 A/250 A, 35 kA, 480V feeder breaker rates the MPIPDPA 100 at 100 kA at 480V. In another example, a 1200 A main breaker rated 100 kA at 480V and feeder breakers 150 A/250 A/400 A/600 A rated 35 kA, 480V rate the MPIPDPA 100 100 kA at 480V. Various other combinations are possible per 3 VA series rating tables. The series rating applies to the MPIPDPAs 1600 illustrated in FIGS. 16A-16E. In an embodiment, the series rating also applies when the main breaker is in another panelboard or another switchboard.

Figure 5A:
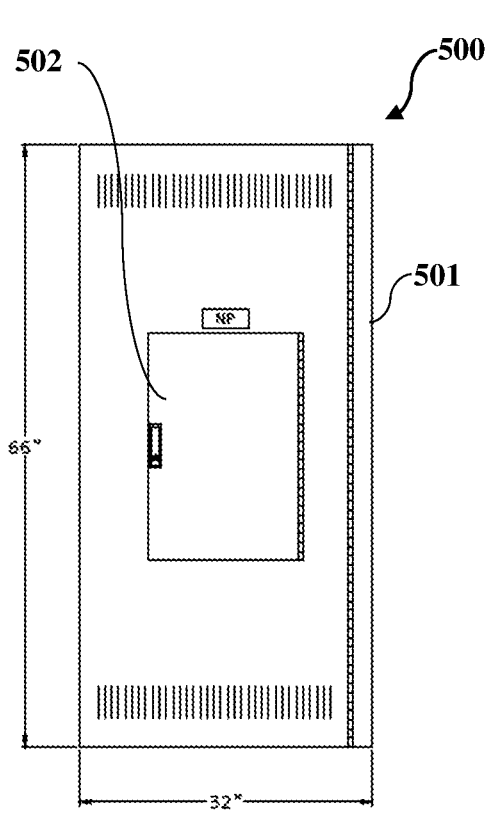
FIGS. 5A-5C illustrate an embodiment of the modular plug-in power distribution panel assembly comprising an 800 A main lug only assembly with six 250 A breakers.
Figure 5B:
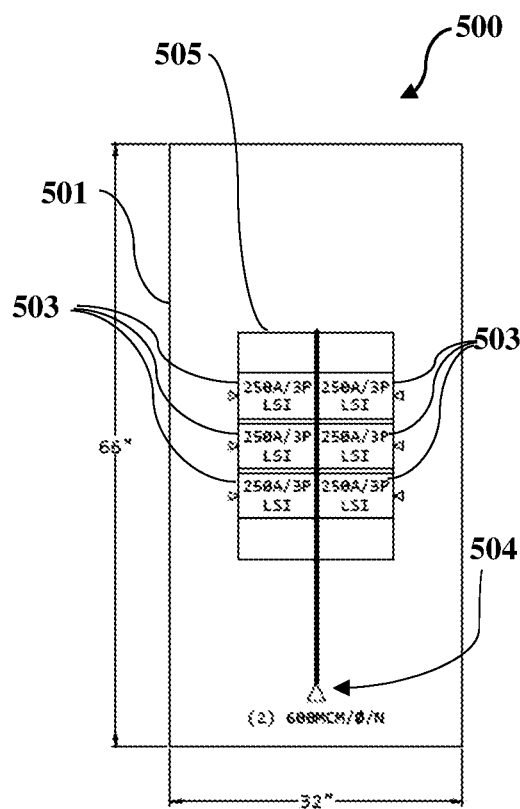
Figure 5C:
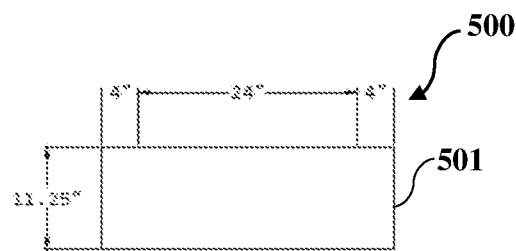

FIGS. 5A-5C illustrate an embodiment of the modular plug-in power distribution panel assembly (MPIPDPA) 500 comprising an 800 A main lug only (MLO) assembly with six 250 A breakers 503. The MLO assembly does not contain a main circuit breaker. In an embodiment of the MLO assembly, the main breaker is positioned in an upstream switchgear or another panelboard. In the MLO assembly, line wires run to a type of electrical connector called a lug 504. The MLO assembly comprises main lugs 504 for input cable connections. In an embodiment as illustrated in FIG. 5B, the main lugs 504 are positioned below the plug-in breakers, for example, the six 250 A breakers 503. In another embodiment (not shown), the main lugs 504 are positioned above the plug-in breakers. In an embodiment, the MLO assembly is provided when a large number of feeder breakers is desired. FIG. 5A illustrates a front elevation view of the MPIPDPA 500 in a closed position, where the plug-in breakers, for example, the six 250 A breakers 503, housed on the panel 505 in the electrical enclosure 501 are concealed by the panel door 502. FIG. 5B illustrates a front elevation view of the MPIPDPA 500 in an open position, where the plug-in breakers, for example, the six 250 A breakers 503, on the panel 505 are exposed. As illustrated in FIG. 5B, the plug-in breakers 503 are twin-mounted on the panel 505. In an example, the height and the length of the electrical enclosure 501 are about 66 inches and about 32 inches respectively. A top plan view of the MPIPDPA 500 illustrated in FIGS. 5A-5B, is illustrated in FIG. 5C. The MPIPDPA is configured to accommodate a different number and combination of 150 A, 250 A, 400 A, and 600 A breakers and the arrangement of the breakers is also user selectable. For example, 600 A breakers can be disposed on an upper section of the panel and 250 A breakers can be disposed on a lower section of the panel. Alternative arrangements have been fully tested to Underwriter Laboratories (UL) standards to ensure electrical safety of the MPIPDPA. For purposes of illustration, the disclosure herein refers to an MPIPDPA 500 comprising an 800 A MLO assembly with six 250 A breakers 503 housed on a panel 505 in an electrical enclosure 501 with a height of about 66 inches; however, the scope of the MPIPDPA disclosed herein is not limited to the assembly shown in FIGS. 5A-5C, but extends to include a 800 A power distribution panel, a 1000 A power distribution panel, or a 1200 A power distribution panel with any number of plug-in breakers, for example, eight 250 A breakers, ten 250 A breakers, etc., housed on the panel in an electrical enclosure of an increased height. For example, the MPIPDPA disclosed herein can accommodate an 800 A power distribution panel with ten 250 A breakers housed on a panel in an electrical enclosure with a height of about 76 inches.

Figure 6:
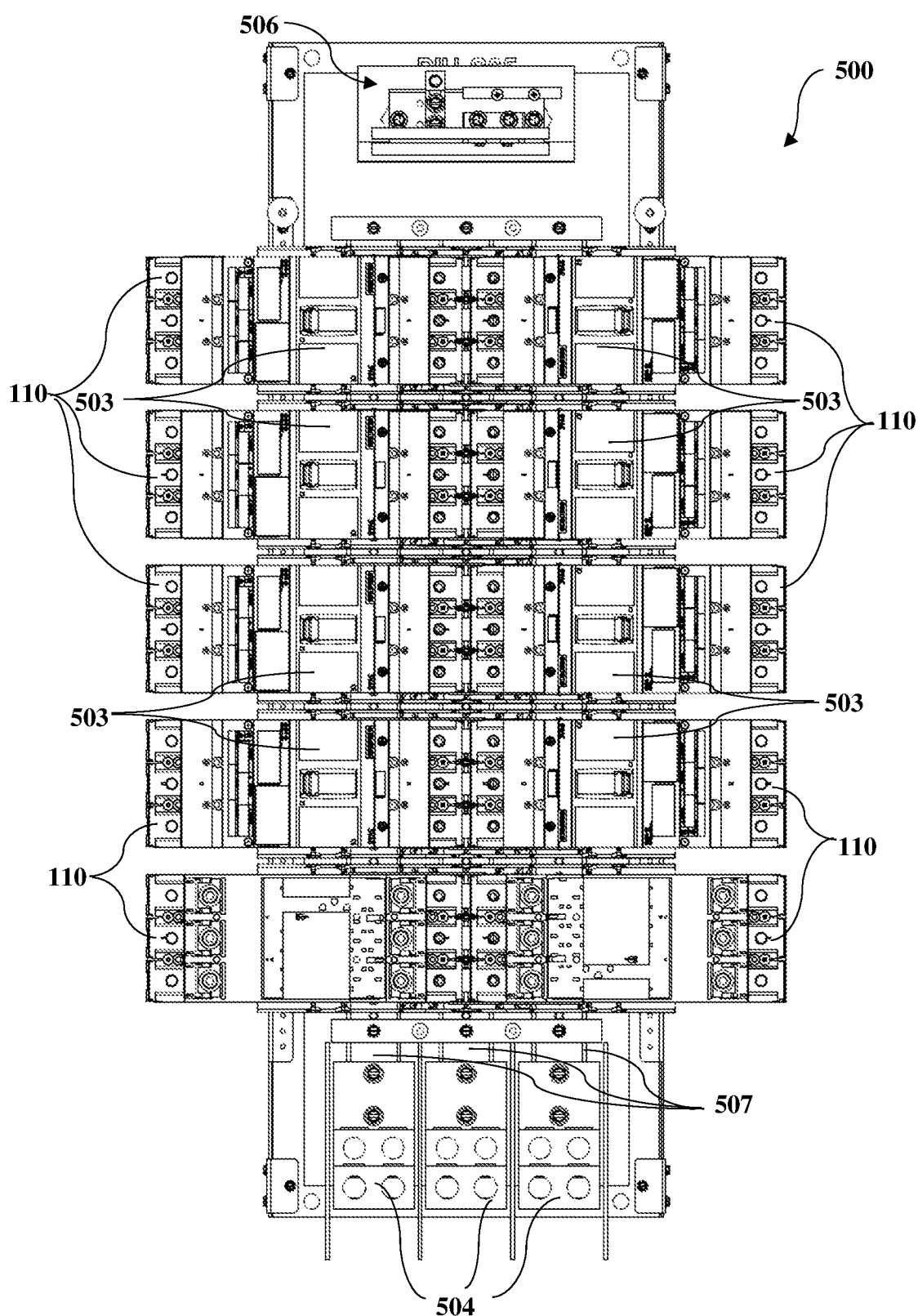
FIG. 6 illustrates a perspective view of an embodiment of the modular plug-in power distribution panel assembly comprising an 800 A main lug only assembly configured for ten 250 A breakers.

FIG. 6 illustrates a perspective view of an embodiment of the modular plug-in power distribution panel assembly (MPIPDPA) 500 comprising an 800 A main lug only (MLO) assembly configured for ten 250 A breakers 503. The plug-in breakers 503 are twin mounted and detachably coupled to the plug-in bases 110 as illustrated in FIG. 6. The MLO assembly comprises main lugs 504 positioned at the bottom and a neutral bus assembly 506 positioned at the top as illustrated in FIG. 6. The neutral bus assembly 506 comprises multiple mechanical connectors for connecting wires of various sizes to a neutral bus. Incoming supply cables are connected directly to the main lugs 504 and the bus bars 507. In an embodiment, the lugs 504 are made of aluminum for implementing 100%-rated plug-in breakers comprising, for example, one or more of 150-ampere plug-in breakers, 250-ampere plug-in breakers, 400-ampere plug-in breakers, and 600 A plug-in breakers. In an example, lugs 504 and heat sinks made of aluminum are used for 100%-rated, 600 A plug-in breakers. The lugs 504 made of aluminum cost significantly less than copper lugs. Furthermore, the lugs 504 used for the 100%-rated breakers are made of high strength aluminum alloy, are tin-plated, and can accommodate both copper and aluminum cables.

Figure 7B:
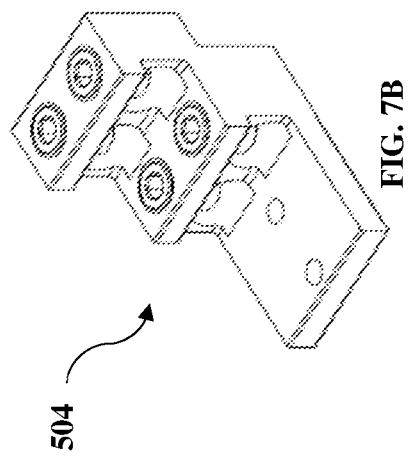
FIGS. 7A-7E illustrate different views of a lug configured to be operably coupled to each bus bar extension of the modular plug-in power distribution panel assembly shown in FIG. 6.
Figure 7C:
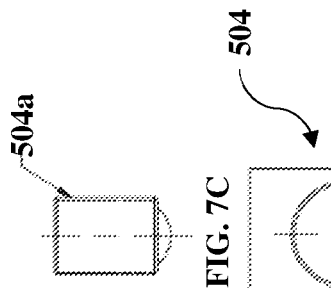
Figure 7E:
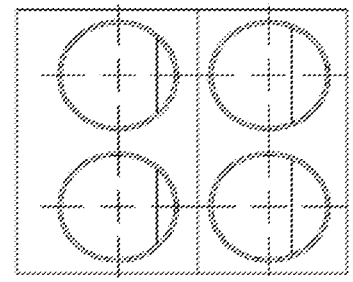
Figure 7A:
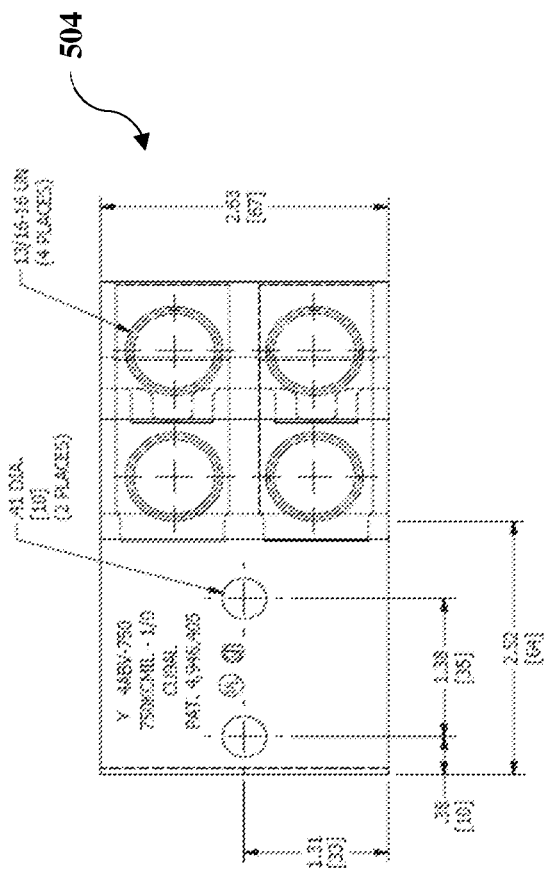
Figure 7D:
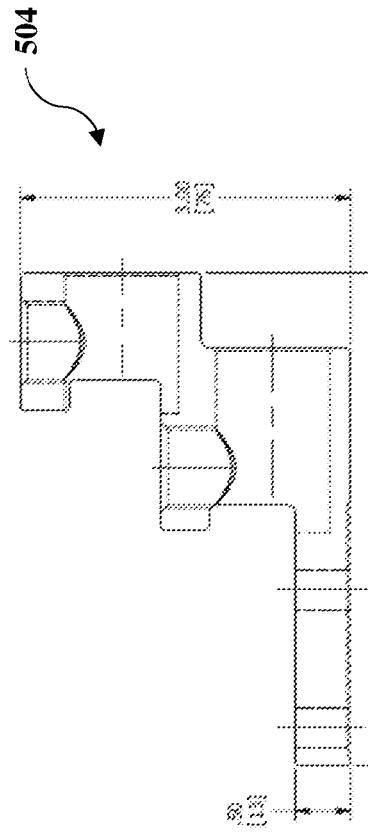

FIGS. 7A-7E illustrate different views of an embodiment of a lug 504 configured to be operably coupled to each extension of the bus bars 507 of the modular plug-in power distribution panel assembly (MPIPDPA) 500 shown in FIG. 6. Exemplary dimensions of the lug 504 are illustrated in FIG. 5A. The aluminum lug 504 illustrated in FIGS. 7A-7B and FIGS. 7D-7E is configured as a main lug for an 800 A or 1000 A plug-in, main lug only (MLO) panelboard as illustrated in FIG. 6. Along with the aluminum lug 504, screws 504a of the type illustrated in FIG. 7C are supplied with connectors fully assembled for connecting the aluminum lug 504 to the bus bar extensions 507. In an embodiment, 75° C.-rated cables are used for load connections to the 100%-rated plug-in breakers. The lugs 504 implemented in the MPIPDPA 500 shown in FIG. 6, do not need 90° C.-rated cables. In an embodiment, the lugs 504 are tin-plated.

Figure 8A:
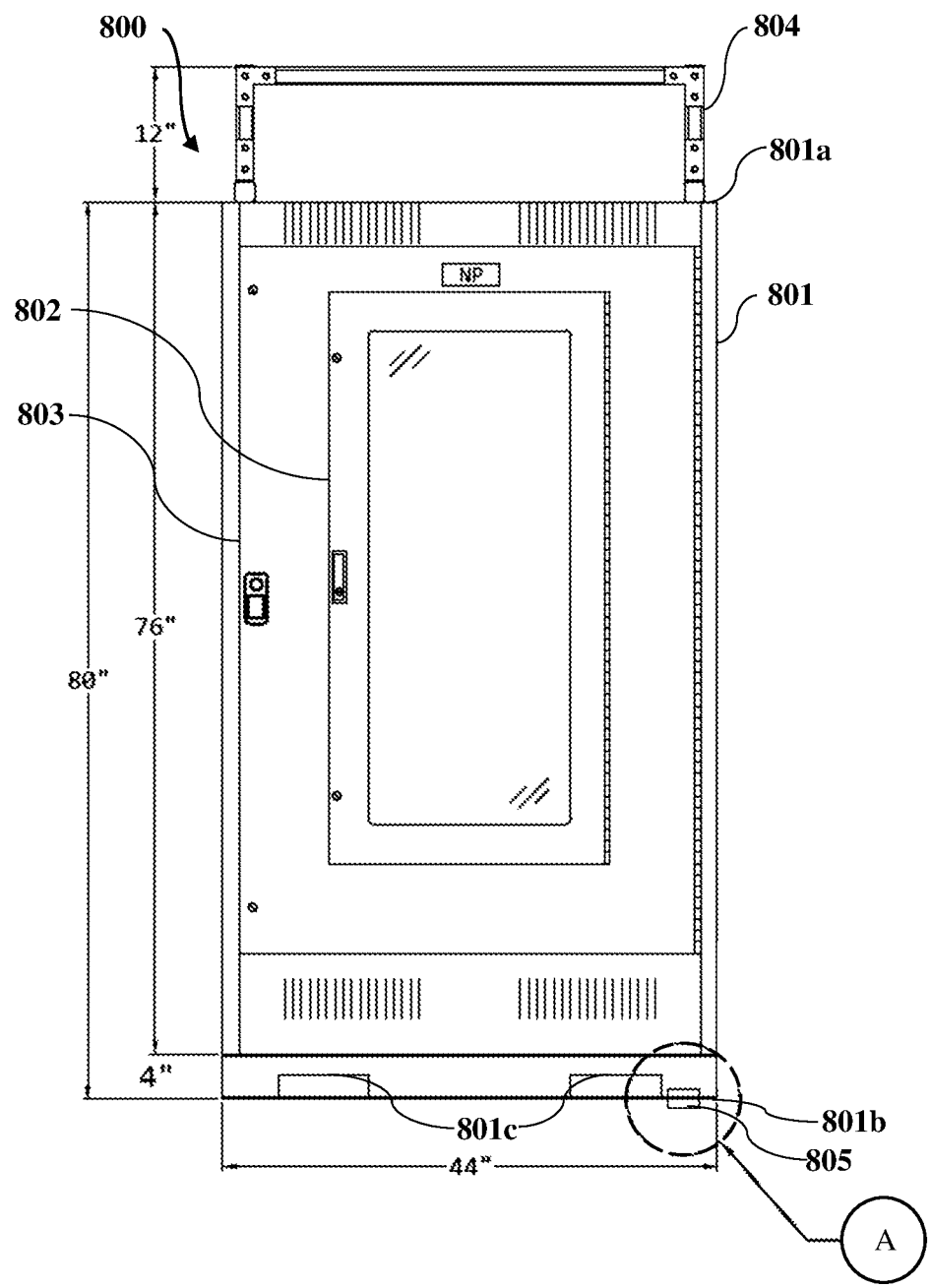
FIG. 8A illustrates a front elevation view of an embodiment of the modular plug-in power distribution panel assembly comprising a 1200 A main lug only assembly with six 250 A breakers and four 600 A breakers, with panel doors in a closed position.
Figure 8B:
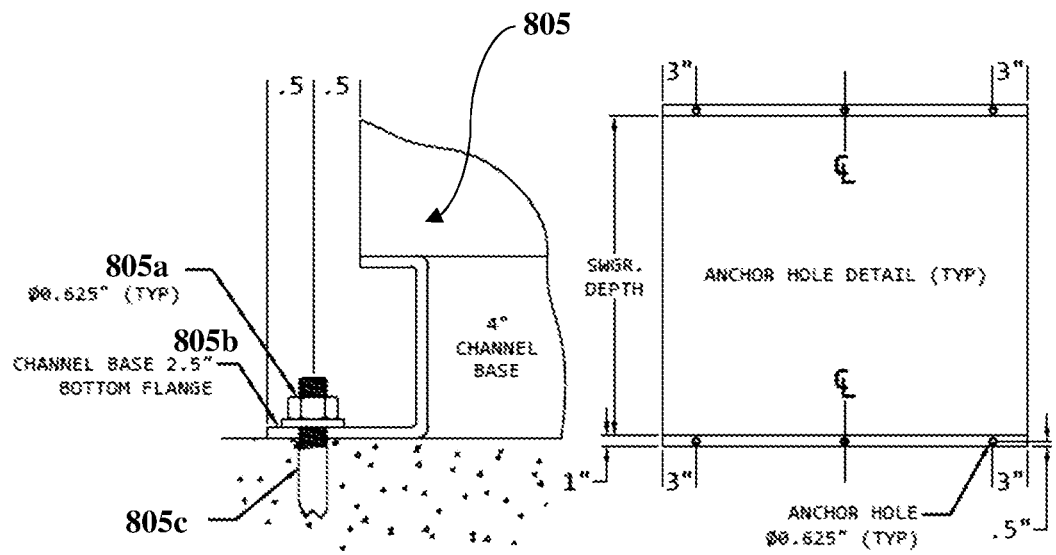
FIG. 8B illustrates an enlarged view of a section marked A in FIG. 8A, showing an anchoring element of the modular plug-in power distribution panel assembly.
Figure 8C:
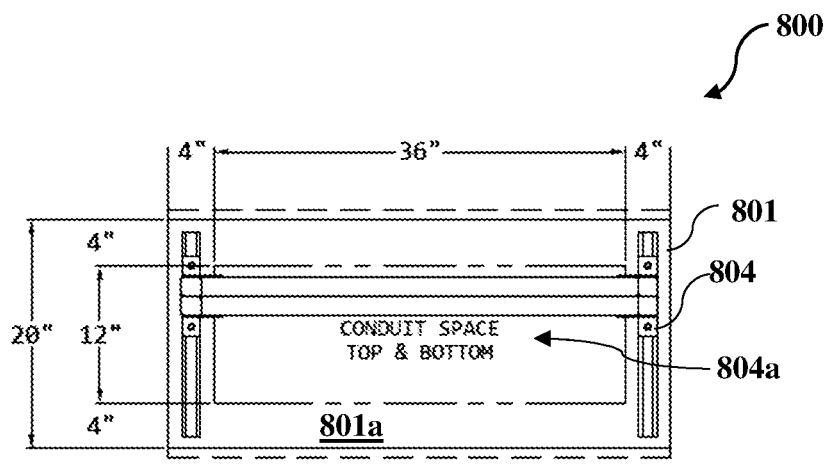
FIG. 8C illustrates a top plan view of the embodiment of the modular plug-in power distribution panel assembly shown in FIG. 8A.
Figure 8D:
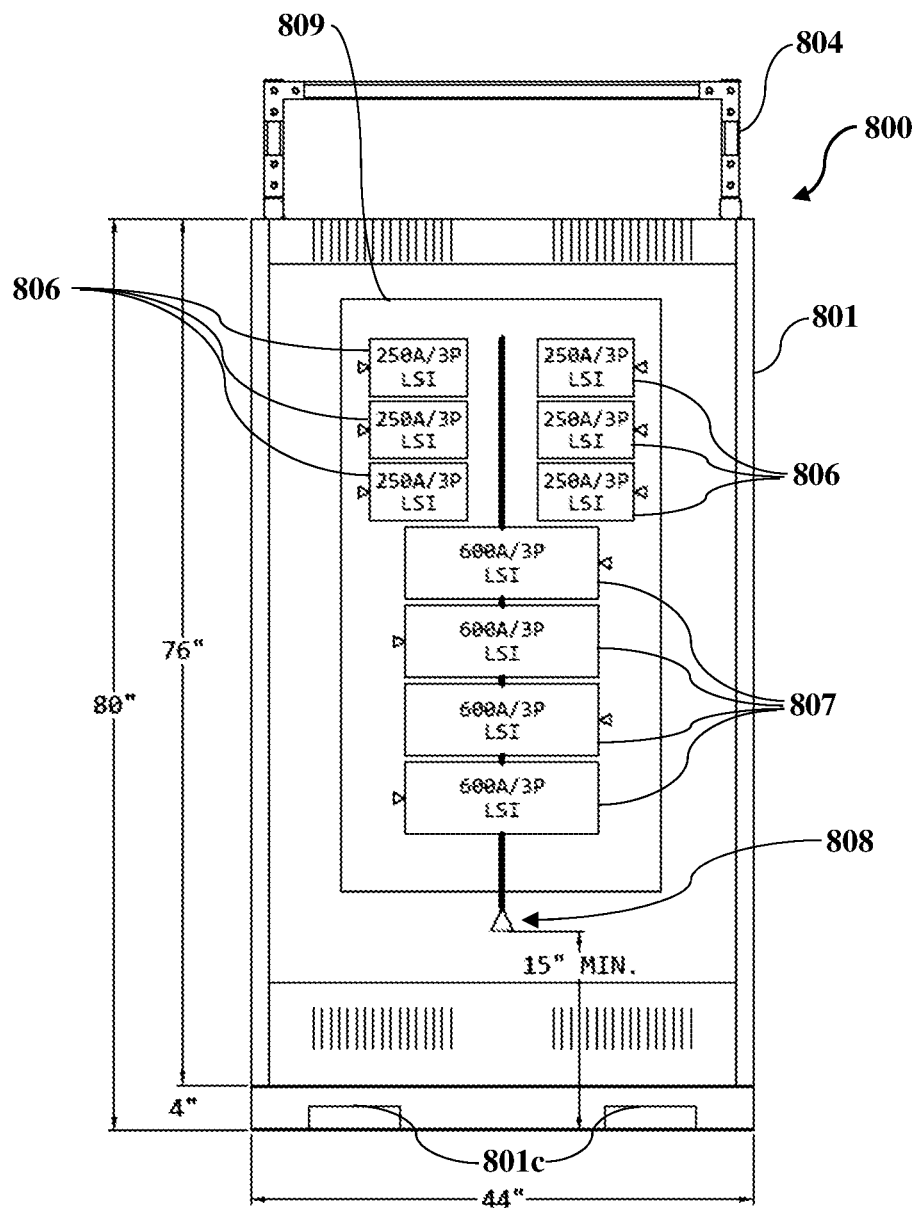
FIG. 8D illustrates a front elevation view of the embodiment of the modular plug-in power distribution panel assembly shown in FIG. 8A, with the panel doors in an open position showing the breakers of the modular plug-in power distribution panel assembly.

FIG. 8A illustrates a front elevation view of an embodiment of the modular plug-in power distribution panel assembly (MPIPDPA) 800 comprising a 1200 A main lug only (MLO) assembly with six 250 A breakers 806 and four 600 A breakers 807 shown in FIG. 8D, with panel doors 802 and 803 in a closed position. In this embodiment, the MPIPDPA 800 is a floor-mounted power distribution panel. In an example, the height and the length of the electrical enclosure 801 of the MPIPDPA 800 is about 80 inches and about 44 inches respectively. The inner panel door 802 provides access to the plug-in breakers 806 and 807 illustrated in FIG. 8D. The outer panel door 803 provides access to bus bars, cables, and other parts of the electrical enclosure 801. The outer panel door 803 is opened to expose the electrical components, for example, the breakers, and to conduct a hot swap of the electrical components, that is, to replace or add electrical components in the MPIPDPA 800 without shutting the power down. In an embodiment, the MPIPDPA 800 is configured to flexibly mount a support 804 for a metal framing system, for example, a Unistrut® metal framing system of Unistrut International Corporation, on a top end of the electrical enclosure 801 for allowing flexible movement of the metal framing system. The metal framing system is configured to provide support for multiple electrical conduits. In an example, a conduit/cable support 804 is configured to be attached to a top surface 801a of the electrical enclosure 801. The conduit/cable support 804 supports electrical conduits that protect the incoming cables that are connected to the main lugs 808 of the MPIPDPA 800. The conduit/cable support 804 also support cables of the MPIPDPA 800. The conduit/cable support 804 allows the metal framing system to be flexibly moved front to back in order to provide support for multiple electrical conduits of different sizes, for example, 4-inch electrical conduits, 6-inch electrical conduits, 8-inch electrical conduits, etc. The conduit/cable support 804 eliminates the need for building separate structures to support electrical conduits during field installation of the MPIPDPA 800.

In an embodiment, the modular plug-in power distribution panel assembly (MPIPDPA) 800 further comprises provisions such as notches 801c configured on a base 801b of the electrical enclosure 801 at the front, to allow handling of the MPIPDPA 800, for example, via lifting equipment such as a fork lift. For example, a fork lift attaches to the front notches 801c configured on the front side of the base 801b of the electrical enclosure 801 for allowing lifting and handling of the MPIPDPA 800. In another embodiment, when the MPIPDPA 800 is accommodated on a pallet, a lift truck or a pallet jack attaches to the front notches 801c of the MPIPDPA 800 to facilitate movement of the MPIPDPA 800. The pallet jack moves the MPIPDPA 800 from the front. In an embodiment, side notches are configured on opposing sides of an electrical enclosure in an MPIPDPA only if the depth of the MPIPDPA is, for example, greater than 36 inches. As the depth of the MPIPDPA 800 is, for example, between about 20 inches to about 24 inches, only front notches 801c are configured in the electrical enclosure 801 of the MPIPDPA 800. Similarly, the MPIPDPA 800 illustrated in FIGS. 11A-11B also comprises front notches 801c. In an embodiment, the MPIPDPA 800 further comprises an anchoring element 805 configured at the base 801b of the electrical enclosure 801. The anchoring element 805 is anchored to a ground surface as illustrated in FIG. 8B, to anchor the electrical enclosure 801 to the ground surface. The structural configuration and the base 801b of the electrical enclosure 801 with the anchoring element 805 are configured to meet stringent seismic requirements.

FIG. 8B illustrates an enlarged view of a section marked A in FIG. 8A, showing the anchoring element 805 of the modular plug-in power distribution panel assembly (MPIPDPA) 800. The anchoring element 805 is anchored to a ground surface, for example, using anchor bolts 805c supported by an anchor hole 805a and a bottom flange 805b. The detail of the anchor hole 805a is also illustrated in FIG. 8B. The structure and the base 801b of the electrical enclosure 801 with the anchoring element 805 are configured to allow the MPIPDPA 800 to remain operational before, during, and after a strong seismic event, for example, an earthquake. When anchored, for example, with ½-inch Grade 5 bolts of a standard defined by the Society of Automotive Engineers (SAE), the structure is well secured and meets seismic safety requirements of critical facilities.

FIG. 8C illustrates a top plan view of the embodiment of the modular plug-in power distribution panel assembly (MPIPDPA) 800 shown in FIG. 8A. The top surface 801a of the electrical enclosure 801 provides a conduit space 804a as illustrated in FIG. 8C, for accommodating multiple electrical conduits of sizes, for example, about 4 inches, 6 inches, 8 inches, etc.

FIG. 8D illustrates a front elevation view of the embodiment of the modular plug-in power distribution panel assembly (MPIPDPA) 800 shown in FIG. 8A, with the panel doors 802 and 803 in an open position showing the breakers 806 and 807 of the MPIPDPA 800. The plug-in breakers, for example, 250 A breakers 806 are twin mounted and detachably coupled to the panel 809 as illustrated in FIG. 8D, via their respective plug-in bases 110 illustrated in FIG. 9A. Furthermore, four 600 A breakers 807 are operably coupled to the panel 809 as illustrated in FIG. 8D, via their respective plug-in bases 2203 illustrated in FIG. 22. The main lug only (MLO) assembly comprises main lugs 808 positioned below the plug-in breakers, for example, the four 600 A breakers 807. In the 1200 A MLO assembly illustrated in FIG. 8D, six 250 A breakers 806 and four 600 A breakers 807 are electrically connected to the main lugs 808.

In other embodiments, the modular plug-in power distribution panel assembly (MPIPDPA) 800 comprises a 1200 A main lug only (MLO) assembly with a different number of 250 A breakers 806 and 600 A breakers 807. For example, in an embodiment, the MPIPDPA 800 comprises a 1200 A MLO assembly with eight 250 A breakers 806 and three 600 A breakers 807. In another embodiment, the MPIPDPA 800 comprises a 1200 A MLO assembly with eight 250 A breakers 806 and two 600 A breakers 807. In another embodiment, the MPIPDPA 800 comprises a 1200 A MLO assembly with six 250 A breakers 806 and three 600 A breakers 807. Furthermore, dimensions, for example, height and length, of the electrical enclosure 801 of the MPIPDPA 800 are configurable to accommodate a different number of breakers. For example, the electrical enclosure 801 with a height and a length of about 80 inches and about 44 inches respectively, accommodates a 1200 A MLO assembly with eight 250 A breakers 806 and three 600 A breakers 807. In another example, the electrical enclosure 801 with a shorter height and a length of about 72 inches and about 44 inches respectively, accommodates a 1200 A MLO assembly with eight 250 A breakers 806 and two 600 A breakers 807.

Figure 9A:
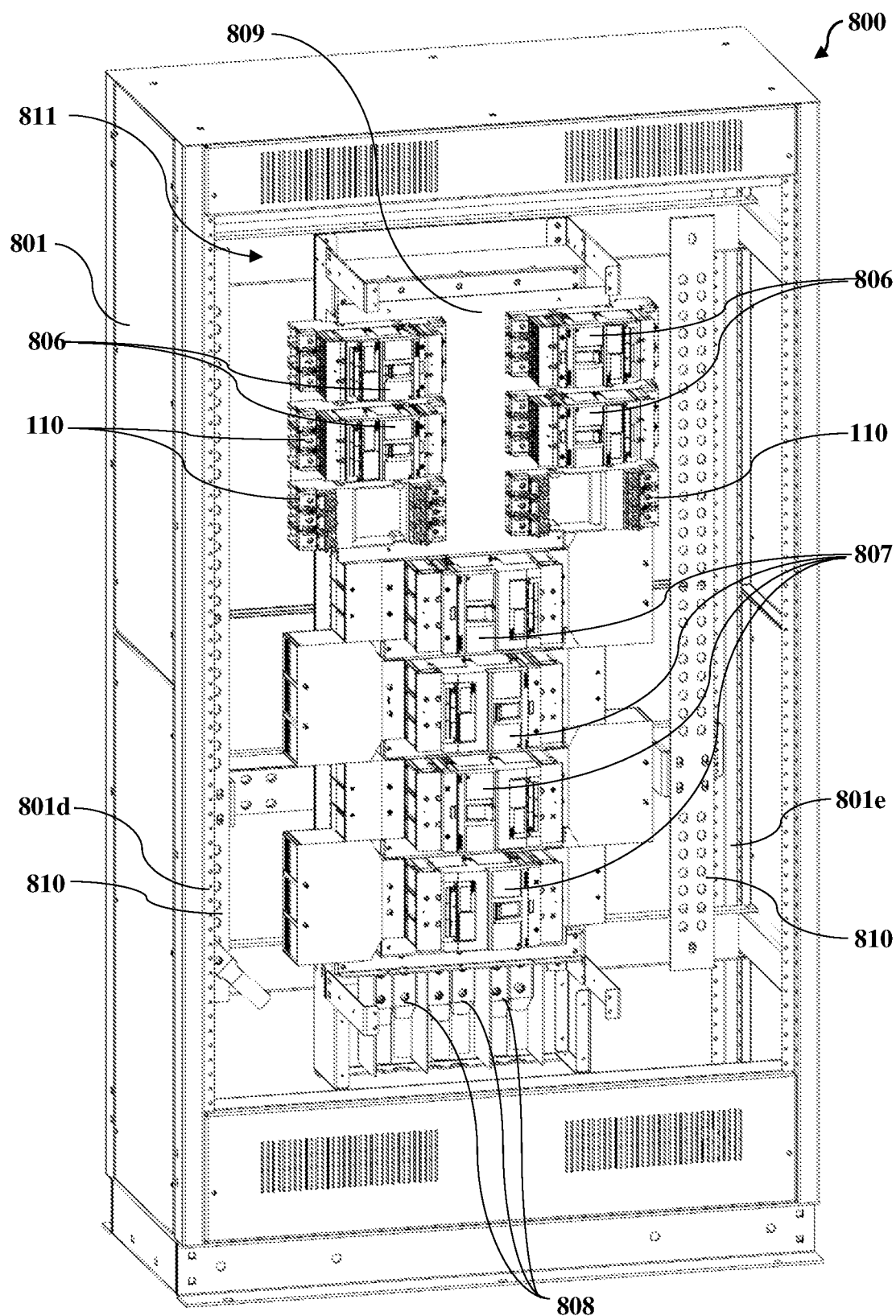
FIG. 9A illustrates a perspective view of an embodiment of a floor-mounted, modular plug-in power distribution panel assembly with panel doors in an open position, showing the plug-in bases and the breakers in the interior of the floor-mounted, modular plug-in power distribution panel assembly.
Figure 9B:
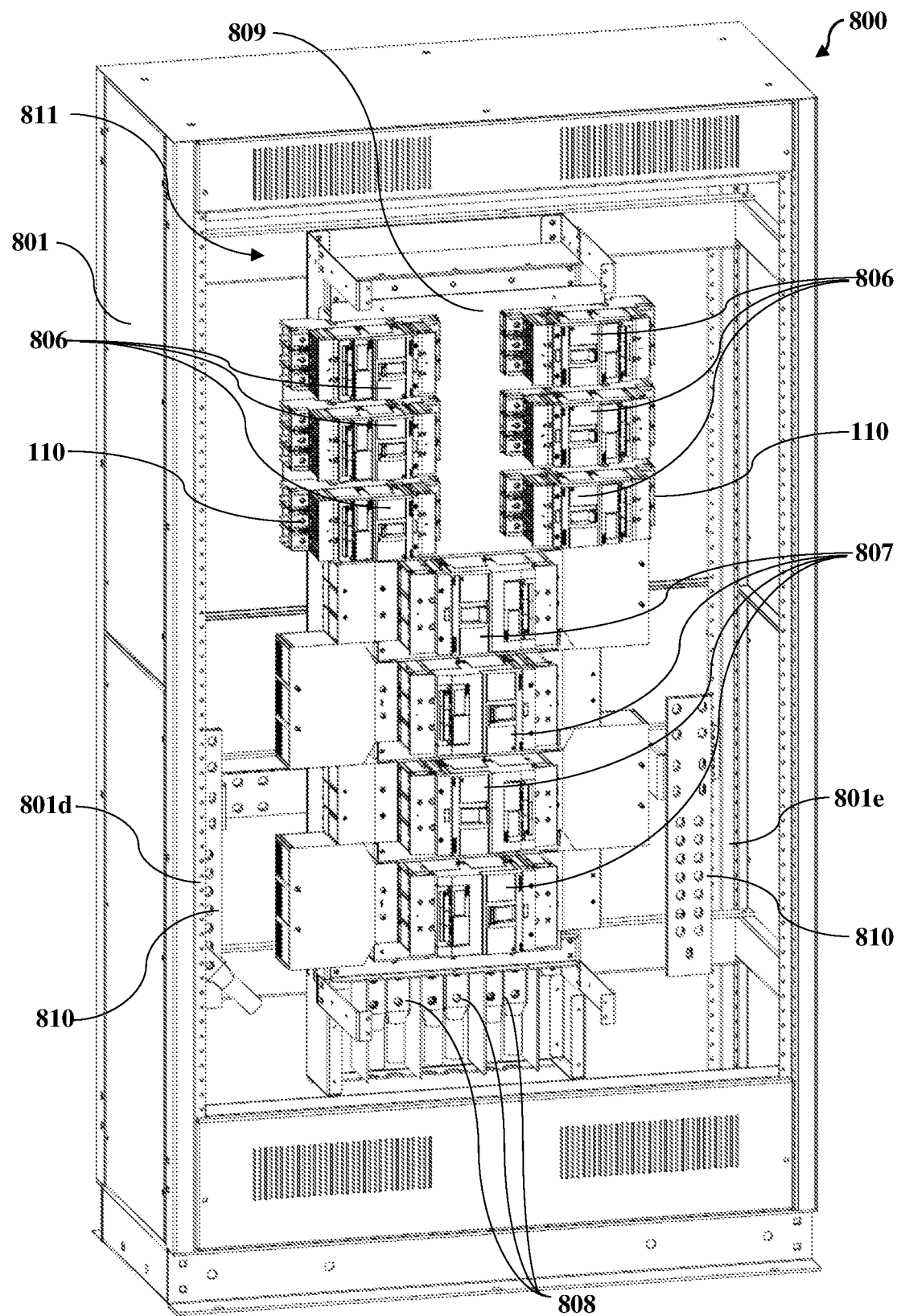
FIG. 9B illustrates a perspective view of the embodiment of the floor-mounted, modular plug-in power distribution panel assembly shown in FIG. 9A, showing the breakers operably coupled to the plug-in bases in the interior of the floor-mounted, modular plug-in power distribution panel assembly.
Figure 9C:
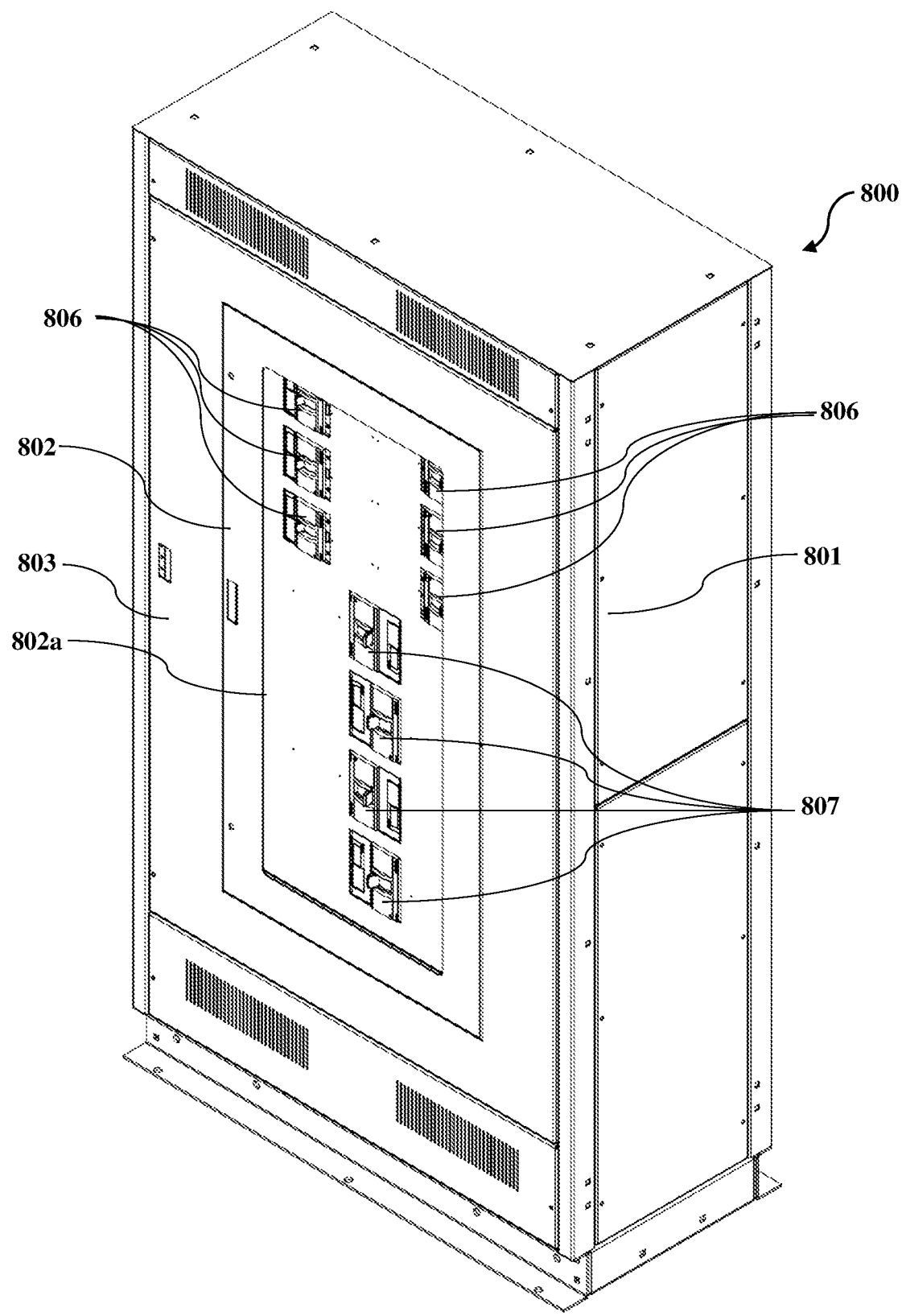
FIG. 9C illustrates a perspective view of the embodiment of the floor-mounted, modular plug-in power distribution panel assembly shown in FIG. 9A, with the panel doors in a closed position.
Figure 10:
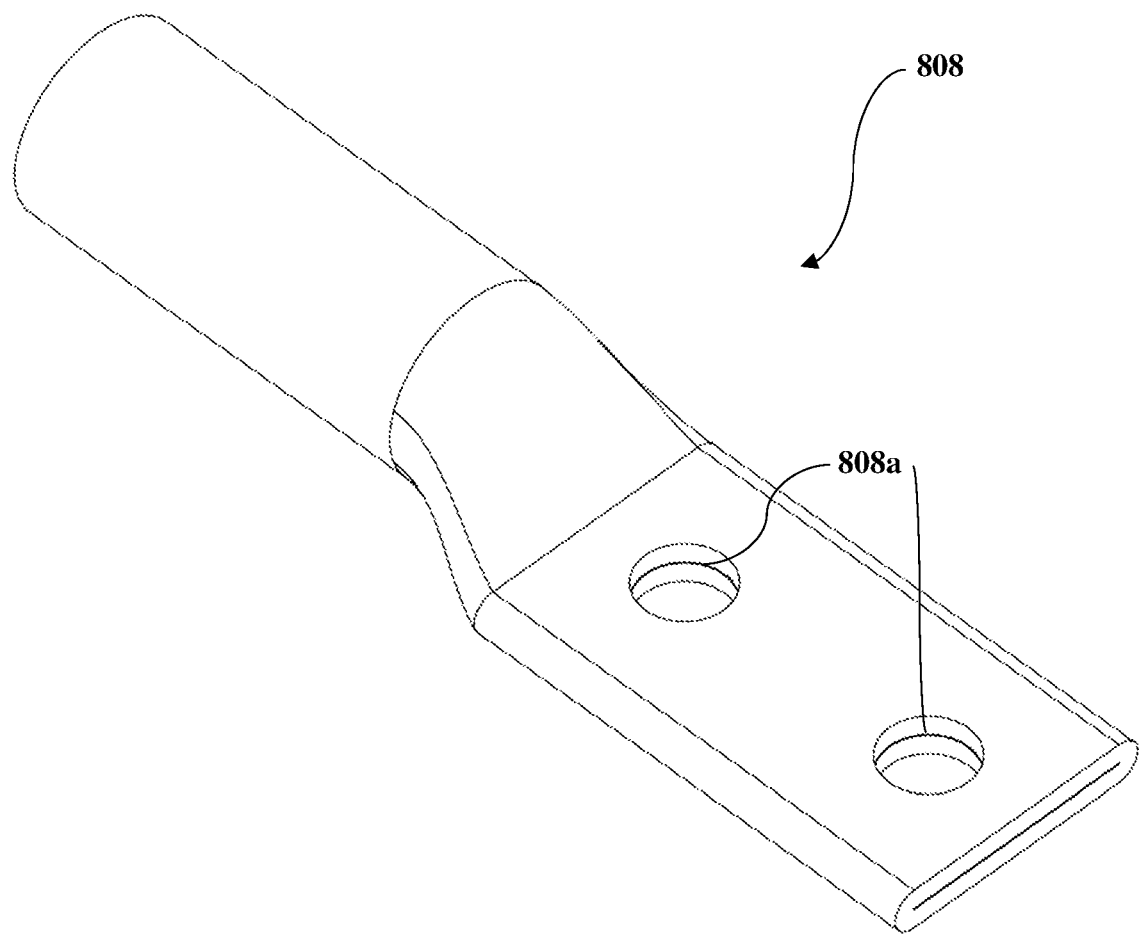
FIG. 10 illustrates a compression lug configured as a main lug to connect to an extension of a main lugs bus of the modular plug-in power distribution panel assembly shown in FIGS. 9A-9C.

FIG. 9A illustrates a perspective view of an embodiment of a floor-mounted, modular plug-in power distribution panel assembly (MPIPDPA) 800 with the panel doors 802 and 803 shown in FIG. 9C, in an open position, showing the plug-in bases 110 and the breakers 806 in the interior 811 of the floor-mounted MPIPDPA 800. The MPIPDPA 800 is a large power distribution panel with 150 A/250 A feeders and 400 A/600 A feeders. The plug-in breakers, for example, six 250 A breakers 806 are twin mounted and detachably coupled to the panel 809 via respective plug-in bases 110 as illustrated in FIG. 9A. In an embodiment, six 150 A breakers are twin mounted and detachably coupled to the panel 809. Furthermore, four 600 A breakers 807 are operably coupled to the panel 809 via respective plug-in bases 2203 illustrated in FIG. 22. In an embodiment, four 400 A breakers are operably coupled to the panel 809. In an embodiment, input is bus connected in the rear of the MPIPDPA 800. In another embodiment, the input is cable connected at the main lugs 808. The main lugs 808 are, for example, compression lugs as illustrated in FIG. 10. The main lugs 808 per phase as illustrated in FIGS. 9A-9B, are connected to extensions of the main bus (not visible in FIG. 9A). In an embodiment, neutral bus bars constituting a neutral bus 810 are positioned on opposing sides 801d and 801e of the MPIPDPA 800 for allowing convenient feeder breaker neutral connections. The neutral bus 810 is operably coupled to each of opposing sides 801d and 801e of the electrical enclosure 801 for allowing flexible and secure neutral connections for feeder breakers, for example, the 250 A breakers 806 and the 600 A breakers 807 in the MPIPDPA 800. The neutral bus bars on either side of the MPIPDPA 800 increase flexibility and security for making neutral connections to the feeder breakers in the MPIPDPA 800.

FIG. 9B illustrates a perspective view of the embodiment of the floor-mounted, modular plug-in power distribution panel assembly (MPIPDPA) 800 shown in FIG. 9A, showing the breakers 806 operably coupled to the plug-in bases 110 in the interior 811 of the MPIPDPA 800.

FIG. 9C illustrates a perspective view of the embodiment of the floor-mounted, modular plug-in power distribution panel assembly (MPIPDPA) 800 shown in FIG. 9A, with the panel doors 802 and 803 in a closed position. In an embodiment, the inner panel door 802 provides a transparent window 802a for viewing the status of the breakers 806 and 807 operably coupled to the panel 809 illustrated in FIGS. 9A-9B. The main lugs 808 are disposed below the breakers 807 of the MPIPDPA 800 and operably coupled to extensions of the main bus.

FIG. 10 illustrates a compression lug 808 configured as a main lug to connect to an extension of a main lugs bus of the modular plug-in power distribution panel assembly (MPIPDPA) 800 shown in FIGS. 9A-9C. The compression lug 808 comprises National Electrical Manufacturers Association (NEMAN) holes 808a spaced, for example, about 1.75 inches apart, for connecting a 500 MCM cable, for example, where 1 MCM=1 kcmil=0.5067 square millimeter.

Figure 11A:
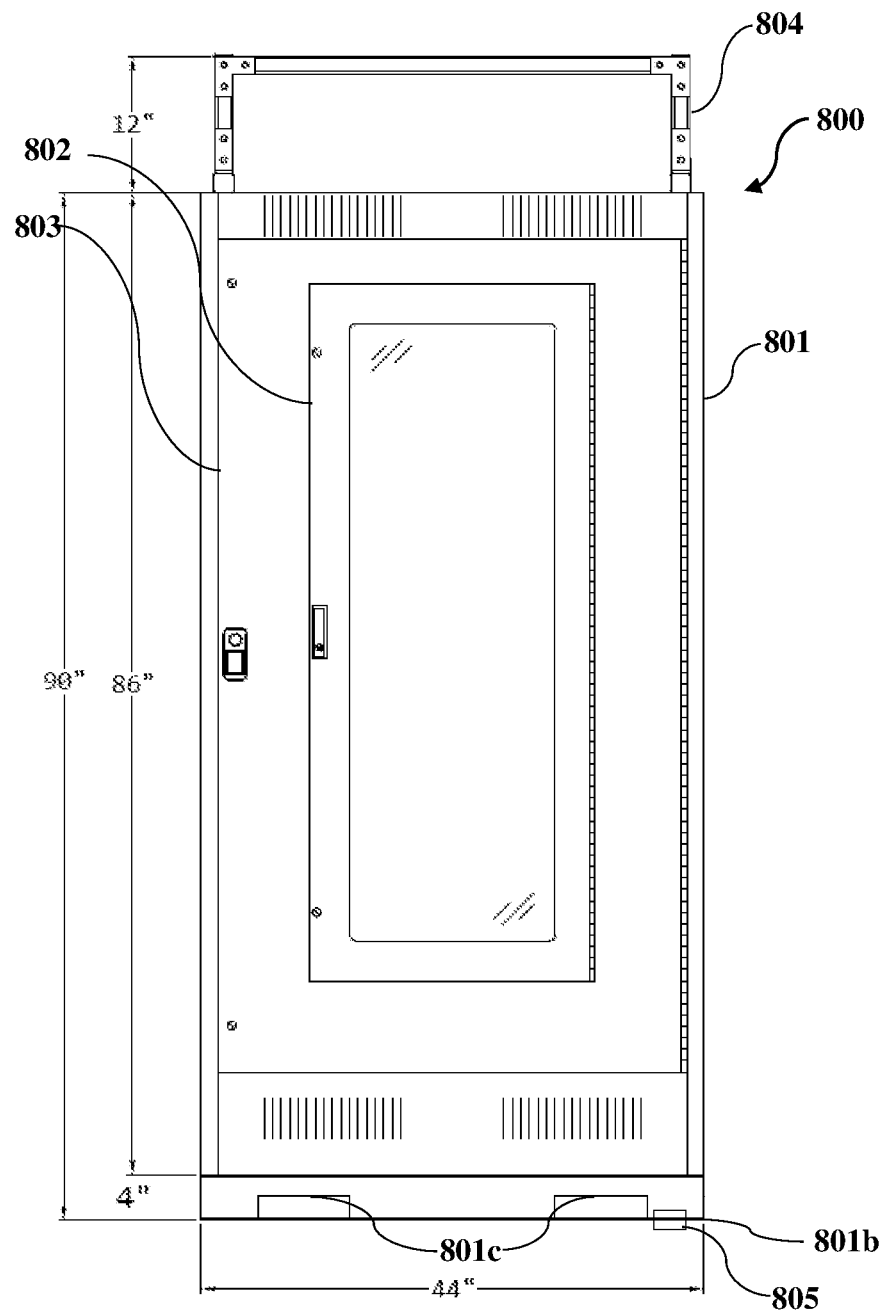
FIG. 11A illustrates a front elevation view of an embodiment of the modular plug-in power distribution panel assembly comprising a 1200 A main lug only assembly with ten 250 A breakers and four 600 A breakers, with panel doors in a closed position.

FIG. 11A illustrates a front elevation view of an embodiment of the modular plug-in power distribution panel assembly (MPIPDPA) 800 comprising a 1200 A main lug only (MLO) assembly with ten 250 A breakers 806 and four 600 A breakers 807, with panel doors 802 and 803 in a closed position. In an example, the height and the length of the electrical enclosure 801 of the MPIPDPA 800 is about 90 inches and about 44 inches respectively. The MPIPDPA 800 comprises the conduit/cable support 804 and the anchoring element 805 as disclosed in the description of FIG. 8A.

Figure 11B:
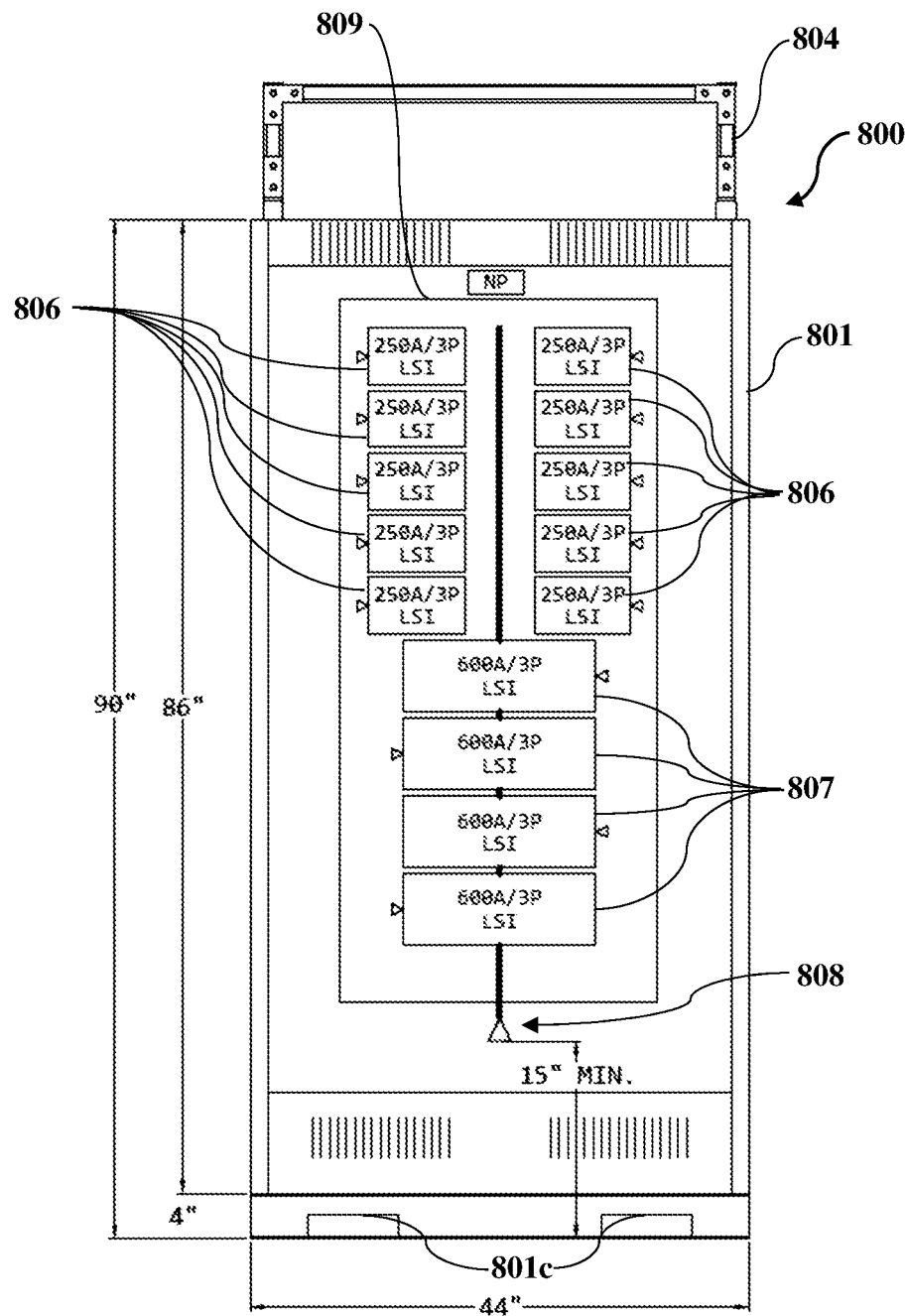
FIG. 11B illustrates a front elevation view of the embodiment of the modular plug-in power distribution panel assembly shown in FIG. 11A, with the panel doors in an open position showing the breakers of the modular plug-in power distribution panel assembly.

FIG. 11B illustrates a front elevation view of the embodiment of the modular plug-in power distribution panel assembly (MPIPDPA) 800 shown in FIG. 11A, with the panel doors 802 and 803 in an open position showing the breakers 806 and 807 of the MPIPDPA 800. The plug-in breakers, for example, 250 A breakers 806 are twin mounted and detachably coupled to the panel 809 as illustrated in FIG. 11B, via their respective plug-in bases. Furthermore, four 600 A breakers 807 are operably coupled to the panel 809 as illustrated in FIG. 11B via their respective plug-in bases. In the 1200 A main lug only (MLO) assembly illustrated in FIG. 11B, ten 250 A breakers 806 and four 600 A breakers 807 are electrically connected to the main lugs 808.

The panelboard configurations of the MPIPDPAs 800 illustrated in FIGS. 8A-8D, FIGS. 9A-9C, and FIGS. 11A-11B are main lug only (MLO). In an embodiment, a main 1200 A or 1000 A breaker is added to the MPIPDPAs 800 to configure the MPIPDPAs 800 as main breaker panels. The number of plug-in feeder breakers for a given height in these main breaker panels is lower than an MLO panelboard, but these main breaker panels are configured to utilize series ratings to optimize cost. In an embodiment, the main breaker panels are configured to be service entrance rated for different applications. If 400 A breakers are used in the MPIPDPAs, more breakers can be accommodated for a given height since 400 A breakers have more compact output lug connections compared to 600 A breakers. The MPIPD-PAs disclosed herein have been fully short circuit tested at 100 kiloamperes (kA) at 480 Volts (V) alternating current (AC) and 65 kA at 60V AC. The MPIPDPAs disclosed herein are also configured for higher short circuit ratings of, for example, about 200 kA at about 480V AC and about 100 kA at about 600V AC. If a main breaker is used, series ratings optimize the cost of the MPIPDPAs.

Figure 12A:
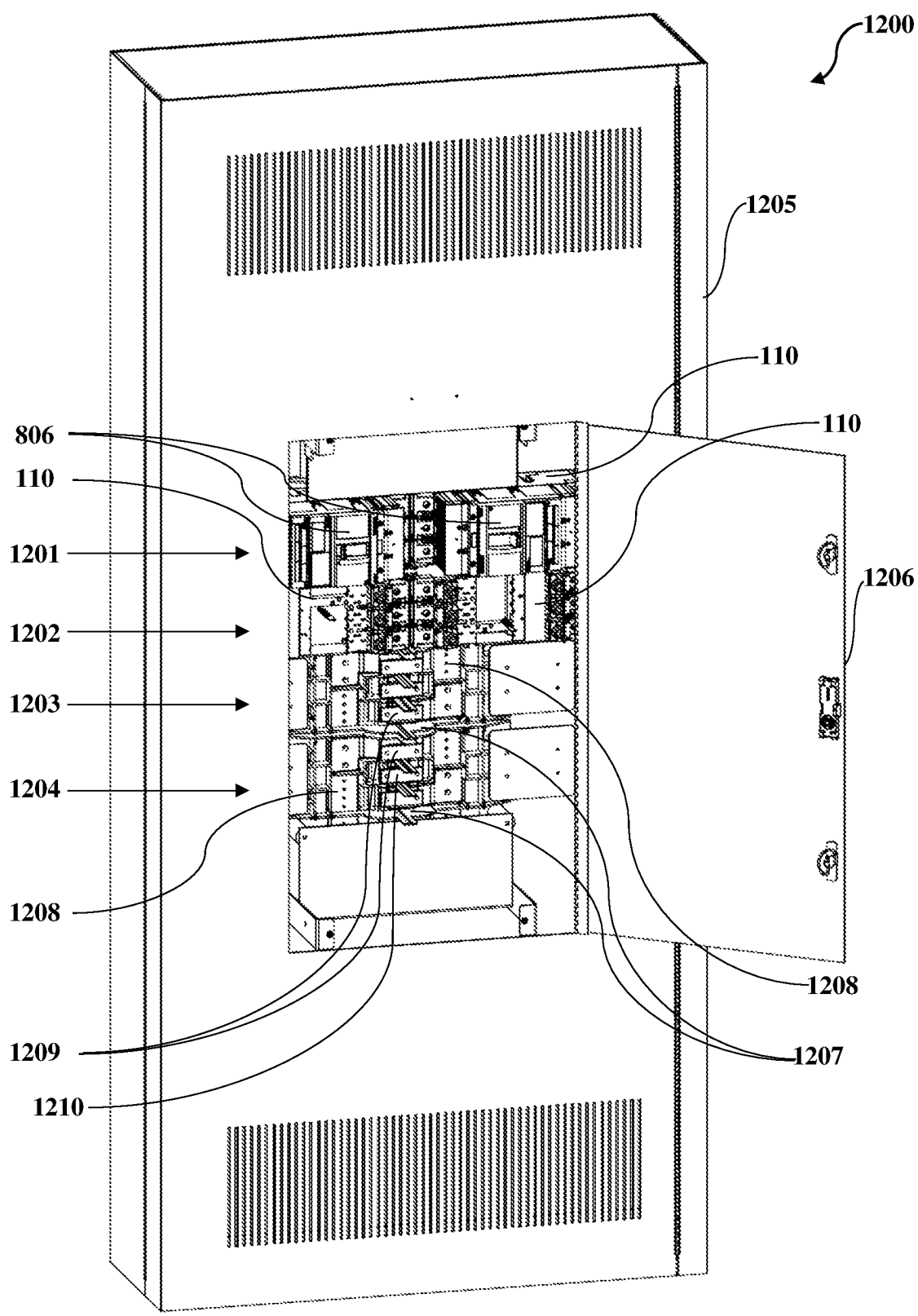
FIG. 12A illustrates a front perspective view of an embodiment of a wall mounted, modular plug-in power distribution panel assembly, showing installation of plug-in bases, plug-in breakers, a main bus, and feeder breaker bus straps within the modular plug-in power distribution panel assembly.

FIG. 12A illustrates a front perspective view of an embodiment of a wall mounted, modular plug-in power distribution panel assembly (MPIPDPA) 1200, showing installation of plug-in bases 110, plug-in breakers 806, a main bus 1208, and feeder breaker bus straps 1209 and 1210 within the MPIPDPA 1200. FIG. 12A illustrates an 800 A/1000 A main lug only (MLO) assembly of the MPIPDPA 1200 indicating four rows 1201, 1202, 1203, and 1204 of components accommodated in an electrical enclosure 1205. FIG. 12A shows the MLO assembly with a panel door 1206 in an open position. The second row 1202 in FIG. 12A shows the plug-in bases 110 for operably coupling 150 A/250 A plug-in breakers 806. The first row 1201 shows two of the 150 A/250 A plug-in breakers 806 operably coupled to the plug-in bases 110. The third row 1203 and the fourth row 1204 show the main bus 1208 and the feeder breaker bus straps 1209 and 1210 used for operably coupling 150 A/250 A plug-in breakers 806 to the main bus 1208 via their corresponding plug-in bases 110. The bus straps 1209 and 1210 are connected to the main bus 1208 as illustrated in FIG. 12A. The MPIPDPA 1200 further comprises one or more barriers 1207 configured for the 150 A/250 A plug-in breakers 806. The barriers 1207 are configured to securely direct gases produced within the MPIPDPA 1200, out of the MPIPDPA 1200 to an external environment, in an event of a short circuit.

Figure 12B:
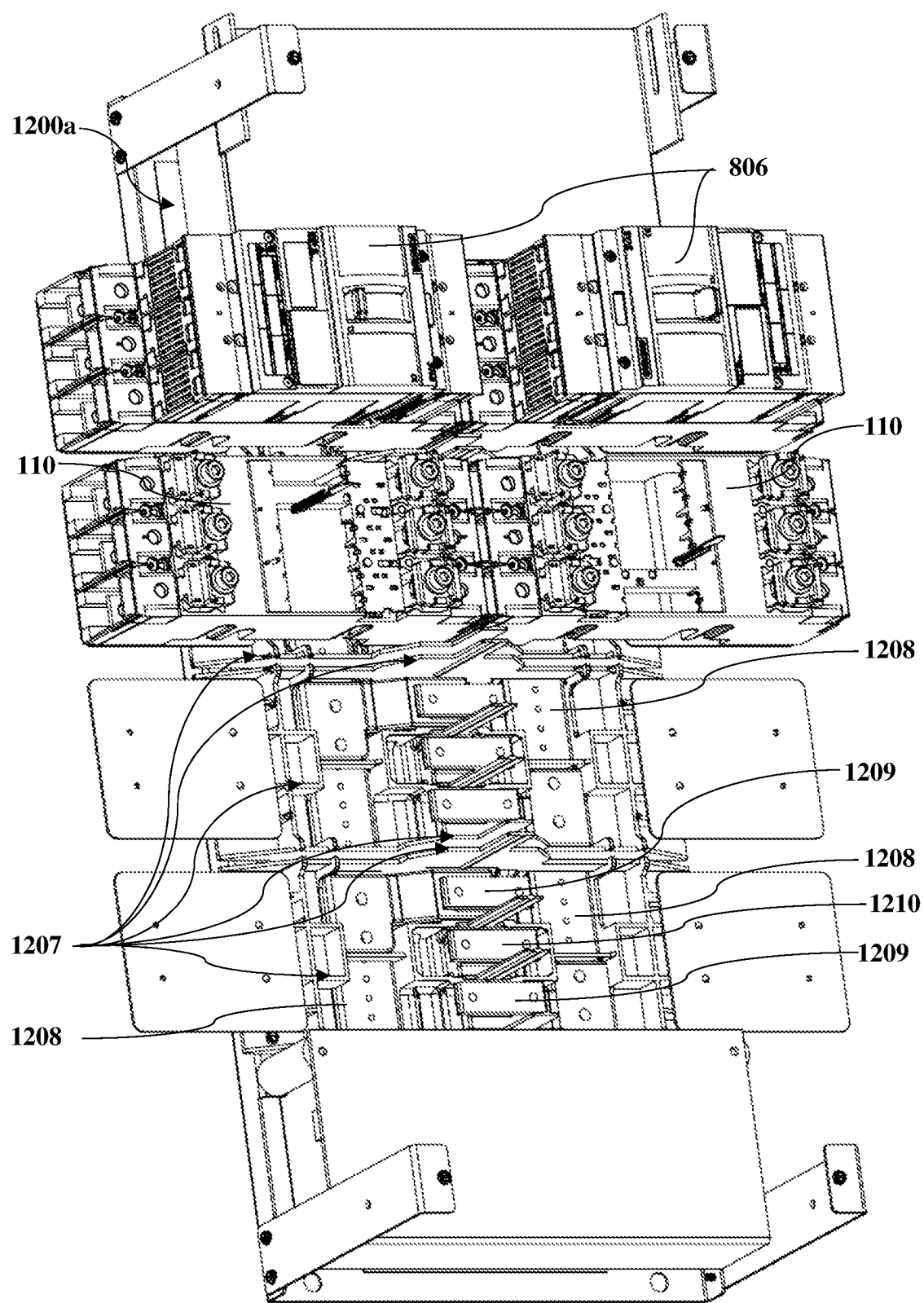
FIG. 12B illustrates an enlarged, perspective view of a panel of the embodiment of the wall mounted, modular plug-in power distribution panel assembly shown in FIG. 12A, showing installation of barriers and bus straps within the modular plug-in power distribution panel assembly.

FIG. 12B illustrates an enlarged, perspective view of a panel 1200a of the embodiment of the wall mounted, modular plug-in power distribution panel assembly (MPIPDPA) 1200 shown in FIG. 12A, showing installation of the barriers 1207 and the bus straps 1209 and 1210 within the MPIPDPA 1200. The bus straps 1209 and 1210 constituting a phase bus electrically couple the feeder breakers, for example, the 150 A/250 A plug-in breakers 806, to the main bus 1208. In an embodiment, the MPIPDPA 1200 further comprises one or more supplementary barriers for incoming cables. The supplementary barrier(s) is configured to accommodate a configurable number of cables of different sizes per phase and maintain touch-safety of the MPIPDPA 1200. The supplementary barrier(s) is made of a polycarbonate resin thermoplastic material, for example, a Lexan® material.

Figure 13A:
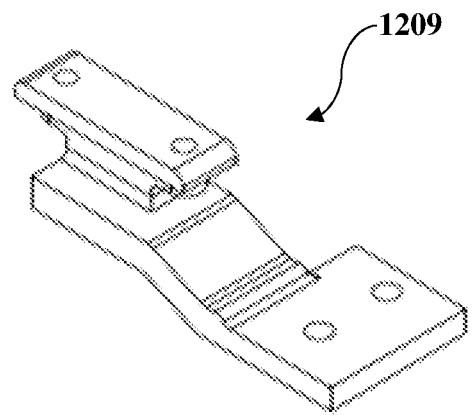
FIGS. 13A-13E illustrate different views of an embodiment of a bus strap implemented in the bus bar assembly of the modular plug-in power distribution panel assembly.
Figure 13B:
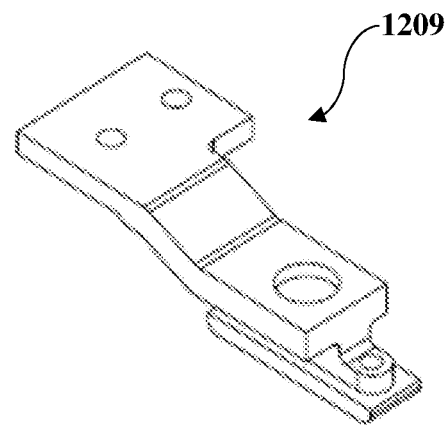
Figure 13C:
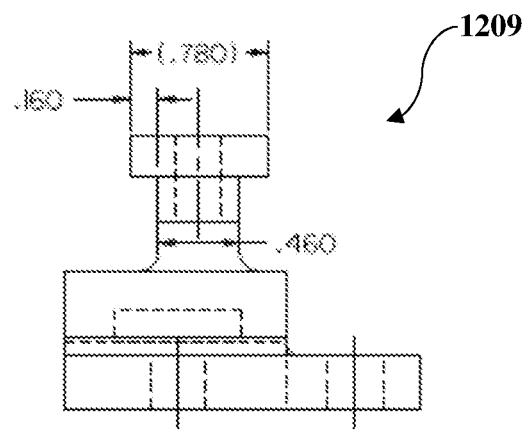
Figure 13D:
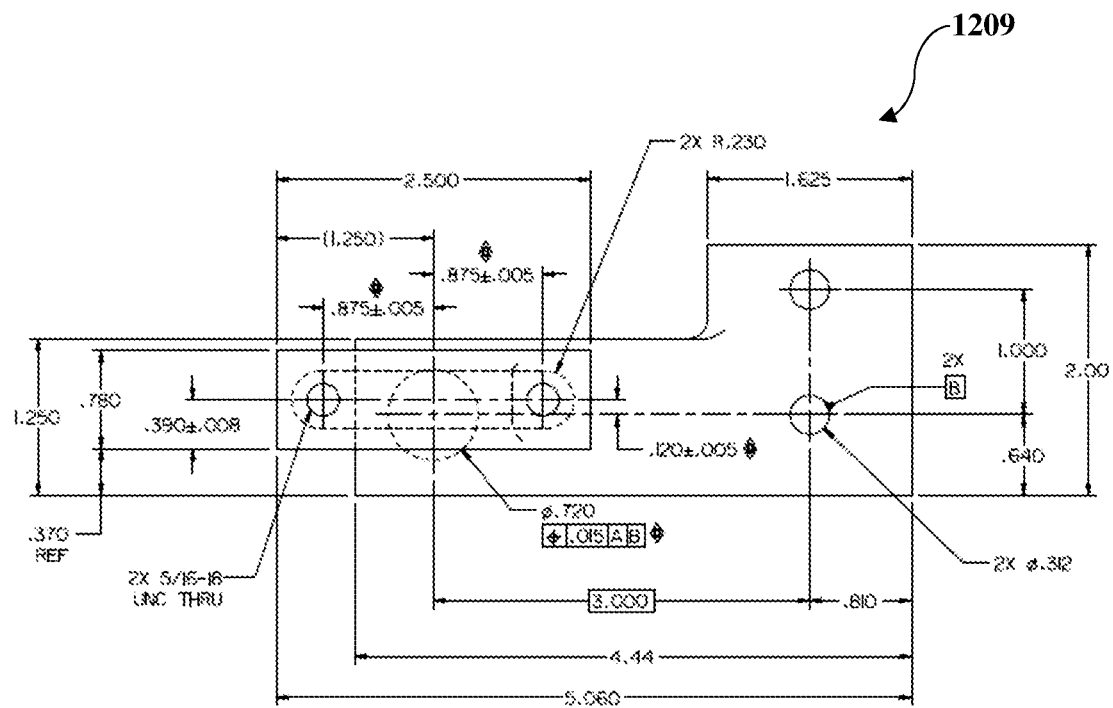
Figure 13E:
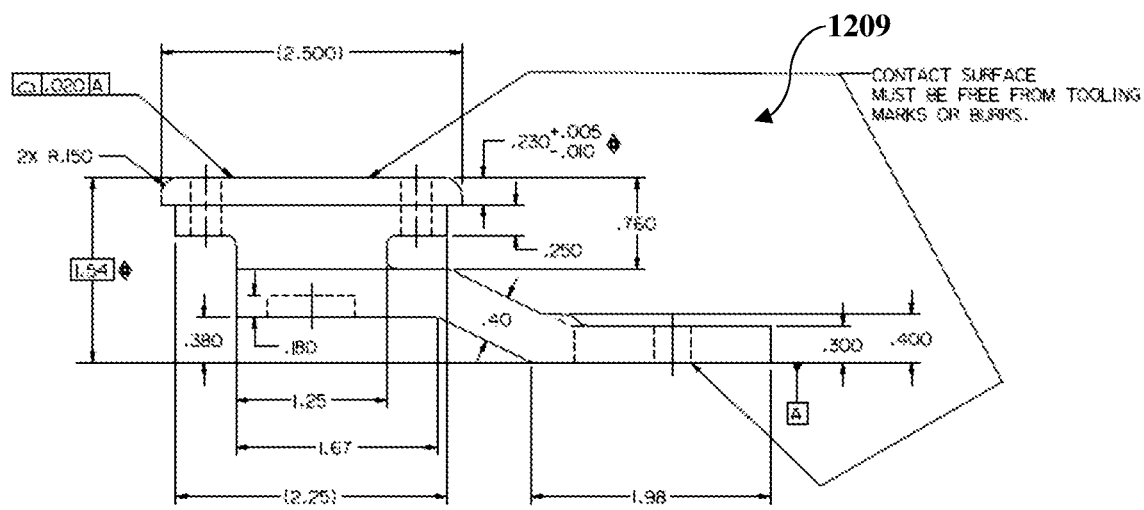
Figure 14B:
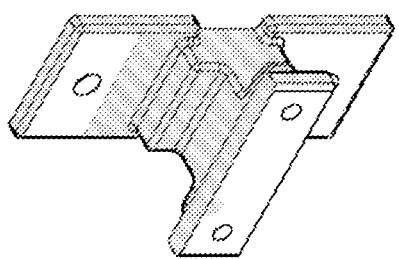
FIGS. 14A-14D illustrate different views of another embodiment of a bus strap implemented in the bus bar assembly of the modular plug-in power distribution panel assembly.
Figure 14D:
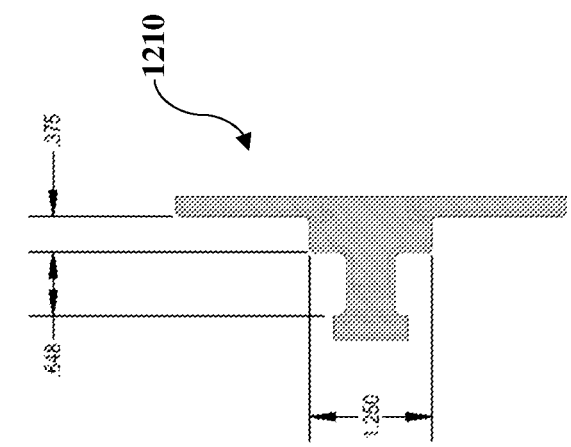
Figure 14A:
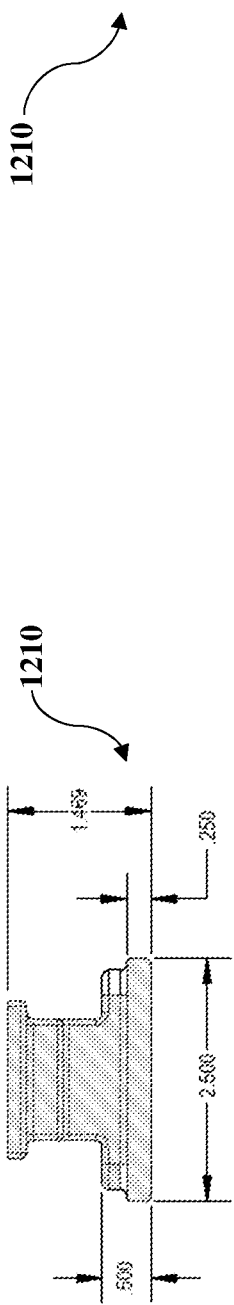
Figure 14C:
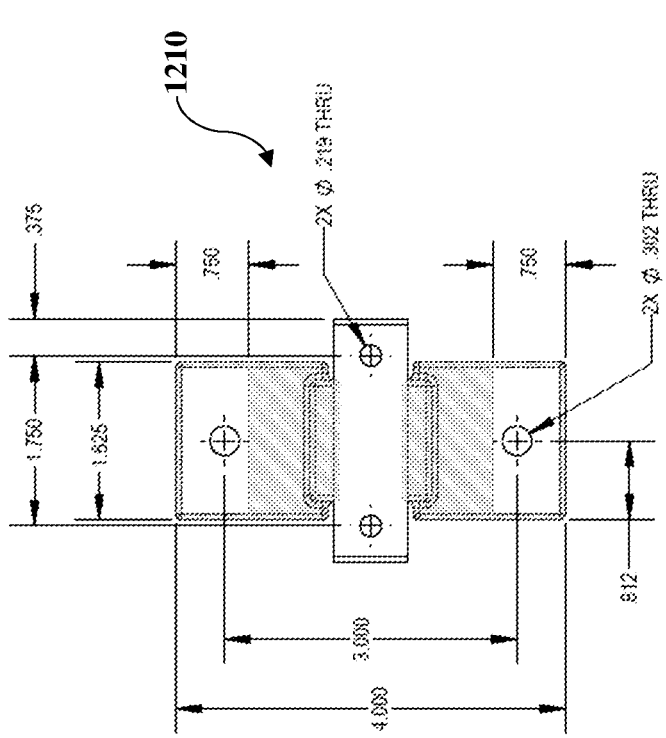

FIGS. 13A-13E illustrate different views of an embodiment of a bus strap 1209 implemented in the bus bar assembly of the modular plug-in power distribution panel assembly (MPIPDPA) 1200 shown in FIGS. 12A-12B. The bus strap 1209 is, for example, a 250 A dual mount A/C bus strap. The bus strap 1209 is made, for example, from a copper material that is tin-plated or silver-plated. For the wall-mounted, 800 A and 1000 A power distribution panels, the same bus straps are used for an 80% rating and a 100% rating. The output lugs are made of aluminum for the 80% and 100% rating. The bus straps 1209 are tin-plated or silver-plated. In this embodiment, only B-phase is epoxy-insulated. The same bus strap 1209 illustrated in FIGS. 13A-13E is used for A and C phase, while the bus strap 1210 illustrated in FIGS. 14A-14D, is used for B-phase. The bus straps 1209 illustrated in FIGS. 13A-13E are configured for both 80%-rated and 100%-rated, 150 A/250 A plug-in feeder breakers in an 800 A and 1000 A plug-in panel. Exemplary dimensions of the bus strap 1209 are illustrated in FIG. 13C and FIGS. 13D-13E.

FIGS. 14A-14D illustrate different views of another embodiment of a bus strap 1210 implemented in the bus bar assembly of the modular plug-in power distribution panel assembly (MPIPDPA) 1200 shown in FIGS. 12A-12B. In an embodiment, the bus strap 1210 is a B-phase bus strap coated with a substantially thin epoxy coating having a UL certified reduced thickness configured to provide the electrical insulation and ensure operability of the MPIPDPA 1200. The bus strap 1210 is made, for example, of a copper material. In an example, epoxy coated B-phase bus straps 1210 are provided for feeder breakers 806 illustrated in FIG. 12A-12B. A thin epoxy coating of, for example, about 0.25 millimeters (mm) thick is provided on the B-phase bus straps 1210 for the feeder breakers 806. In an embodiment, the unepoxy coated parts of the bus are tin-plated or silver-plated. The bus straps 1210 illustrated in FIGS. 14A-14D are configured for both 80%-rated and 100%-rated, 150 A/250 A plug-in feeder breakers in an 800 A and 1000 A plug-in panel.

Figure 15A:
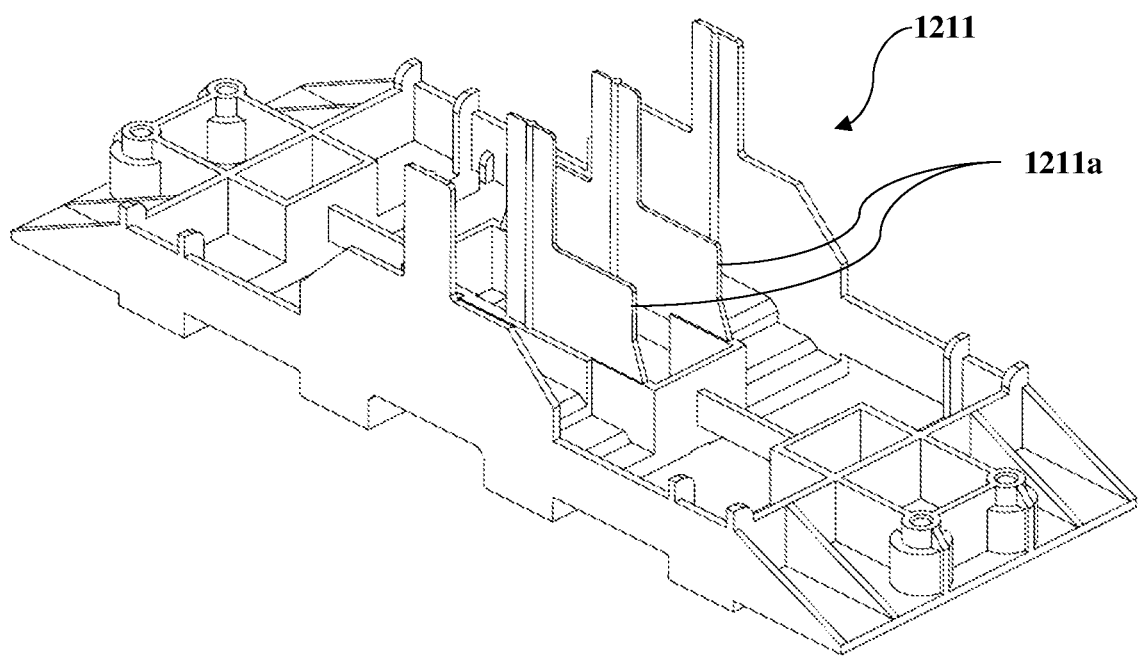
FIG. 15A illustrates a perspective view of an embodiment of a barrier configured for a non-plug-in breaker of the modular plug-in power distribution panel assembly.

FIG. 15A illustrates a perspective view of an embodiment of a barrier 1211 configured for a non-plug-in breaker, for example, 103, of the modular plug-in power distribution panel assembly (MPIPDPA) 100 shown in FIGS. 1A-1C and FIGS. 2A-2D. The barrier 1211 is, for example, a 3 VA top barrier. To accommodate a plug-in base for a plug-in breaker, the part 1211a of the barrier 1211 illustrated in FIG. 15A is removed from the top barrier 1211 to form the barrier 1207 illustrated in FIG. 15B. If a breaker is used without the plug-in base, the part 1211a provides an insulating barrier between phases. In an embodiment, insulating barriers are provided in the plug-in base itself, and therefore, modifying the barrier 1211 by cutting off the part 1211a provides an easy and efficient method to install the plug-in base on the top barrier 1211. This modification to the top barrier 1211 also ensures the safety and functionality of the MPIPDPA 100.

Figure 15B:
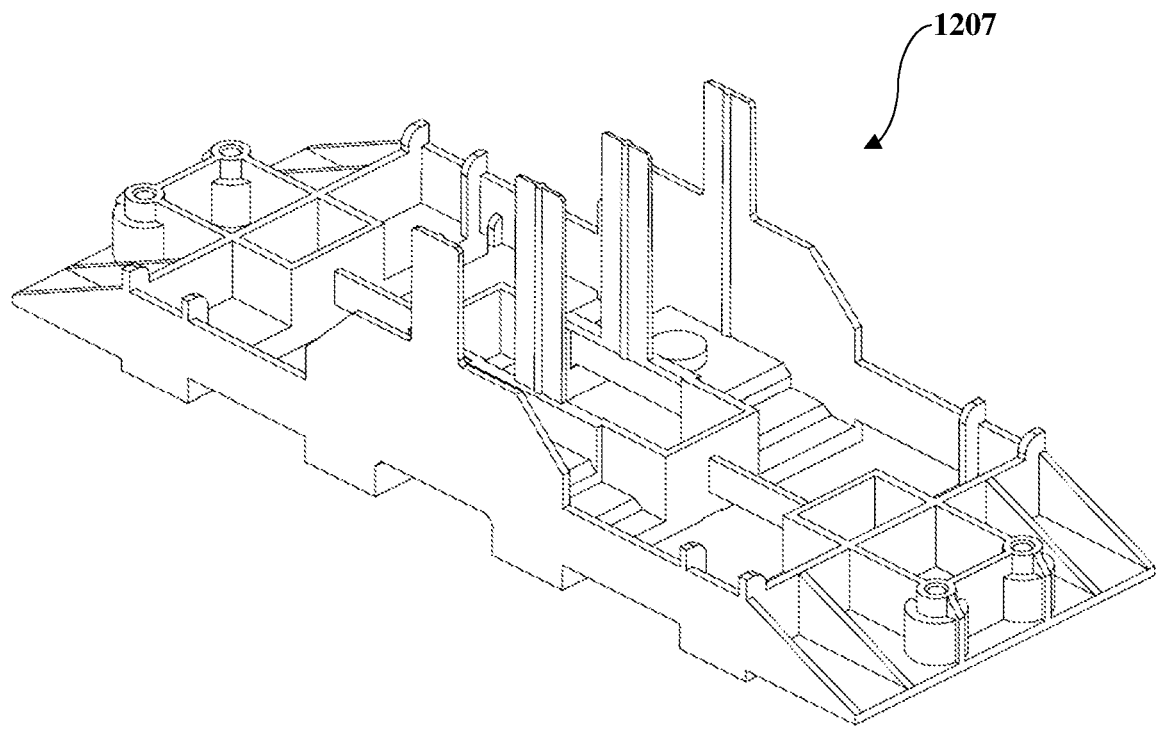
FIG. 15B illustrates a perspective view of an embodiment of a barrier configured for a plug-in breaker of the modular plug-in power distribution panel assembly.

FIG. 15B illustrates a perspective view of an embodiment of a barrier 1207 configured for a plug-in breaker, for example, 806, of the modular plug-in power distribution panel assembly (MPIPDPA) 1200 shown in FIGS. 12A-12B. The barrier 1207 is, for example, a 3 VA top barrier. The barrier 1207 allows accommodation of a plug-in base for a plug-in breaker 806 in the MPIPDPA 1200.

Figure 16A:
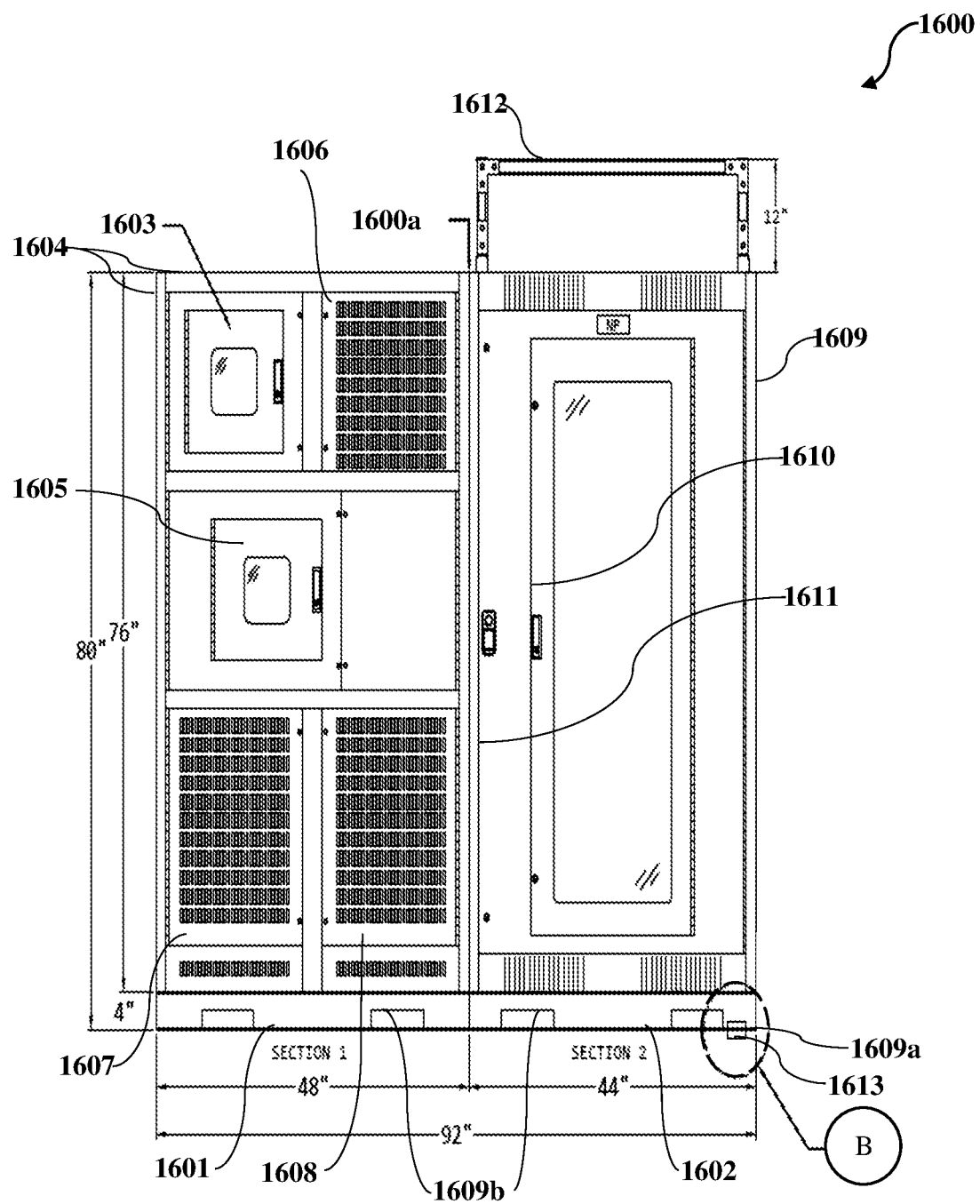
FIG. 16A illustrates a front elevation view of an embodiment of the modular plug-in power distribution panel assembly comprising a 1200 A power distribution panel section with ten 250 A breakers and four 600 A breakers, with panel doors in a closed position, and a transformer section operably connected to a power distribution panel section.
Figure 16B:
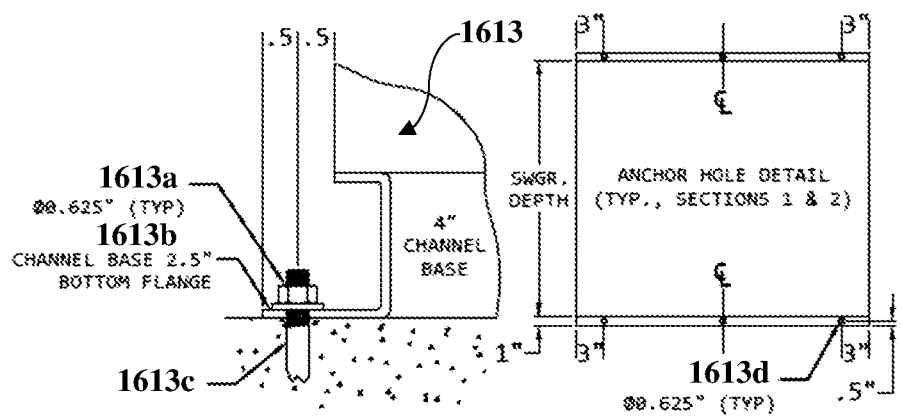
FIG. 16B illustrates an enlarged view of a section marked B in FIG. 16A, showing an anchoring element of the modular plug-in power distribution panel assembly.
Figure 16C:
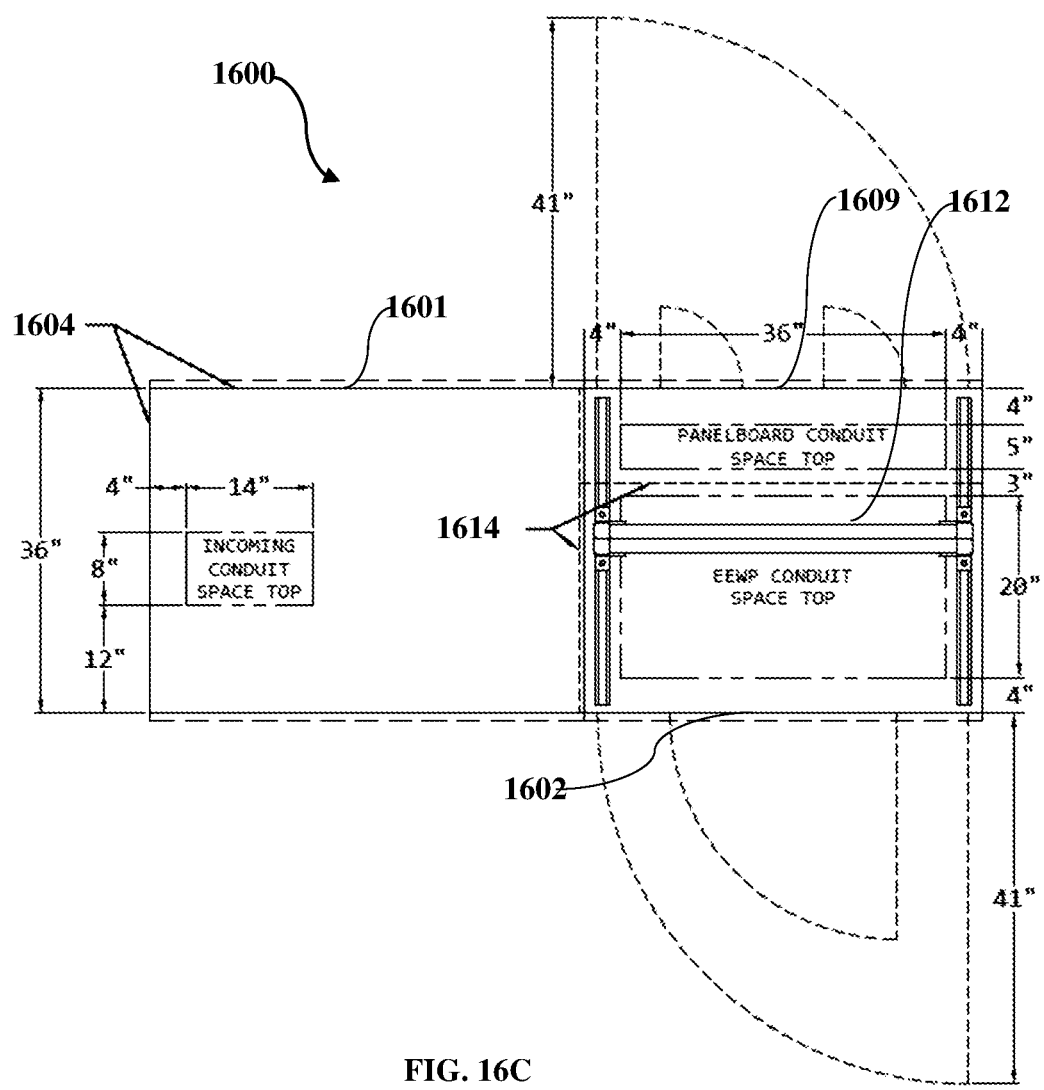
FIG. 16C illustrates a top plan view of the embodiment of the modular plug-in power distribution panel assembly shown in FIG. 16A.
Figure 16D:
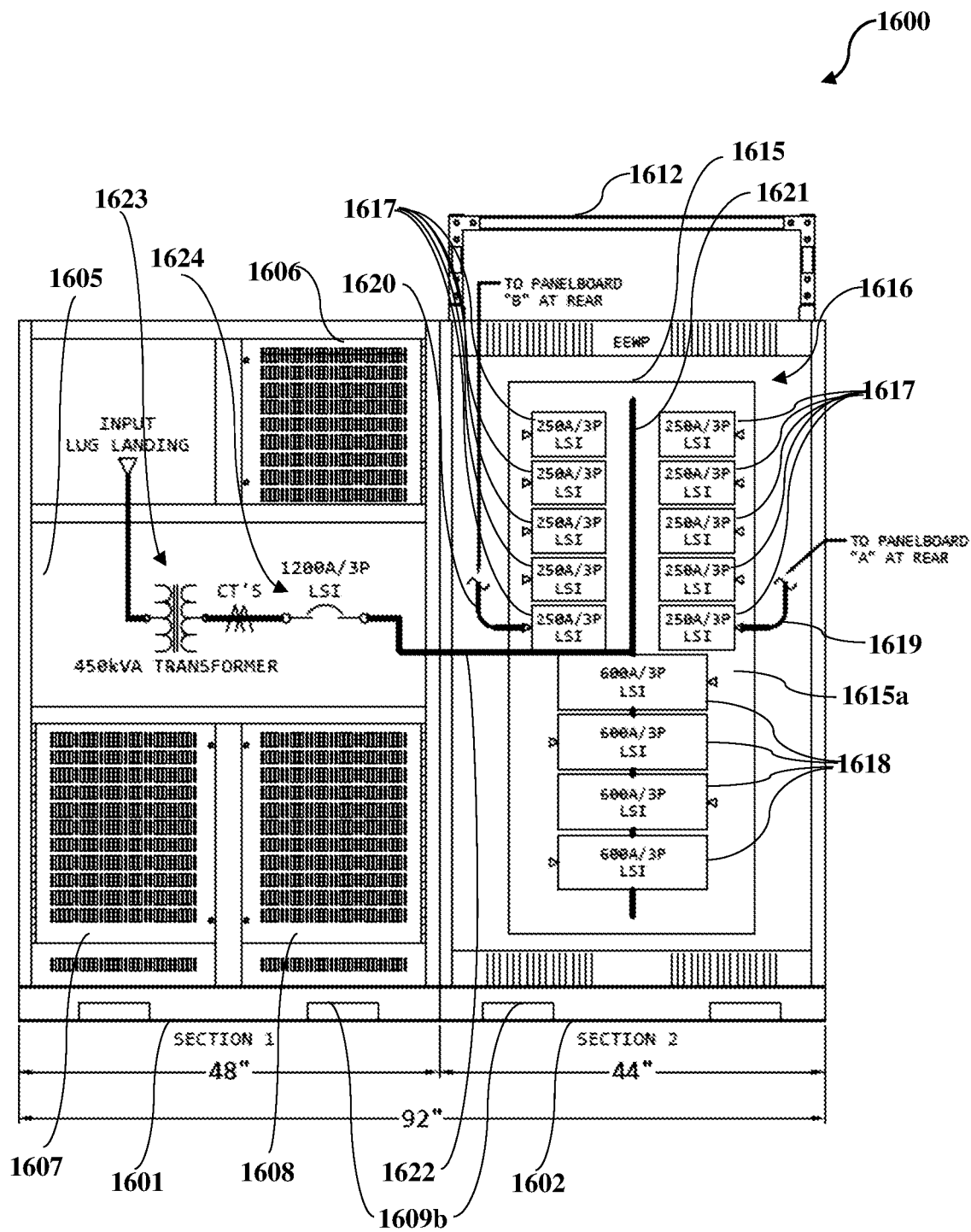
FIG. 16D illustrates a front elevation view of the embodiment of the modular plug-in power distribution panel assembly shown in FIG. 16A, with the panel doors in an open position showing the breakers of the modular plug-in power distribution panel assembly.

FIG. 16A illustrates a front elevation view of an embodiment of the modular plug-in power distribution panel assembly (MPIPDPA) 1600 comprising a 1200 A power distribution panel section 1602 with ten 250 A breakers 1617 and four 600 A breakers 1618 shown in FIG. 16D, with panel doors 1610 and 1611 in a closed position, and a transformer section 1601 operably coupled to the power distribution panel section 1602. In the MPIPDPA 1600, section 1 is the transformer section 1601 and section 2 is the power distribution panel section 1602. FIG. 16A also indicates a location 1600a where the two sections 1601 and 1602 are split for shipping purposes. In this embodiment, the power distribution panel section 1602 is operably connected to the transformer section 1601 to constitute a power distribution unit (PDU). Section 2, that is, the power distribution panel section 1602, is bus connected to the transformer section 1601 to create a complete power cluster having a step down or step-up transformer 1623, for example, a 450 kVA transformer, illustrated in FIG. 16D. In this embodiment, the power distribution panel section 1602 is not configured as a main breaker assembly or a main lug only assembly, but is configured as part of the PDU in a floor-mounted switchboard construction. A main breaker 1624, for example, a 1200 A circuit breaker, is fixed mounted in the transformer section 1601 as illustrated in FIG. 16D. In this embodiment, the power distribution panel section 1602 provides more space for accommodating additional feeder breakers, for example, 1617 and 1618.

Figure 17B:
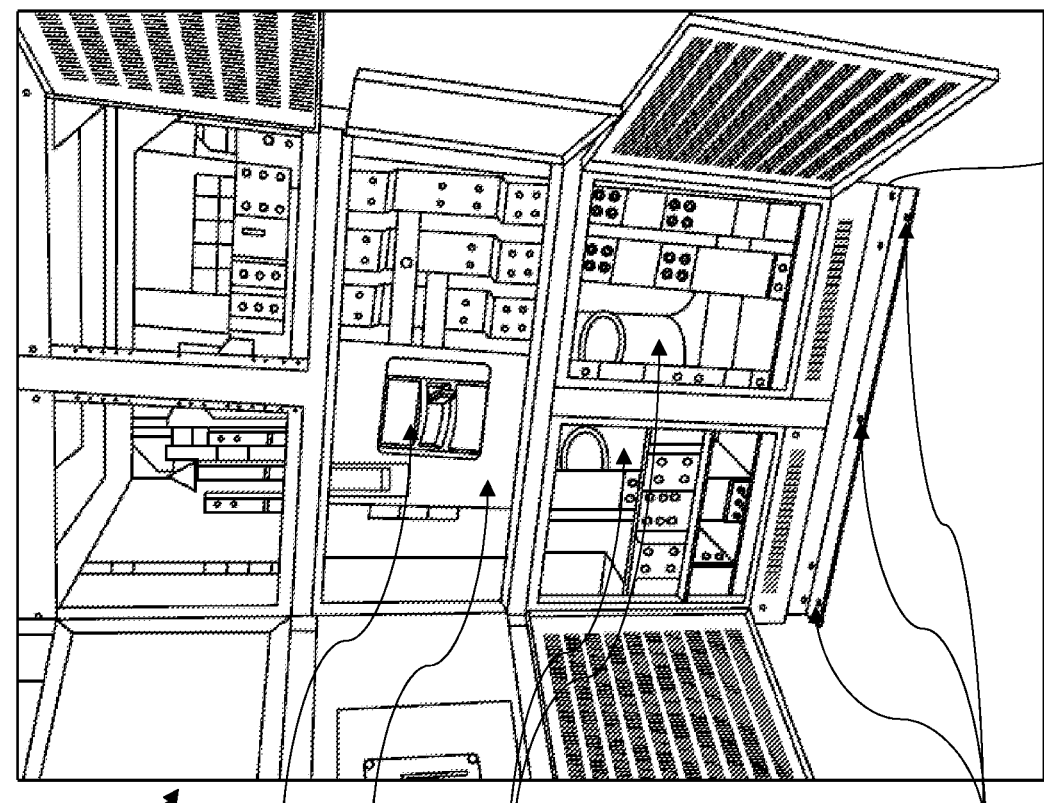
FIG. 17B illustrates a front perspective view of the transformer section with the compartment doors in an open position.

The transformer section 1601 is operably connected to the power distribution panel section 1602, for example, by a copper bus 1622, allowing more space for the plug-in breakers 1617 and 1618 illustrated in FIG. 16D. The transformer section 1601 comprises a meter compartment 1603, a breaker compartment 1605 for housing the main breaker 1624, and vented compartments 1606, 1607, and 1608. The transformer 1623 is accommodated in a rear section of the transformer section 1601 as illustrated in FIGS. 17B-17D. In an embodiment, the lateral and rear sides of the transformer section 1601 are protected with vented covers 1604. The meter compartment 1603 houses an electrical meter configured to measure an amount of electrical energy consumed in facilities such as hospitals, data centers, semiconductor fabrication facilities, etc., where the MPIPDPA 1600 is implemented. The power distribution panel section 1602 further comprises the conduit/cable support 1612 at a top surface of the electrical enclosure 1609 and the anchoring element 1613 at a base 1609a of the electrical enclosure 1609 similar to the conduit/cable support 804 and the anchoring element 805 disclosed in the description of FIGS. 8A-8B. In an embodiment, the power distribution panel section 1602 is configured as a standalone power distribution panel that is connected with cables in and out by adding main lugs to form a main lug only (MLO) assembly. The height of the transformer section 1601 and the power distribution panel section 1602 are matched so that the MPIPDPA 1600 is easy to install in the field.

In an embodiment, the modular plug-in power distribution panel assembly (MPIPDPA) 1600 further comprises provisions such as notches 1609b configured on the base 1609a of the electrical enclosure 1609 at the front, to allow handling of the MPIPDPA 1600, for example, via lifting equipment such as a fork lift. For example, a fork lift attaches to the front notches 1609b configured on the front side of the base 1609a of the electrical enclosure 1609 in both the sections 1601 and 1602 for allowing lifting and handling of the MPIPDPA 1600. In another embodiment, when the MPIPDPA 1600 is accommodated on a pallet, a lift truck or a pallet jack attaches to the front notches 1609b of the MPIPDPA 1600 to facilitate movement of the MPIPDPA 1600 from the front. In an embodiment, the front notches 1609b are optional in MPIPDPAs having a depth, for example, greater than 36 inches. As the MPIPDPA 1600 has a depth greater than 36 inches, in an embodiment, the MPIPDPA 1600 further comprises side notches (not shown in FIG. 16A) configured at the sides of the base 1609a of the electrical enclosure 1609 to allow handling of the MPIPDPA 1600, for example, via lifting equipment such as a lifting dolly, a hydraulic machinery roller dolly, etc. For example, a hydraulic machinery roller dolly attaches to the side notches configured on opposing lateral sides of the base 1609a of the electrical enclosure 1609 for allowing lifting and handling of the MPIPDPA 1600. Attachment of the lifting equipment on two sides of the electrical enclosure 1609 via the side notches facilitates ease of moving and handling the MPIPDPA 1600 without using an overhead crane or a fork lift after the pallet that accommodates the MPIPDPA 1600 is removed.

FIG. 16B illustrates an enlarged view of a section marked B in FIG. 16A, showing an anchoring element 1613 of the modular plug-in power distribution panel assembly (MPIPDPA) 1600. The anchoring element 1613 is anchored to a ground surface, for example, using anchor bolts 1613c supported by an anchor hole 1613a and a bottom flange 1613b. The detail of the anchor hole 1613a is also illustrated in FIG. 16B.

FIG. 16C illustrates a top plan view of the embodiment of the modular plug-in power distribution panel assembly (MPIPDPA) 1600 shown in FIG. 16A. The top plan view in FIG. 16C indicates the vented side and rear covers 1604 in the transformer section 1601 of the MPIPDPA 1600. The top plan view in FIG. 16C also indicates spaces configured to accommodate electrical conduits in the transformer section 1601 and the power distribution panel section 1602 of the MPIPDPA 1600. The top plan view in FIG. 16C also indicates barriers 1614 provided in the power distribution panel section 1602 of the MPIPDPA 1600. In an embodiment, one or more barriers 1614 are configured for the plug-in breakers 1617 and 1618 operably coupled to the panel 1615 illustrated in FIG. 16D. The barriers 1614 are configured to securely direct gases produced in the MPIPDPA 1600, out of the electrical enclosure 1609 to an external environment safely in the event of a short circuit. The barriers 1614 also provide for a touch-safe power distribution assembly.

Figure 16E:
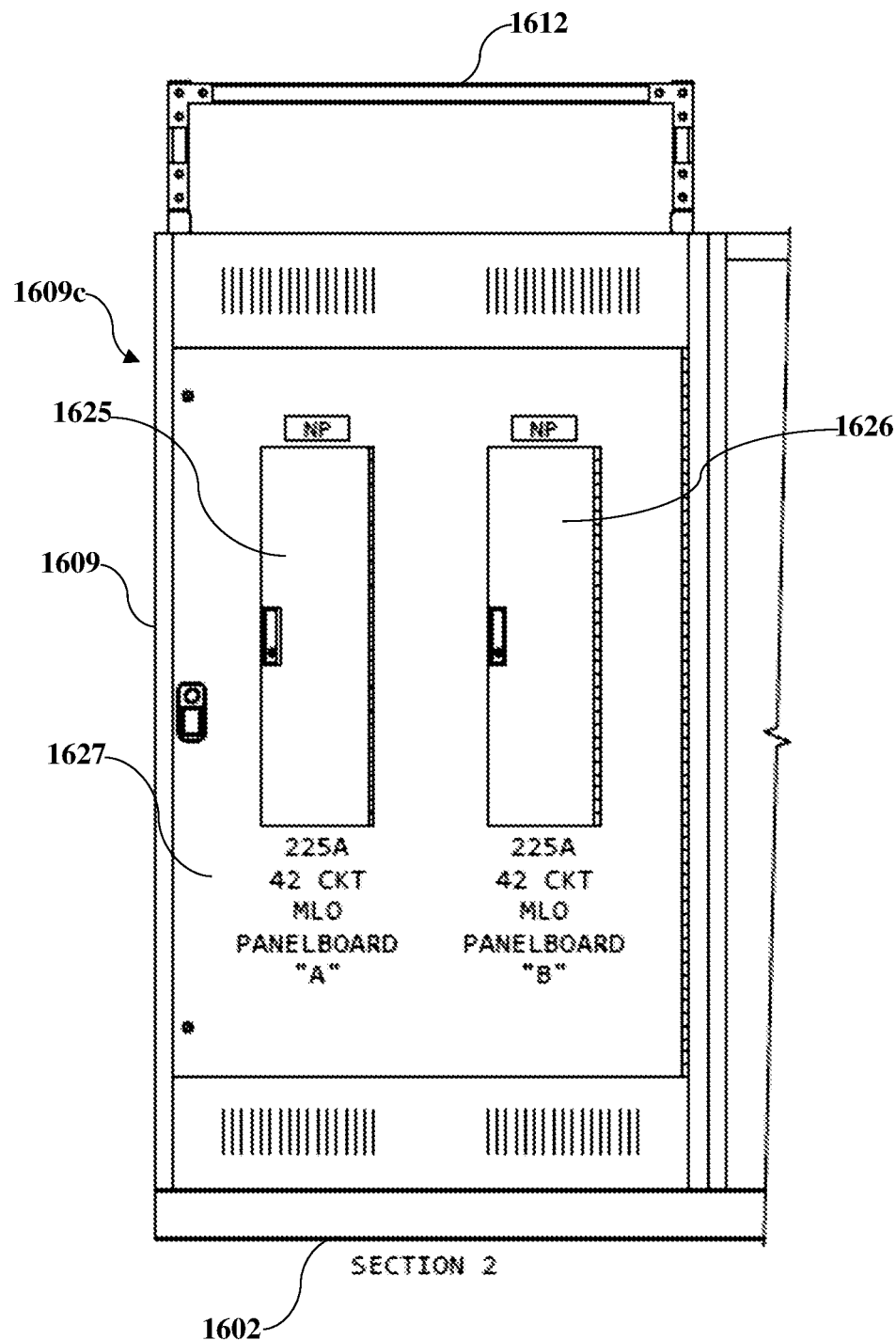
FIG. 16E illustrates a rear elevation view of the embodiment of the power distribution panel section of the modular plug-in power distribution panel assembly shown in FIG. 16A and FIG. 16D, showing additional optional touch-safe, plug-in panelboards for other loads.

FIG. 16D illustrates a front elevation view of the embodiment of the modular plug-in power distribution panel assembly (MPIPDPA) 1600 shown in FIG. 16A, with the panel doors 1610 and 1611 in an open position showing the breakers 1617 and 1618 of the MPIPDPA 1600. By opening the panel doors 1610 and 1611, the interior 1616 of the electrical enclosure 1609 is exposed, thereby exposing the breakers 1617 and 1618 operably coupled to the panel 1615 via their respective plug-in bases. In an embodiment, the power distribution section 1602 comprises ten 250 A breakers 1617 and four 600 A breakers 1618. In this embodiment, the main bus 1621 that is installed in the power distribution panel section 1602 is electrically connected to the main breaker 1624, for example, a 1200 A circuit breaker, that is fixed mounted in the transformer section 1601, by a bus 1622 to constitute a power distribution unit (PDU). In an embodiment, the bus 1622 that connects the main bus 1621 to the main breaker 1624 is a silver-plated copper bus. In another embodiment, the bus 1622 that connects the main bus 1621 to the main breaker 1624 is a tin-plated copper bus. The 1200 A circuit breaker serves as the main breaker 1624 for the power distribution panel section 1602. The front elevation view in FIG. 16D indicates cables 1619 and 1620 connecting the plug-in bases coupled to the 250 A breakers 1617 at a front section 1615a of the panel 1615 to a panelboard A and a panelboard B respectively, positioned on a rear section 1609c of the electrical enclosure 1609 as illustrated in FIG. 16E. The cables 1619 and 1620 are connected to the plug-in bases and therefore can be installed during initial installation. As the capacity grows, qualified personnel can add plug-in breakers 1617 and 1618 later without shutting the power down following guidelines for electrical safety as defined by local and national electrical codes, the National Fire Protection Association (NFPA) guidelines, and the Occupational Safety and Health Administration (OSHA) guidelines. The cables 1619 and 1620 of the breakers 1617 and 1618 are routed on both sides of the panel 1615 for optimal cable management. The front elevation view in FIG. 16D also indicates a transformer 1623 electrically connected to the main breaker 1624 housed in the breaker compartment 1605 of the transformer section 1601. The arrangement of the main breaker 1624 in the breaker compartment 1605 of the transformer section 1601 allows accommodation of a larger number of plug-in breakers in the power distribution panel section 1602 since there is no main lug or main breaker in the power distribution panel section 1602. This assembly also makes the installation easier since there are no cables to connect.

Disclosed herein is also a method for increasing the short circuit rating of the panel 1615 by series rating with a plug-in main breaker, for example, a 250 A plug-in main breaker. The main breaker is rated higher, for example, rated at 35 kA or 50 kA and is used to increase the short circuit rating of a 250 A panel. The short circuit rating of a feeder breaker is low, for example, 10 kA. The combination is rated at the higher rating of the main breaker by proper design and safety testing. Series rating is the combination of two or more over current protective devices (OCPDs), for example, breakers, connected in series where the interrupting current rating of the downstream device(s) is less than the interrupting current rating of the MPIPDPA 1600. The implementation of the series rating in the power distribution panel section 1602 increases the short circuit rating of the panelboards, for example, the panelboard A and the panelboard B positioned in the rear section 1609c of the electrical enclosure 1609 as illustrated in FIG. 16E. The short circuit rating of the panelboards A and B is increased, for example, from about 10 kiloamperes (kA) to about 35 kA or 50 kA through suitable design and safety testing as disclosed in the description of FIG. 16E.

FIG. 16E illustrates a rear elevation view of the embodiment of the power distribution panel section 1602 of the modular plug-in power distribution panel assembly (MPIPDPA) 1600 shown in FIG. 16A and FIG. 16D, showing additional optional touch-safe, panelboards for other loads. In an embodiment, two touch-safe, panelboards, for example, 225 A, 42-circuit panels, are positioned in the rear section 1609c of the electrical enclosure 1609. The touch-safe, panelboards are, for example, ProLine panelboards of ABB, Inc. The panelboards are connected to the plug-in breakers, for example, the 250 A breakers 1617, at the front section 1615a of the panel 1615 via the cables 1619 and 1620 respectively, illustrated in FIG. 16D. In an embodiment, the panelboards are main lug only (MLO) panelboards. An outer panel door 1627 provides rear access to the power distribution panel section 1602. Opening the outer panel door 1627 provides rear access to the inner panel doors 1625 and 1626. Opening the inner panel doors 1625 and 1626 provides rear access to the panelboards A and B respectively. These panelboards A and B are each fed by a 250 A plug-in breaker 1617 in the power distribution panel section 1602. In an embodiment, the 250 A plug-in breakers 1617 are series rated with the panel breakers rated, for example, about 1 A to about 100 A, of the respective panelboards A and B such that the short circuit rating of the panelboards A and B is much higher, for example, up to about 35 kA or about 50 kA at 480V instead of 10 kA at 480V through design, safety testing, and certification.

In an embodiment, the panelboards A and B are touch-safe, plug-in panelboards that are each series rated with plug-in breaker of a predetermined ampacity for increasing a short circuit rating of the MPIPDPA 1600. For example, the panelboards A and B are touch-safe, plug-in panelboards that are each series rated with a 250 A plug-in breaker of the power distribution panel section 1602. By using a 250 A plug-in breaker that is rated at 35 kA or 50 kA at 480 Volts (V) or 208 V, the series rating of the panelboards A and B is, for example, about 35 kA or 50 kA at 480 V or 208 V, as opposed to a lower rating of 10 kA at 480 V of the smaller 1 A-100 A breakers of panelboards A and B. The higher short circuit series rating of the panelboards A and B is achieved by careful design and compliance testing that meets Underwriter Laboratories (UL) standards. Disclosed below are exemplary aspects of the MPIPDPA 1600 that accomplish the higher short circuit rating of 35 kA or 50 kA:

(1) All bus connections A, B, and C to the breaker are epoxy insulated to prevent any arcing during short circuit interruption. When the breaker contacts open, arcing of contacts releases a large volume of gases with metal particles.

(2) The electrical enclosure 1609 is larger, thereby allowing more volume for the gases released from the breaker, during a short circuit, to expand. The additional volume for gases means that the pressure applied on the inner door 1625 or 1626 is lower. If the inner door 1625 or 1626 opens during a short circuit, the test is considered a failure. The optimized size of the electrical enclosure 1609 provides an adequate volume for the gases released from the breaker, during a short circuit, to expand, and to provide sufficient cable bend radius for connecting load cables.

(3) Three separate latches are provided for securing the inner door 1625 or 1626: one plastic latch with a lock and two mechanical hook latches that are operated with a screw.

(4) Extensive testing is performed to validate the design and UL witness testing is performed to verify safety compliance.

(5) The UL short circuit series rating tests, that is, witness tests, are conducted periodically, for example, every two years to maintain high UL series ratings at 35 kA and 50 kA.

In other embodiments, the modular plug-in power distribution panel assembly (MPIPDPA) 1600 comprises a 1000 A power distribution panel section 1602 with a different number of 250 A breakers 1617 and 600 A breakers 1618. For example, in an embodiment, the MPIPDPA 1600 comprises a 1000 A power distribution panel section 1602 with ten 250 A plug-in breakers 1617 and three 600 A plug-in breakers 1618. In this embodiment, a 1000 A circuit breaker 1624 is housed in the breaker compartment 1605 in the transformer section 1601 and is configured to serve as the main breaker for the power distribution panel section 1602. Furthermore, in this embodiment, the rear section of the transformer section 1601 accommodates a transformer 1623, for example, a 300 kVA transformer.

Figure 17A:
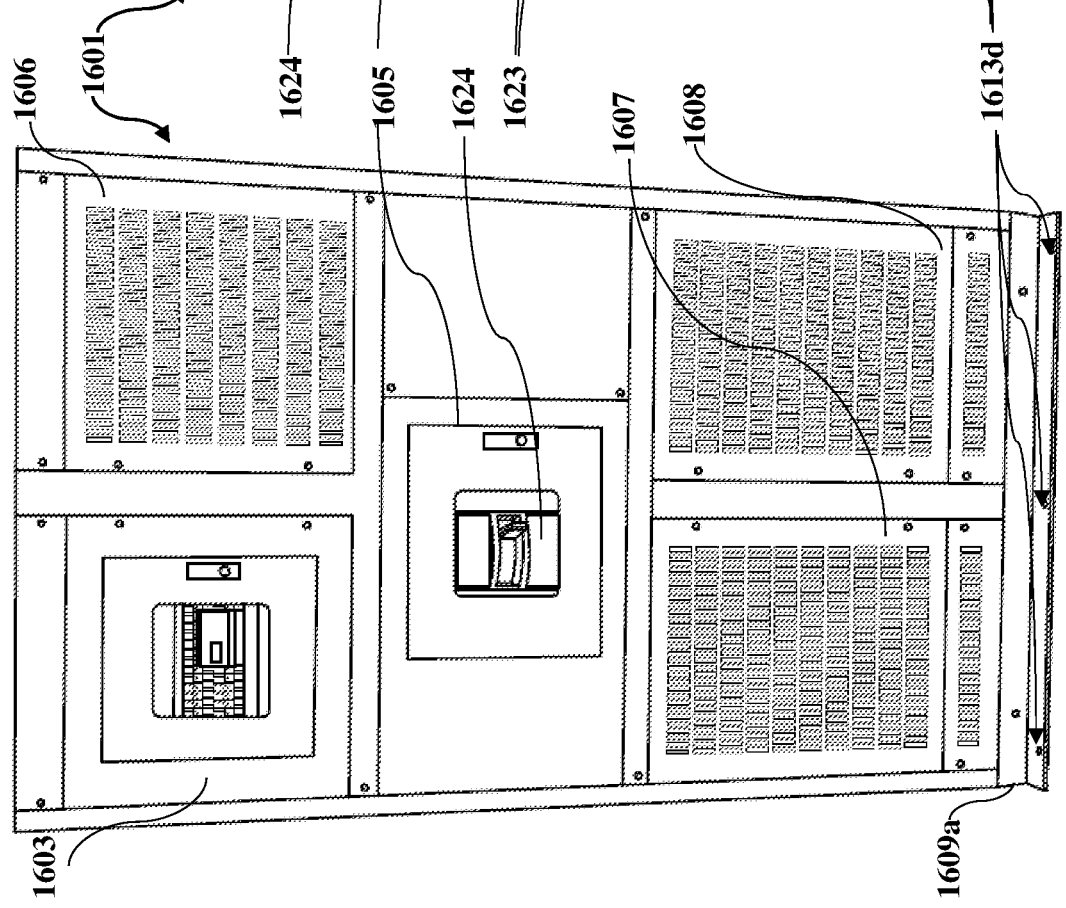
FIG. 17A illustrates a front view of the transformer section of the embodiment of the modular plug-in power distribution panel assembly shown in FIG. 16A, with compartment doors in a closed position.
Figure 17D:
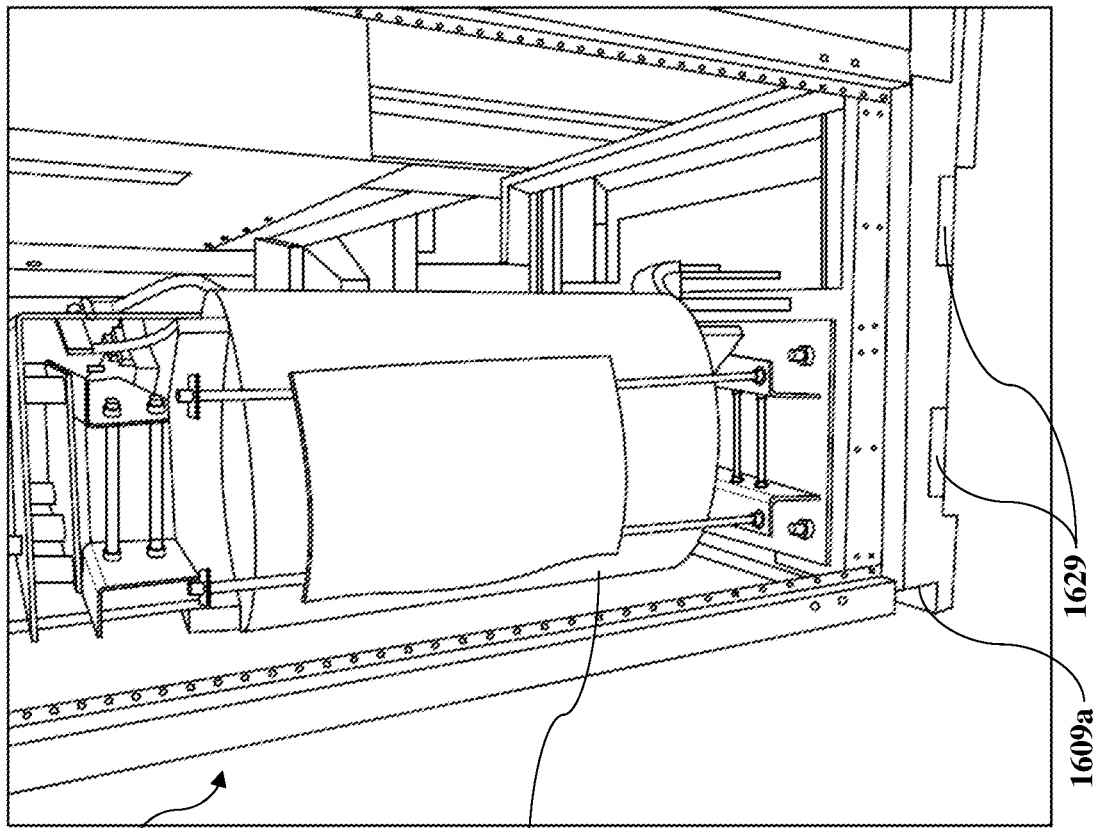
FIGS. 17C-17D illustrate a rear view and a side view, respectively, of the transformer section shown in FIGS. 17A-17B, with doors in an open position.
Figure 17C:
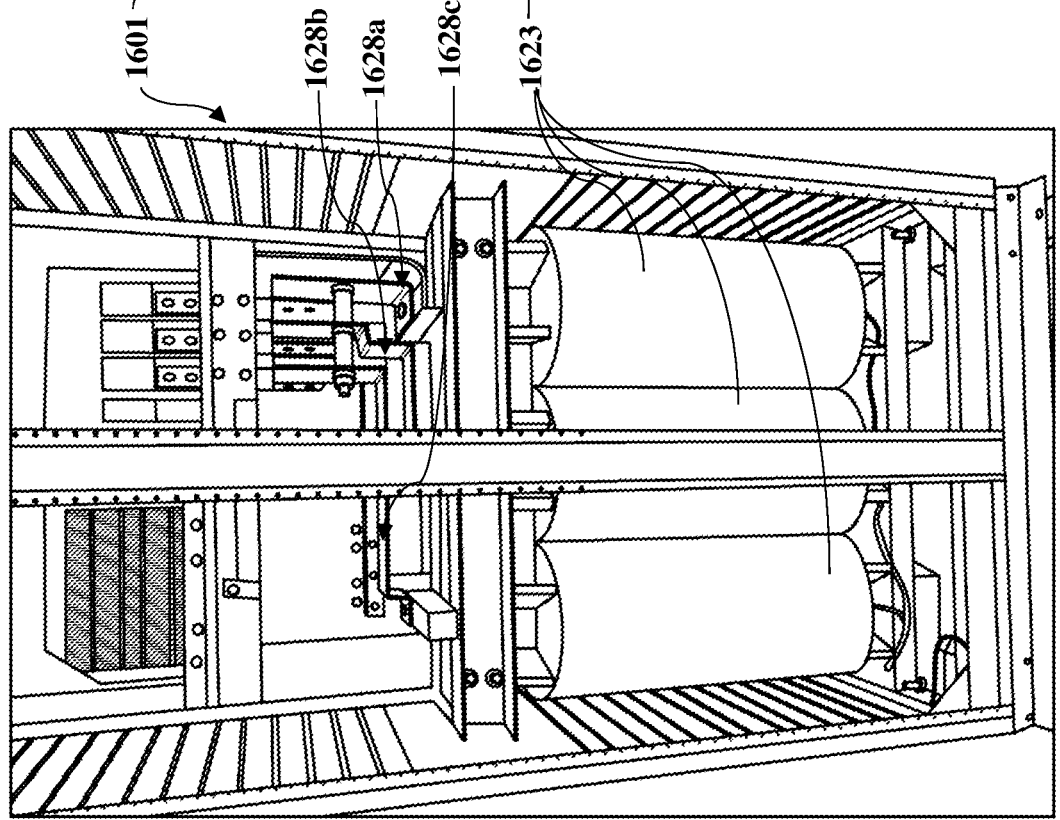

FIG. 17A illustrates a front view of the transformer section 1601 of the embodiment of the modular plug-in power distribution panel assembly 1600 shown in FIG. 16A, with doors of the compartments 1603, 1605, 1606, 1607, and 1608 in a closed position. In an embodiment, the base 1609a of the transformer section 1601 comprises anchor holes 1613d for seismic anchor bolts as illustrated in FIGS. 17A-17B.

FIG. 17B illustrates a front perspective view of the transformer section 1601 with the doors of the compartments 1603, 1605, 1606, 1607, and 1608 in an open position. FIG. 17B illustrates the main breaker 1624 housed in the middle, breaker compartment 1605 of the transformer section 1601. The main breaker 1624 is electrically connected to the transformer 1623 positioned in the transformer section 1601.

FIGS. 17C-17D illustrate a rear view and a side view respectively, of the transformer section 1601 shown in FIGS.

17A-17B, with doors in an open position. FIG. 17C illustrates buses, for example, an A-phase bus 1628a, a B-phase bus 1628b, and C-phase bus 1628c configured in the transformer section 1601 for implementing bus connections to the main breaker 1624. As illustrated in FIG. 17D, notches 1629 are configured on the sides of the base 1609a of the transformer section 1601. As the depth of the transformer section 1601 is, for example, greater than 36 inches, side notches 1629 are configured on the base 1609a of the transformer section 1601. The base 1609a of the transformer section 1601 is configured to allow lifting equipment, for example, pallet jacks, to move the transformer section 1601 from the front when the transformer section 1601 is on a pallet. The base 1609a of the transformer section 1601 is configured with notches 1629 of size, for example, about 6 inches, on the sides as illustrated in FIG. 17D, to allow lifting equipment, for example, hydraulic roller dollies to attach to the sides of the base 1609a of the transformer section 1601 and move the transformer section 1601 when the pallet is removed. Hydraulic machine roller dollies are used for lifting and handling the modular plug-in power distribution panel assembly (MPIPDPA) 1600 illustrated in FIG. 16A. A hydraulic machine roller dolly is made, for example, from reinforced steel frame. An example of a hydraulic machine roller dolly used for lifting and moving the MPIPDPA 1600 is, for example, the Wesco® hydraulic Raise-N-Roll machinery dolly of Wesco Industrial Products, LLC. Adjustable forks of two hydraulic machine roller dollies are attached to the notches 1629 configured on the opposing lateral sides of the base 1609a of the transformer section 1601 illustrated in FIG. 17D and FIGS. 17G-17H. Swivel casters of the two hydraulic machine roller dollies allow the attached transformer section 1601 to be maneuvered in any direction. Attachment of the lifting equipment on two sides of the transformer section 1601 via the notches 1629 facilitates ease of moving and handling the MPIPDPA 1600 without using an overhead crane or a fork lift after the pallet that accommodates the MPIPDPA 1600 is removed.

Figure 17E:
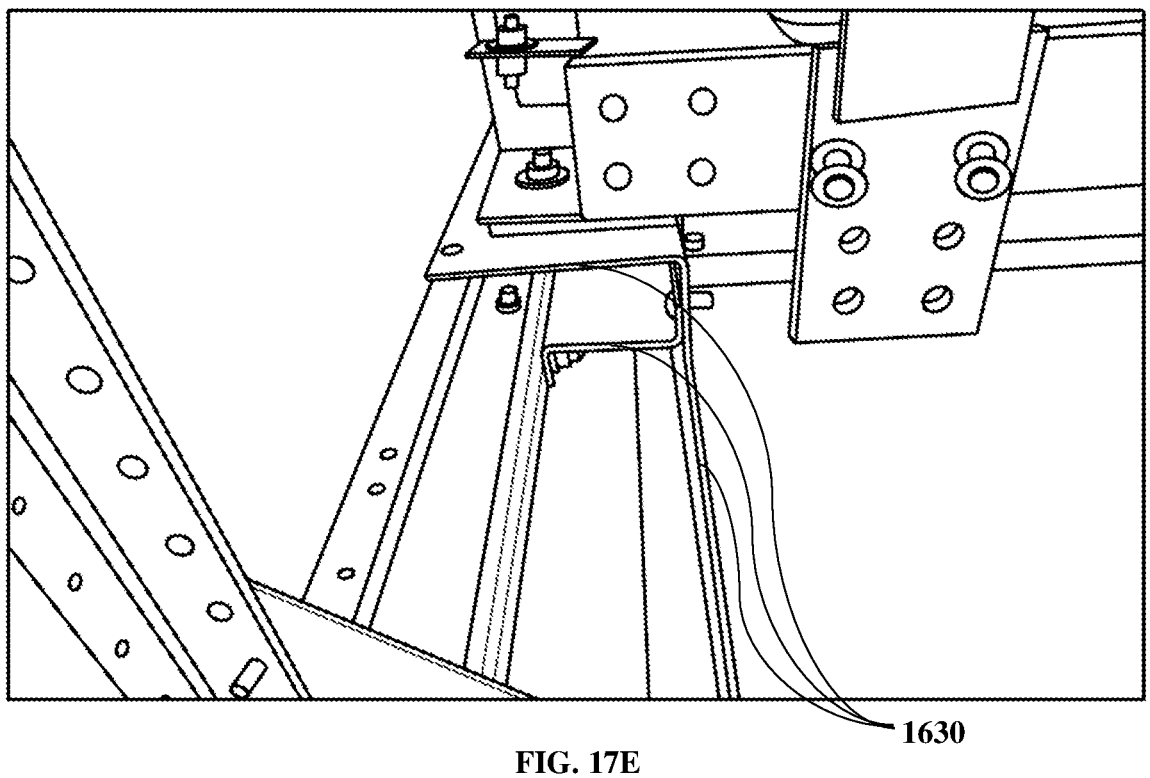
FIGS. 17E-17G illustrate base reinforcement implemented in the transformer section shown in FIGS. 17A-17B, for meeting seismic compliance requirements.
Figure 17F:
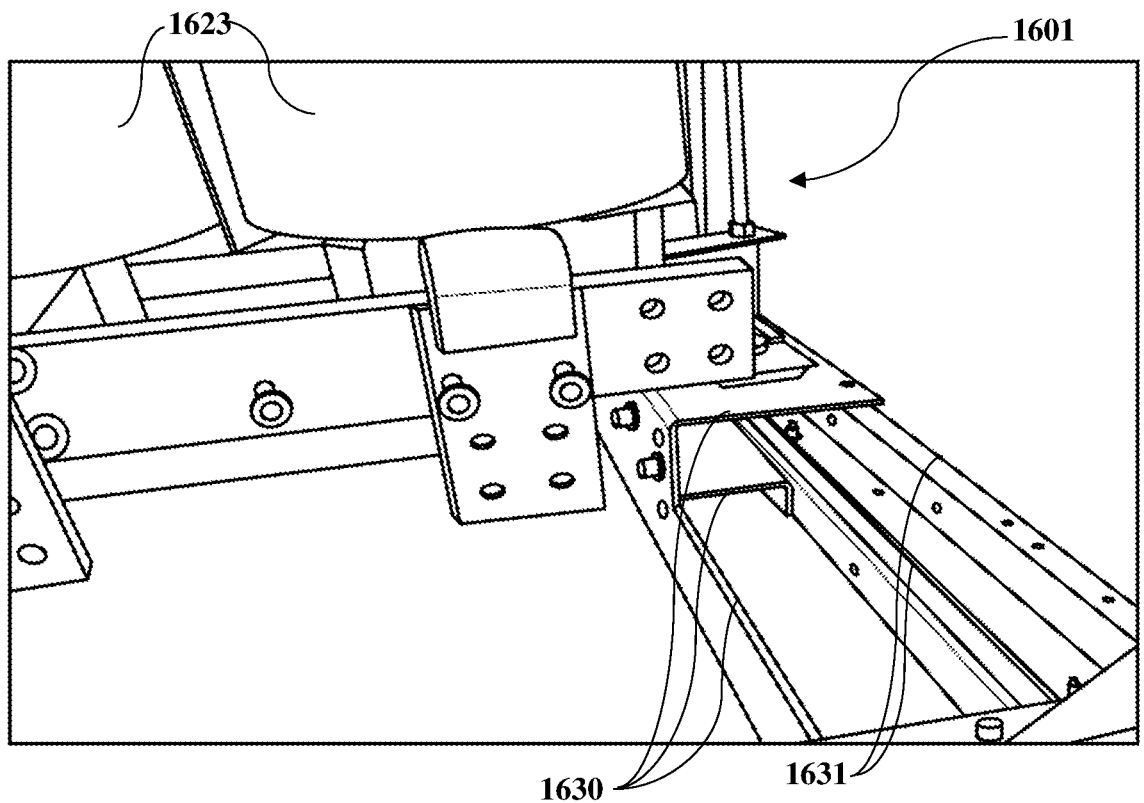
Figure 17G:
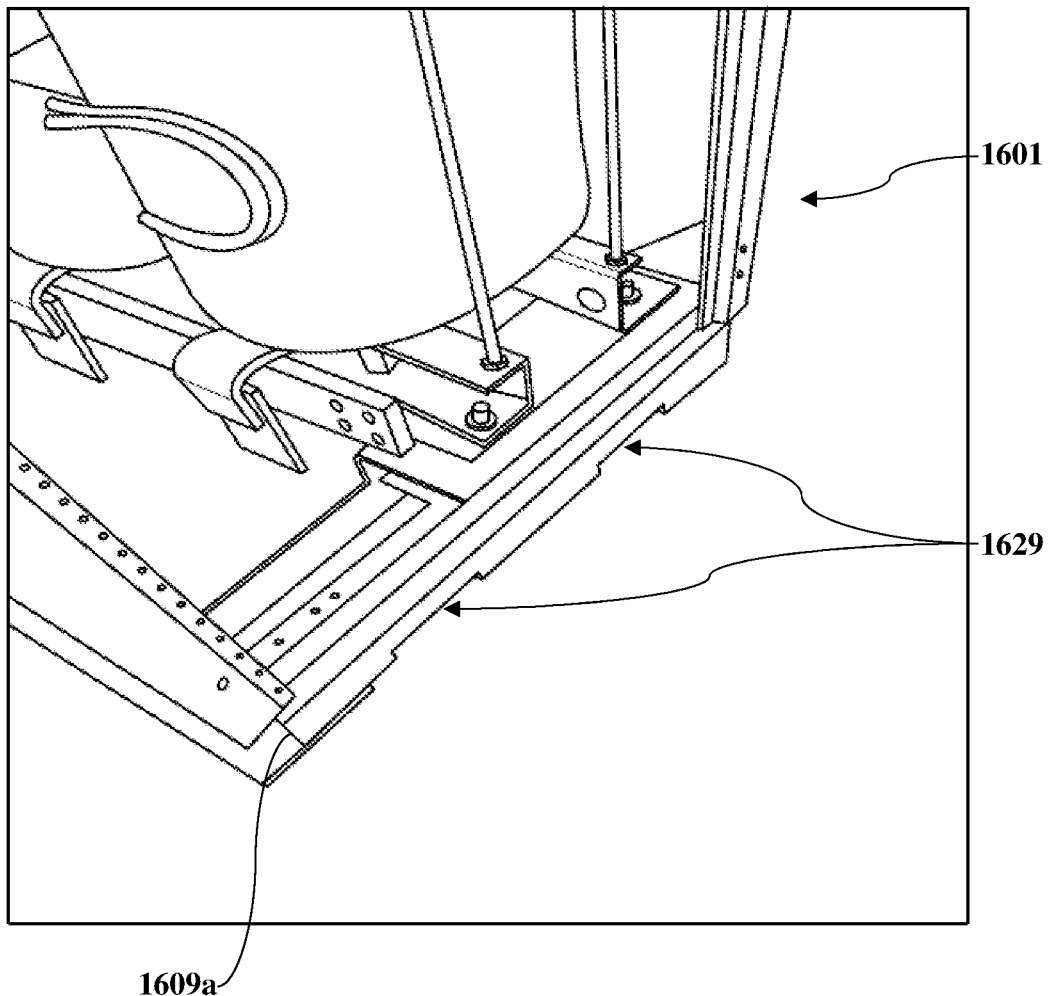

FIGS. 17E-17G illustrate base reinforcement 1630 implemented in the transformer section 1601 shown in FIGS. 17A-17B, for meeting seismic compliance requirements. In an embodiment, the base reinforcement 1630 is implemented in the transformer section 1601 for seismic compliance due to the notches 1629 illustrated in FIG. 17D, needed for attaching to lifting equipment on both sides. The base reinforcement 1630, which is disposed along a side channel as illustrated in FIGS. 17E-17F, allows ease of movement of the power distribution unit (PDU) illustrated in FIGS. 16A-16E, with lifting equipment on each side. FIG. 17F illustrates the main base channel support 1631. The notches 1629 are configured on side of the base 1609a as illustrated in FIG. 17G for attaching to lifting equipment, which allow ease of movement of the PDU. In an embodiment, the side of the base 1609a comprises 6-inch notches 1629 for each lifting equipment.

Figure 17H:
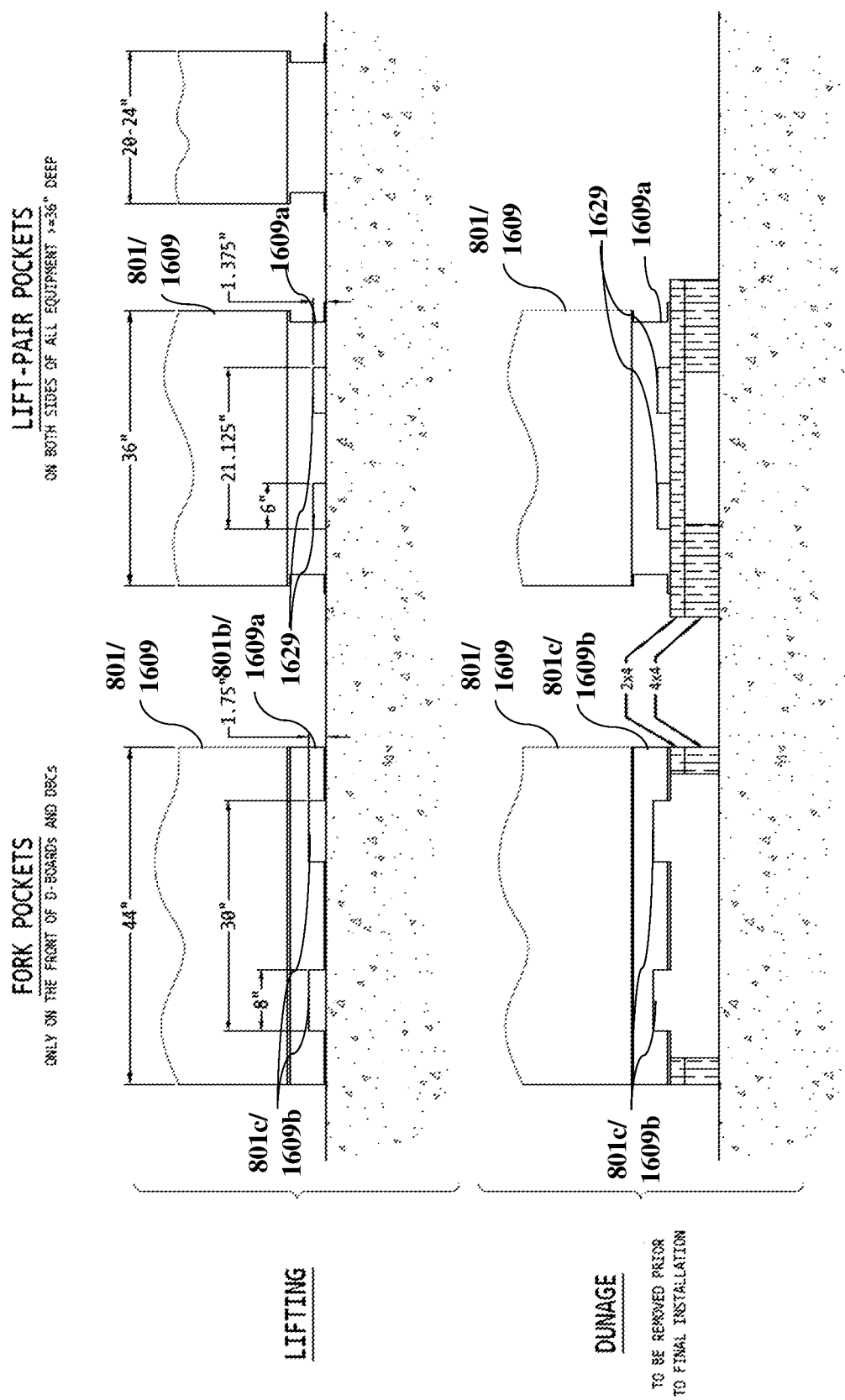
FIG. 17H illustrates elevation views showing notches configured on one or more sides of a base of an electrical enclosure in various embodiments of the modular plug-in power distribution panel assembly.

FIG. 17H illustrates elevation views showing notches, for example, 801c/1609b/1629, configured on one or more sides of a base 801b/1609a of an electrical enclosure 801/1609 in various embodiments of the modular plug-in power distribution panel assembly (MPIPDPA). In an embodiment, front notches 801c/1609b are configured on a front side of the base 801b/1609a of the electrical enclosure 801/1609 as disclosed in the description of FIG. 8A. The front notches 801c/1609b, also referred to as fork pockets, attach to lifting equipment, for example, a fork lift, on the front side of the electrical enclosure 801/1609 to facilitate ease of moving and handling the MPIPDPA. The front notches 801c/1609b are, for example, 8-inch notches, as illustrated in FIG. 17H. In another embodiment, side notches 1629 are configured on opposing lateral sides of the base 1609a of the electrical enclosure 1609 as disclosed in the description of FIG. 17D. The side notches 1629, also referred to as lift-pair pockets, attach to lifting equipment, for example, lifting dolly, a hydraulic machinery roller dolly, etc., on the opposing lateral sides of the base 1609a of the electrical enclosure 801/1609 to facilitate ease of moving and handling the MPIPDPA. The side notches 1629 are, for example, 6-inch notches, as illustrated in FIG. 17H. Exemplary dimensions of the front notches 801c/1609b and the side notches 1629 are illustrated in FIG. 17H.

Figures 18A, 18B:
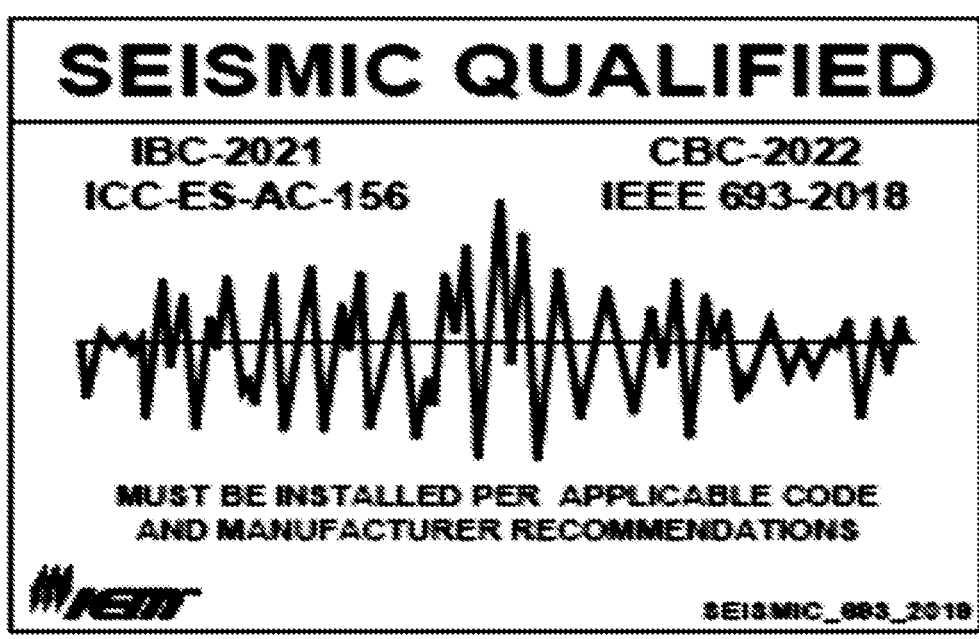
FIGS. 18A-18B illustrate certification labels attached to the transformer section shown in FIG. 17A.

FIGS. 18A-18B illustrate certification labels 1801 and 1802 attached to the transformer section 1601 shown in FIG. 17A. A power distribution unit (PDU) rating and safety certification label 1801 is illustrated in FIG. 18A. A PDU seismic label 1802 is illustrated in FIG. 18B.

Figure 19A:
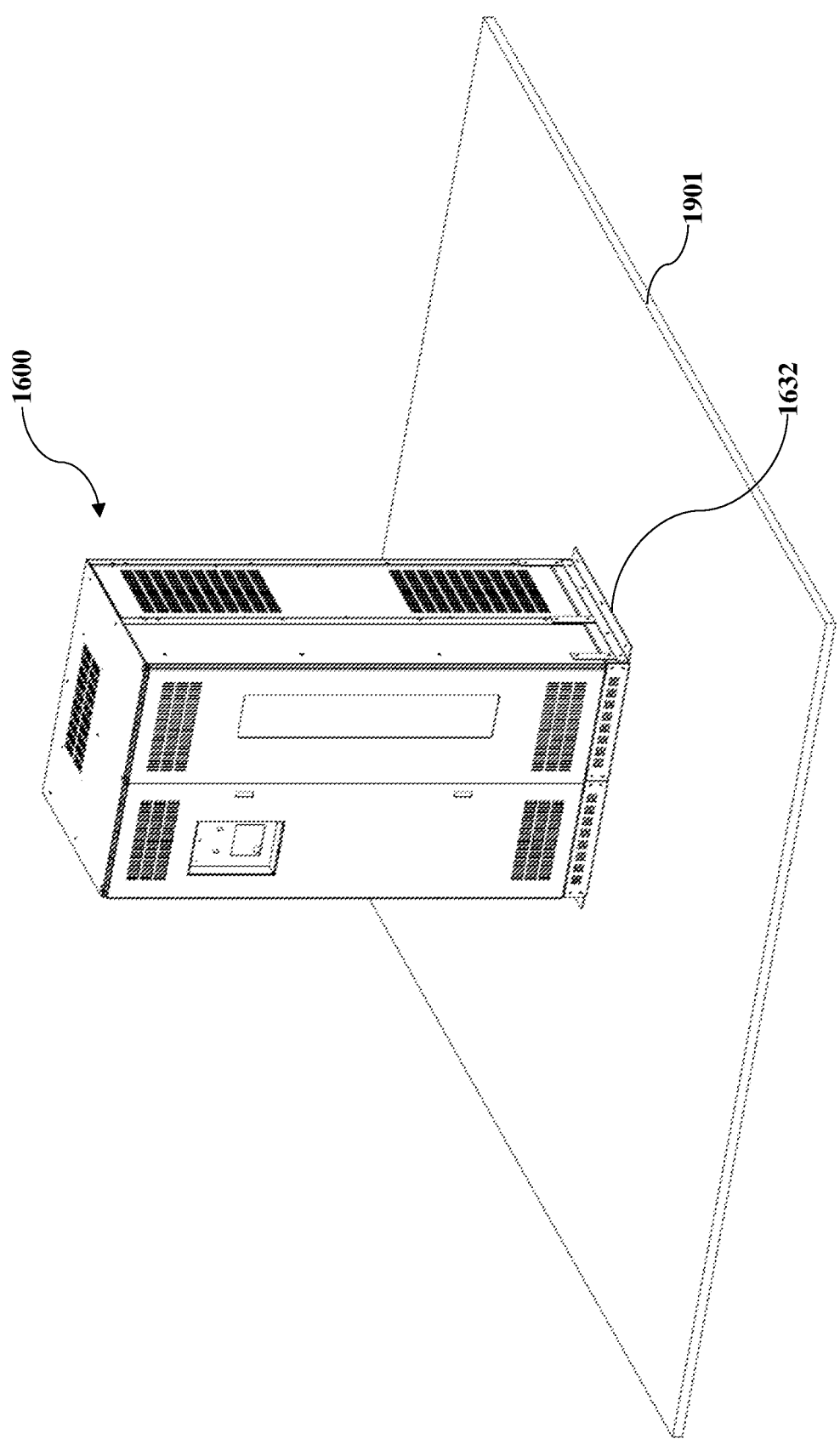
FIGS. 19A-19B illustrate an embodiment of the anchoring for an alternate transformer section of the modular plug-in power distribution panel assembly in the absence of base reinforcements shown in FIGS. 17E-17F.
Figure 19B:
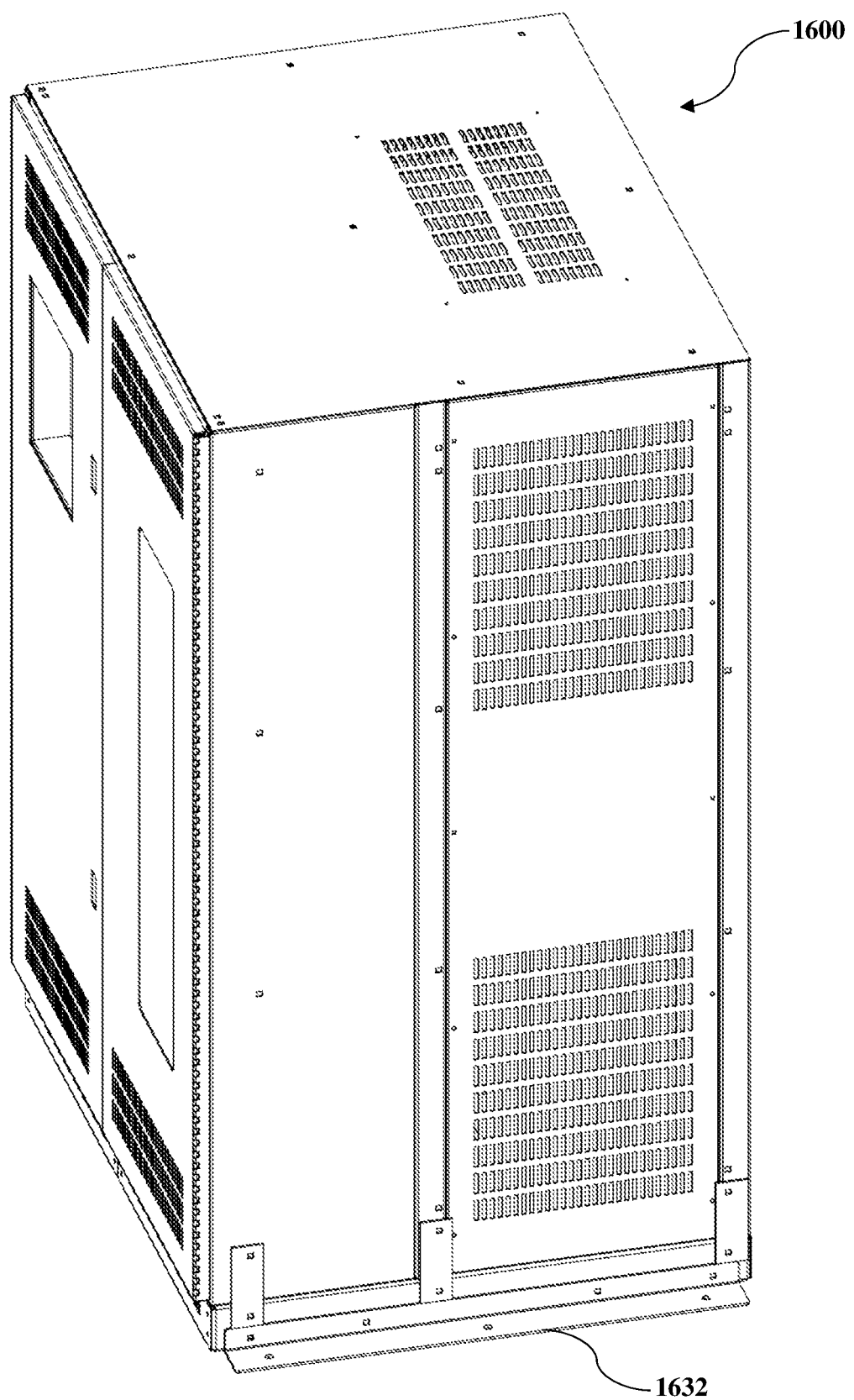

FIGS. 19A-19B illustrate an embodiment of the anchoring 1632 for an alternate transformer section of the modular plug-in power distribution panel assembly 1600 in the absence of base reinforcements 1630 shown in FIGS. 17E-17F. With base reinforcements 1630, the transformer section 1601 is anchored at the anchor holes 1613d illustrated in FIGS. 17A-17B. In the embodiment illustrated in FIGS. 19A-19B, no additional anchoring brackets are required. The alternate anchoring 1632 of the transformer section on an earthquake shaking table 1901 is illustrated in FIG. 19A.

Figure 20A:
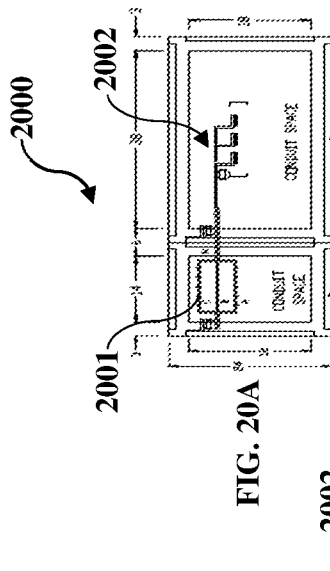
FIGS. 20A-20F illustrate different views of another embodiment of the modular plug-in power distribution panel assembly.
Figure 20B:
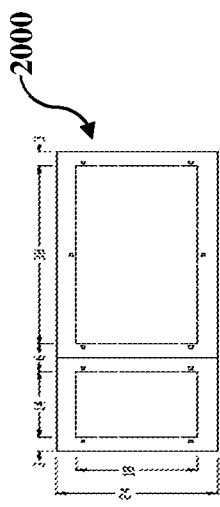
Figure 20C:
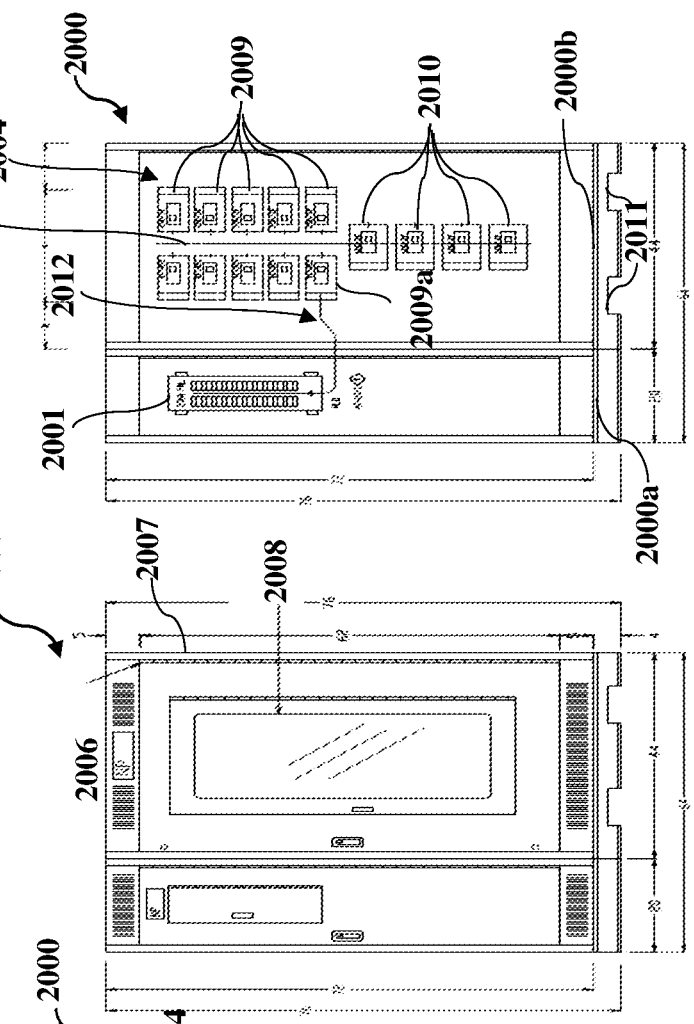
Figure 20D:
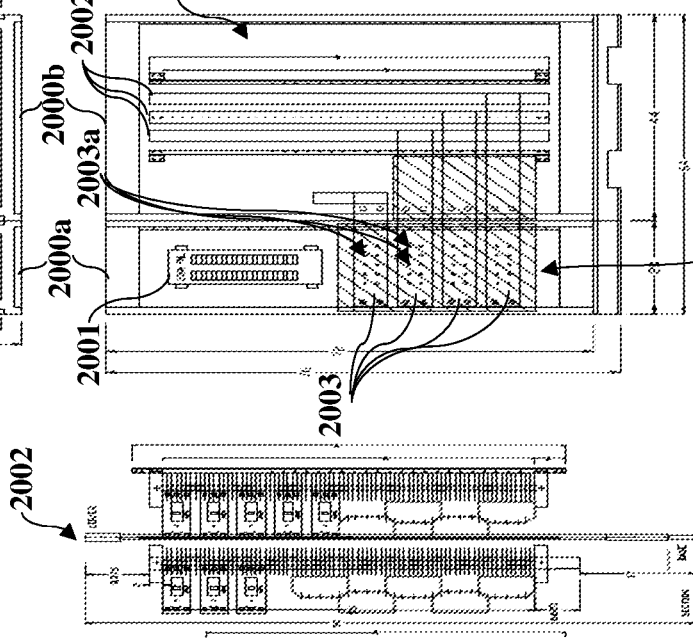
Figure 20E:
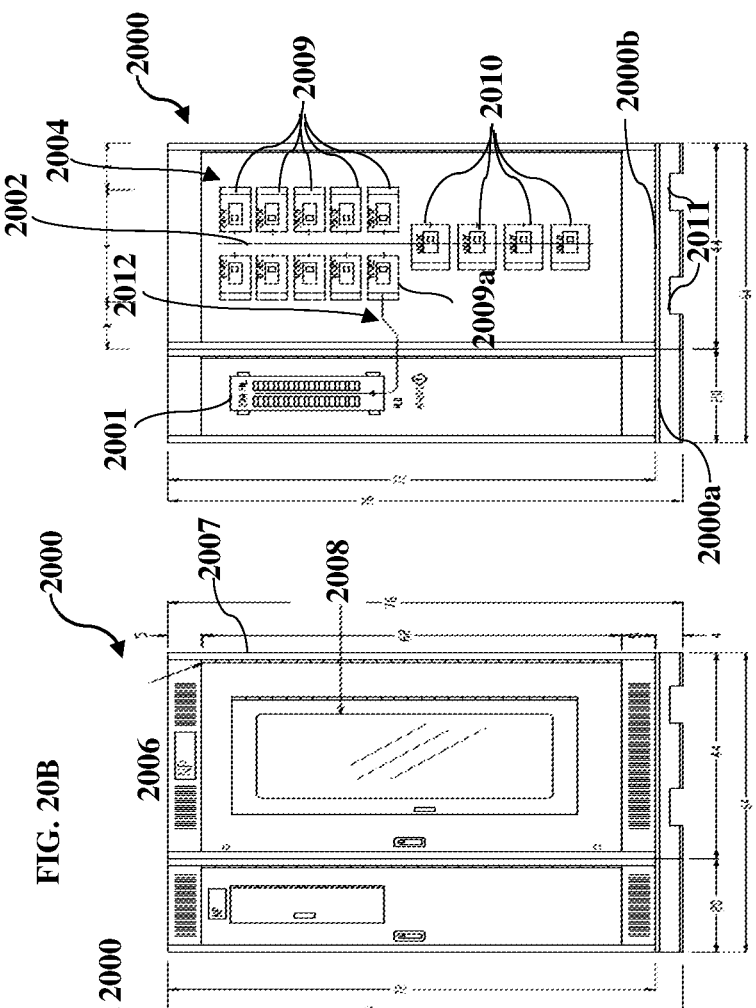
Figure 20F:
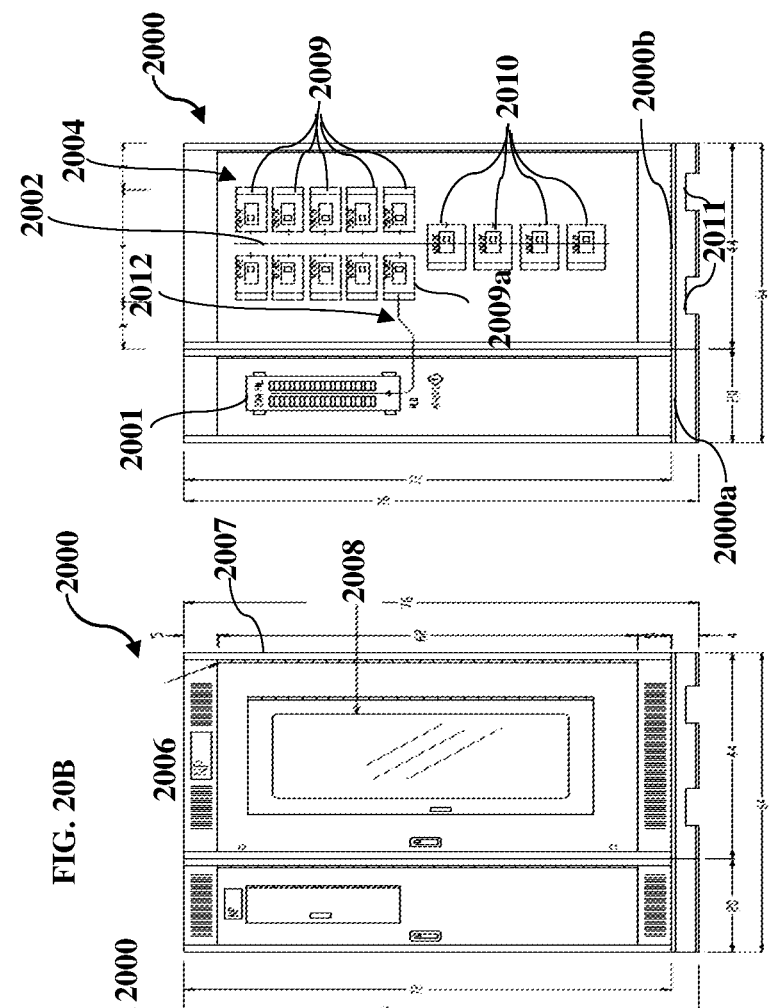

FIGS. 20A-20F illustrate different views of another embodiment of the modular plug-in power distribution panel assembly (MPIPDPA) 2000. The MPIPDPA 2000 comprises two sections 2000a and 2000b. A bottom view, a top view, a side view, a front interior view, a front exterior view, and a breaker view of the MPIPDPA 2000 are illustrated in FIGS. 20A-20F, respectively. In this embodiment, the MPIPDPA 2000 is configured, for example, as a 1200 A panelboard with another 250 A panel 2001 as illustrated in FIG. 20A, FIG. 20D, and FIG. 20F. This embodiment provides an alternative layout for increasing the number of plug-in breakers by a bus connection to a main bus 2002 as illustrated in FIGS. 20C-20D, instead of by a cable connection. This arrangement uses another section 2000a where the cables come in. This MPIPDPA 2000 comprises main input cables 2005 coming in the front as illustrated in FIG. 20D and a smaller 250 A panel 2001 in the front, and there is a cable connection 2012 to the plug-in panel 2004 as illustrated in FIG. 20F. The input cable connections are indicated by 2005 in FIG. 20D. The cable connection 2012 illustrated in FIG. 20F is the connection between a 250 A plug-in breaker 2009a to the smaller plug-in panel 2001 in the rear. The main input cables 2005 are connected to a bus 2003 as illustrated in FIG. 20D. The bus 2003 comprises holes 2003a for connecting lugs of the incoming input cables 2005. The MPIPDPA 2000 comprises, for example, ten 250 A plug-in breakers 2009 and four 600 A plug-in breakers 2010 as illustrated in the breaker view shown in FIG. 20F. The 250 A plug-in breaker 2009a in the larger plug-in panel 2004 connects to and feeds the smaller 250 A panel 2001 via the cable connection 2012 as illustrated in FIG. 20F. The smaller 250 A panel 2001 is series rated to a higher short circuit rating. In this configuration, the MPIPDPA 2000 allows for a higher number of plug-in breakers in the larger plug-in panel 2004 for a given height. In an embodiment, this configuration comprises, for example, a 42-circuit, 225 A panel on the side and cables for the main plug-in panel 2004 in the back of the 42-circuit, 225 A panel. The 42-circuit, 225 A panel is connected to a main 250 A plug-in breaker 2009a.

The front exterior view illustrated in FIG. 20E shows panel doors 2008 with a Lexan® material, used for covering the plug-in breakers 2009 and 2010 illustrated in FIG. 20F. The panel doors 2008 are hinged to the electrical enclosure 2007 of the MPIPDPA 2000, for example, using stainless steel piano hinges 2006. As the MPIPDPA 2000 has a depth of, for example, between about 20 inches to about 24 inches, the MPIPDPA 2000 comprises front notches 2011 instead of side notches as disclosed in the description of FIG. 8A.

FIGS. 21A-21F illustrate different views of another embodiment of the modular plug-in power distribution panel assembly (MPIPDPA) 2100. A bottom view, a top view, a side view, a front interior view, a front exterior view, and a breaker view of the MPIPDPA 2100 are illustrated in FIGS. 21A-21F, respectively. In this embodiment, the configuration of the MPIPDPA 2100 comprises cable connections in the back and accommodates a larger number of plug-in breakers for a given height. FIG. 21D illustrates main input cables 2103 connected to a bus 2104 as illustrated in FIG. 21D. The bus 2104 comprises holes 2104a for connecting lugs of the incoming input cables 2103. The MPIPDPA 2100 illustrated in FIGS. 21A-21F is of a height, for example, about 76 inches, and accommodates an additional number of 250 A and 600 A plug-in breakers 2107 and 2108 than the MPIPDPA 800 of height about 80 inches illustrated in FIGS. 8A-8D. For example, the MPIPDPA 800 illustrated in FIG. 8D accommodates six 250 A plug-in breakers 806 and four 600 A plug-in breakers 807, while the MPIPDPA 2100 illustrated in FIGS. 21A-21F accommodates ten 250 A plug-in breakers 2107 and four 600 A plug-in breakers 2108. The plug-in breakers 2107 and 2108 are operably coupled to the main bus 2102 via their respective plug-in bases (not shown). The front exterior view illustrated in FIG. 21E shows panel doors 2105 with a Lexan® material, used for covering the plug-in breakers 2107 and 2108 illustrated in FIG. 21F. The panel doors 2105 are hinged to the electrical enclosure 2101 of the MPIPDPA 2100, for example, using stainless steel piano hinges 2106. As the MPIPDPA 2100 has a depth of, for example, between about 20 inches to about 24 inches, the MPIPDPA 2100 comprises front notches 2109 instead of side notches as disclosed in the description of FIG. 8A.

Figure 22:
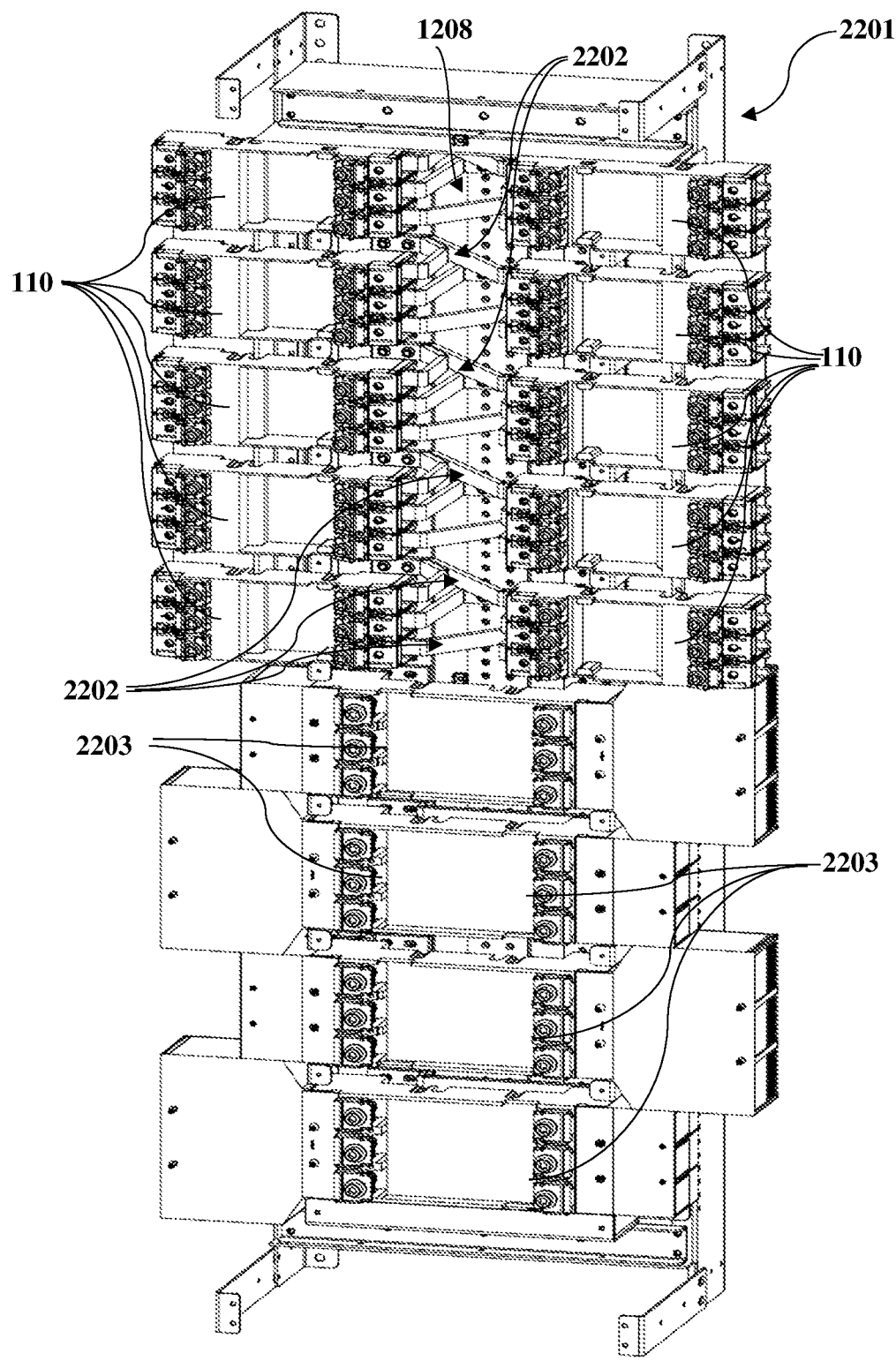
FIG. 22 illustrates an embodiment of the bus bar assembly of a modular plug-in power distribution panel assembly configured as a 1200-ampere power distribution panel.
Figures 27A, 27B, 27C, 27D, 27E:
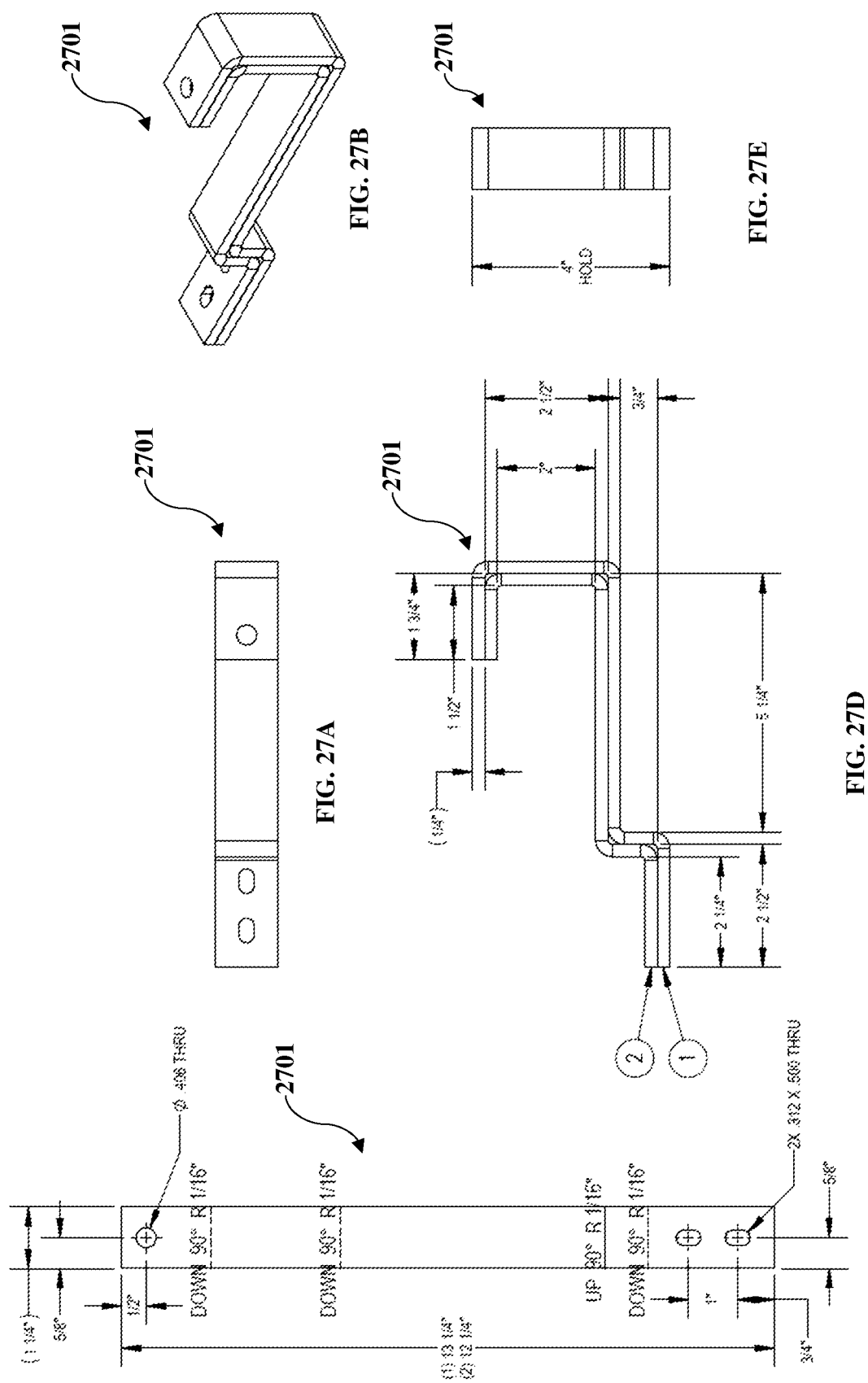
FIGS. 27A-27E illustrate different views of another embodiment of a bus implemented in the bus bar assembly of the modular plug-in power distribution panel assembly.

FIG. 22 illustrates an embodiment of the bus bar assembly 2201 of the modular plug-in power distribution panel assembly (MPIPDPA) 800/1200/1600 illustrated in FIGS. 8A-8D, FIGS. 9A-9C, FIGS. 11A-11B, FIG. 12A, and FIGS. 16A-16E. The MPIPDPA 800/1200/1600 is configured, for example, as a 1200 A power distribution panel. The 1200 A power distribution panel is larger than the 800 A and 1000 A wall-mounted assemblies, thereby requiring a different bus bar assembly 2201 as illustrated in FIG. 22. In the 1200 A power distribution panel, all bus connections to the breakers are epoxy insulated to ensure safety since there are no insulation barriers that separate the phases. The plug-in bases 110 and 2203 are operably coupled to the bus bar assembly 2201 as illustrated in FIG. 22. For example, ten plug-in bases 110 are operably coupled to the bus bar assembly 2201 for connecting ten 150 A/250 A plug-in breakers thereto, and four plug-in bases 2203 are operably coupled to the bus bar assembly 2201 for connecting four 400 A/600 A plug-in breakers thereto. The bus bar assembly 2201 comprises a main bus 1208 and breaker buses or bus straps 2202. The bus straps 2202 are insulated bus straps selectively configured and connected to the main bus 1208 to provide electrical insulation and enhance flexibility and operability of the MPIPDPA 800/1200/1600. The bus straps 2202 connect the plug-in bases 110 and 2203 to phases A, B, and C of the main bus 1208. In an embodiment, the bus bar assembly 2201 implements internal bus connections to the plug-in bases 110 and 2203, and in turn to the plug-in breakers, using the bus straps 2202. In an example, epoxy coated copper bus straps 2202 are provided in the bus bar assembly 2201.

The modular plug-in power distribution panel assembly (MPIPDPA) disclosed herein implements various feeder breaker bus designs and configurations for all plug-in breakers to address the flexibility of accommodating 80%-rated and 100%-rated, 150 A, 250 A, 400 A, and 600 A plug-in breakers. The size of the bus is critical in the design of the MPIPDPA. In the wall-mounted power distribution panel, the main bus is sized for 800 A or 1000 A. In an example, for a main bus sized for 800 A, 2×1.25"×0.25" silver-plated or tin-plated copper is used. In another example, for a main bus sized for 1000 A, 3×1.25"×0.25" silver-plated or tin-plated copper is used. Both 150 A and 250 A plug-in breakers use the same bus strap. Both 80%-rated and 100%-rated breakers also use the same bus straps to simplify the design. However, the breaker lugs are made of copper or aluminum for 100%-rated breakers and the breakers used are 100%-rated. The 80%-rated plug-in breakers use aluminum lugs and are marked for an 80% rating. In an alternative construction of the 1200 A-rated floor-mounted power distribution panel, the main bus size is 1×5"×¼" silver-plated or tin-plated copper if the main bus 1621 is connected to a transformer section 1601 illustrated in FIG. 16D and FIG. 17C. The main bus 1621 is 2×2.5"×¼" silver-plated or tin-plated copper for a standalone power distribution panel as illustrated in FIG. 8B. The buses used for the plug-in breakers differ by the rating as disclosed below.

FIGS. 23A-23E, FIGS. 24A-24D, and FIGS. 25A-25E illustrate different views of embodiments of buses 2301, 2401, and 2501 implemented in the bus bar assembly of the modular plug-in power distribution panel assembly, respectively. For both 80%-rated and 100%-rated, 150 A and 250 A breakers, the buses 2301, 2401, and 2501 illustrated in FIGS. 23A-23E, FIGS. 24A-24D, and FIGS. 25A-25E, respectively, are used. The buses 2301 and 2401 illustrated in FIGS. 23A-23E and FIGS. 24A-24D are used for A and C bus phases. The bus 2501 illustrated in FIGS. 25A-25E is used for a B bus phase. The buses 2301, 2401, and 2501 are 1×5/16"×¾" epoxy-coated, silver-plated, or tin-plated copper. Since both 80%-rated and 100%-rated, 150 A and 250 A plug-in breakers are twin-mounted, the buses 2301 and 2401 are used alternatively depending on whether the plug-in breaker is positioned on the left or the right. In an embodiment, instead of the epoxy coating, a low voltage suitable electrical tape or Raychem insulation is used. Using the buses 2301, 2401, and 2501 for the MPIPDPA and using aluminum lugs with 75° C. cables for the breaker load connections, are suitable for both 80%-rated and 100%-rated breakers. The buses 2301, 2401, and 2501 satisfy the safety and temperature rise requirements for both 80% and 100%-rated breakers. Exemplary dimensions of the buses 2301, 2401, and 2501 in inches are illustrated in FIGS. 23A-23E, FIGS. 24A-24D, and FIGS. 25A-25E, respectively.

FIGS. 26A-26E, FIGS. 27A-27E, and FIGS. 28A-28E illustrate different views of other embodiments of buses 2601, 2701, and 2801 implemented in the bus bar assembly of the modular plug-in power distribution panel assembly, respectively. For both 80%-rated and 100%-rated, 400 A plug-in breaker, buses 2601, 2701, and 2801 illustrated in FIGS. 26A-26E, FIGS. 27A-27E, and FIGS. 28A-28E, respectively, are used. The buses 2601 and 2801 illustrated in FIGS. 26A-26E and FIGS. 28A-28E respectively, are used for A and C bus phases. The bus 2701 illustrated in FIGS. 27A-27E, is used for a B bus phase. Each of the buses 2601, 2701, and 2801 is a 2×1.25"×¼" epoxy-coated, silver-plated, or tin-plated copper bus. Both 80%-rated and 100%-rated, 400 A plug-in breakers use aluminum lugs without heat sinks at the output connections. In an embodiment, the buses 2601, 2701, and 2801 illustrated in FIGS. 26A-26E, FIGS. 27A-27E, and FIGS. 28A-28E, respectively, are also used for an 80%-rated, 600 A plug-in breaker. The buses 2601, 2701, and 2801 illustrated in FIGS. 26A-26E, FIGS. 27A-27E, and FIGS. 28A-28E are configured for both 80%-rated and 100%-rated, 400 A plug-in feeder breakers, and for an 80%-rated, 600 A plug-in feeder breaker. In an embodiment, the 600 A plug-in feeder breaker uses bus extensions 3101 shown in FIGS. 31-32 with aluminum lugs. The 80%-rated and 100%-rated 400 A feeder breakers and 80%-rated 600 A feeder breakers utilize or implement the use of 75° C. cables for breaker load connections, which offer flexibility and minimize installation cost.

Figure 29A:
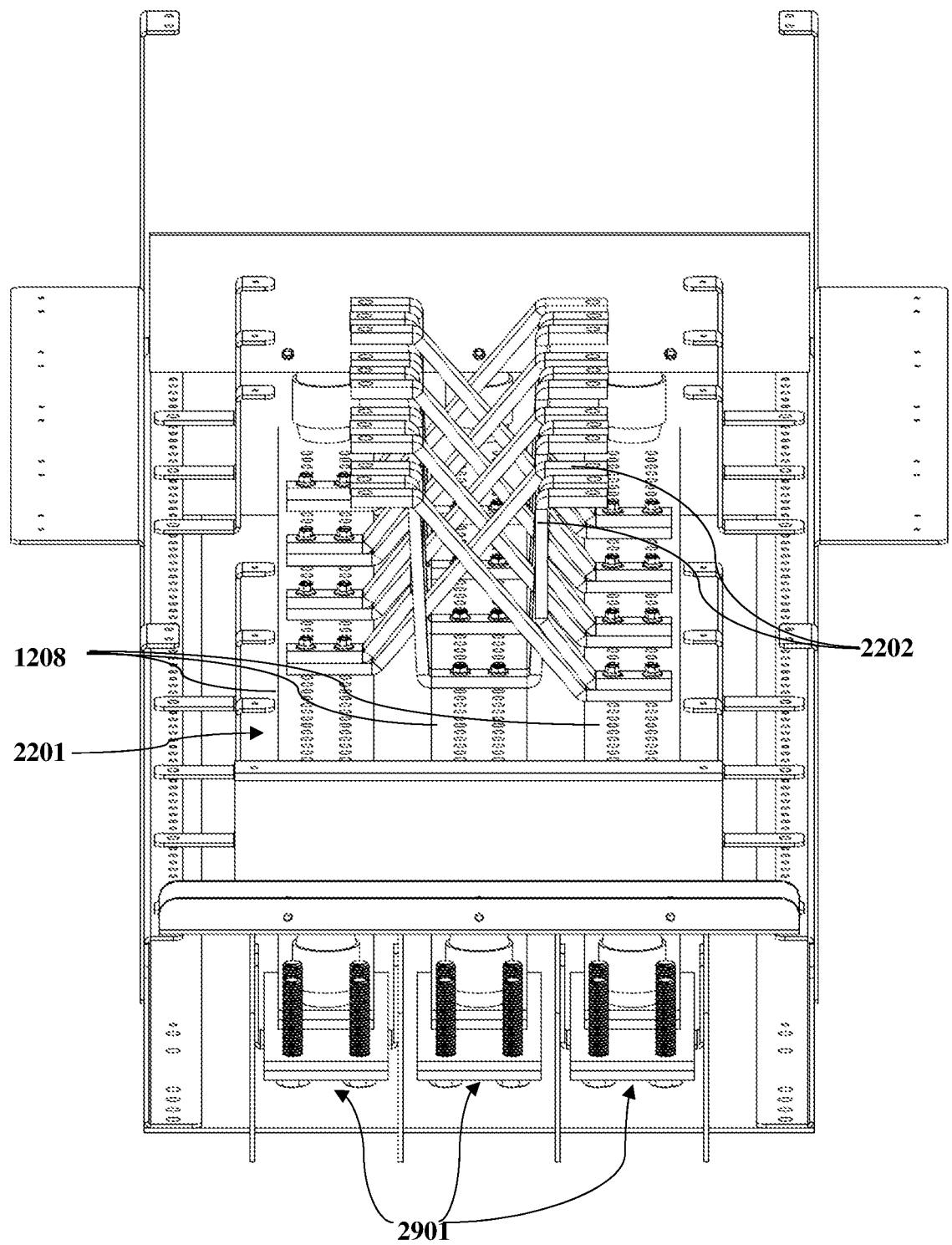
FIGS. 29A-29C illustrate an embodiment of the bus bar assembly of the modular plug-in power distribution panel assembly, showing a main bus and multiple bus straps configured to connect to multiple plug-in breakers.
Figure 29B:
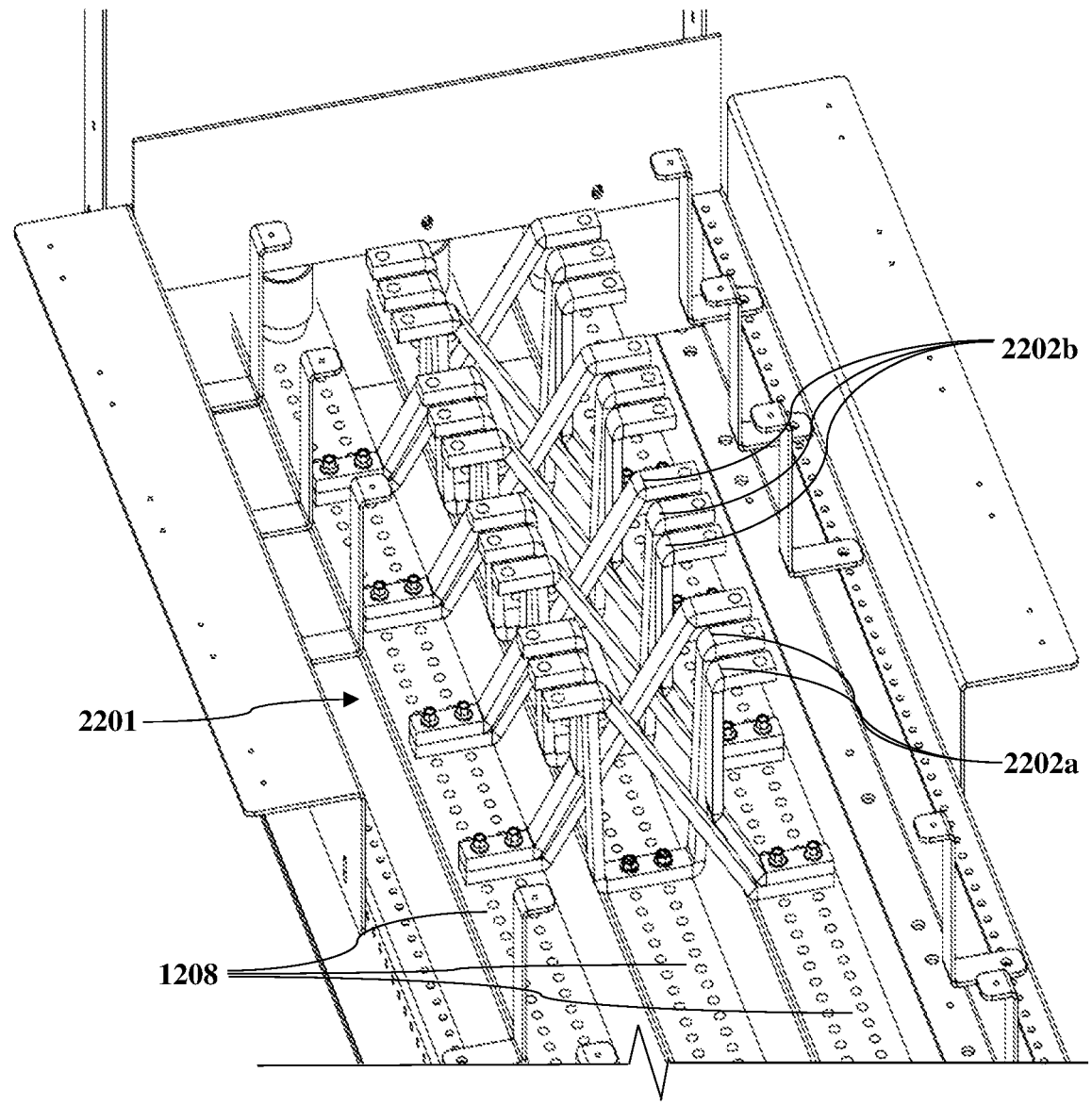
Figure 29C:
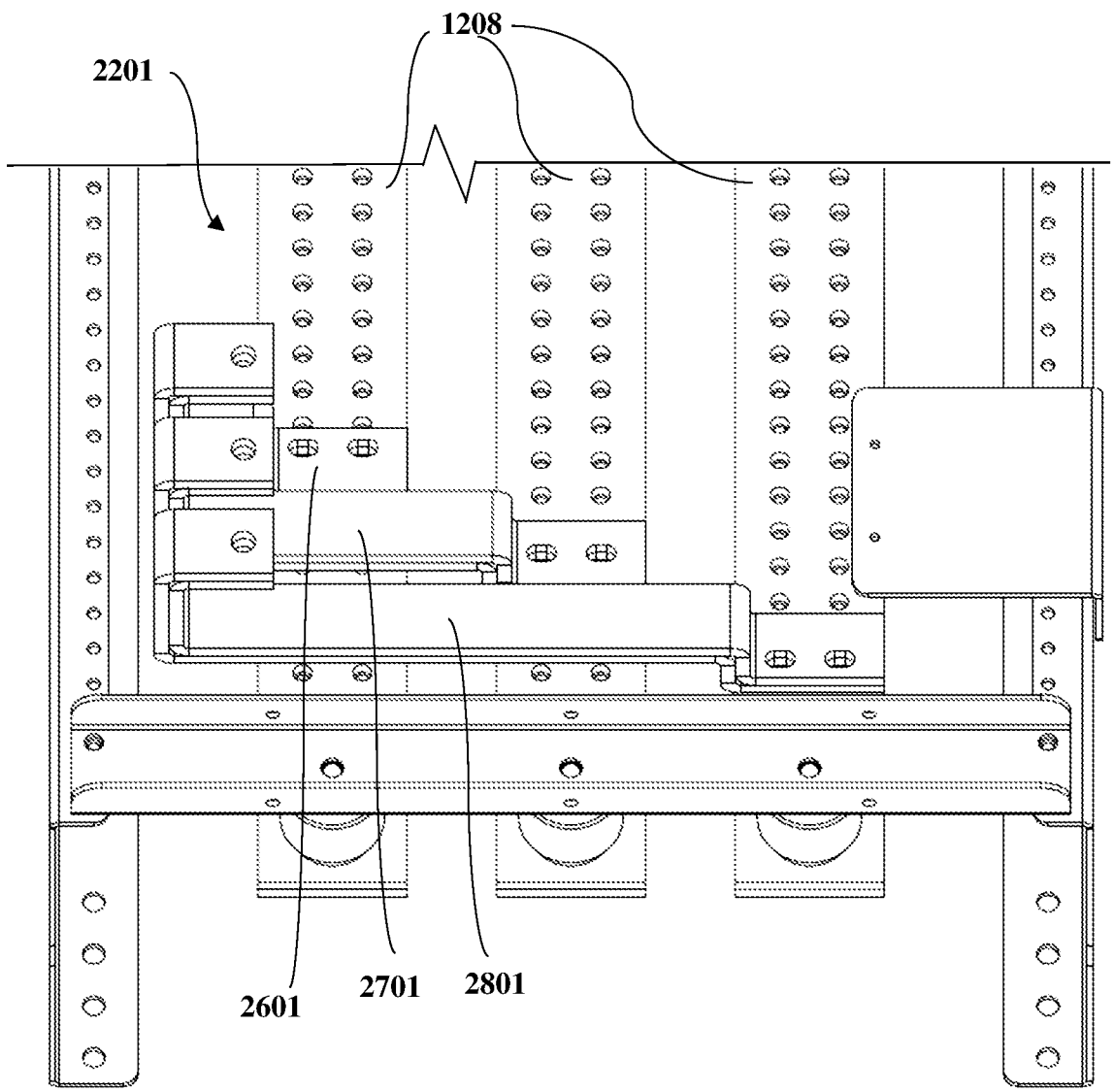

FIGS. 29A-29C illustrate an embodiment of the bus bar assembly 2201 of the modular plug-in power distribution panel assembly (MPIPDPA), showing a main bus 1208 and multiple bus straps 2202 configured to connect to multiple plug-in breakers. In an embodiment, the MPIPDPA is configured as a 1200 A plug-in panel as illustrated in FIG. 29A. The 1200 A plug-in panel comprises a main lugs bus 2901 at the bottom for supporting main lugs, that is, the compression lugs 808 illustrated in FIGS. 9A-9B and FIG. 10. The main lugs bus 2901 is an extension of the main bus 1208 for accommodating the compression lugs 808. FIG. 29A illustrates a main bus 1208 and the bus straps 2202 for 150 A/250 A breakers. The 1200 A plug-in panel does not need barriers since the plug-in breakers are spaced further apart and the bus straps 2202 are insulated. The insulation is, for example, epoxy coating, electrical insulation tape, a Raychem low voltage insulation similar to heat shrink tubing, etc. In an example, the bus straps 2202a for the bottom row twin breakers are insulated using Raychem insulation, and the bus straps 2202b for the top rows are insulated with electrical insulating tape as illustrated in FIG. 29B. FIG. 29C illustrates a main bus 1208 and the bus straps 2601, 2701, and 2801 for 400 A/600 A breakers. The bus straps 2601, 2701, and 2801 are insulated, for example, using electrical insulating tape. For an MPIPDPA configured, for example, as an 800 A or 1000 A plug-in panel, the same bus is used for both 80% and 100% ratings. In the 800 A or 1000 A plug-in panel, aluminum lugs are employed for both 80% and 100% rating. The cables to be used for both 80% rating and 100% rating are, for example, 75° C.-rated cables.

Figure 30B:
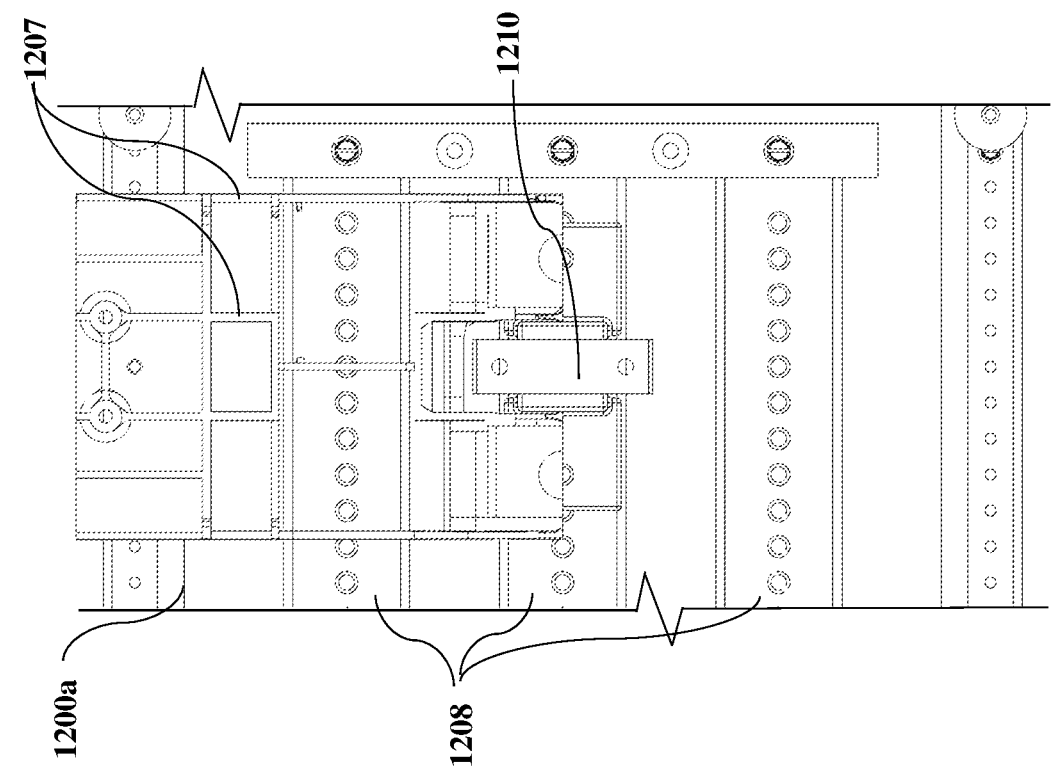
FIGS. 30A-30I illustrate a method for installing a plug-in breaker into the panel of the modular plug-in power distribution panel assembly.
Figure 30A:
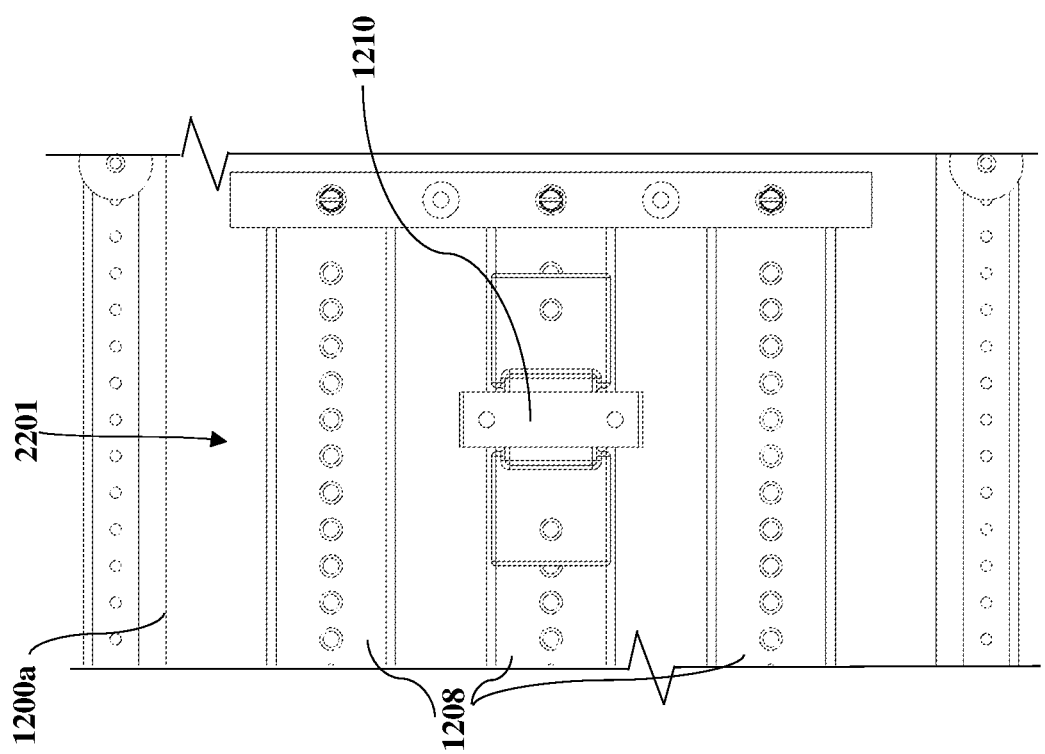
Figure 30D:
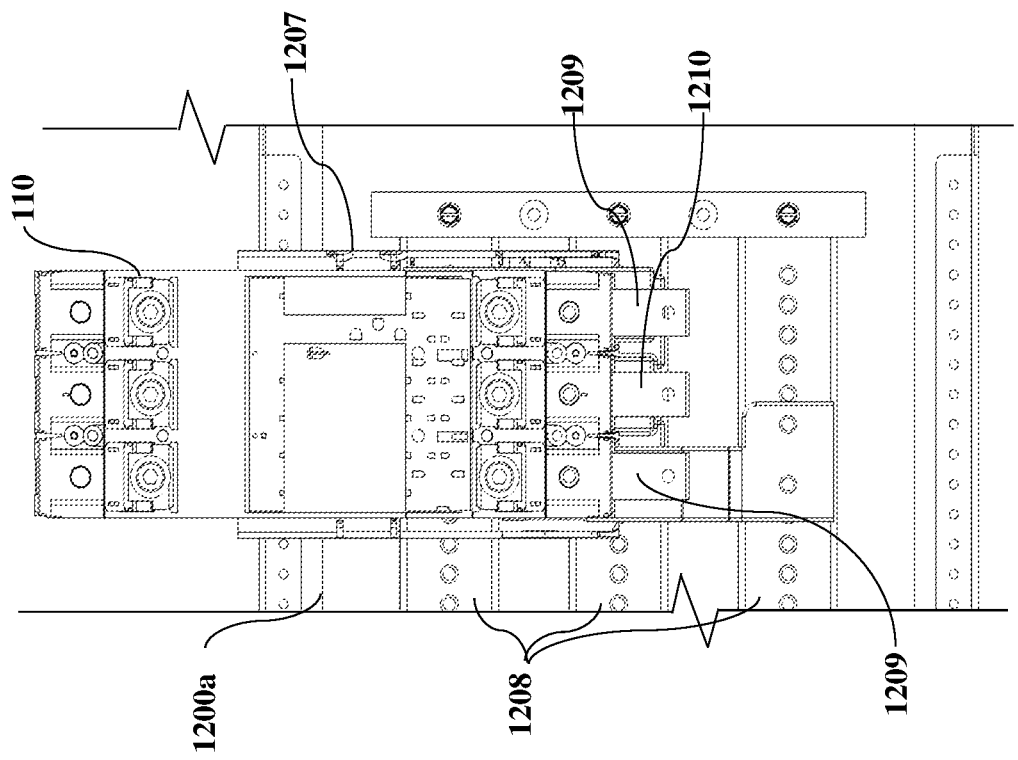
Figure 30C:
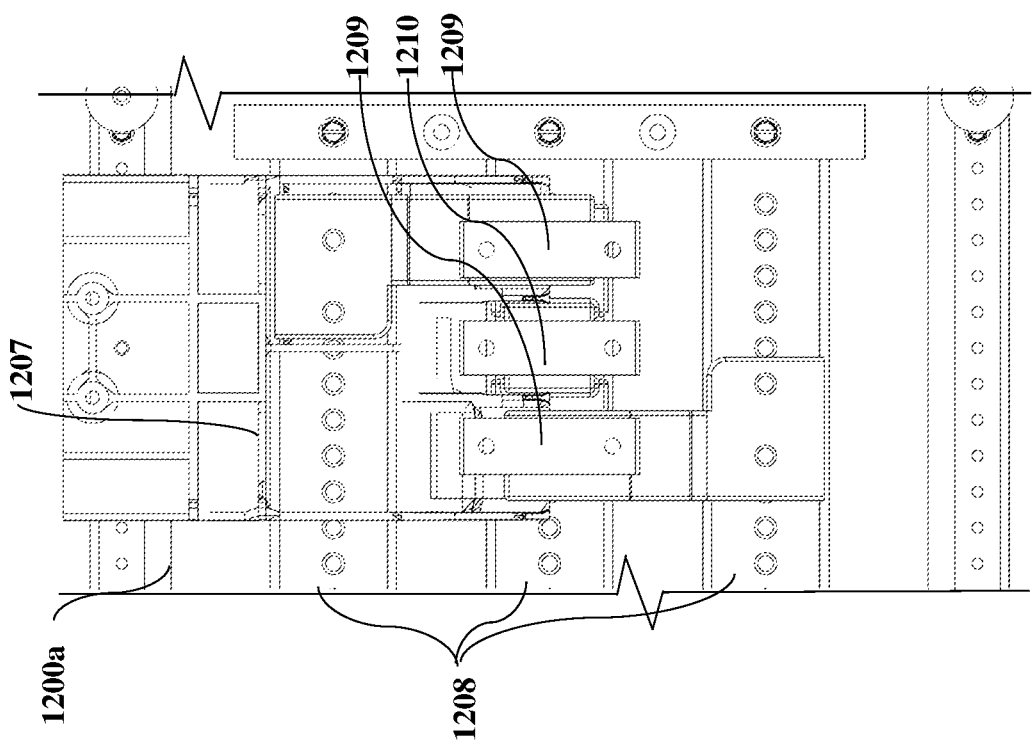
Figure 30F:
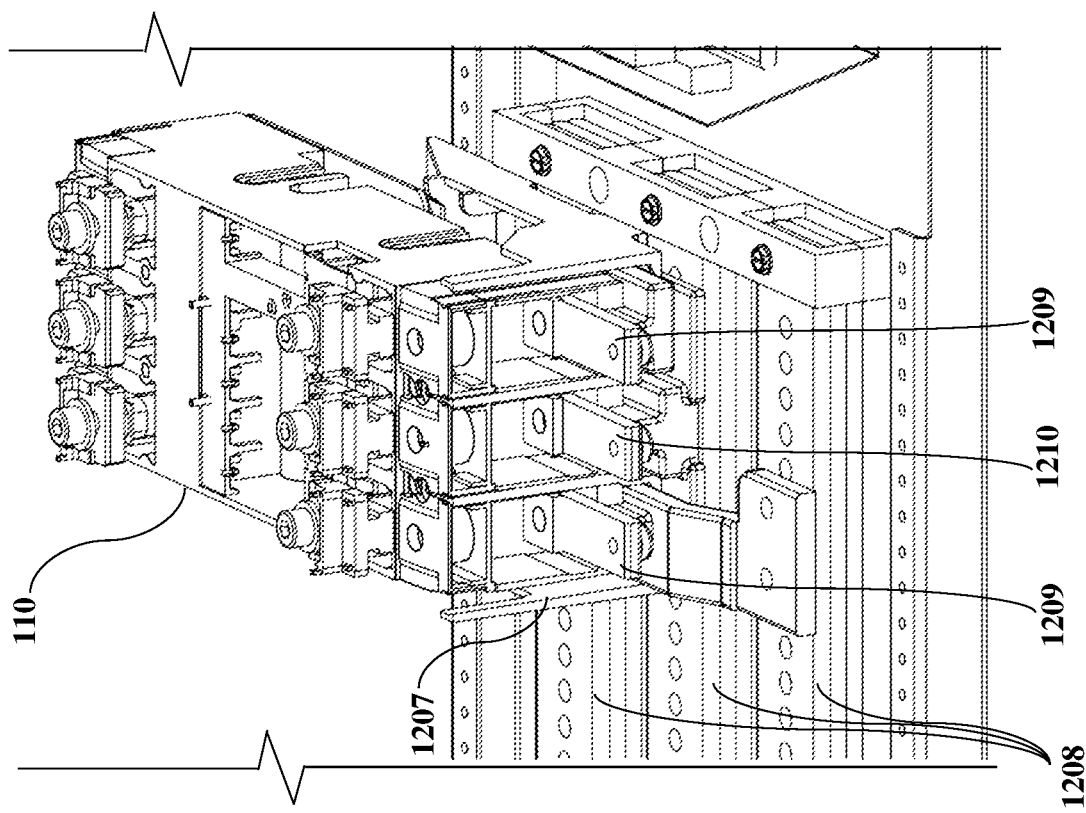
Figure 30E:
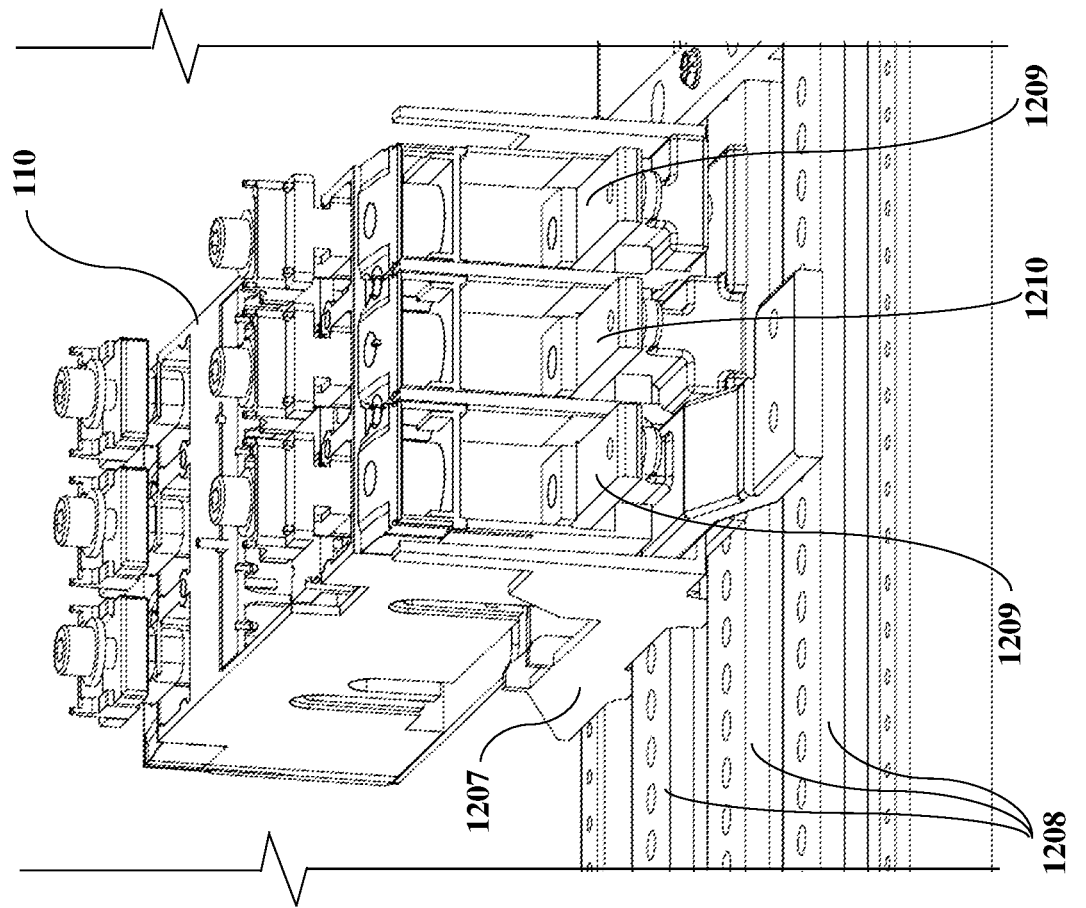
Figure 30G:
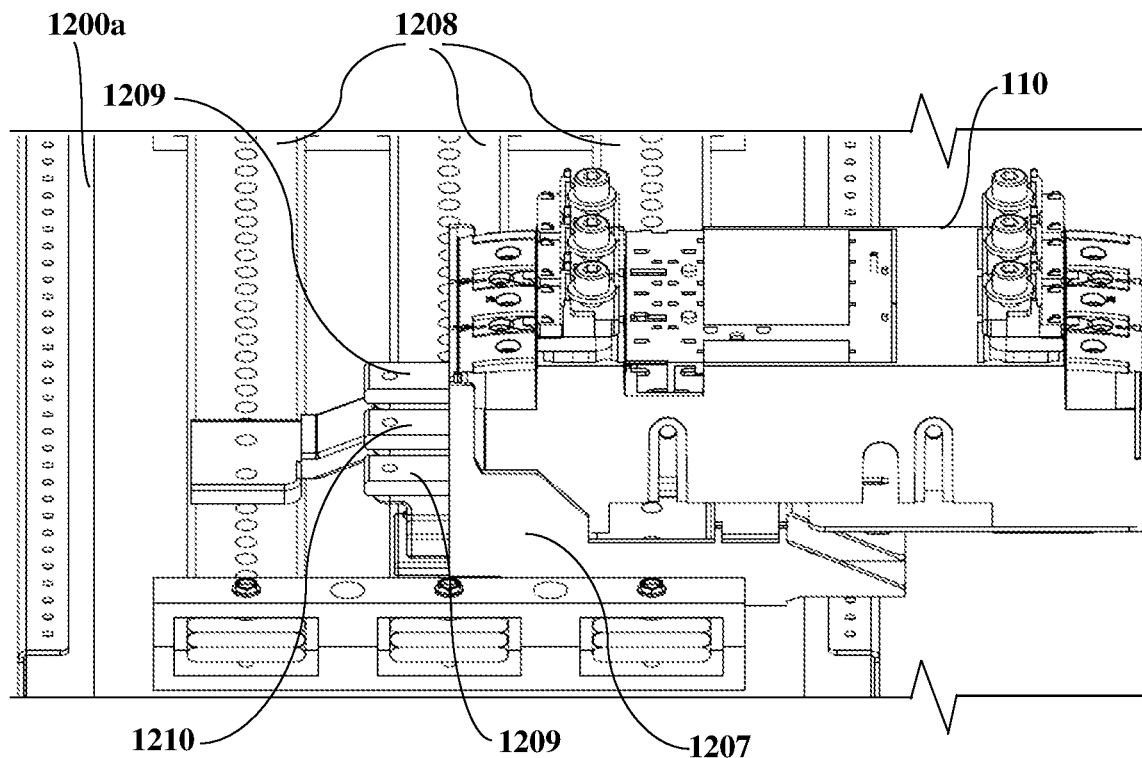
Figure 30H:
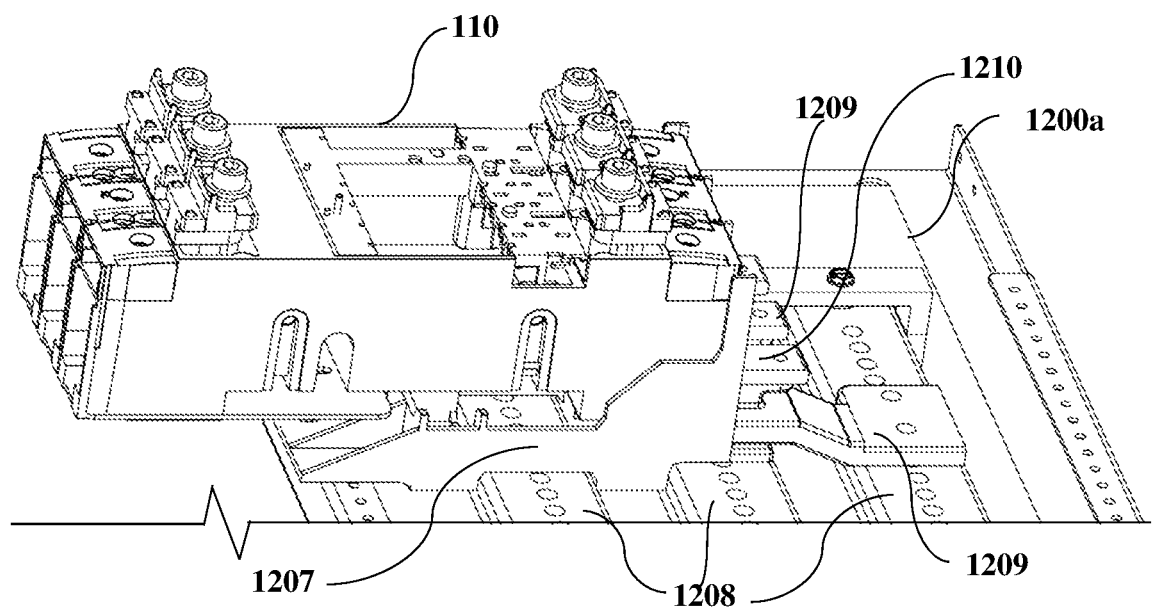
Figure 30I:
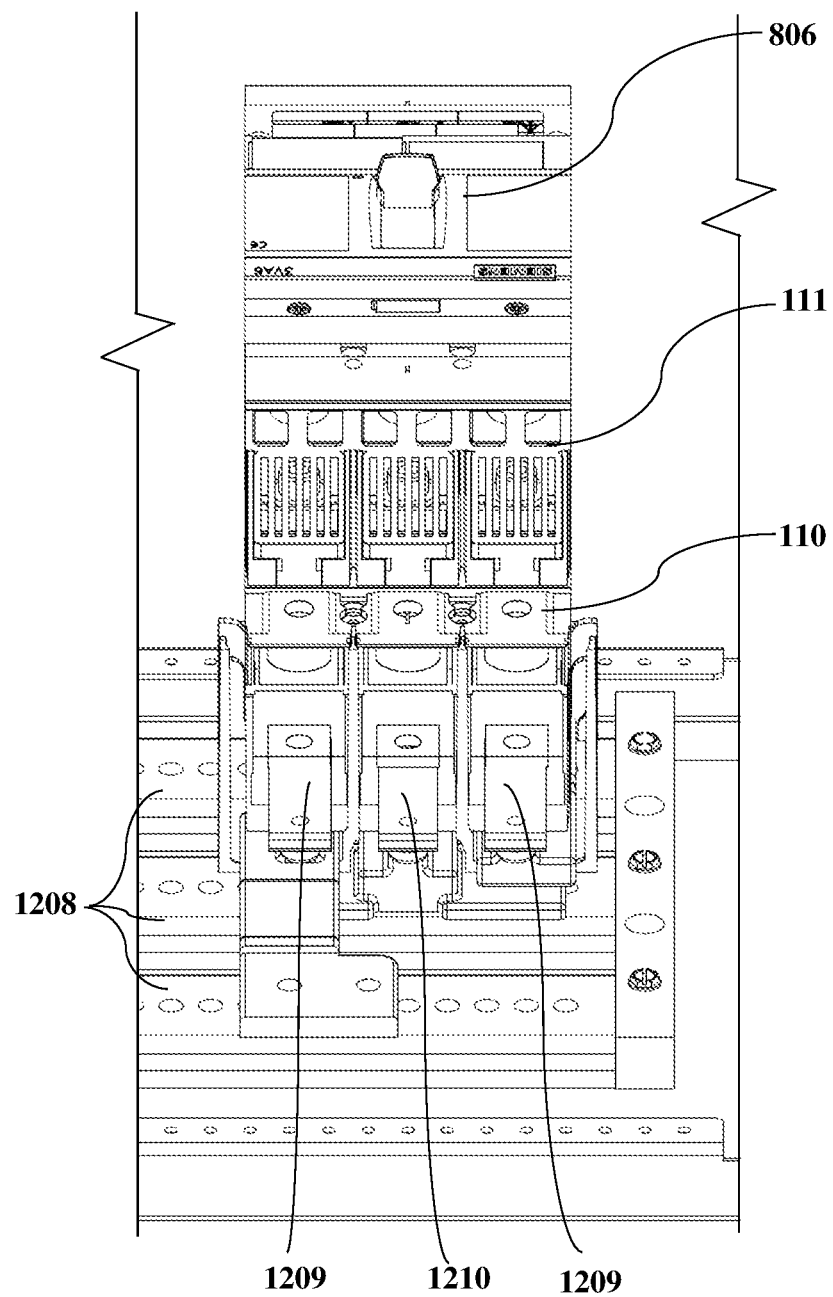

FIGS. 30A-30I illustrate a method for installing a plug-in breaker, for example, 806 into the panel 1200a of an embodiment of a wall-mounted, modular plug-in power distribution panel assembly (MPIPDPA) 1200 shown in FIGS. 12A-12B. In an example, a B-phase bus strap 1210 illustrated in FIGS. 12A-12B and FIGS. 14A-14D, is first installed on the main bus 1208 as illustrated in FIG. 30A. A barrier 1207 is then installed on the main bus 1208 as illustrated in FIG. 30B. A-phase and C-phase bus straps 1209 illustrated in FIGS. 13A-13E, are then installed on the main bus 1208 over the barrier 1207 as illustrated in FIG. 30C. A plug-in base 110 is then installed within the barrier 1207 as illustrated in FIGS. 30D-30H. The bus straps 1209 and 1210 connect the plug-in base 110 to phases A, B, and C of the main bus 1208. A plug-in breaker 806, for example, a 3 VA breaker, with a vented lug cover 111, is then detachably coupled to the plug-in base 110 as illustrated in FIG. 30I. FIGS. 30E-30H illustrate perspective views of the phase barrier 1207 and the bus connections formed by the bus straps 1209 and 1210 after installation. FIGS. 30E-30H illustrate perspective views showing the barrier 1207 positioned below the plug-in base 110. The barrier 1207 is used for the plug-in base 110 that operably couples to a plug-in breaker 806. A phase separation partition is configured as part of the plug-in base 110 to ensure there is no loss of functionality or compromise in safety by modifying the barrier 1207 to fit the plug-in base 110.

Figure 31:
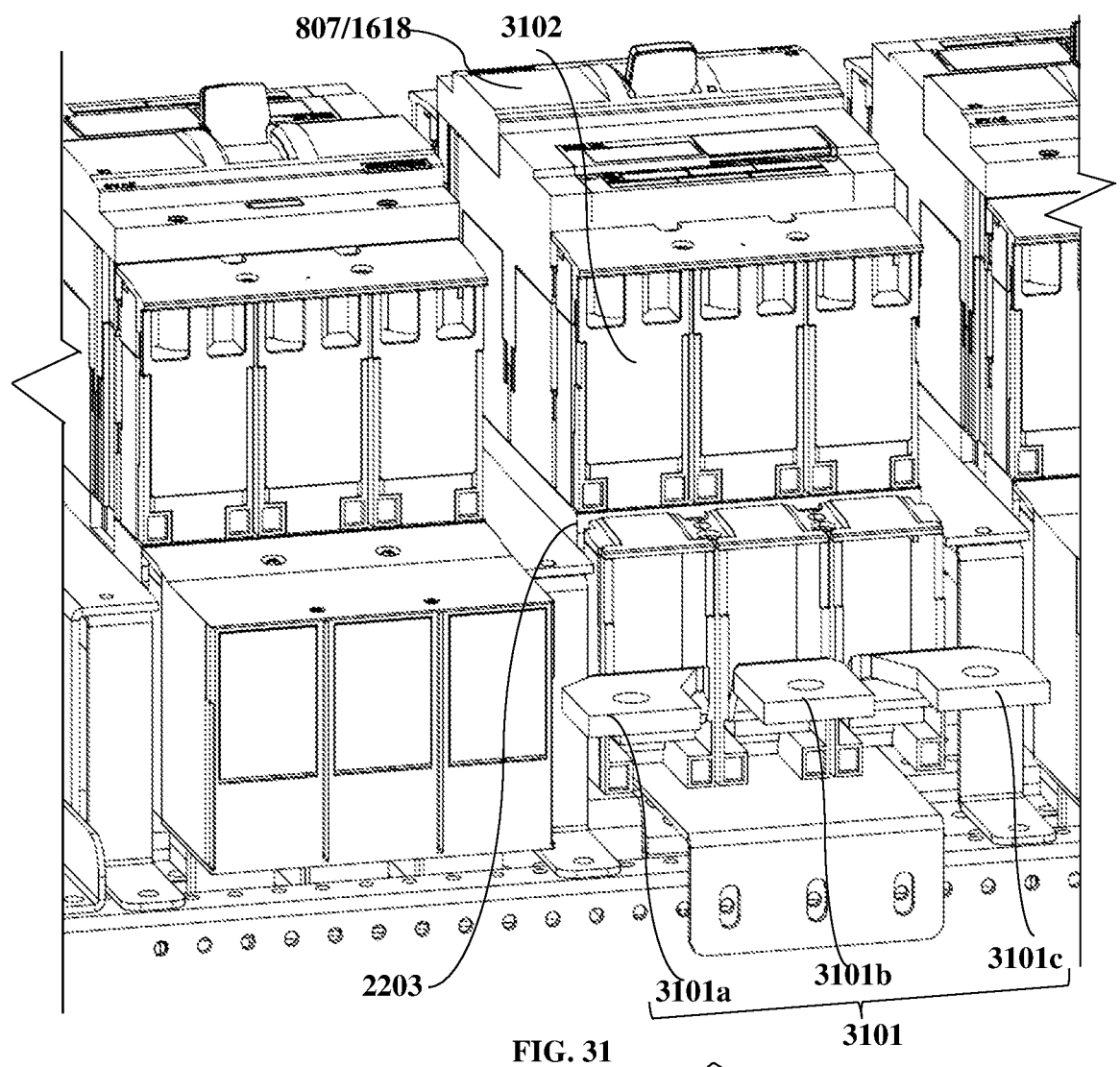
FIG. 31 illustrates a 600 A plug-in breaker operably coupled to a plug-in base, showing an embodiment of bus extensions that connect to output terminals of the plug-in base of the modular plug-in power distribution panel assembly.

FIG. 31 illustrates a 600 A plug-in breaker 807/1618 operably coupled to a plug-in base 2203, showing bus extensions 3101 that connect to output terminals of the plug-in base 2203 of the modular plug-in power distribution panel assembly. Heat sinks (not shown in FIG. 31) and aluminum lugs are configured to be mounted on the bus extensions 3101. FIG. 31 shows the 600 A bus extensions 3101a, 3101b, and 3101c for phases A, B, and C, respectively. The A-phase and C-phase bus extensions 3101a and 3101c, respectively, are configured as zig-zag buses, and the B-phase bus extension 3101b is configured as a straight bus. Also illustrated in FIG. 31 is a lug cover 3102 without vents, attached to the terminals of a breaker 3102.

Figure 32:
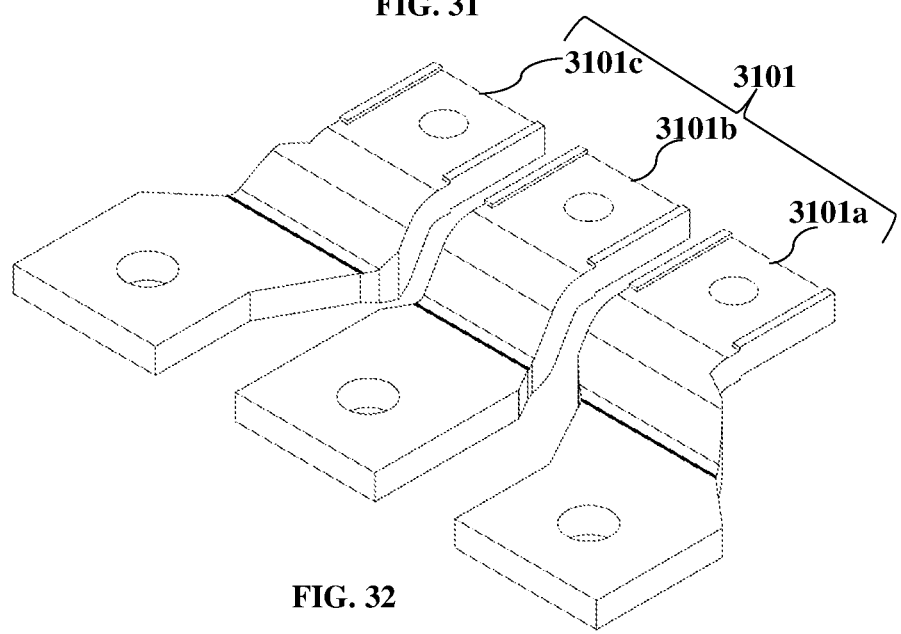
FIG. 32 illustrates a perspective view of the embodiment of the bus extensions implemented in the bus bar assembly of the modular plug-in power distribution panel assembly.

FIG. 32 illustrates a perspective view of the embodiment of the bus extensions 3101 implemented in the bus bar assembly of the modular plug-in power distribution panel assembly. The bus extensions 3101 are used for bus connections to a 600 A plug-in breaker 807/1618 as illustrated in FIG. 31. The bus extensions 3101 are made, for example, from tin-plated copper. The bus extensions 3101 comprise an A-phase bus extension 3101a, a B-phase bus extension 3101b, and a C-phase bus extension 3101c. The B-phase bus extension 3101b is a straight bus while the A-phase bus extension 3101a and the C-phase bus extension 3101c are zig-zag buses.

Figure 33D:
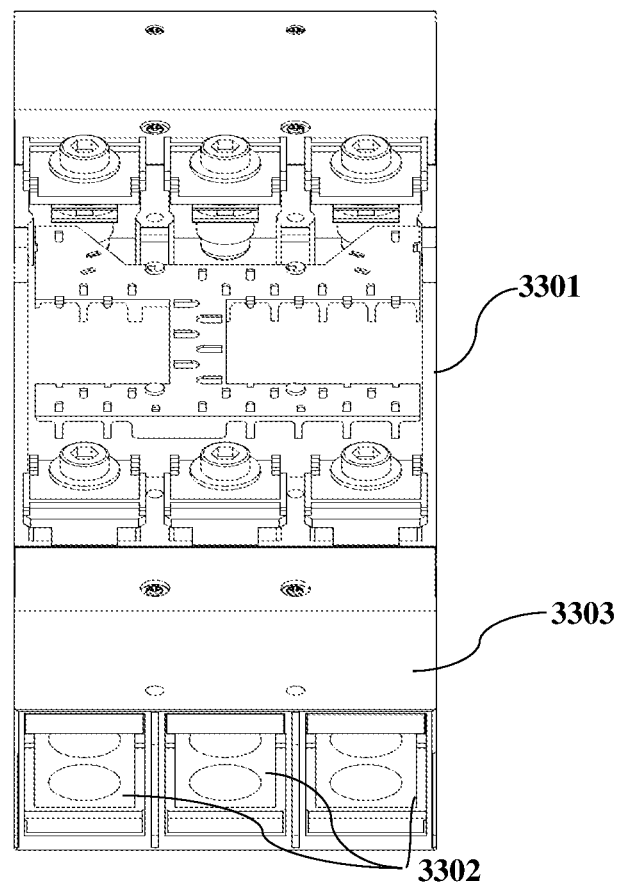
FIG. 33D illustrates a top view of a plug-in base for a 400 A plug-in breaker.

FIG. 33A illustrates a perspective view of a plug-in base 3301, showing output lugs 3302 connected to terminals of the plug-in base 3301. The plug-in base 3301 is configured to operably couple to a 400 A plug-in breaker. In an embodiment, the plug-in base 3301 is configured to operably couple to a 600 A plug-in breaker. While the plug-in base 3301 is the same for the 400 A plug-in breaker and the 600 A plug-in breaker, the bus straps and output connections are different. When 400 A plug-in breakers are used, the MPIPDPA is configured to feed power to more loads that may be beneficial in some cases. For example, in the MPIPDPA 800 disclosed in the description of FIG. 11B, there are ten 250 A plug-in breakers and four 600 A plug-in breakers. If 400 A plug-in breakers are used, ten 250 A plug-in breakers and six 400 A plug-in breakers can be accommodated in the same MPIPDPA 800. The output lugs 3302 are, for example, tin-plated copper lugs, as illustrated in FIG. 33A and FIGS. 33C-33D. The appearance of aluminum lugs is similar or identical to the tin-plated copper lugs illustrated in FIG. 33A and FIGS. 33C-33D. Aluminum lugs weigh less than tin-plated copper lugs.

FIG. 33B illustrates a perspective view of an embodiment of a lug cover 3303 configured to cover the output lugs 3302 shown in FIG. 33A. The lug cover 3303 is configured with openings 3303a to accommodate a configurable number of cables of different sizes.

FIG. 33C illustrates a perspective view showing the lug cover 3303 covering the output lugs 3302 connected to the terminals of the plug-in base 3301 shown in FIG. 33A. The lug cover 3303 is positioned over the output lugs 3302 as illustrated in FIG. 33C.

FIG. 33D illustrates a top view of a plug-in base 3301 for a 400 A plug-in breaker. The lug cover 3303 is positioned over the output lugs 3302 that are connected to the terminals of the plug-in base 3301.

Figure 34:
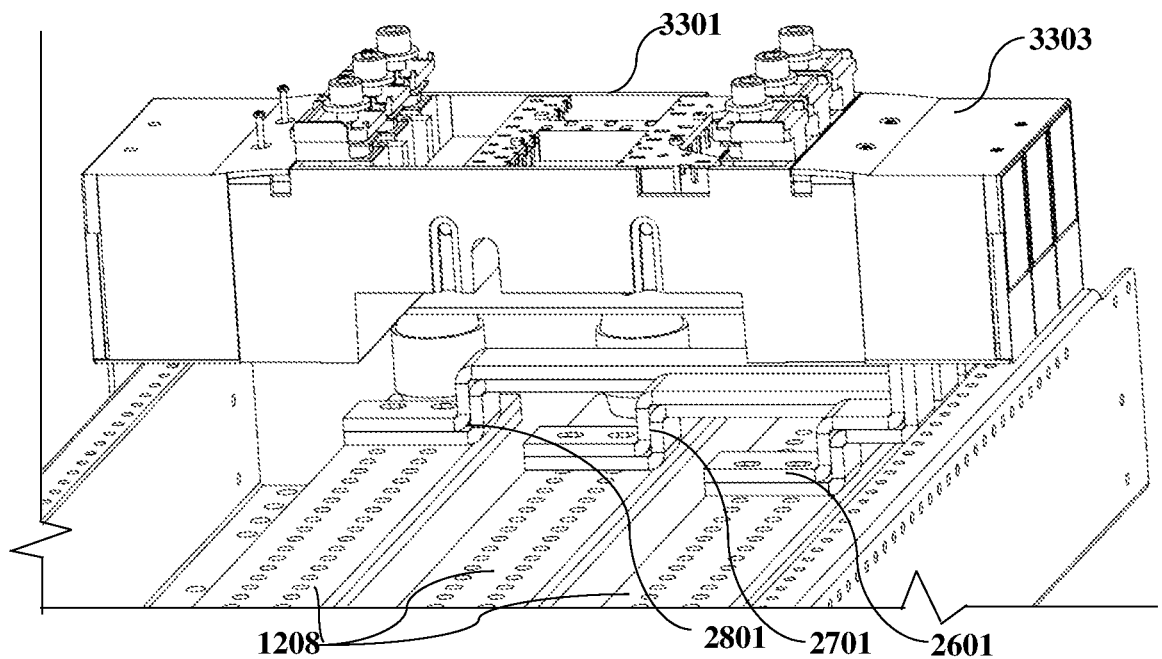
FIG. 34 illustrates input bus and output connections of a 400 A plug-in breaker in an embodiment of the modular plug-in power distribution panel assembly.

FIG. 34 illustrates input bus and output connections of the 400 A plug-in breaker in an embodiment of the modular plug-in power distribution panel assembly (MPIPDPA). FIG. 34 illustrates a main bus 1208 and bus straps 2601, 2701, and 2801 for the 400 A plug-in breaker. The bus straps 2601, 2701, and 2801 are connected the main bus 1208 as illustrated in FIG. 34. The main bus 1208 and the bus straps 2601, 2701, and 2801 facilitate input bus connections of the 400 A plug-in breaker. The bus straps 2601, 2701, and 2801 of the type illustrated in FIGS. 26A-26E, FIGS. 27A-27E, and FIGS. 28A-28E, respectively, electrically connect the plug-in base 3301, and in turn, the 400 A plug-in breaker coupled thereto, to the main bus 1208 as illustrated in FIG. 34. In an embodiment, the bus configuration illustrated in FIG. 34 is implemented for a power distribution panel similar to the power distribution panel section 1602 that is connected to the transformer section 1601 of the modular plug-in power distribution panel assembly (MPIPDPA) 1600 illustrated in FIGS. 16A-16E. In an embodiment, bus extensions are not required for accommodating 400 A plug-in breakers, and hence additional 400 A plug-in breakers can be accommodated in the power distribution panel section 1602 of the MPIPDPA 1600.

Figure 35A:
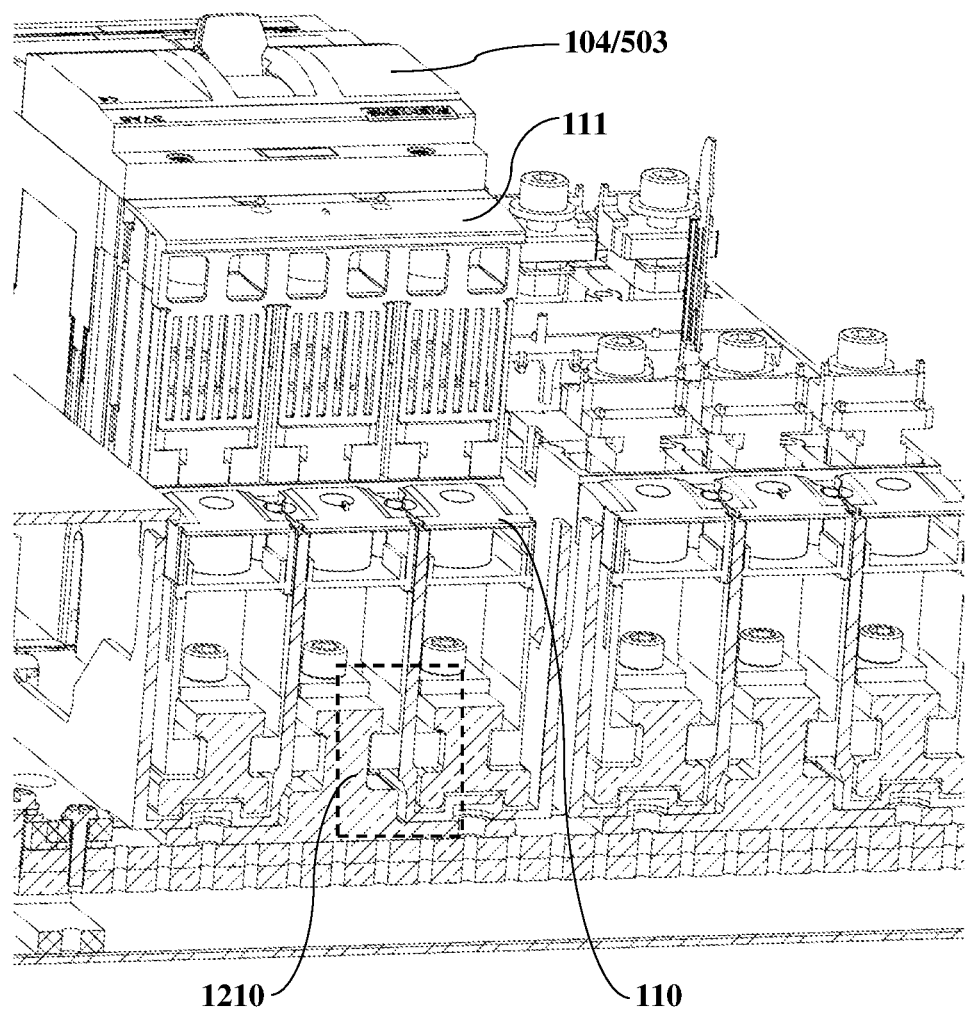
FIGS. 35A-35C illustrate an engineering design element addressed in the modular plug-in power distribution panel assembly.
Figure 35B:
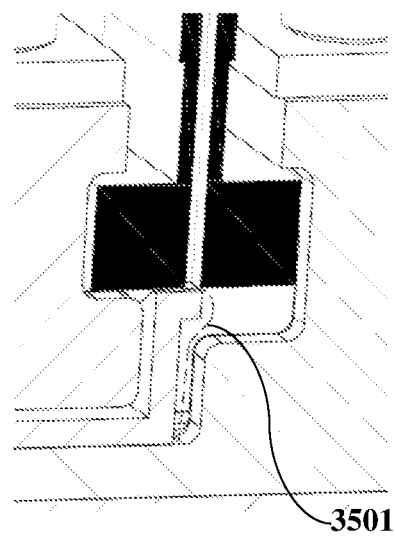
Figure 35C:
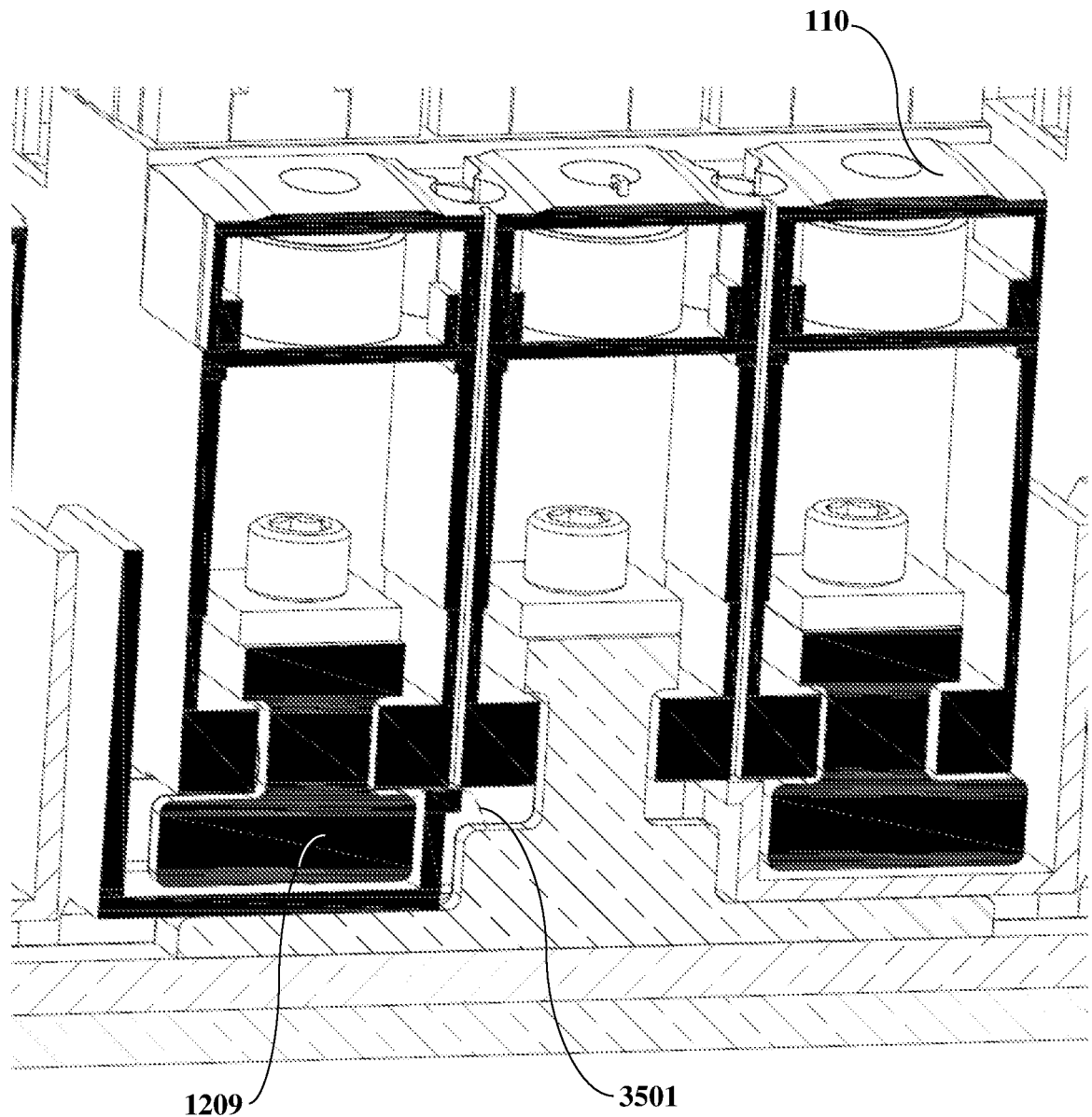

FIGS. 35A-35C illustrate an engineering design element addressed in the modular plug-in power distribution panel assembly (MPIPDPA). FIGS. 35A-35C illustrate a clearance of, for example, less than about 1 inch through air between the B-phase bus and the C-phase bus as illustrated in FIG. 35A, or between the B-phase bus and the A-phase bus as illustrated in FIG. 35C. FIGS. 35A-35C also illustrate a creepage of, for example, less than about 2 inches between the B-phase bus and the C-phase bus as illustrated in FIG. 35A, or between the B-phase bus and the A-phase bus as illustrated in FIG. 35C. The line 3501 illustrated in FIGS. 35B-35C indicates the clearance and creepage between the buses. Clearance is the distance between two electrical conductors through air. Creepage refers to the shortest distance along a surface of a solid insulating material between two electrical conductors. In an embodiment, epoxy coated B-phase bus straps 1210 illustrated in FIGS. 14A-14D, are provided with a substantially thin insulation of thickness, for example, between about 0.2 mm and 0.3 mm. In an example, epoxy resin DK 15-0463 from SolEpoxy, Inc., suitable for a low voltage is used to coat the B-phase bus straps 1210. The epoxy resin DK 15-0463 from SolEpoxy, Inc., is UL certified at a thickness of 0.51 mm. For safety reasons and requirements of the Underwriters Laboratories (UL) panelboard standard UL 67, a minimum of 1-inch clearance through air and 2-inch creepage via an insulating surface is required. On close examination, the clearance between phases A and B and B and C is slightly less than 1 inch, for example, about 0.95 inches. By coating the B-phase bus strap 1210 with the low voltage epoxy, the MPIPDPA disclosed herein meets the requirement of the UL 67 standard and ensures the safety of the MPIPDPA. This application requires an epoxy coating that is UL certified, having a substantially reduced thickness, for example, about 0.25 mm to about 0.30 mm, for ensuring operability of the MPIPDPA. UL flame and insulation tests have been conducted with the reduced thickness to ensure that the MPIPDPA is safe.

Figure 36B:
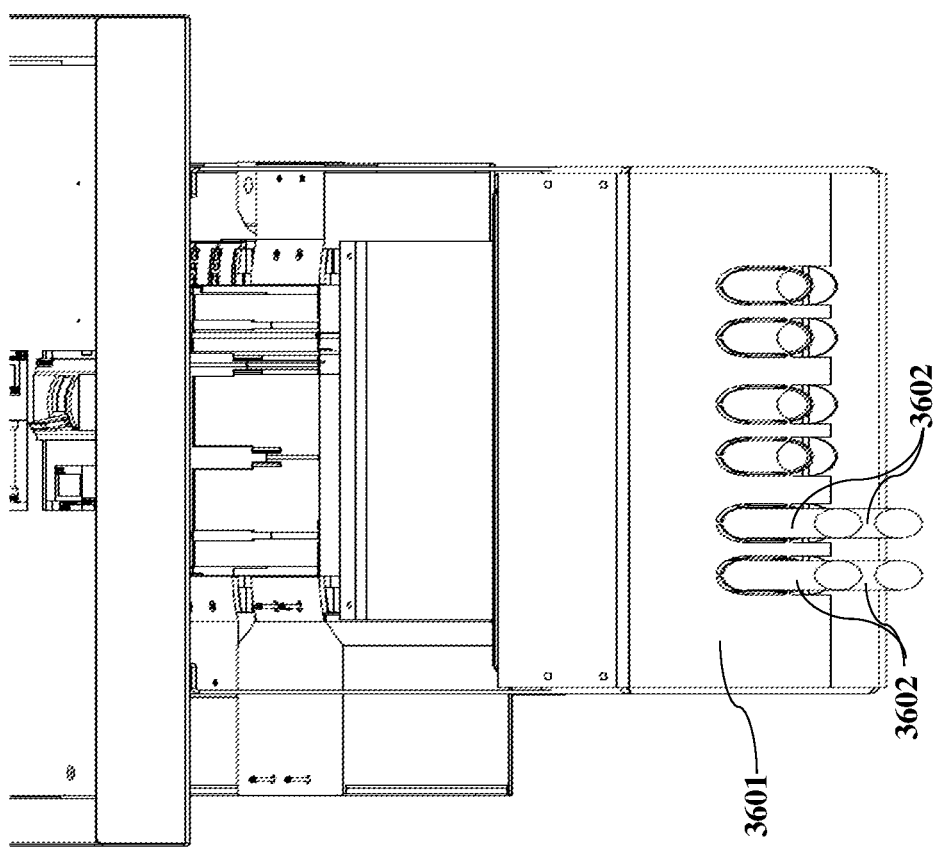
FIGS. 36A-36B illustrate bottom views showing a flexible cover configured to accommodate a varying number of incoming cables per phase in the modular plug-in power distribution panel assembly.
Figure 36A:
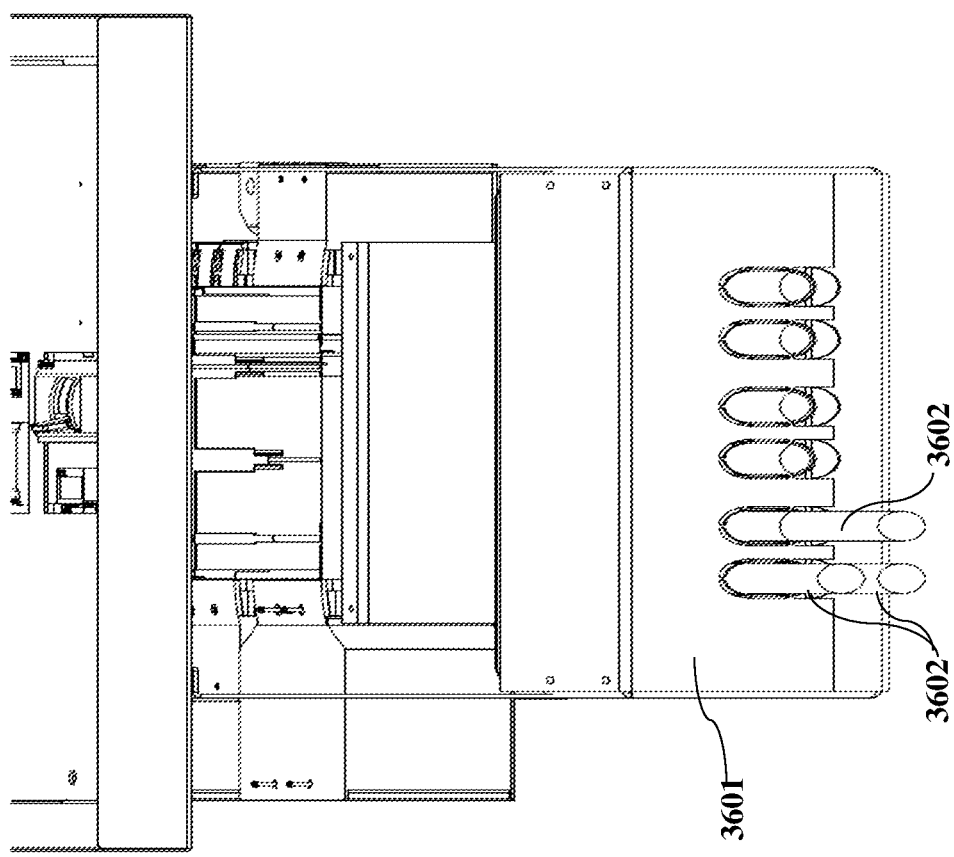

FIGS. 36A-36B illustrate bottom views showing a flexible cover 3601 configured to accommodate a varying number of incoming cables 3602 per phase in the modular plug-in power distribution panel assembly (MPIPDPA) 500/800 shown in FIG. 6 and FIGS. 9A-9B. In an embodiment, the MPIPDPA 500/800 further comprises flexible covers 3601 configured for the main lugs, for example, 504 and 808 illustrated in FIG. 6 and FIGS. 9A-9B, respectively. The flexible covers 3601 are made of a polycarbonate resin thermoplastic material, for example, a Lexan® material. The flexible covers 3601 are configured to accommodate a configurable number of incoming cables 3602 of different sizes. For example, the flexible covers 3601 accommodate incoming cables 3602 having dimensions of 3×600 MCM or thousand circular mils, where 1 MCM=1 kcmil=0.5067 square millimeter, as illustrated in FIG. 36. In another example, the flexible covers 3601 accommodate incoming cables 3602 having dimensions of 4×500 MCM. In another example, 2×350 MCM copper cables are used for 100%-rated, 600 A breakers. In an embodiment as illustrated in FIG. 36, the flexible covers 3601 are configured as Lexan® guards which serve as supplementary barriers for protecting the main lugs 504 and 808.

Figure 37A:
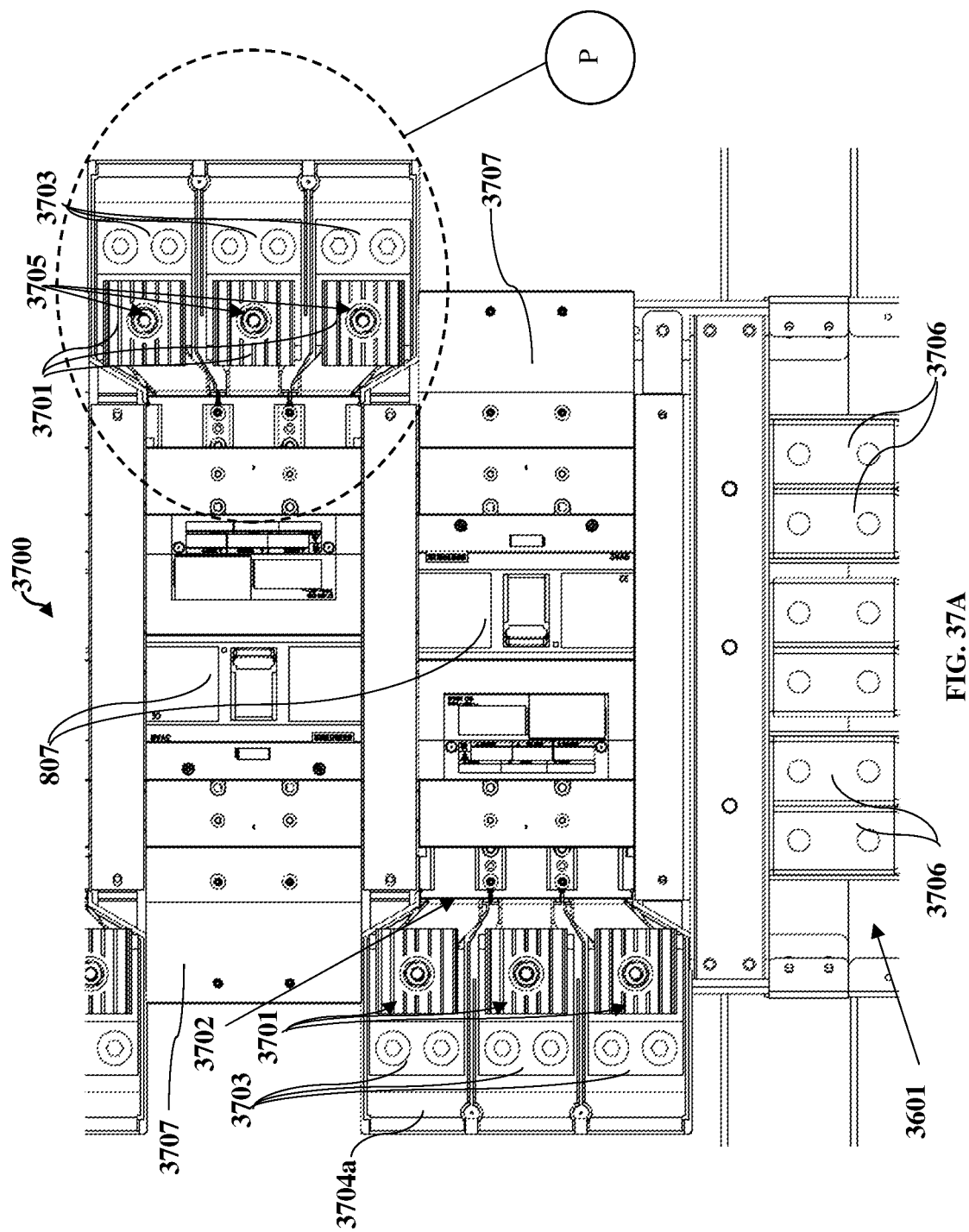
FIG. 37A illustrates a front, partial view of an embodiment of the modular plug-in power distribution panel assembly comprising a 1200 A power distribution panel, showing two 100%-rated, 600 A plug-in breakers and heat sinks operably coupled to terminals of the 600 A plug-in breakers.

FIG. 37A illustrates a front, partial view of an embodiment of the modular plug-in power distribution panel assembly (MPIPDPA) 3700 comprising a 1200 A power distribution panel, showing two 100%-rated, 600 A plug-in breakers 807 and heat sinks 3701 operably coupled to terminals 3702 of the 600 A plug-in breakers 807. Also illustrated in FIG. 37A are mechanical lugs 3703 and bases 3704a of the lug covers 3704 shown in FIG. 37D. The mechanical lugs 3703 are made of aluminum for implementing 100%-rated, 600 A plug-in breakers 807. The mechanical lugs 3703 are used for breaker output connections. The mechanical lugs 3703 are operably coupled to the heat sinks 3701 and disposed on the bases 3704a of the lug covers 3704 as illustrated in FIG. 37A. The heat sinks 3701 are fastened to the mechanical lugs 3703, for example, using strong bolts 3705. The lug covers 3704, in this embodiment, are free of vents or openings, thereby enhancing the touch-safe feature of the MPIPDPA 3700. Also illustrated in FIG. 37A are bus covers 3707 configured to cover line buses 3801, 3802, and 3803 (not shown in FIG. 37A) extending from a plug-in base 2203 shown in FIGS. 38A-38E and FIG. 38G. The bus covers 3707 are positioned over the line buses 3801, 3802, and 3803. Also illustrated in FIG. 37A is a flexible cover 3601 configured to accommodate a varying number of incoming cables per phase in the MPIPDPA 3700. The flexible cover 3601 covers the main lugs 3706 extending below the 100%-rated, 600 A plug-in breakers 807. The flexible cover 3601 is configured as a Lexan® guard for protecting the main lugs 3706. The main lugs 3706 used for the 100%-rated, 600 A plug-in breakers 807 are made of high strength aluminum alloy, are tin-plated, and can accommodate both copper and aluminum cables.

Figure 37B:
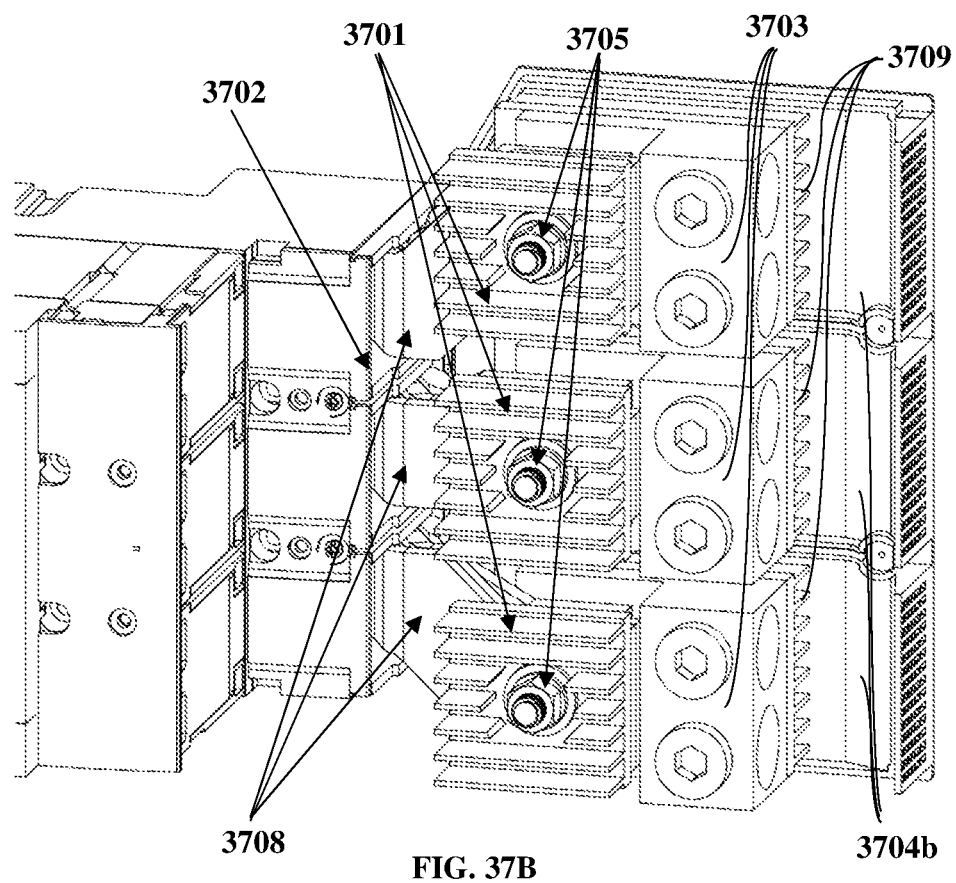
FIG. 37B illustrates an enlarged, perspective view of a section marked P in FIG. 37A, showing the heat sinks and mechanical lugs operably coupled to the terminals of the 100%-rated, 600 A plug-in breakers.
Figure 37C:
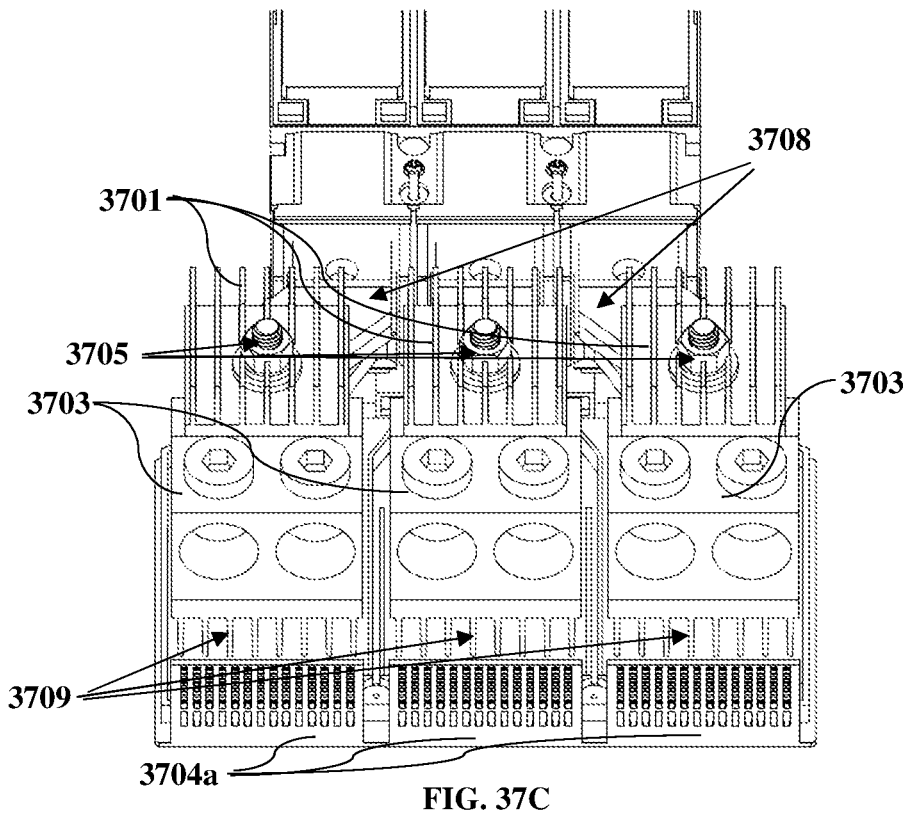
FIG. 37C illustrates a side view of the section marked P in FIG. 37A, showing the heat sinks and the mechanical lugs.
Figure 37D:
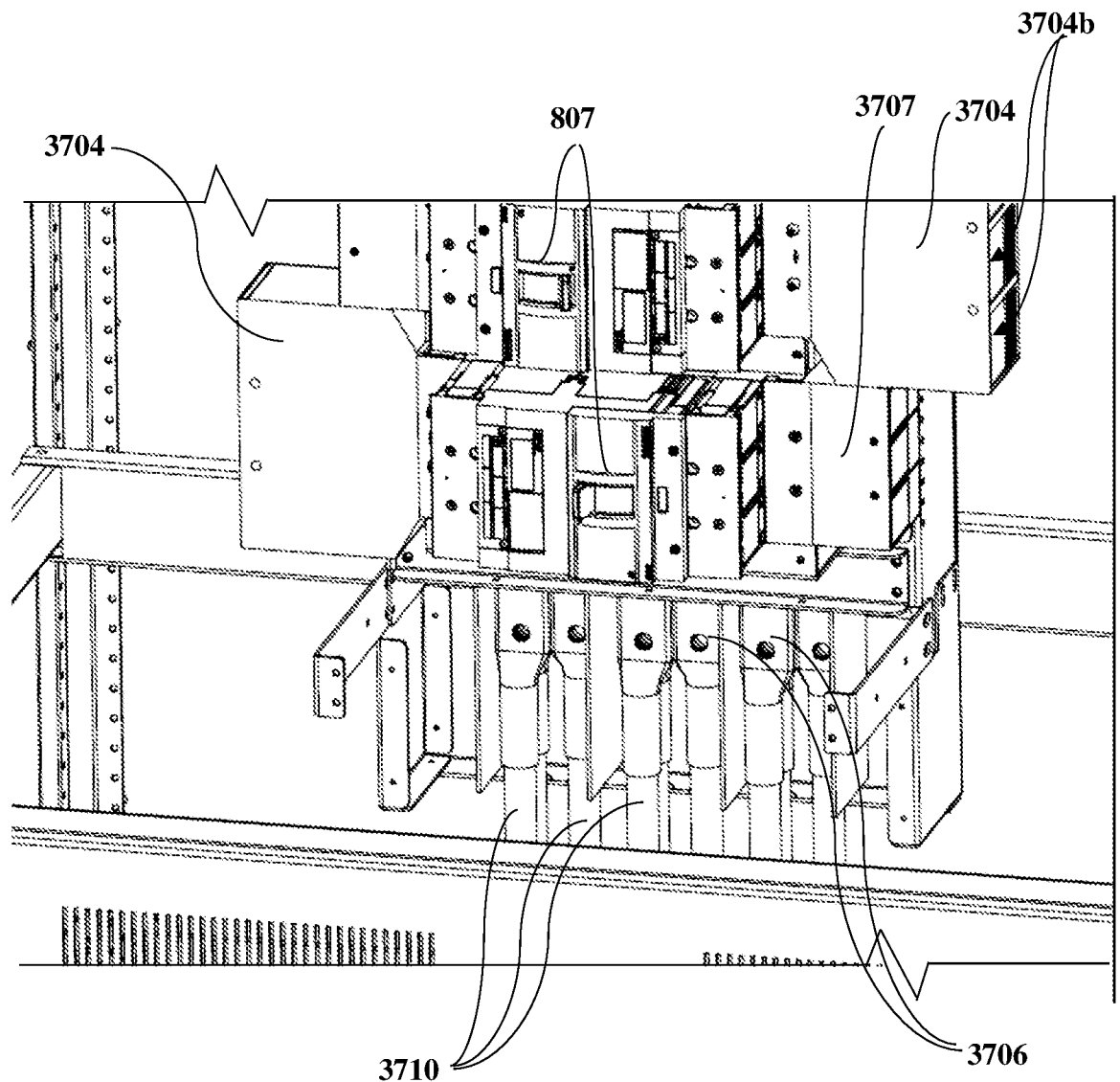
FIG. 37D illustrates a front, partial view of a bottom portion of the embodiment of the modular plug-in power distribution panel assembly, showing lugs operably coupled to bus bar extensions of the modular plug-in power distribution panel assembly shown in FIG. 37A.

FIG. 37B illustrates an enlarged, perspective view of a section marked P in FIG. 37A, showing the heat sinks 3701 and the mechanical lugs 3703 operably coupled to the terminals 3702 of the 100%-rated, 600 A plug-in breakers 807. Smaller sized upper heat sinks 3701 of dimensions, for example, about 2.0625 inches×2.125 inches, are disposed above the mechanical lugs 3703. Similar to the upper heat sinks 3701 illustrated in FIG. 37A, larger sized heat sinks 3709 of dimensions, for example, about 2.406 inches×3.562 inches, are disposed below the mechanical lugs 3703 as illustrated in FIGS. 37B-37C. Also illustrated in FIG. 37B are load buses 3708 that connect the mechanical lugs 3703 to the terminals 3702 of the 100%-rated, 600 A plug-in breakers 807 and facilitate breaker load connections. In an embodiment, the output buses, that is, the load buses 3708 illustrated in FIG. 37B, are insulated with electrical tape or Raychem insulation to provide load side bus insulation and enhance the radiation heat transfer. Since the output bus assembly, also referred to as a load side bus assembly 3800b illustrated in FIGS. 38A-38E and FIG. 38G, is covered by a lug cover 3704 that has no vents as illustrated in FIG. 37D, which enhances the touch-safe feature, the cooling of the output connections is predominantly performed via conduction and radiation. Black anodized heat sinks 3701 and 3709 provide significant cooling by absorbing heat and radiating the heat to the ambient environment to minimize the temperature rise at breaker terminals 3702 and cable connections at the mechanical lugs 3703.

FIG. 37C illustrates a side view of the section marked P in FIG. 37A, showing the heat sinks 3701 and 3709 and the mechanical lugs 3703. The smaller sized upper heat sinks 3701 and the larger sized lower heat sinks 3709 are disposed above and below the mechanical lugs 3703, respectively, as illustrated in FIG. 37C. The heat sinks 3701 and 3709 with the mechanical lugs 3703 are operably coupled to the terminals 3702 of the 100%-rated, 600 A plug-in breakers 807 shown in FIG. 37A. The heat sinks 3701 and 3709 are made of aluminum and are black anodized. The heat sinks 3701 and 3709 are configured to cool the output terminals 3702 of the 100%-rated, 600 A plug-in breakers 807. The heat sinks 3701 and 3709 enhance cooling of the terminals 3702 of the 100%-rated, 600 A plug-in breakers, for example, by natural conduction, convection, and radiation. In an embodiment, thermal grease is added to the heat sinks 3701 and 3709 to enhance heat transfer. Also illustrated in FIG. 37C are the bases 3704a of the lug covers 3704 shown in FIG. 37D, free of vents or openings.

FIG. 37D illustrates a front, partial view of a bottom portion of the embodiment of the modular plug-in power distribution panel assembly (MPIPDPA) 3700 shown in FIG. 37A, showing the main lugs 3706 operably coupled to bus bar extensions of the MPIPDPA 3700. The flexible cover 3601 (not shown in FIG. 37D) illustrated in FIGS. 36A-36B, is configured to accommodate main cables 3710 per phase in the MPIPDPA 3700. Insulation tape is used to support and protect the main cables 3710 at a bottom surface of the MPIPDPA 3700. The flexible cover 3601 made, for example, of a Lexan® material, covers and protects the main lugs 3706 as illustrated in FIG. 37D. Also illustrated in FIG. 37D are lug covers 3704 free of vents or openings and configured to cover the heat sinks 3701 and 3709 and the mechanical lugs 3703 of the load side bus assembly 3800b illustrated in FIGS. 37A-37C and FIGS. 38A-38E and FIG. 38G. The lug covers 3704 are flexible covers configured to also cover cables that are connected to the mechanical lugs 3703 in the MPIPDPA 3700. In an embodiment, the lug covers 3704 are attached to the terminals 3702 of the 100%-rated, 600 A plug-in breaker 807. In an embodiment, the cables are connected to the breaker terminals 3702 via openings 3704b or ports configured in the lug covers 3704. Also illustrated in FIG. 37D are bus covers 3707 configured to cover the line buses 3801, 3802, and 3803 (not shown in FIG. 37D) extending from the plug-in base 2203 shown in FIGS. 38A-38E and FIG. 38G.

Figure 38A:
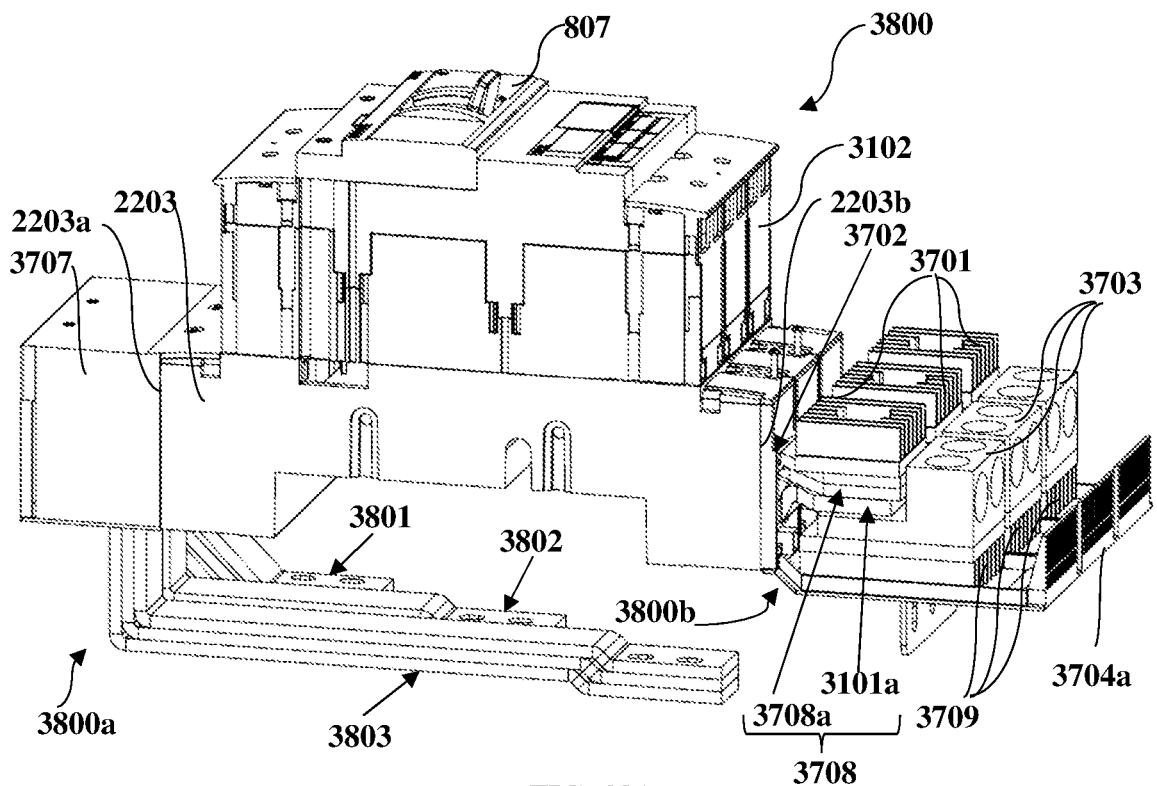
FIGS. 38A-38B illustrate perspective views of an embodiment of a breaker assembly of the modular plug-in power distribution panel assembly shown in FIG. 37A, showing an embodiment of a line side bus assembly and a load side bus assembly configured for bus connections to the 100%-rated, 600 A plug-in breakers of the modular plug-in power distribution panel assembly.
Figure 38B:
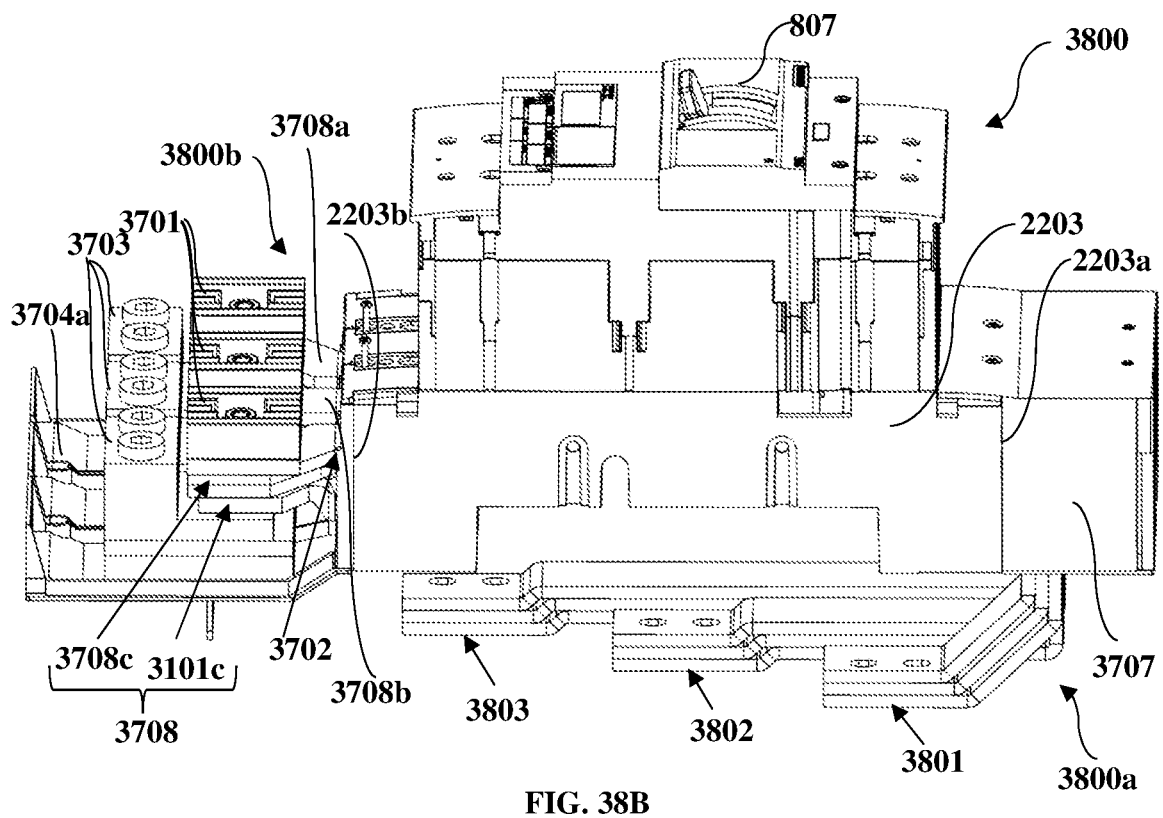
Figure 38C:
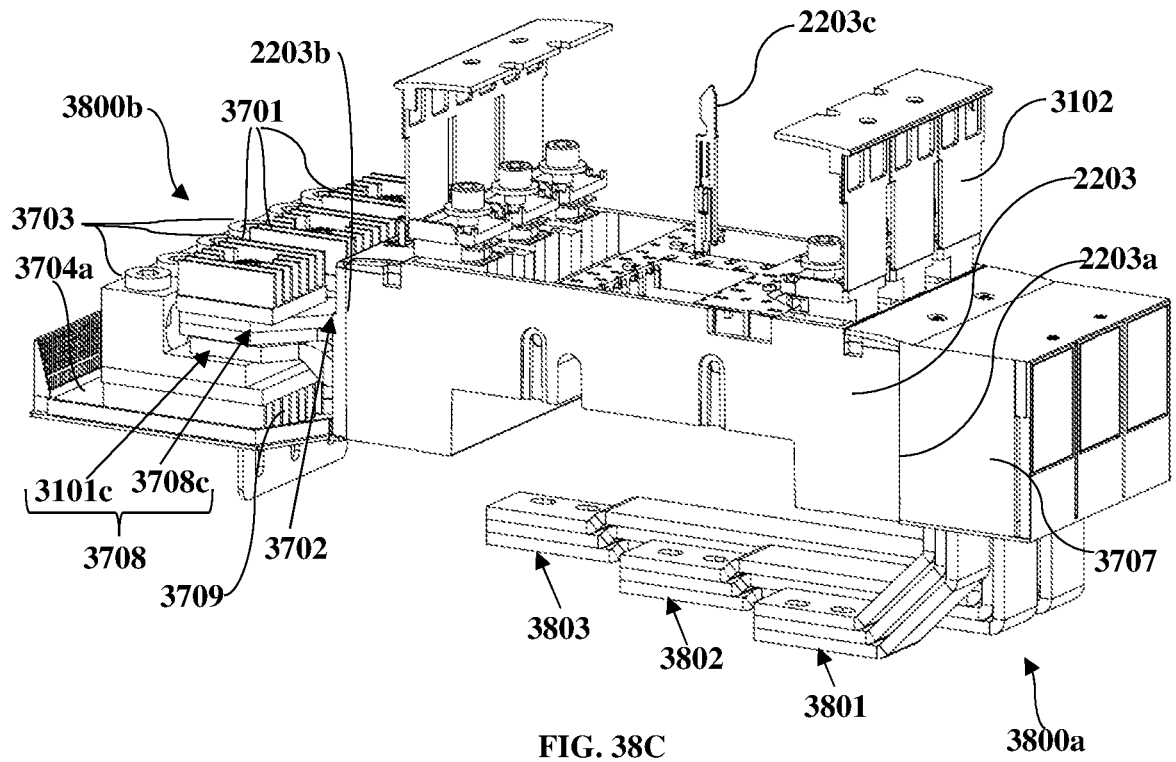
FIG. 38C illustrates a perspective view of the embodiment of the breaker assembly without the breaker shown in FIGS. 38A-38B, showing the line side bus assembly and heat sinks disposed on load buses of the load side bus assembly.
Figure 38D:
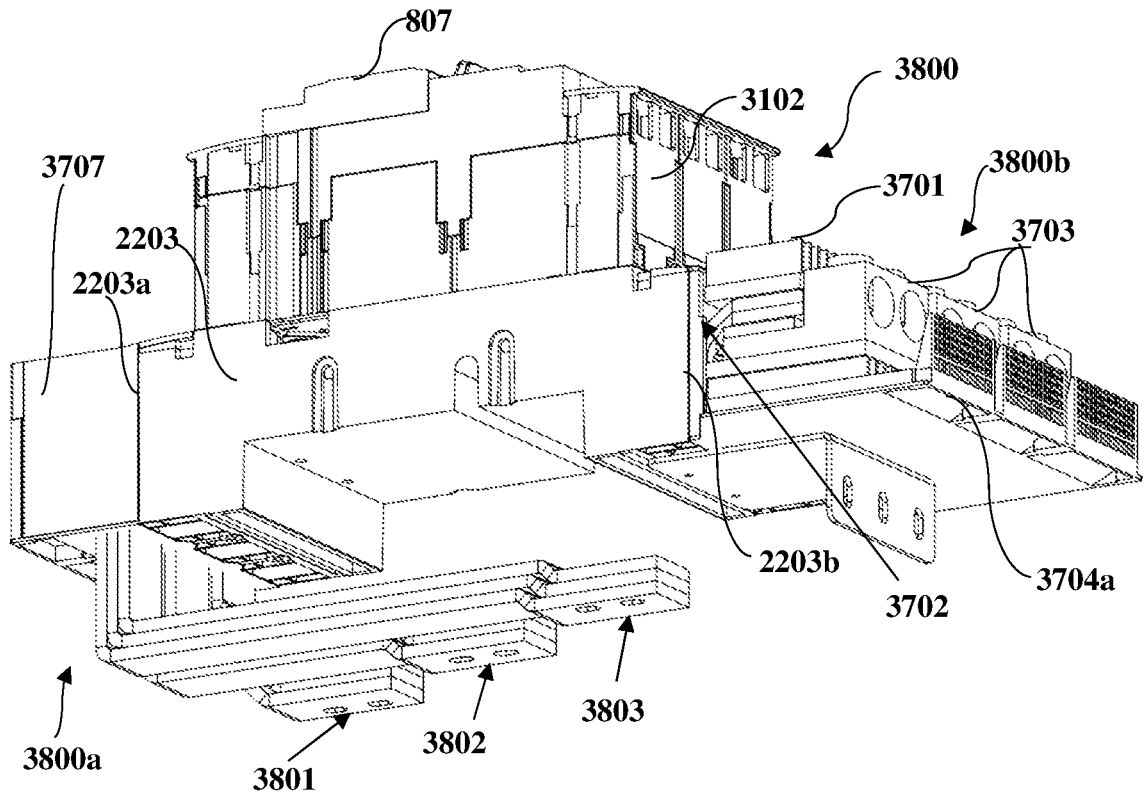
FIG. 38D illustrates a bottom perspective view of the embodiment of the breaker assembly with the breaker, showing output breaker connections with heat sinks and lugs for cable connections.

FIGS. 38A-38B illustrate perspective views of an embodiment of a breaker assembly 3800 of the modular plug-in power distribution panel assembly (MPIPDPA) 3700 shown in FIG. 37A, showing an embodiment of a line side bus assembly 3800a and a load side bus assembly 3800b configured for bus connections to the 100%-rated, 600 A plug-in breakers 807 of the MPIPDPA 3700. The breaker assembly 3800 comprises the plug-in breaker 807 detachably coupled to a corresponding plug-in base 2203 in the MPIPDPA 3700. As illustrated in FIG. 38A, the line side bus assembly 3800a and the load side bus assembly 3800b are operably coupled to and extend from opposing ends 2203a and 2203b of a plug-in base 2203, respectively, for supply and distribution of electric power within the MPIPDPA 3700. The line side bus assembly 3800a comprises line buses 3801, 3802, and 3803 disposed at one end 2203a of the plug-in base 2203. The load side bus assembly 3800b comprises load buses 3708, disposed at the other end 2203b of the plug-in base 2203. Each load bus 3708 comprises a bus extension and a supplementary bus added for providing a 100% rating. For example, an A-phase load bus 3708 comprises a bus extension 3101a and a supplementary bus 3708a as illustrated in FIG. 38A; a B-phase load bus 3708 comprises a bus extension 3101b and a supplementary bus 3708b (not shown in FIGS. 38A-38G); a C-phase load bus 3708 comprises a bus extension 3101c and a supplementary bus 3708c as illustrated in FIGS. 38B-38C. The load buses 3708 are conductive bus bars that provide common connection points for electrical loads and distribute electric current or power to various sub-circuits within the MPIPDPA 3700. The line buses 3801, 3802, and 3803 are conductive bus bars that connect to a main power supply and supply incoming electric current to the load buses 3708, which then distribute the electric current to individual sub-circuits within the MPIPDPA 3700.

FIG. 38C illustrates a perspective view of the embodiment of the breaker assembly 3800 without the breaker 807 shown in FIG. 38A, showing the line side bus assembly 3800a and heat sinks 3701 disposed on the load buses 3708 of the load side bus assembly 3800b. As exemplarily illustrated in FIGS. 38A-38C, the line side bus assembly 3800a comprising the line buses 3801, 3802, and 3803 of three different configurations extends from one end 2203a of the plug-in base 2203, while the load side bus assembly 3800b comprising the load buses 3708 extends from the other end 2203b of the plug-in base 2203. The heat sinks 3701 are disposed above the load buses 3708, while the mechanical lugs 3703 extend below the load buses 3708. Additional heat sinks 3709 are disposed below the mechanical lugs 3703 as illustrated in FIGS. 38A-38B.

The line buses 3801 and 3803 are used for A and C bus phases, while the line bus 3802 is used for a B phase. Each of the line buses 3801, 3802, and 3803 comprises, for example, a 3×1.25"×¼" epoxy-coated, silver-plated or tin-plated copper bus. In an embodiment, each of the line buses 3801, 3802, and 3803 is insulated with electrical tape or Raychem insulation (not shown). The output connection has two heat sinks 3701 and 3709 per phase and aluminum lugs 3703. The output terminals 3702 of the 100%-rated, 600 A plug-in breaker 807 with the heat sinks 3701 and 3709 use the aluminum lugs 3703 for transmitting electric current within the modular plug-in power distribution panel assembly (MPIPDPA) 3700 shown in FIG. 37A. The line buses 3801, 3802, and 3803 illustrated in FIGS. 38A-38E and FIG. 38G, are configured for a 100%-rated, 600 A plug-in feeder breaker 807. The output connection 3702 comprises a bus extension for each phase, for example, the A-phase bus extension 3101a, the B-phase bus extension 3101b, and the C-phase bus extension 3101c illustrated in FIG. 32, and two additional pieces of a 0.25" thick copper bus. The two additional pieces of copper bus of thickness, for example, 0.25", constitute the supplementary bus for each phase as disclosed in the description of FIGS. 38A-38B. The bus extensions 3101a, 3101b, and 3101c are disposed below the supplementary buses 3708a, 3708b, and 3708c, respectively, at the end 2203b of the plug-in base 2203. The load buses 3708 are connected to plug-in base load terminals on one side and to the mechanical lugs 3703 and the heat sinks 3701 and 3709 on the other side. In an embodiment, 400 A and 600 A plug-in bases operate for both 400 A and 600 A plug-in breakers. However, the output connections for 400 A and 600 A breakers are different. The output connections of a 400 A breaker are shown in FIG. 33A and FIGS. 33C-33D, while a 600 A breaker requires a bus extension 3101a/3101b/3101c which makes the output area substantially larger. Consequently, for a MPIPDPA of a given height, a greater number of 400 A breakers can be accommodated therein compared to 600 A breakers. A 600 A breaker configured for an 80%-rated breaker is configured to support a 100%-rated 400 A breaker. For example, if the panel of the MPIPDPA is supplied with plug-in bases for 600 A breakers, a customer can choose to install a 400 A breaker on the plug-in bases to optimize cost. FIG. 38B also illustrates the safety trip lever 2203c configured to execute the safety function as disclosed in the description of FIGS. 3A-3B.

FIG. 38C illustrates a bottom perspective view of the embodiment of the breaker assembly of the breaker assembly 3800 with the breaker 807, showing output breaker connections with heat sinks 3701 and 3709 and lugs 3703 for cable connections. The maximum temperature rise permitted at the output terminals 3702 of the 100%-rated, 600 A plug-in breakers 807 is, for example, about 65° C. over ambient temperature. The maximum temperature rise allowed for the cable connections at the output lugs 3703 is 50° C. over ambient temperature for 75° C.-rated cables. The 100% rated breakers in the modular plug-in power distribution panel assembly (MPIPDPA) disclosed herein utilize or implement the use of standard 75° C.-rated cables for providing an overall solution that optimizes installation cost. The 75° C.-rated cables are used for 100%-rated breaker connections and electrical installation.

Figure 38E:
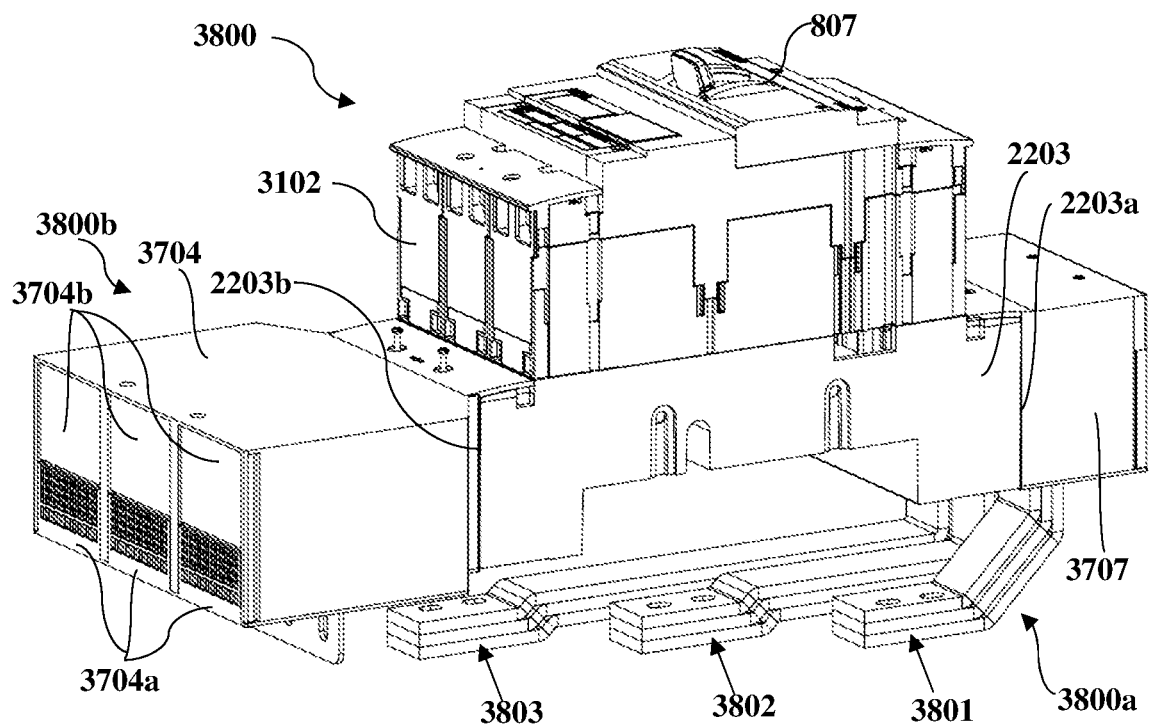
FIG. 38E illustrates a perspective view of an embodiment of the breaker assembly of the modular plug-in power distribution panel assembly shown in FIG. 37A, showing a lug cover covering the load side bus assembly.

FIG. 38E illustrates a perspective view of an embodiment of the breaker assembly 3800 of the modular plug-in power distribution panel assembly (MPIPDPA) 3700 shown in FIG. 37A, showing a lug cover 3704 covering the load side bus assembly 3800b. The lug cover 3704 is disposed over and attached to the lug cover base 3704a illustrated in FIGS. 38A-38D, to cover the mechanical lugs 3703 and the heat sinks 3701 and 3709 of the load side bus assembly 3800b.

Figure 38F:
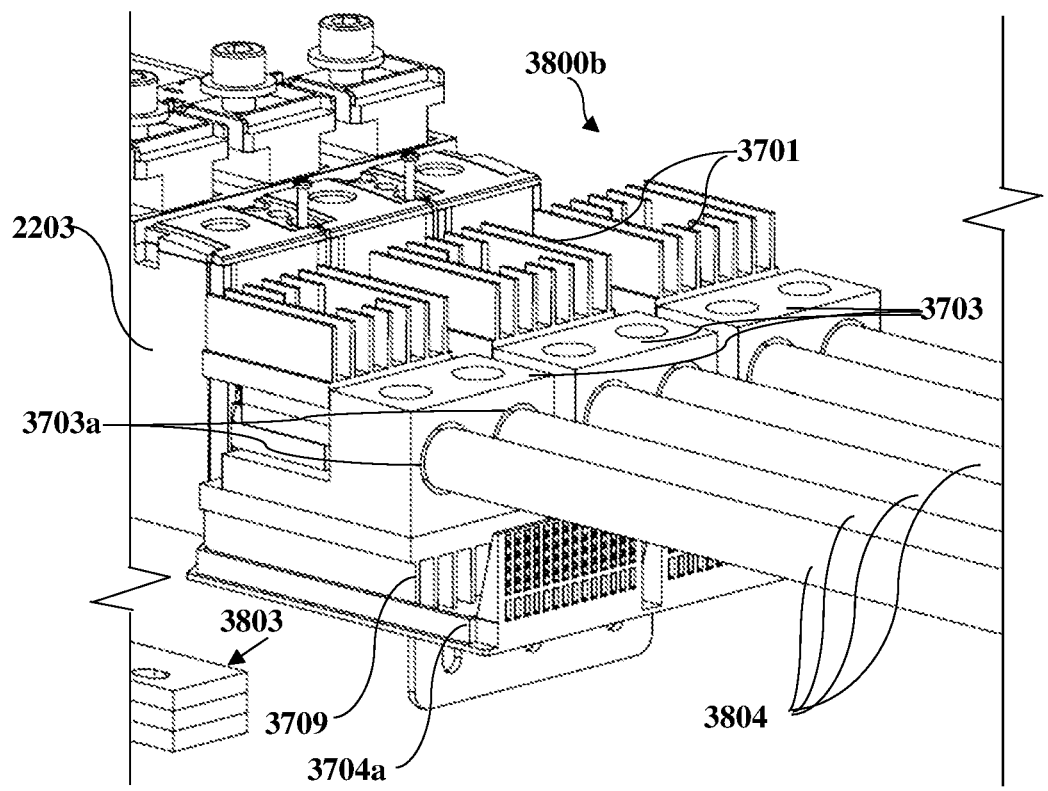
FIG. 38F illustrates a perspective, partial view of the load side bus assembly, showing cables connected to lugs of the load side bus assembly.

FIG. 38F illustrates a perspective, partial view of the load side bus assembly 3800b, showing cables 3804 connected to the mechanical lugs 3703 of the load side bus assembly 3800b. In an embodiment, each of the mechanical lugs 3703 comprises two openings 3703a for inserting and connecting the cables 3804 to the mechanical lugs 3703. The cables 3804 allow connections to the plug-in base 2203, and in turn to the plug-in breaker 807 illustrated in FIGS. 38A-38E and FIG. 38G, via the mechanical lugs 3703.

Figure 38G:
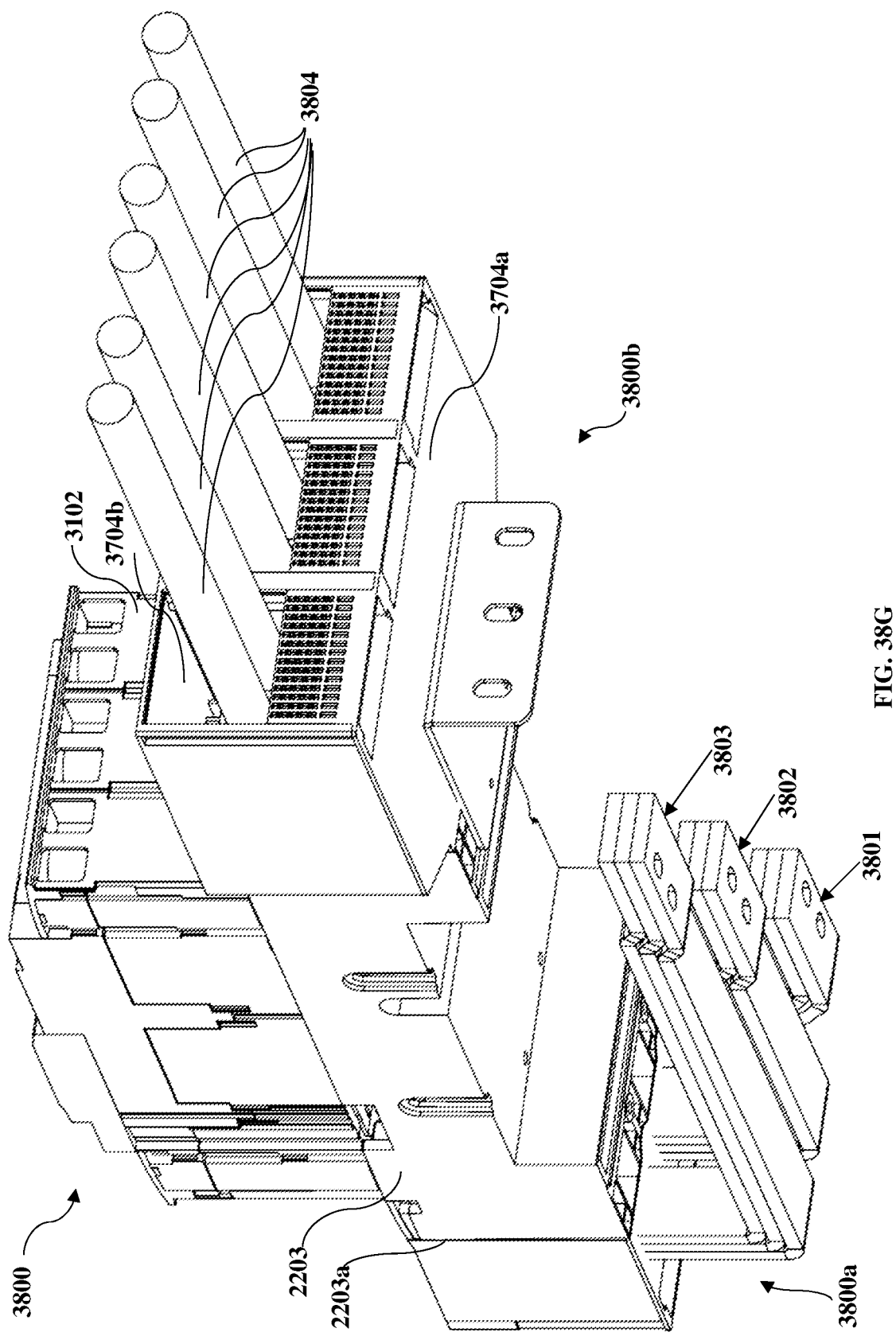
FIG. 38G illustrates a bottom perspective view of the embodiment of the breaker assembly of the modular plug-in power distribution panel assembly shown in FIG. 37A, showing cables extending from openings of the lug cover used to cover the lugs of the load side bus assembly.
Figure 39E:
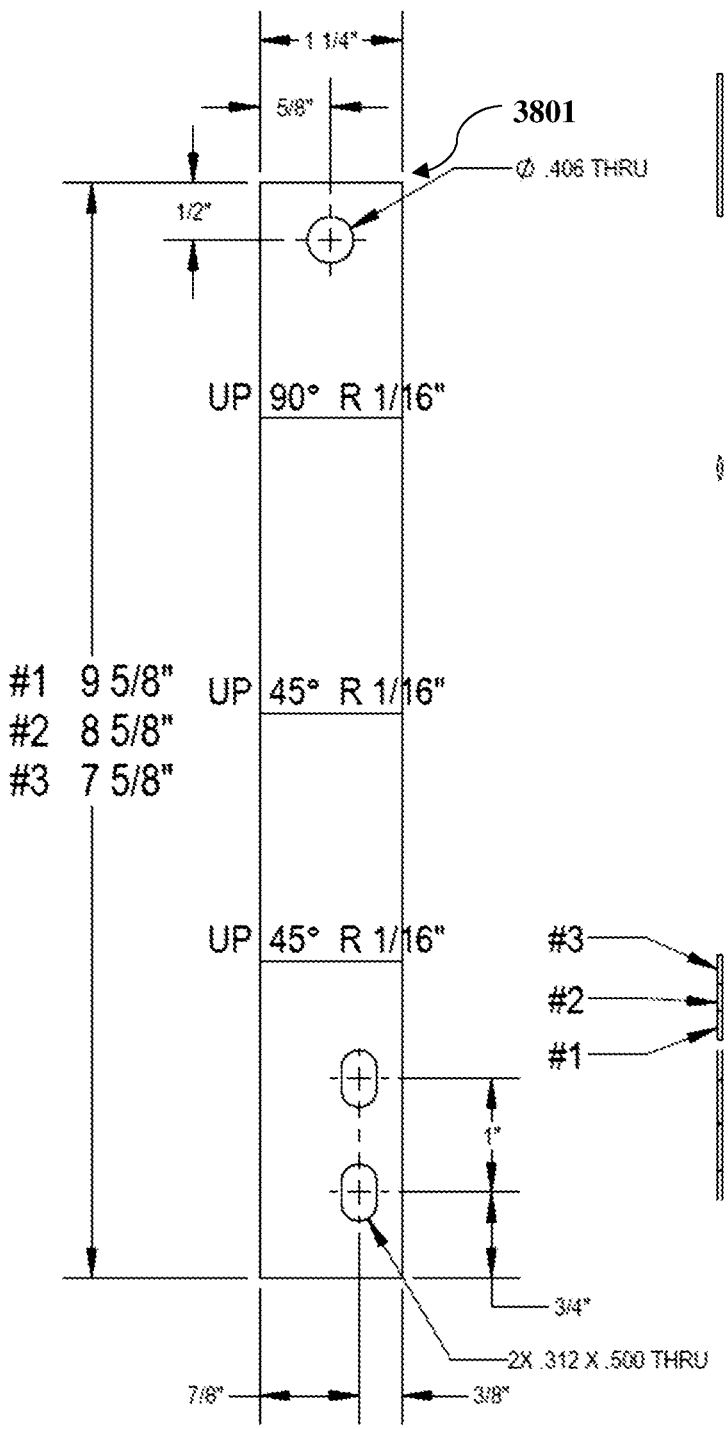
Figure 40E:
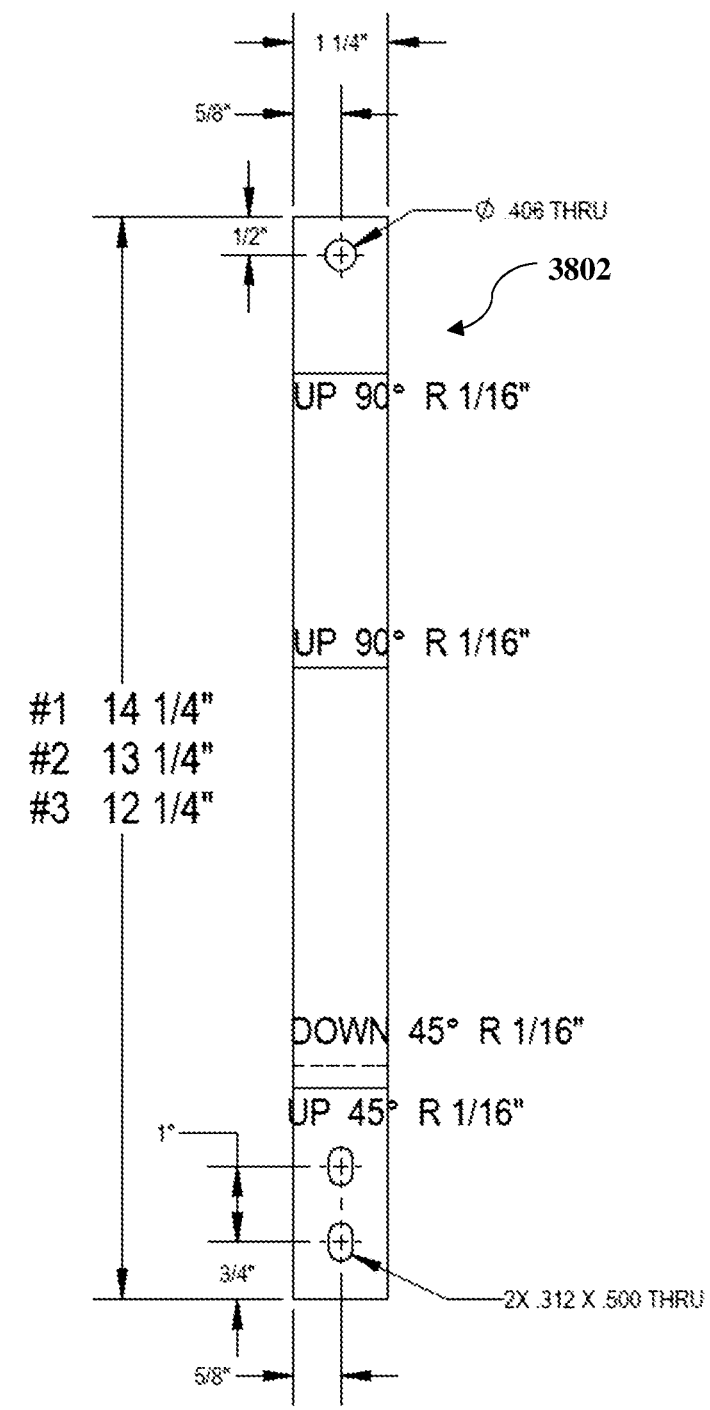
Figure 41E:
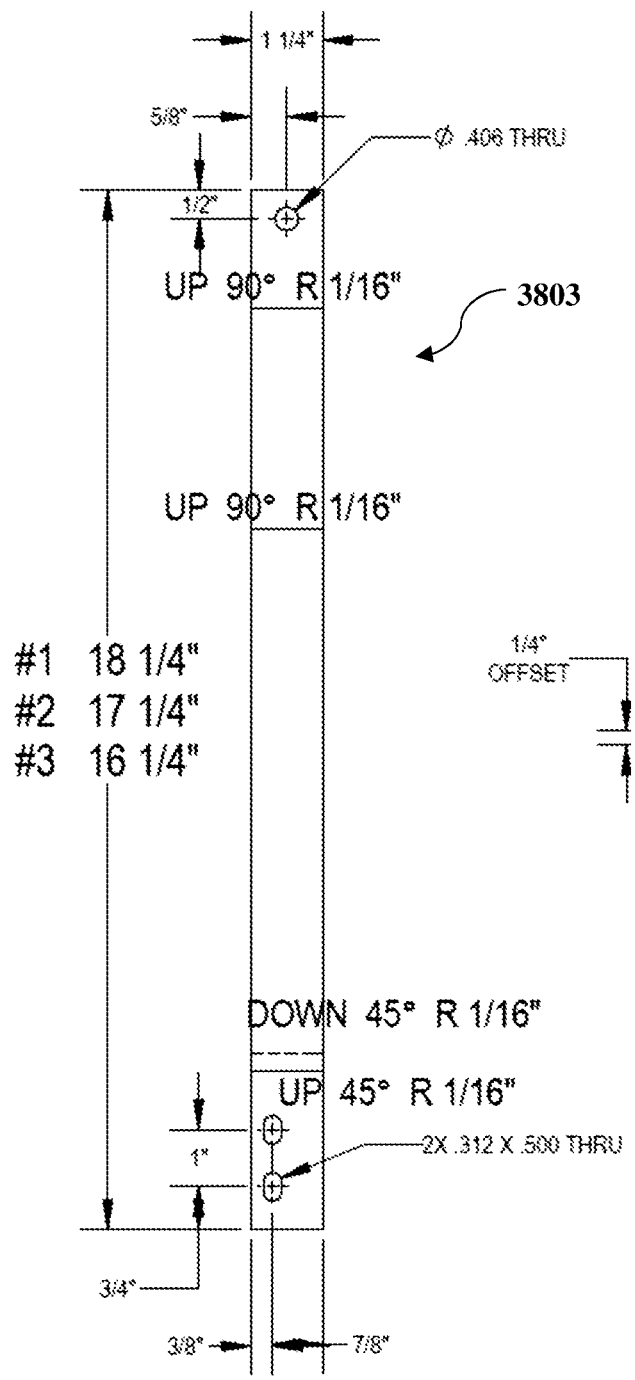

FIG. 38G illustrates a bottom perspective view of the embodiment of the breaker assembly 3800 of the modular plug-in power distribution panel assembly (MPIPDPA) 3700 shown in FIG. 37A, showing cables 3804 extending from openings 3704b of the lug cover 3704 used to cover the mechanical lugs 3703 of the load side bus assembly 3800b. After the cables 3804 are connected to the mechanical lugs 3703 through the openings 3703a of the mechanical lugs 3703 as illustrated in FIG. 38F, the lug cover 3704 is disposed over and attached to the lug cover base 3704a, thereby covering the mechanical lugs 3703 and the heat sinks 3701 and 3709 of the load side bus assembly 3800b as illustrated in FIGS. 38A-38D and FIG. 38F.

FIGS. 39A-39E illustrate different views of an embodiment of a line bus 3801 implemented for bus connections in a modular plug-in power distribution panel assembly (MPIPDPA) 3700 shown in FIG. 37A. The line bus 3801 is a part of the line side bus assembly 3800a disposed at the end 2203a of the plug-in base 2203 illustrated in FIGS. 38A-38E and FIG. 38G. The line bus 3801 is used for an A bus phase. The line bus 3801 is made, for example, of a copper material with dimensions, for example, a width of 1.25" and a thickness of ¼", that is 1.25"×¼". Exemplary dimensions of the line bus 3801 are illustrated in FIGS. 39A-39E.

FIGS. 40A-40E illustrate different views of another embodiment of a line bus 3802 implemented for bus connections in a modular plug-in power distribution panel assembly (MPIPDPA) 3700 shown in FIG. 37A. The line bus 3802 is a part of the line side bus assembly 3800a disposed at the end 2203a of the plug-in base 2203 illustrated in FIGS. 38A-38E and FIG. 38G. The line bus 3802 is used for a B bus phase. The line bus 3802 is made, for example, of a copper material with dimensions, for example, 1.25"×¼". Exemplary dimensions of the line bus 3802 are illustrated in FIGS. 40A-40E.

FIGS. 41A-41E illustrate different views of another embodiment of a line bus 3803 implemented for bus connections in a modular plug-in power distribution panel assembly (MPIPDPA) 3700 shown in FIG. 37A. The line bus 3803 is a part of the line side bus assembly 3800a disposed at the end 2203a of the plug-in base 2203 illustrated in FIGS. 38A-38E and FIG. 38G. The line bus 3803 is used for a C bus phase. The line bus 3803 is made, for example, of a copper material with dimensions, for example, 1.25"×¼". Exemplary dimensions of the line bus 3803 are illustrated in FIGS. 41A-41E. The line buses 3801, 3802, and 3803 illustrated in FIGS. 39A-39E, FIGS. 40A-40E, and FIGS. 41A-41E, respectively, are implemented for bus connections to the 100%-rated, 600 A plug-in breakers 807 of the MPIPDPA 3700 shown in FIG. 37A and FIGS. 38A-38B, FIGS. 38D-38E, and FIG. 38G.

Figure 42A:
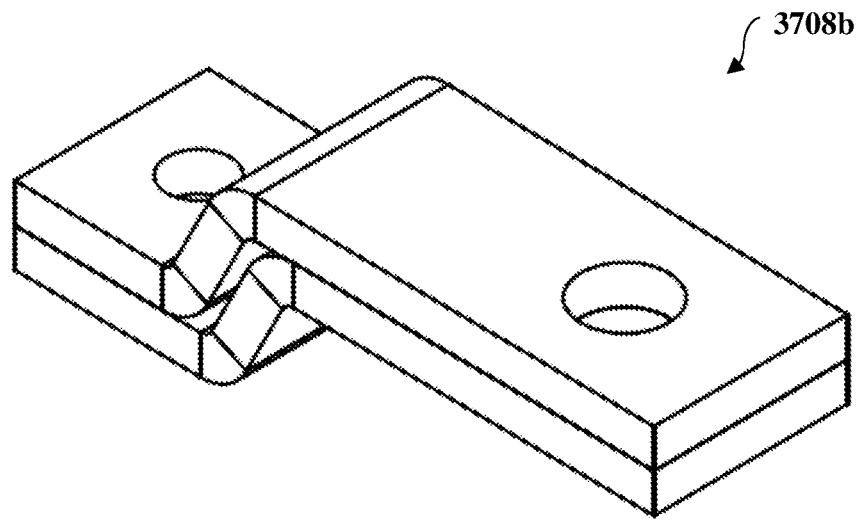
FIGS. 42A-42E illustrate different views of an embodiment of a supplementary bus of a load bus implemented for bus connections in a modular plug-in power distribution panel assembly.
Figure 42B:
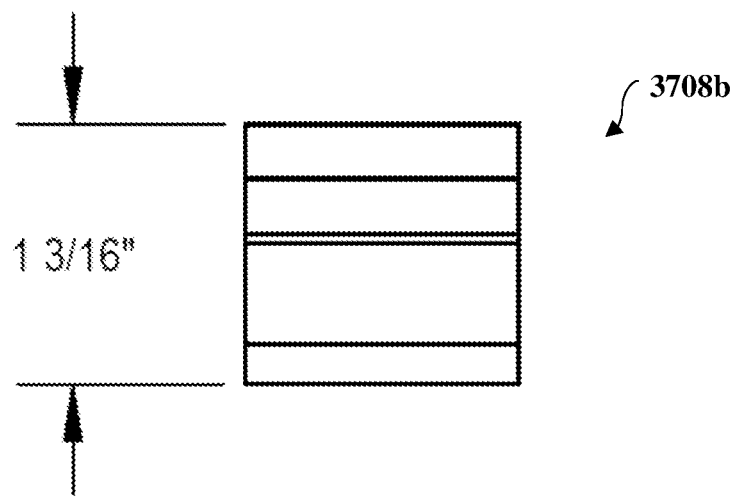
Figure 42C:
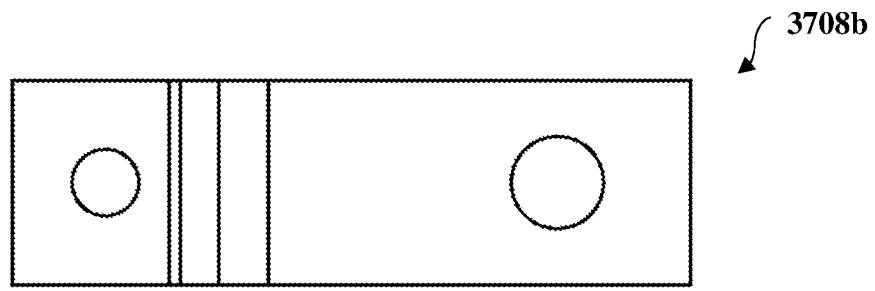
Figure 42D:
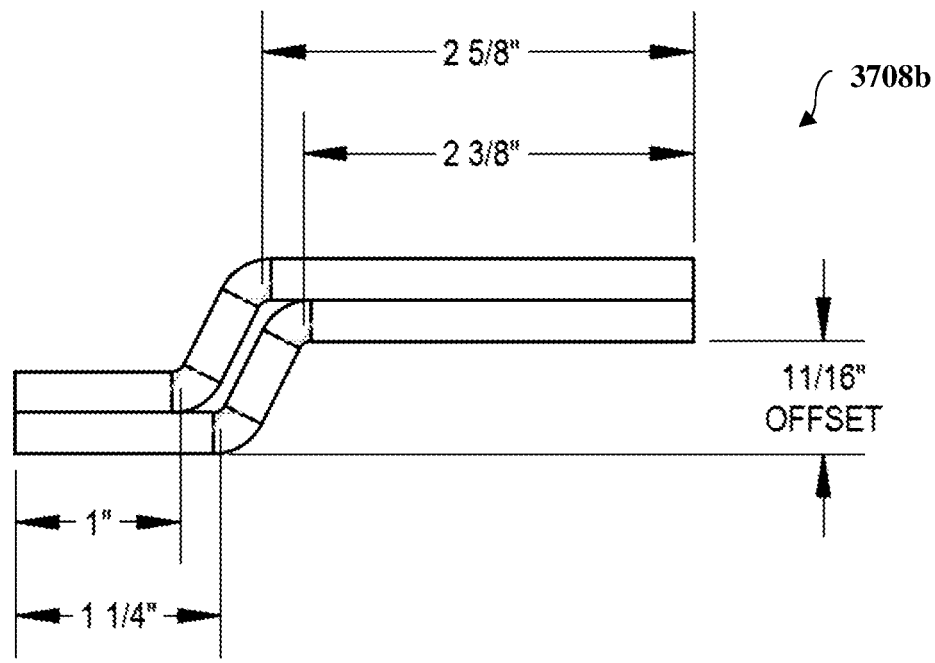
Figure 42E:
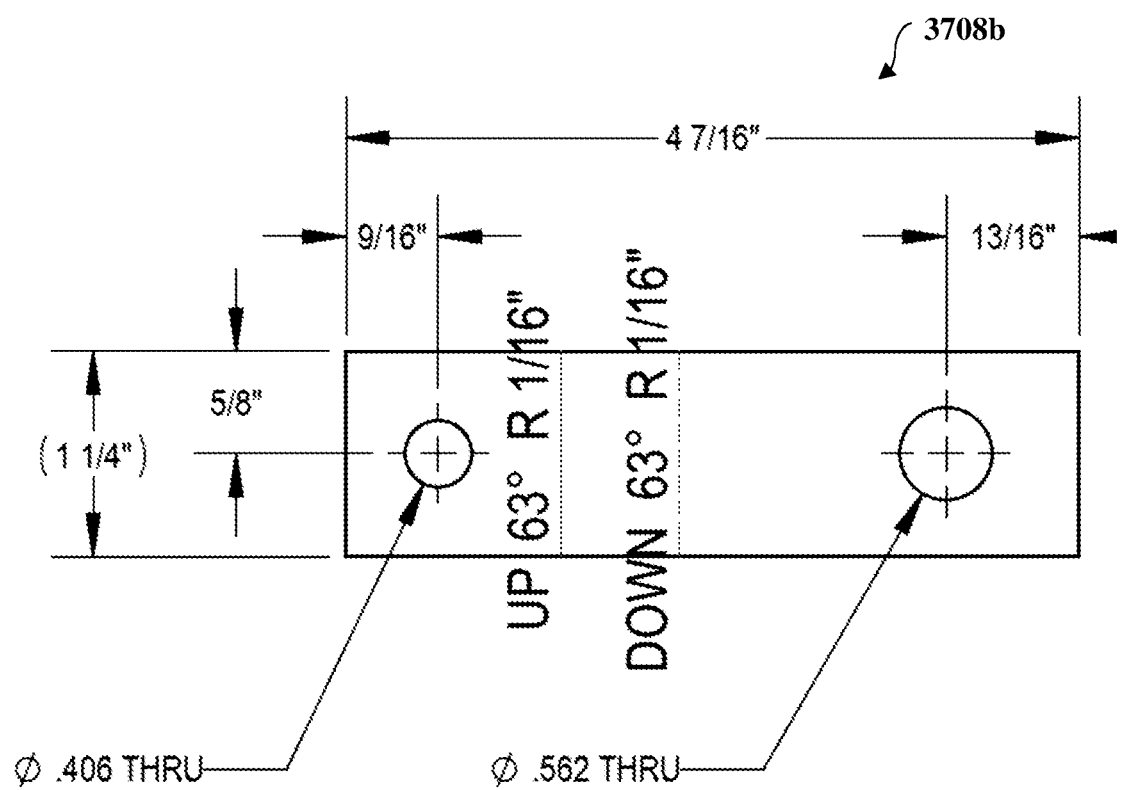

FIGS. 42A-42E illustrate different views of an embodiment of a supplementary bus 3708b of a load bus 3708 (not shown in FIGS. 38A-38C), implemented for bus connections in a modular plug-in power distribution panel assembly (MPIPDPA) 3700 shown in FIG. 37A. In addition to a bus extension 3101 for each bus phase illustrated in FIGS. 31-32, each load bus 3708 comprises two ¼" supplementary buses 3708b and 3708a/3708c as illustrated in FIGS. 42A-42E and FIGS. 43A-43E. As illustrated in FIGS. 42A-42E, the supplementary bus 3708b along with the bus extension 3101b illustrated in FIG. 32, constitutes a load bus 3708 which is a part of the load side bus assembly 3800b disposed at the end 2203b of the plug-in base 2203 illustrated in FIGS. 38A-38D and FIGS. 38F-38G. The supplementary bus 3708b is used for a B bus phase. The supplementary bus 3708b is made, for example, of a copper material with dimensions, for example, 1.25"×¼". Exemplary dimensions of the supplementary bus 3708b are illustrated in FIG. 42B and FIGS. 42D-42E.

FIGS. 43A-43E illustrate different views of an embodiment of a supplementary bus 3708a/3708c of a load bus 3708 shown in FIGS. 38A-38C, implemented for bus connections in the modular plug-in power distribution panel assembly (MPIPDPA) 3700 shown in FIG. 37A. The supplementary bus 3708a/3708c along with a corresponding bus extension 3101a/3101c constitutes a load bus 3708 which is a part of the load side bus assembly 3800b disposed at the end 2203b of the plug-in base 2203 illustrated in FIGS.

Figure 43B:
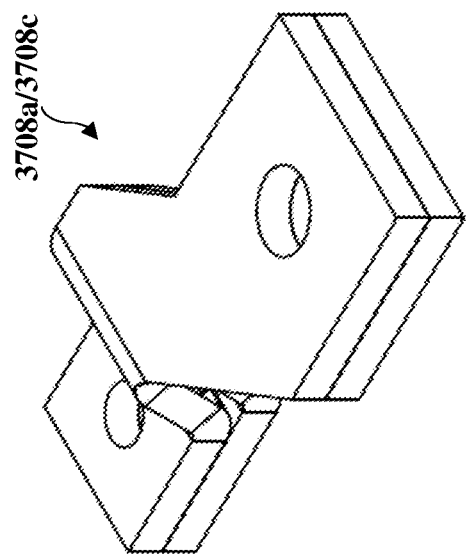
FIGS. 43A-43E illustrate different views of an embodiment of a supplementary bus of a load bus implemented for bus connections in the modular plug-in power distribution panel assembly.
Figure 43D:
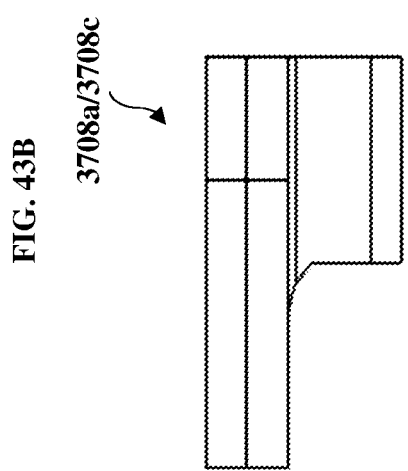
Figure 43A:
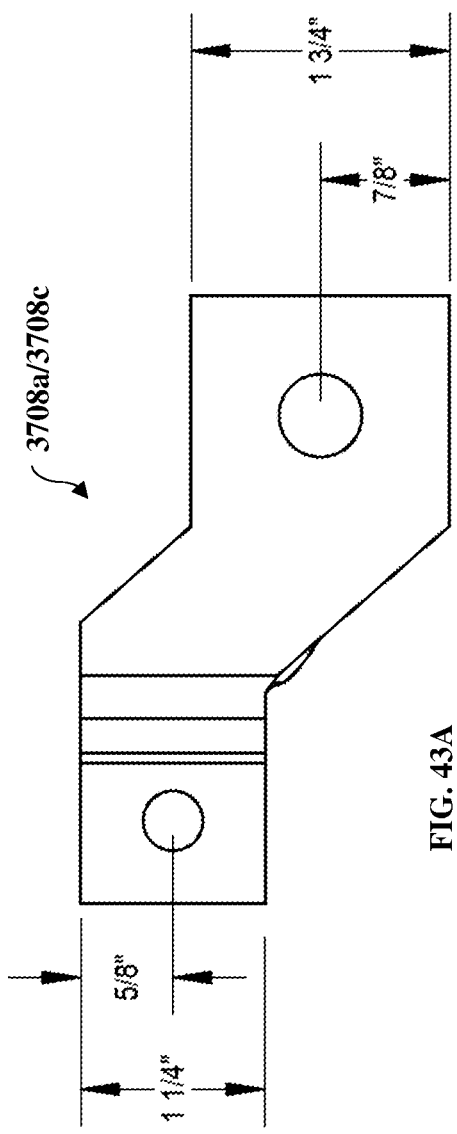
Figure 43C:
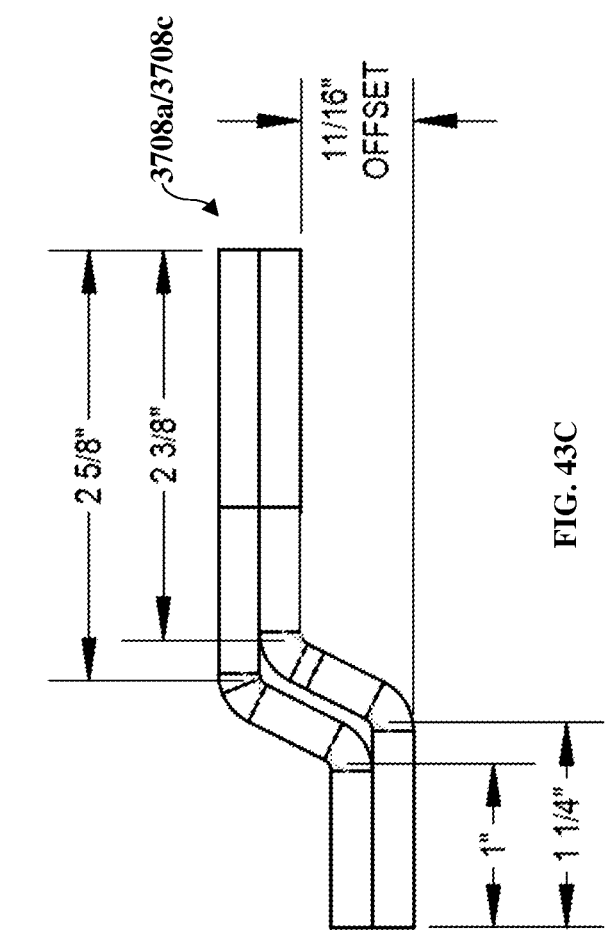
Figure 43E:
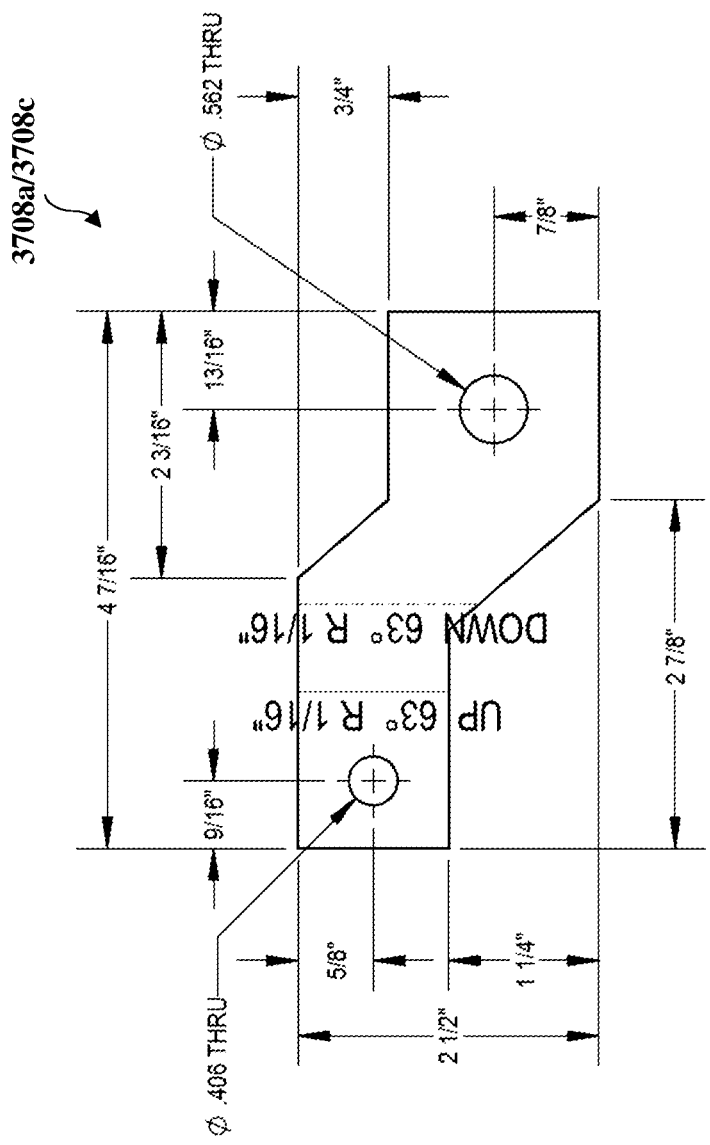

38A-38C. The supplementary bus 3708a/3708c is used for A and C bus phases. The supplementary bus 3708a/3708c is made, for example, of a copper material with dimensions, for example, a width of 2.5" and a depth of ¼", that is, 2.5"×¼". Exemplary dimensions of the supplementary bus 3708a/3708c are illustrated in FIG. 43A, FIG. 43C, and FIG. 43E. The supplementary buses 3708b and 3708a/3708c illustrated in FIGS. 42A-42E and FIGS. 43A-43E, respectively, are implemented for connecting the mechanical lugs 3703 to the terminals 3702 of the 100%-rated, 600 A plug-in breakers 807 of the MPIPDPA 3700 shown in FIG. 37A.

Figure 44A:
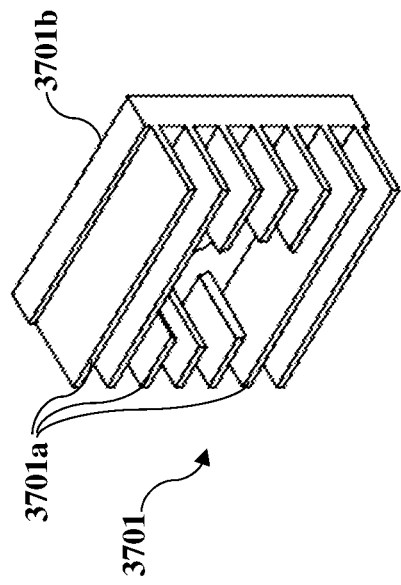
FIGS. 44A-44F illustrate different views of an embodiment of a heat sink implemented in the modular plug-in power distribution panel assembly.
Figure 44B:
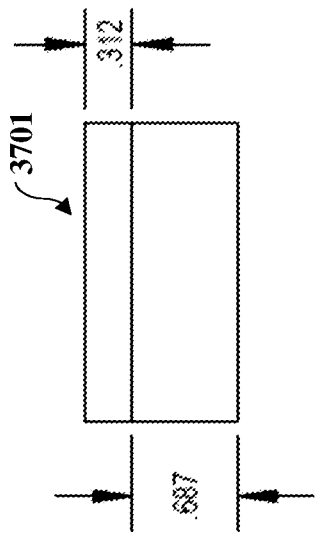
Figure 44C:
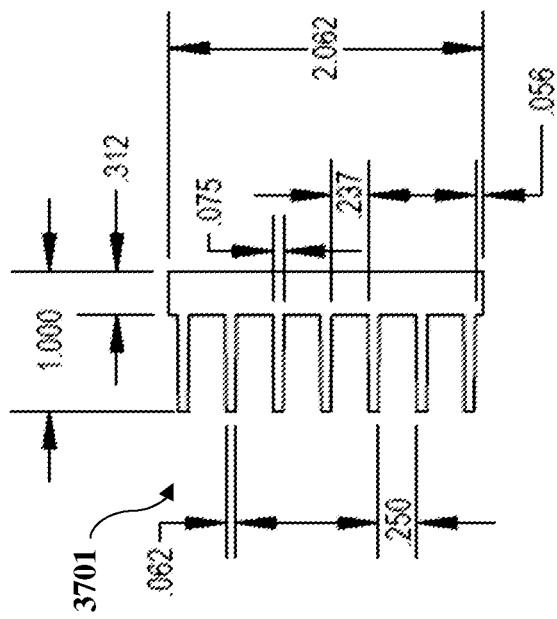
Figure 44D:
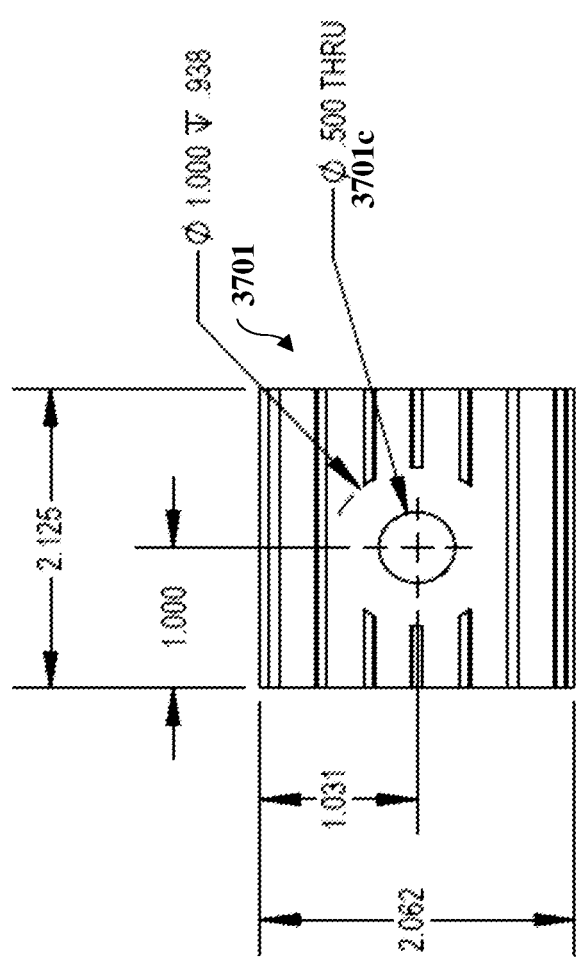
Figure 44E:
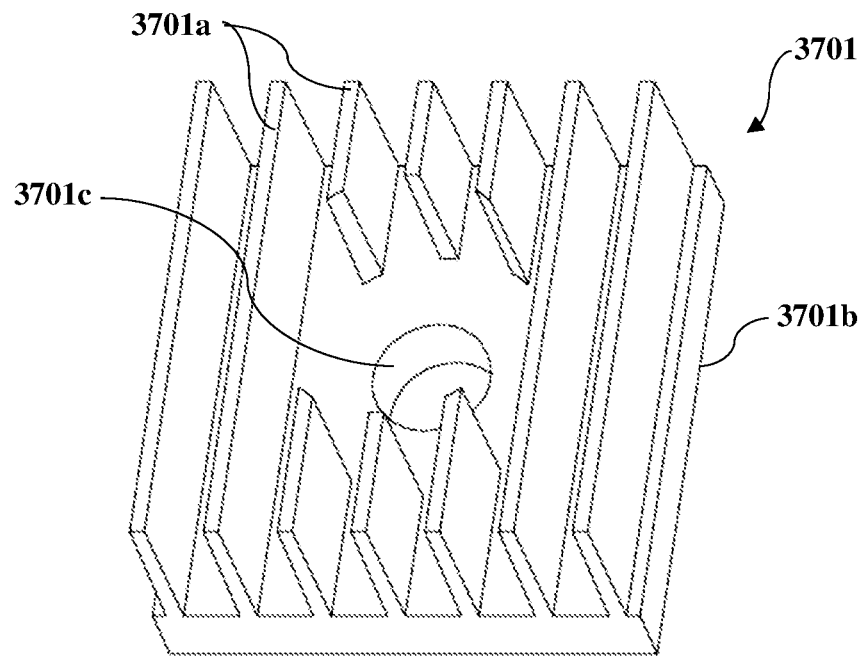
Figure 44F:
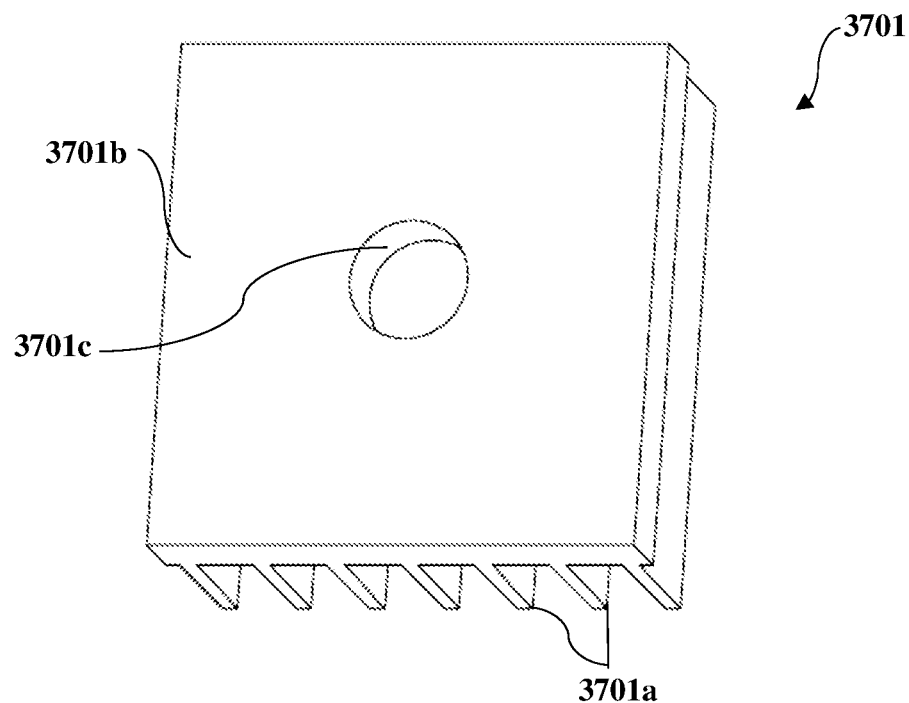

FIGS. 44A-44F illustrate different views of an embodiment of a heat sink 3701 implemented in the modular plug-in power distribution panel assembly (MPIPDPA) 3700 shown in FIGS. 37A-37D. The heat sink 3701 is a part of the load side bus assembly 3800b illustrated in FIGS. 38A-38D and FIG. 38F. The heat sink 3701 illustrated in FIGS. 44A-44F is the smaller sized upper heat sink 3701 of dimensions, for example, about 2.062 inches×2.125 inches, configured to be operably coupled to each of the terminals 3702 of the 100%-rated, 600 A plug-in breakers 807 in the MPIPDPA 3700 as illustrated in FIGS. 37A-37C, FIGS. 38A-38D, and FIG. 38F. The heat sink 3701 comprises an upper irregular surface 3701a and a lower flat surface 3701b as illustrated in FIGS. 44E-44F. The heat sink 3701 further comprises a through hole 3701c configured to receive a fastener, for example, a strong bolt 3705 as illustrated in FIGS. 37A-37C, for fastening each heat sink 3701 to a corresponding load bus 3708 as illustrated in FIGS. 38A-38D and FIG. 38F. The heat sink 3701 is made of aluminum and is black anodized to enhance cooling via radiation. In an embodiment, the upper irregular surface 3701a of the heat sink 3701 comprises a black anodized aluminum material, and the lower flat surface 3701b of the heat sink 3701 comprises a conducting material. In an embodiment, the bottom or lower flat surface 3701b of the heat sink 3701 is treated with a chemical film as illustrated in FIG. 44F, to enhance heat transfer via conduction. A top plan view, a perspective view, a front elevation view, a side elevation view, a front perspective view, and a rear perspective view of the heat sink 3701 are illustrated in FIGS. 44A-44F, respectively. Exemplary dimensions of the heat sink 3701 are illustrated in FIG. 44A and FIGS. 44C-44D.

Figure 45B:
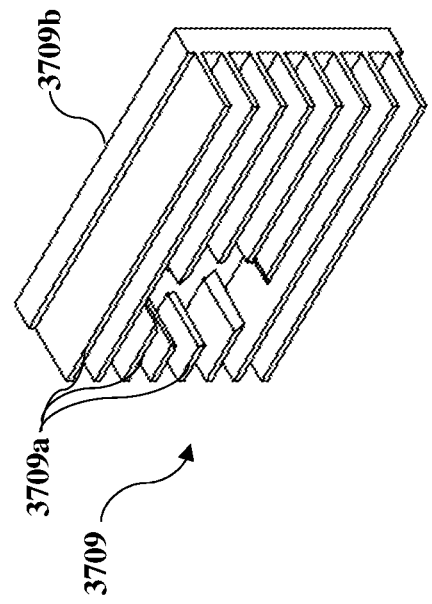
FIGS. 45A-45F illustrate different views of another embodiment of the heat sink implemented in the modular plug-in power distribution panel assembly.
Figure 45D:
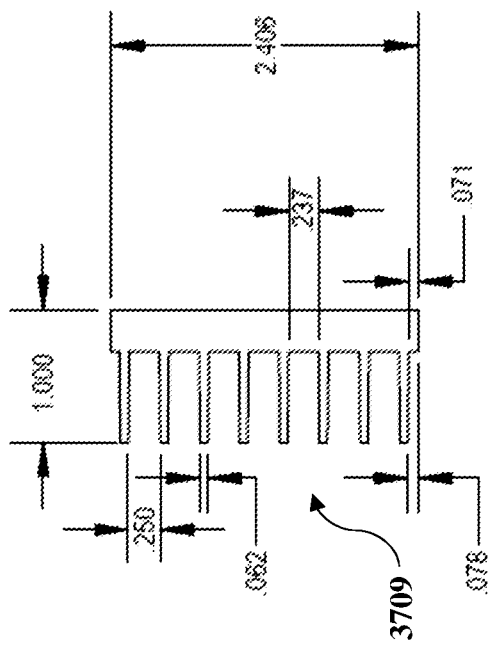
Figure 45A:
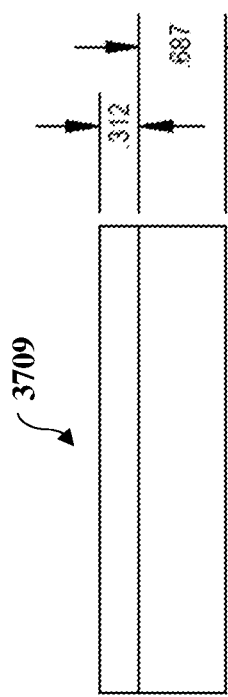
Figure 45C:
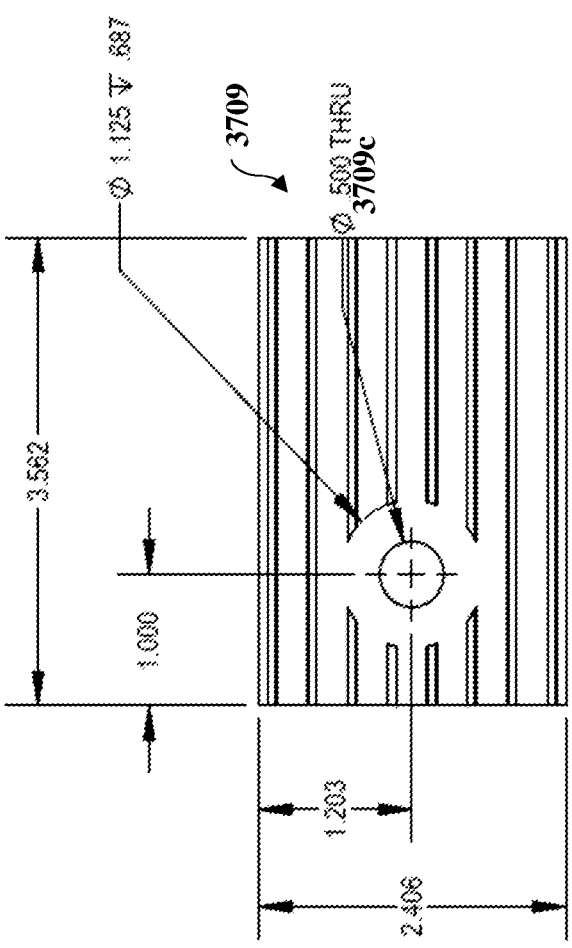
Figure 45F:
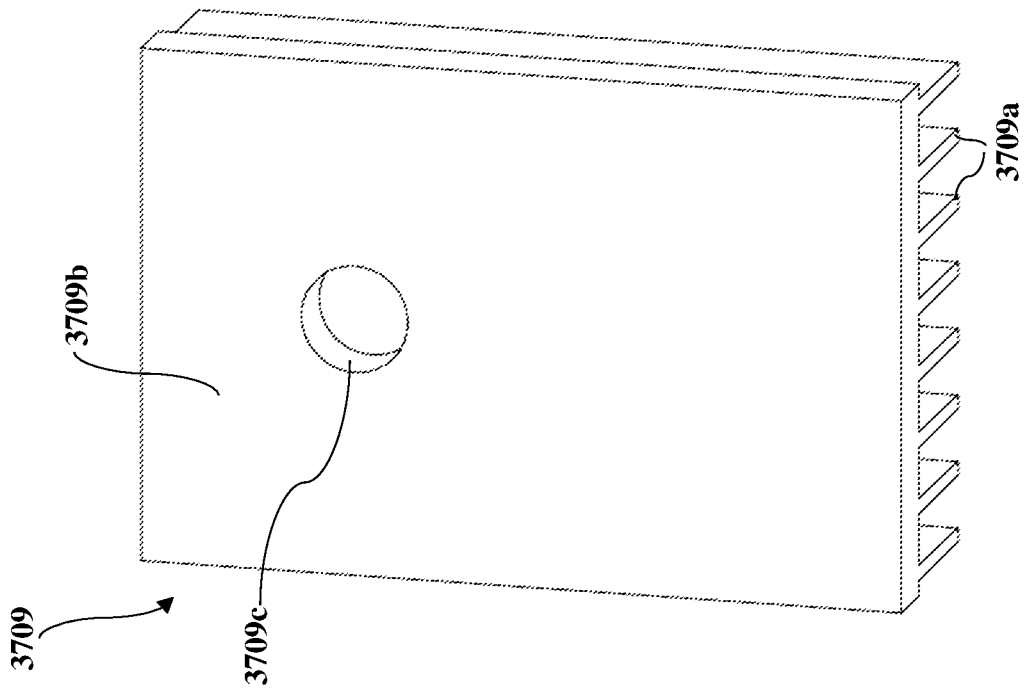
Figure 45E:
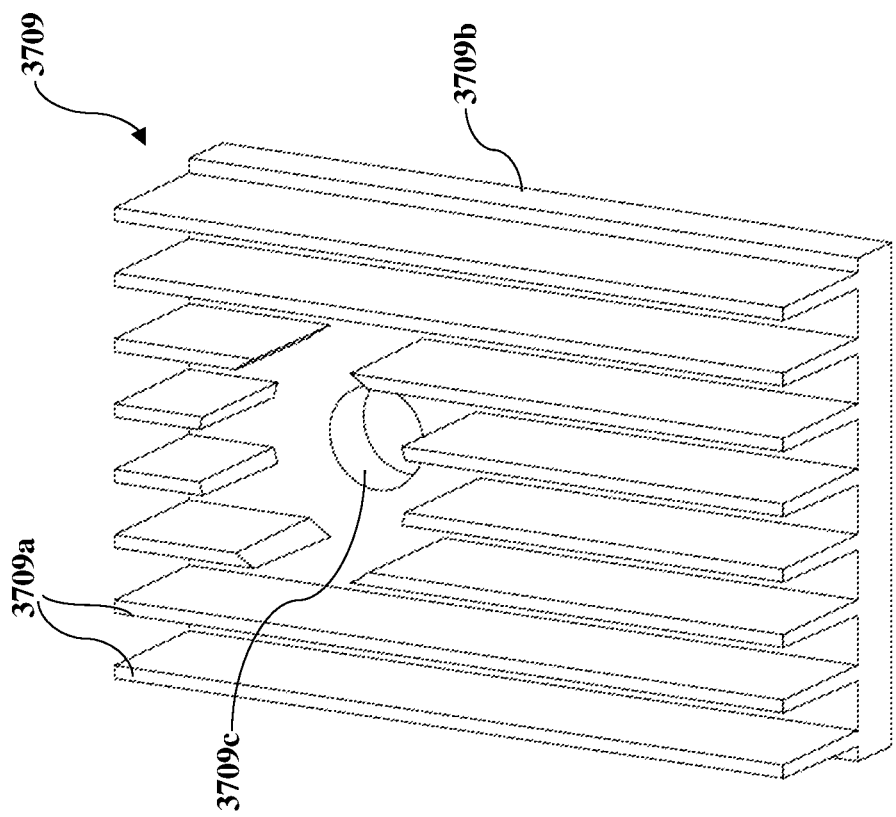
Figure 46B:
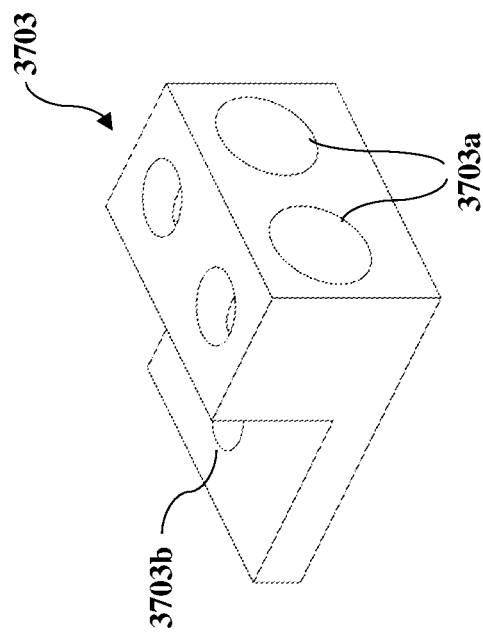
FIG. 46A-46E illustrate different views of an embodiment of a lug employed for a 100%-rated, 600 A plug-in breaker with heat sinks.
Figure 46D:
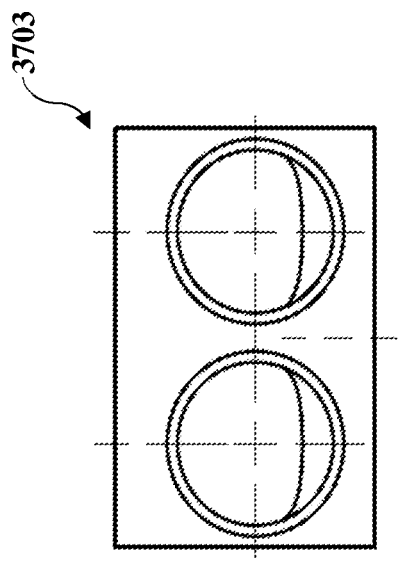
Figure 46A:
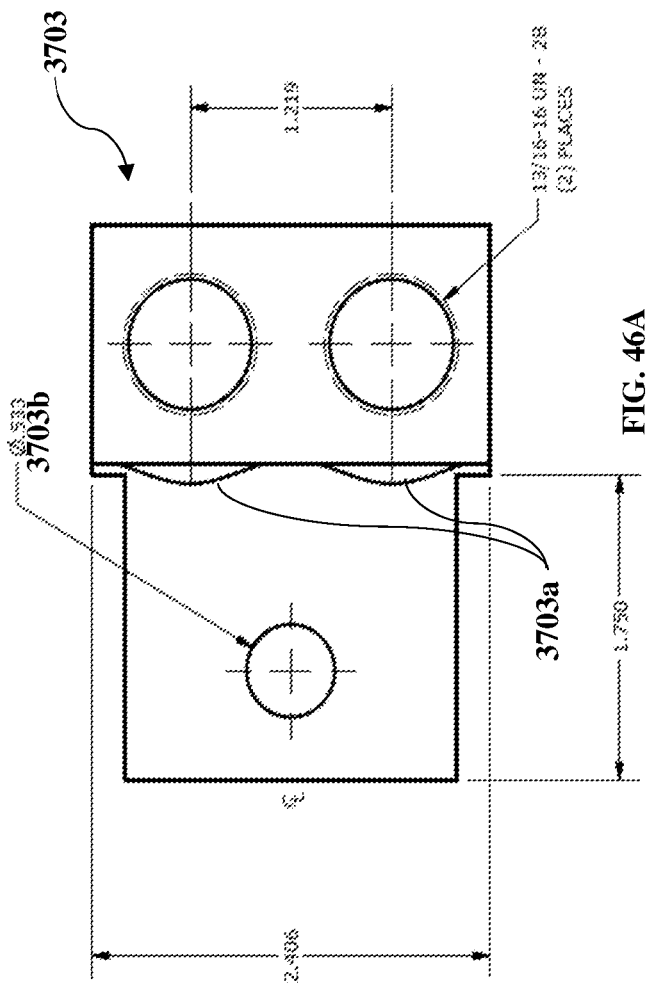
Figure 46C:
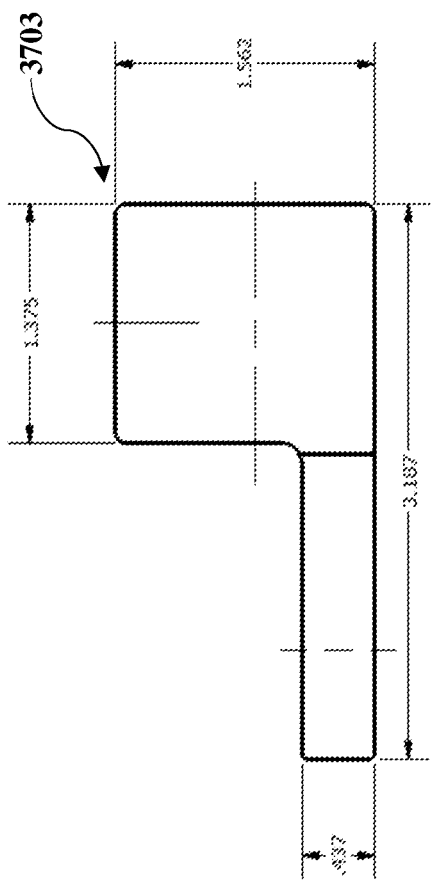
Figure 46E:
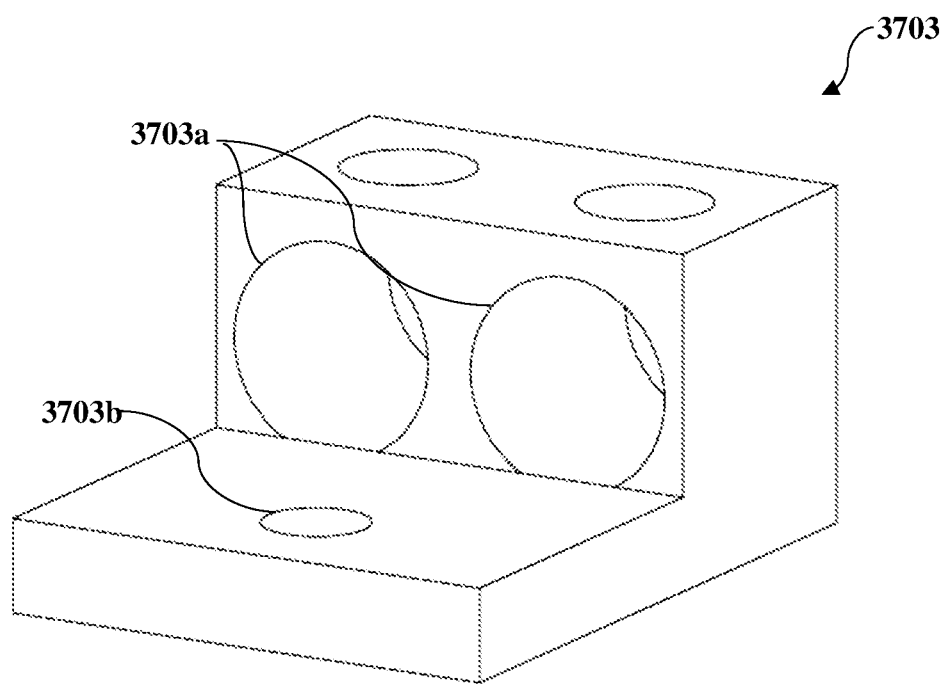

FIGS. 45A-45F illustrate different views of another embodiment of the heat sink 3709 implemented in the modular plug-in power distribution panel assembly (MPIPDPA) 3700 shown in FIGS. 37A-37D. The heat sink 3709 is a part of the load side bus assembly 3800b illustrated in FIG. 38A, FIGS. 38C-38D, and FIG. 38F. The heat sink 3709 illustrated in FIGS. 45A-45F is the larger sized lower heat sink 3709 of dimensions, for example, about 2.406 inches×3.562 inches, configured to be operably coupled to each of the terminals 3702 of the 100%-rated, 600 A plug-in breakers 807 in the MPIPDPA 3700 as illustrated in FIG. 37A, FIG. 37D, and FIGS. 38A-38C. The heat sink 3709 comprises an upper irregular surface 3709a and a lower flat surface 3709b as illustrated in FIGS. 45E-45F. The heat sink 3709 further comprises a through hole 3709c configured to receive a fastener, for example, a strong bolt (not shown), for fastening each heat sink 3709 to the mechanical lug 3703 as illustrated in FIG. 38A, FIGS. 38C-38D, and FIG. 38F. The heat sink 3709 is made of aluminum and is black anodized to enhance cooling via radiation. In an embodiment, the upper irregular surface 3709a of the heat sink 3709 comprises a black anodized aluminum material, and the lower flat surface 3709b of the heat sink 3709 comprises a conducting material. In an embodiment, the bottom or lower flat surface 3709b of the heat sink 3709 is treated with a chemical film as illustrated in FIG. 45F, to enhance heat transfer via conduction. A top plan view, a perspective view, a front elevation view, a side elevation view, a front perspective view, and a rear perspective view of the heat sink 3709 are illustrated in FIGS. 45A-45F, respectively. Exemplary dimensions of the heat sink 3709 are illustrated in FIG. 45A and FIGS. 45C-45D.

FIGS. 46A-46E illustrates different views of an embodiment of a lug 3703 employed for a 100%-rated, 600 A plug-in breaker 807 with heat sinks 3701 and 3709 shown in FIGS. 37A-37C, FIGS. 38A-38D, and FIG. 38F. The lug 3703 is a mechanical lug operably coupled between the heat sinks 3701 and 3709 as illustrated in FIG. 38A, FIG. 38C, and FIG. 38F. The lug 3703 illustrated in FIGS. 46A-46E is, for example, an aluminum cable lug selected for use with a 100%-rated, 600 A plug-in breaker 807. This lug 3703 is operably coupled proximal to each bus extension 3101a, 3101b, and 3101c as illustrated in FIGS. 38A-38C. The lug 3703 comprises an opening 3703b for inserting a fastener, for example, a screw, thereinto, for fastening the lug 3703 to a corresponding heat sink 3709 as illustrated in FIGS. 38A-38D, and FIG. 38F. The lug 3703 further comprises openings 3703a for cable connections as illustrated in FIG. 38F. In an embodiment, the heat sinks 3701 and 3709 are mounted on the bus extensions 3101a, 3101b, and 3101c, one on top and one on the bottom along with the aluminum lug 3703. The lug 3703 is made, for example, of aluminum, and is tin-plated to accept both copper and aluminum cables for added installation flexibility. The lug 3703 is configured to accommodate a range of cables, for example, from 6 American Wire Gauge (AWG) to 600 MCM cables. Therefore, the lug 3703 is capable of accommodating, for example, 2×350 MCM copper cables or 2×600 MCM aluminum cables for 600 A loads.

FIGS. 47A-47C illustrate tabular representations showing results of bench tests conducted with a 100%-rated, 600 A plug-in breaker 807 with heat sinks 3701 and 3709 shown in FIGS. 37A-37C, FIG. 38A, FIGS. 38C-38D, and FIG. 38F. The results show the temperature rise at the breaker line terminals, the breaker load connections at the lug, and the breaker load terminals for bus phases A, B, and C. UL witness testing that was performed to verify safety compliance showed that temperature rise for an MPIPDPA configured as a 1200 A modular plug-in panel is about 5° C. greater than the temperature rise found during the bench tests conducted with the 100%-rated, 600 A plug-in breaker 807 in free air.

In various embodiments, the modular plug-in power distribution panel assembly (MPIPDPA) is configured with ratings, for example, 800 A, 1000 A, and 1200 A. In an embodiment, the smallest MPIPDPA comprises, for example, six feeders or feeder breakers, for example, 250 A feeders or 150 A feeders. In another embodiment, the largest MPIPDPA comprises ten feeders, for example, 250 A feeders or 150 A feeders. In another embodiment, the MPIPDPA comprises more than ten feeders. The number of feeders depends on the height of the MPIPDPA. The breakers in the MPIPDPA are twin mounted, that is, two breakers are mounted per row, with barriers for exhausting gases in the event of a short circuit. In an embodiment, the MPIPDPA is configured as a main lug only (MLO) assembly comprising plug-in breakers. In another embodiment, the MPIPDPA is configured as a main breaker assembly comprising a non-plug-in main 3 VA breaker. Disclosed herein is also a method for increasing a short circuit rating of the MPIPDPA by series rating, for example, with a 250 A plug-in main breaker. This method increases the short circuit rating, for example, from about 10 kiloamperes (kA) to about 35 kA or about 50 kA through suitable design and safety testing. A series rating between a main breaker and feeder breakers in a main breaker MPIPDPA, for example, increases the rating of the panel to 100 kA by selecting the fixed main breaker that is rated 100 kA and a plug-in feeder breaker that is rated 25 kA.

In various embodiments, the modular plug-in power distribution panel assembly (MPIPDPA) comprises 100%-rated, 150 A, 250 A, 400 A, and 600 A feeder breakers. The embodiments herein disclose different designs of power distribution panels, for example, wall-mounted, 800 A and 1000 A power distribution panels, and floor-mounted 1200 A power distribution panels. Furthermore, the method and the MPIPDPA disclosed herein allow the use of aluminum lugs for 100%-rated breakers to optimize cost. The embodiments herein provide a fully touch-safe panel design including flexible Lexan® covers for the main lugs that accommodate various sizes and number of cables. The embodiments herein allow faster and easier maintenance and the ability to add feeder breakers without the need to power down the main power or other critical loads. The embodiments herein provide a cooling method using black anodized aluminum heat sinks for larger 400 A and 600 A feeder breakers. The embodiments herein use aluminum lugs for 150 A, 250 A, and 400 A feeder breakers for 100% rating. The embodiments herein also use a barrier for twin 150 A or 250 A breakers that helps to safely direct gases out of the electrical enclosure in the event of a short circuit. The embodiments herein also use epoxy coated B-phase bus straps for the twin mounted breakers with a thin coating of, for example, about 0.20 mm to 0.30 mm thickness, that provides adequate electrical insulation and ensures operability of the MPIPDPA. The MPIPDPA comprises various barriers configured to implement touch-safety of the panels or panelboards. The embodiments herein comprise a Lexan® barrier for the incoming cables that accommodates different sizes, number of cables, and still maintains the touch-safe feature of the MPIPDPA. In the closed position, the panel doors of the MPIPDPA are secured using fasteners, for example, screws, and locked using door locks to ensure safety. In various other embodiments, 3 VA connection technology comprising, for example, aluminum wire connectors, terminal covers, copper wire connectors, nut keeper kits, bus connector extensions, rear connection studs, phase barriers, insulating plates, etc., are incorporated where applicable in the MPIPDPA.

The foregoing examples and illustrative implementations of various embodiments have been provided merely for explanation and are in no way to be construed as limiting of the embodiments disclosed herein. Dimensions of various parts of the modular plug-in power distribution panel assembly disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A modular plug-in power distribution panel assembly for addition of critical loads, the modular plug-in power distribution panel assembly comprising:
   an electrical enclosure configured to accommodate a panel therewithin;
   a bus bar assembly comprising a plurality of bus bars operably coupled to the panel, wherein the bus bar assembly further comprises bus straps selectively configured and connected to a main bus to provide electrical insulation and enhance flexibility and operability of the modular plug-in power distribution panel assembly;
   a plurality of plug-in bases operably coupled to the panel via the bus bar assembly, wherein the plug-in bases are configured to connect a plurality of cables during initial installation for adding a configurable number of plug-in breakers to the panel without shutting power down;
   a plurality of plug-in breakers detachably coupled to the plug-in bases, wherein the plug-in breakers are configured to be coupled to the plug-in bases without powering down one of a main power and the critical loads;
   one or more barriers configured for the plug-in breakers, wherein the one or more barriers are configured to securely direct gases produced within the electrical enclosure, out of the electrical enclosure to an external environment, in an event of a short circuit; and
   a plurality of heat sinks operably coupled to terminals of the plug-in breakers, wherein the heat sinks are configured to cool the terminals of the plug-in breakers.

2. The modular plug-in power distribution panel assembly of claim 1 configured as a touch-safe, 100%-rated power distribution panel and as one of a wall-mounted power distribution panel and a floor-mounted power distribution panel.

3. The modular plug-in power distribution panel assembly of claim 1 configured as one of an 800-ampere power distribution panel, a 1000-ampere power distribution panel, and a 1200-ampere power distribution panel.

4. The modular plug-in power distribution panel assembly of claim 3, wherein the one of the 800-ampere power distribution panel, the 1000-ampere power distribution panel, and the 1200-ampere power distribution panel is configured with one of a main lug assembly and a main breaker assembly, wherein the main breaker assembly comprises a non-plug-in main breaker.

5. The modular plug-in power distribution panel assembly of claim 1 configured as a power distribution unit comprising a transformer section and a power distribution panel section, wherein the transformer section comprising a main breaker is bus connected to the power distribution panel section comprising the plurality of plug-in breakers.

6. The modular plug-in power distribution panel assembly of claim 1, further comprising one or more plug-in panelboards that are each series rated with a plug-in breaker of a predetermined ampacity for increasing a short circuit rating of the modular plug-in power distribution panel assembly, wherein the plug-in breaker is a 250-ampere main breaker.

7. The modular plug-in power distribution panel assembly of claim 1, wherein the plug-in breakers are 100%-rated plug-in breakers comprising one or more of 150-ampere plug-in breakers, 250-ampere plug-in breakers, 400-ampere plug-in breakers, and 600-ampere plug-in breakers, and wherein the plug-in breakers are twin mounted to the plug-in bases on the panel.

8. The modular plug-in power distribution panel assembly of claim 7, wherein the 100%-rated plug-in breakers comprise electronic trip units for added flexibility and reliability.

9. The modular plug-in power distribution panel assembly of claim 1, wherein the heat sinks are made of a black anodized aluminum material.

10. The modular plug-in power distribution panel assembly of claim 1, further comprising lugs made of aluminum for implementing 100%-rated plug-in breakers comprising one or more of 150-ampere plug-in breakers, 250-ampere plug-in breakers, 400-ampere plug-in breakers, and 600-ampere plug-in breakers, wherein 75° C.-rated cables are used for load connections to the 100%-rated plug-in breakers.

11. The modular plug-in power distribution panel assembly of claim 1, further comprising flexible covers configured for main lugs, wherein the flexible covers are made of a polycarbonate resin thermoplastic material, and wherein the flexible covers are configured to accommodate a configurable number of cables of different sizes.

12. The modular plug-in power distribution panel assembly of claim 1, wherein the bus straps comprise B-phase bus straps coated with an epoxy coating having a certified reduced thickness configured to provide the electrical insulation and ensure the operability of the modular plug-in power distribution panel assembly.

13. The modular plug-in power distribution panel assembly of claim 1, further comprising one or more supplementary barriers for incoming cables, wherein the one or more supplementary barriers are configured to accommodate a configurable number of cables of different sizes per phase and maintain touch-safety of the modular plug-in power distribution panel assembly, wherein the one or more supplementary barriers are made of a polycarbonate resin thermoplastic material.

14. The modular plug-in power distribution panel assembly of claim 1, further comprising notches configured at a base of the electrical enclosure for attaching to lifting equipment on one or more sides of the electrical enclosure to facilitate ease of moving and handling the modular plug-in power distribution panel assembly.

15. The modular plug-in power distribution panel assembly of claim 1, further comprising an anchoring element configured to anchor the electrical enclosure to a ground surface, wherein structure of the modular plug-in power distribution panel assembly and a base of the electrical enclosure with the anchoring element are configured to meet stringent seismic requirements.

16. The modular plug-in power distribution panel assembly of claim 1 configured to flexibly mount a support for a metal framing system on a top end of the electrical enclosure for allowing flexible movement of the metal framing system configured to provide support for a plurality of electrical conduits.

17. The modular plug-in power distribution panel assembly of claim 1, wherein the bus bar assembly further comprises:
a neutral bus operably coupled to each of opposing sides of the electrical enclosure for allowing flexible and secure neutral connections for feeder breakers among the plug-in breakers; and
a line side bus assembly and a load side bus assembly operably coupled to terminals configured at opposing ends of each of the plug-in bases for supply and distribution of electric power within the modular plug-in power distribution panel assembly.

18. The modular plug-in power distribution panel assembly of claim 1, wherein the bus bar assembly implements a plurality of bus configurations and designs for the plug-in breakers for flexibly accommodating the plug-in breakers rated 80% and 100%, wherein the plug-in breakers comprise 150-ampere plug-in breakers, 250-ampere plug-in breakers, 400-ampere plug-in breakers, and 600-ampere plug-in breakers.

19. The modular plug-in power distribution panel assembly of claim 1 with a main breaker configured to be series rated for cost optimization and characterized by:
bus connections to the main breaker being epoxy insulated to prevent any arcing during a short circuit interruption;
increased size of the electrical enclosure to provide a large volume for the gases released from a breaker, during a short circuit, to expand;
optimized size of the electrical enclosure to provide an adequate volume for the gases released from the breaker, during a short circuit, to expand, and to provide sufficient cable bend radius for connecting load cables;
extensive testing performed for validating design of the modular plug-in power distribution panel assembly; and
witness testing performed for verifying safety compliance and for maintaining high series ratings.

20. The modular plug-in power distribution panel assembly of claim 1, wherein the bus bar assembly is configured to allow bus connections of an increased number of the plug-in breakers to a main bus, and wherein one of a part of a plug-in panel section and a supplementary section is configured for incoming cables.

* * * * *